US012571995B2

(12) United States Patent
Lin et al.

(10) Patent No.: US 12,571,995 B2
(45) Date of Patent: Mar. 10, 2026

(54) PHOTOGRAPHING LENS ASSEMBLY, IMAGE CAPTURING UNIT AND ELECTRONIC DEVICE

(71) Applicant: LARGAN PRECISION CO., LTD., Taichung City (TW)

(72) Inventors: Guan-Bo Lin, Taichung City (TW); Hsiang-Chi Tang, Taichung City (TW); Chun-Che Hsueh, Taichung City (TW); I-Hsuan Chen, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 462 days.

(21) Appl. No.: 18/097,952

(22) Filed: Jan. 17, 2023

(65) Prior Publication Data

US 2024/0159937 A1 May 16, 2024

(30) Foreign Application Priority Data

Nov. 18, 2022 (TW) .................................. 111144183

(51) Int. Cl.
*G02B 13/00* (2006.01)
*G02B 9/34* (2006.01)
(Continued)

(52) U.S. Cl.
CPC ........... *G02B 13/0055* (2013.01); *G02B 9/34* (2013.01); *G02B 9/60* (2013.01); *G02B 9/62* (2013.01);
(Continued)

(58) Field of Classification Search
CPC ........ G02B 13/0055; G02B 9/34; G02B 9/60; G02B 9/62; G02B 13/004; G02B 13/0045; G02B 13/0065
See application file for complete search history.

(56) References Cited

U.S. PATENT DOCUMENTS 10,408,416 B2   9/2019   Khorasaninejad et al.
10,591,643 B2   3/2020   Lin et al.
(Continued)

FOREIGN PATENT DOCUMENTS

CN      113156620 A      7/2021
CN      114578513 A      6/2022
(Continued)

OTHER PUBLICATIONS

TW Office Action dated Jan. 8, 2024 as received in Application No. 111144183.
(Continued)

*Primary Examiner* — Wen Huang
(74) *Attorney, Agent, or Firm* — Maschoff Brennan

(57) ABSTRACT
A photographing lens assembly includes at least four lens elements that are, in order from an object side to an image side along an optical path, a first lens element, a second lens element, at least one subsequent lens element and a last lens element that is closest to an image surface. Each of the at least four lens elements has an object-side surface facing toward the object side and an image-side surface facing toward the image side. At least one surface among lens surfaces from the image-side surface of the second lens element to the object-side surface of the last lens element is a metasurface having a subwavelength microstructure.

37 Claims, 61 Drawing Sheets

(51) Int. Cl.
    *G02B 9/60*         (2006.01)
    *G02B 9/62*         (2006.01)

(52) U.S. Cl.
    CPC ....... *G02B 13/004* (2013.01); *G02B 13/0045* (2013.01); *G02B 13/0065* (2013.01)

(56)         References Cited

U.S. PATENT DOCUMENTS

| | | | |
|---|---|---|---|
| 10,761,328 | B2 | 9/2020 | Hu |
| 10,816,815 | B2 | 10/2020 | Aieta et al. |
| 11,079,520 | B2 | 8/2021 | Tsai et al. |
| 11,089,197 | B1 | 8/2021 | Taylor et al. |
| 11,201,993 | B1 | 12/2021 | Wang et al. |
| 11,454,808 | B2 | 9/2022 | Park et al. |
| 11,835,680 | B2 | 12/2023 | Groever et al. |
| 2017/0082263 | A1 | 3/2017 | Byrnes et al. |
| 2018/0267270 | A1 | 9/2018 | Han et al. |
| 2020/0116900 | A1 | 4/2020 | Chiu et al. |
| 2020/0174163 | A1 | 6/2020 | Han et al. |
| 2021/0028215 | A1 | 1/2021 | Devlin et al. |
| 2021/0103075 | A1 | 4/2021 | Park et al. |
| 2021/0132256 | A1 | 5/2021 | Park et al. |
| 2021/0149081 | A1 | 5/2021 | Groever et al. |
| 2021/0149082 | A1 | 5/2021 | Chen et al. |
| 2021/0247549 | A1 | 8/2021 | Park et al. |
| 2021/0271000 | A1 | 9/2021 | Park et al. |
| 2021/0318516 | A1 | 10/2021 | Han et al. |
| 2021/0405270 | A1 | 12/2021 | Han et al. |
| 2022/0011594 | A1 | 1/2022 | Newman et al. |
| 2022/0048764 | A1 | 2/2022 | Chen et al. |
| 2022/0082731 | A1 | 3/2022 | Mun et al. |
| 2022/0082794 | A1 | 3/2022 | Kim et al. |
| 2022/0137259 | A1 | 5/2022 | Greco et al. |
| 2022/0146711 | A1 | 5/2022 | Greco et al. |
| 2022/0206186 | A1 | 6/2022 | Chen et al. |
| 2022/0229207 | A1 | 7/2022 | Li et al. |
| 2022/0239883 | A1 | 7/2022 | Wong |
| 2023/0078816 | A1* | 3/2023 | Zhuang .................. H04N 23/55 359/708 |
| 2023/0280497 | A1 | 9/2023 | Liu |
| 2025/0123469 | A1* | 4/2025 | Hao ........................ C03C 17/02 |

FOREIGN PATENT DOCUMENTS

| | | |
|---|---|---|
| CN | 114660780 A | 6/2022 |
| CN | 114779437 A | 7/2022 |
| CN | 114859447 A | 8/2022 |
| CN | 115016099 A | 9/2022 |
| CN | 115032766 A | 9/2022 |
| KR | 10-2013-0064684 A | 6/2013 |
| KR | 10-1846021 B1 | 4/2018 |
| WO | 2022/051971 A1 | 3/2022 |
| WO | 2023/109412 A1 | 6/2023 |
| WO | 2023/246451 A1 | 12/2023 |
| WO | 2024/070611 A1 | 4/2024 |

OTHER PUBLICATIONS

Extended European Search Report dated Feb. 1, 2024 as received in Application No. 23152251.7.

* cited by examiner

Lm
Ls

PHOTOGRAPHING LENS ASSEMBLY, IMAGE CAPTURING UNIT AND ELECTRONIC DEVICE

RELATED APPLICATIONS

This application claims priority to Taiwan Application 111142440, filed on Nov. 7, 2022, and Taiwan Application 111144183, filed on Nov. 18, 2022, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view. In particular, the conventional optical system uses one or more refractive lenses to control the imaging quality through the change of the surface curvatures thereof, such that the thickness reduction is limited, leading a large size and poor accuracy of the conventional optical system.

SUMMARY

According to one aspect of the present disclosure, a photographing lens assembly includes at least four lens elements. The at least four lens elements are, in order from an object side to an image side along an optical path, a first lens element, a second lens element, at least one subsequent lens element and a last lens element that is closest to an image surface. Each of the at least four lens elements has an object-side surface facing toward the object side and an image-side surface facing toward the image side;

Preferably, at least one lens surface among lens surfaces from the image-side surface of the second lens element to the object-side surface of the last lens element is a metasurface having a subwavelength microstructure.

When a focal length of the photographing lens assembly is f, a maximum image height of the photographing lens assembly is ImgH, a curvature radius of the object-side surface of the first lens element is R1, and a focal length of the first lens element is f1, the following conditions are preferably satisfied:

$$0.03 < f/|R1| < 30.00; \text{ and}$$

$$0.05 < |ImgH/f1| < 10.00.$$

When a maximum angle of incident light onto a metasurface emitting from a meridional ray of maximum field of view is θm, the following condition is preferably satisfied at a metasurface closest to the object side:

$$\theta m < 40.0 \text{ [deg.]}.$$

According to another aspect of the present disclosure, a photographing lens assembly includes at least three lens elements. Each of the at least three lens elements has an object-side surface facing toward the object side and an image-side surface facing toward the image side.

Preferably, at least one lens element among the at least three lens elements is a simple refractive lens element, and at least one other lens element among the at least three lens elements is a metalens. Preferably, at least one lens surface of the object-side surface and the image-side surface of the metalens is a metasurface. The metasurface includes a base and a subwavelength microstructure formed on the base, and preferably a surface of the base is planar.

Preferably, the at least three lens elements at least include three lens elements closer to the object side than other lens elements. The three lens element are, in order from the object side to the image side along an optical path, a first lens element, a second lens element and a third lens element.

When an axial distance between a metasurface closest to the object side in the photographing lens assembly and an image surface is ML, an axial distance between the object-side surface of the first lens element and the image surface is TL, an axial distance between the second lens element and the third lens element is T23, an axial distance between the object-side surface of the first lens element and the image-side surface of a last lens element that is closest to the image surface is TD, and a minimum value among Abbe numbers of all simple refractive lens elements and Abbe numbers of all bases of all metalenses of the photographing lens assembly is Vmin, the following conditions are preferably satisfied:

$$0.05 < ML/TL < 0.98;$$

$$0.005 < T23/TD < 0.80; \text{ and}$$

$$V\min < 30.0.$$

When a maximum angle of incident light onto a metasurface emitting from a meridional ray of maximum field of view is θm, the following condition is preferably satisfied at a metasurface closest to the image surface:

$$\theta m < 32.0 \text{ [deg.]}.$$

According to another aspect of the present disclosure, a photographing lens assembly includes a plurality of lens elements. The plurality of lens elements at least include a first lens element closest to an object side and at least one subsequent lens element. Each of the plurality of lens elements has an object-side surface facing toward the object side and an image-side surface facing toward an image side.

Preferably, the first lens element is a simple refractive lens element. Preferably, at least one lens element of the at least one subsequent lens element is a metalens. Preferably, at least one lens surface of the object-side surface and the image-side surface of the metalens is a metasurface, and the metasurface includes a base and a subwavelength microstructure formed on the base.

When a minimum value among Abbe numbers of all simple refractive lens elements and Abbe numbers of all bases of all metalenses of the photographing lens assembly is Vmin, a central thickness of a simple refractive lens element closest to the object side in the photographing lens assembly is CTc1, and a curvature radius of the image-side surface of a simple refractive lens element closest to an image surface in the photographing lens assembly is RLci, the following conditions are preferably satisfied:

$$6.0 < V\min < 20.0; \text{ and}$$

$$0.01 < CTc1/|RLci| < 30.00.$$

According to another aspect of the present disclosure, a photographing lens assembly includes at least five lens elements. The at least five lens elements are, in order from an object side to an image side along an optical path, a first lens element, a second lens element, at least two subsequent lens elements and a last lens element that is closest to an image surface. Each of the at least five lens elements has an object-side surface facing toward the object side and an image-side surface facing toward the image side.

Preferably, at least one lens element among the at least five lens elements is a simple refractive lens element, and at least one other lens element among the at least five lens elements is a metalens. Preferably, at least one lens surface among lens surfaces from the image-side surface of the second lens element to the image-side surface of the last lens element is a metasurface having a subwavelength micro-structure. Preferably, the image-side surface of a simple refractive lens element closest to the image surface in the photographing lens assembly is concave in a paraxial region thereof.

When a focal length of the photographing lens assembly is f, and a focal length of a simple refractive lens element closest to the object side in the photographing lens assembly is fc1, the following condition is preferably satisfied:

$$0.015 < f/|fc1| < 20.00.$$

According to another aspect of the present disclosure, an image capturing unit includes one of the aforementioned photographing lens assemblies and an image sensor, wherein the image sensor is disposed on the image surface of the photographing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
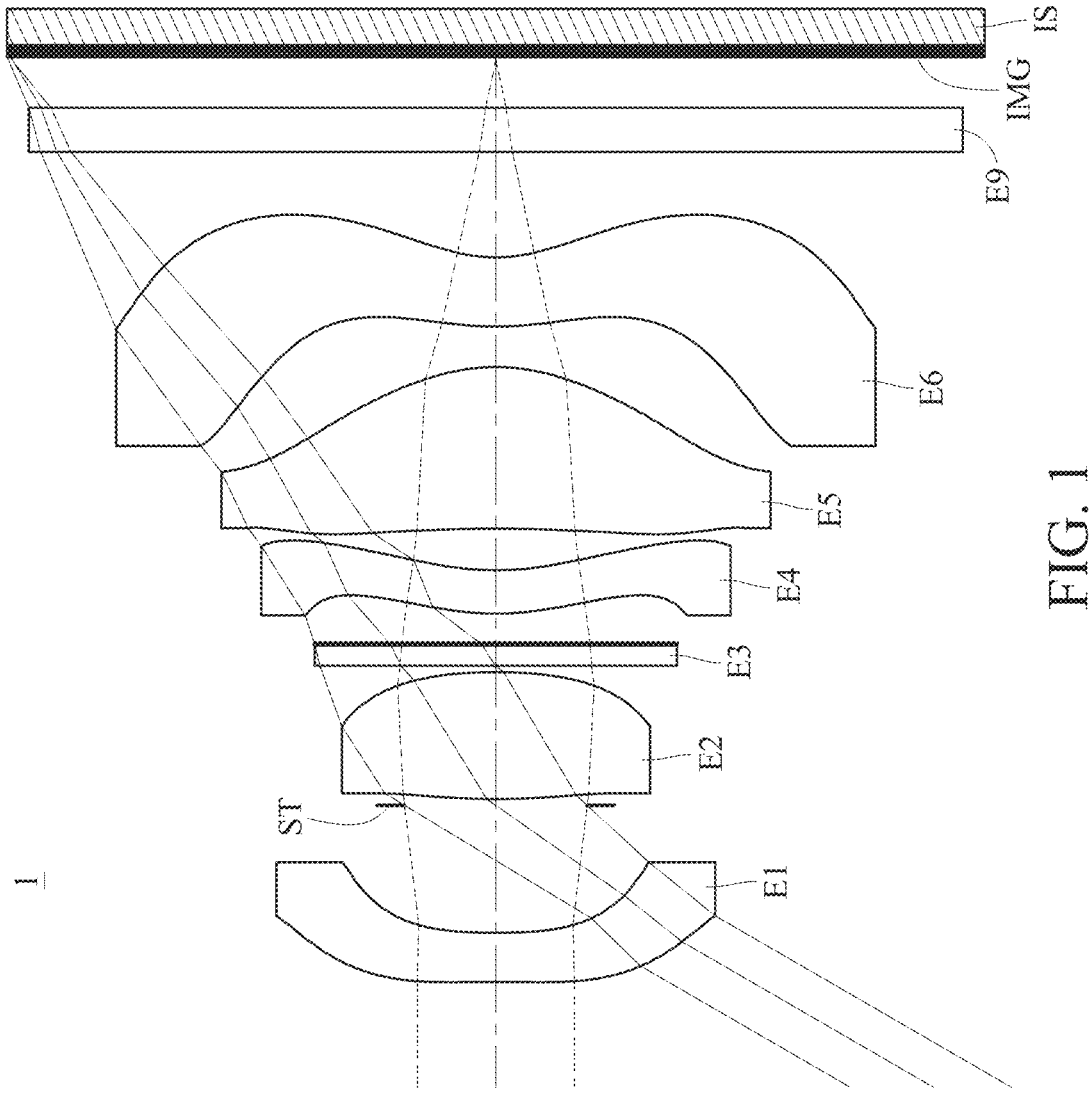
FIG. 1 is a schematic view of an image capturing unit according to the 1st embodiment of the present disclosure.

A photographing lens assembly includes a plurality of lens elements that at least include a first lens element closest to an object side and at least one subsequent lens element. Moreover, the plurality of lens elements can further include a second lens element that is adjacent to the first lens element at an image side of the first lens element, and there is no additional lens element located between the first lens element and the second lens element. Moreover, the quantity of the plurality of lens elements can be at least three. The at least three lens elements at least include three lens elements that are closer to the object side than the other lens elements, and the three lens elements can be, in order from the object side to an image side along an optical path, the first lens element, the second lens element and a third lens element. Moreover, the quantity of the plurality of lens elements can be at least four. The at least four lens elements can be, in order from the object side to the image side along the optical path, the first lens element, the second lens element, the at least one subsequent lens element and a last lens element that is closest to an image surface. Moreover, the quantity of the plurality of lens elements can be at least five. The at least five lens elements can be, in order from the object side to the image side along the optical path, the first lens element, the second lens element, at least two subsequent lens elements and the last lens element that is closest to the image surface. Each of the plurality of lens elements has an object-side surface facing toward the object side and an image-side surface facing toward the image side.

Each of the lens elements of the photographing lens assembly can be a metalens or a simple refractive lens element. Moreover, at least one lens element in the photographing lens assembly can be a metalens. Moreover, at least one other lens element in the photographing lens assembly can be a simple refractive lens element. Therefore, it is favorable for effectively reducing the manufacturing cost, thereby increasing mass-production capability. Moreover, the photographing lens assembly can at least include two simple refractive lens elements.

According to the present disclosure, the term "metalens" used herein refers to a lens element having at least one lens surface among the object-side surface and the image-side surface thereof being a metasurface with subwavelength microstructure. It can also be considered that a metasurface can include a base and a subwavelength microstructure, wherein the base can be with equivalent optical properties to a simple refractive lens element or a planar optical element, the subwavelength microstructure is disposed on the base and facing towards at least one of the object side and image side, and the subwavelength microstructure and the surface of the base formed with the subwavelength microstructure can be together served as the metasurface of the metalens. Therefore, it is favorable for reducing the thickness of single lens element and correcting aberrations. Further, the term "subwavelength microstructure" used herein refers to a structure has a shape or arrangement period smaller than a reference wavelength in at least one dimension. Moreover, each of the object-side surface and the image-side surface of the metalens can be the metasurface having the subwavelength microstructure. Therefore, it is favorable for combining the subwavelength microstructures of both sides of single lens element, thereby further correcting aberrations such as chromatic aberration. Moreover, at least one lens surface among lens surfaces from the image-side surface of the second lens element to the image-side surface of the last lens element can be the metasurface having the subwavelength microstructure. Therefore, it is favorable for correcting aberrations generated by one or more lens elements at the object side. Moreover, at least one lens surface among lens surfaces from the image-side surface of the second lens element to the object-side surface of the last lens element can be the metasurface having the subwavelength microstructure. Moreover, the surface of the base of the metasurface having the subwavelength microstructure can be planar. Therefore, it is favorable for maintaining good manufacturing yield rate of the subwavelength microstructure. Moreover, the base of the metasurface can be made of glass material (e.g., SiO$_2$, fused silica, etc.), quartz or polymer (e.g., poly (methyl methacrylate) (PMMA), SU-8 photoresist, plastic material, etc.).

Figure 48:
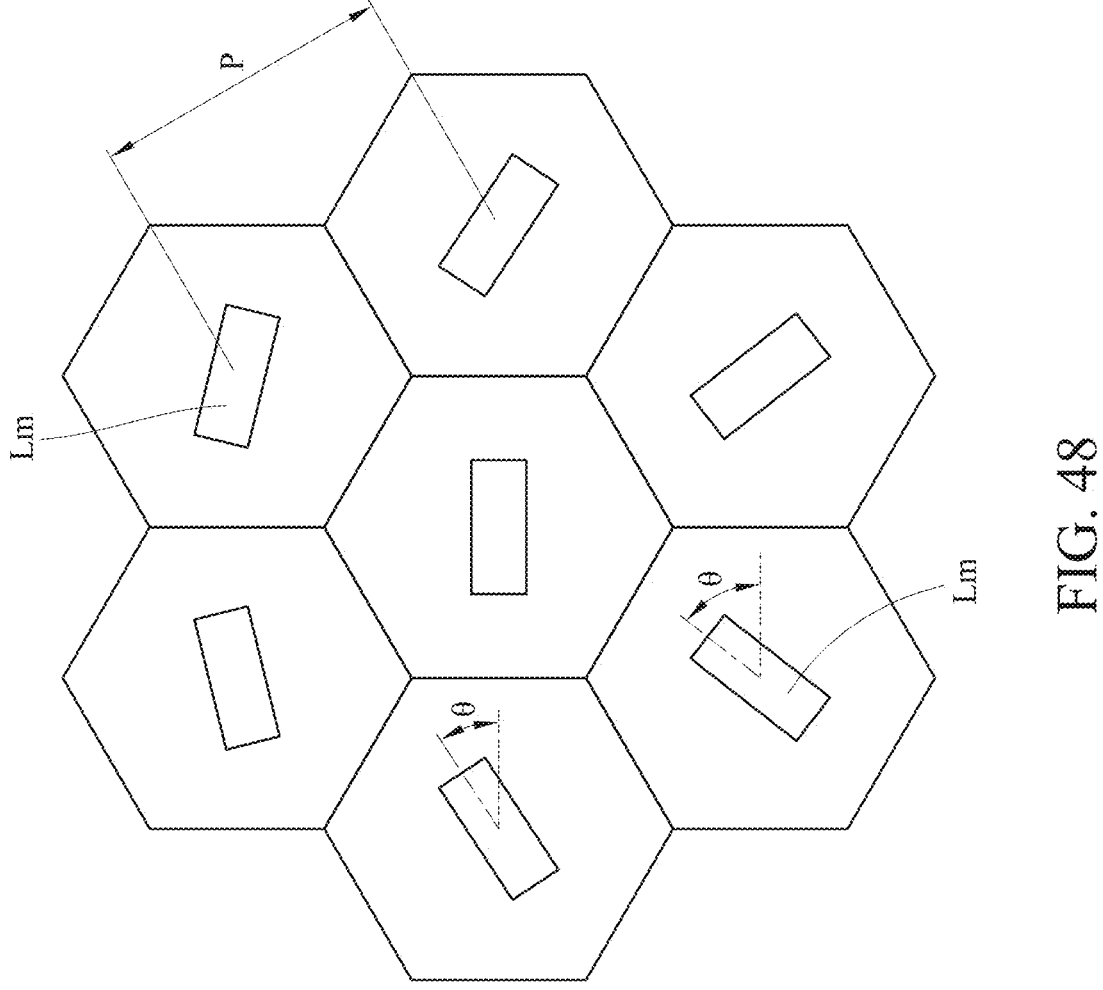
FIG. 48 is a top view of nanofins according to the present disclosure.
Figure 49:
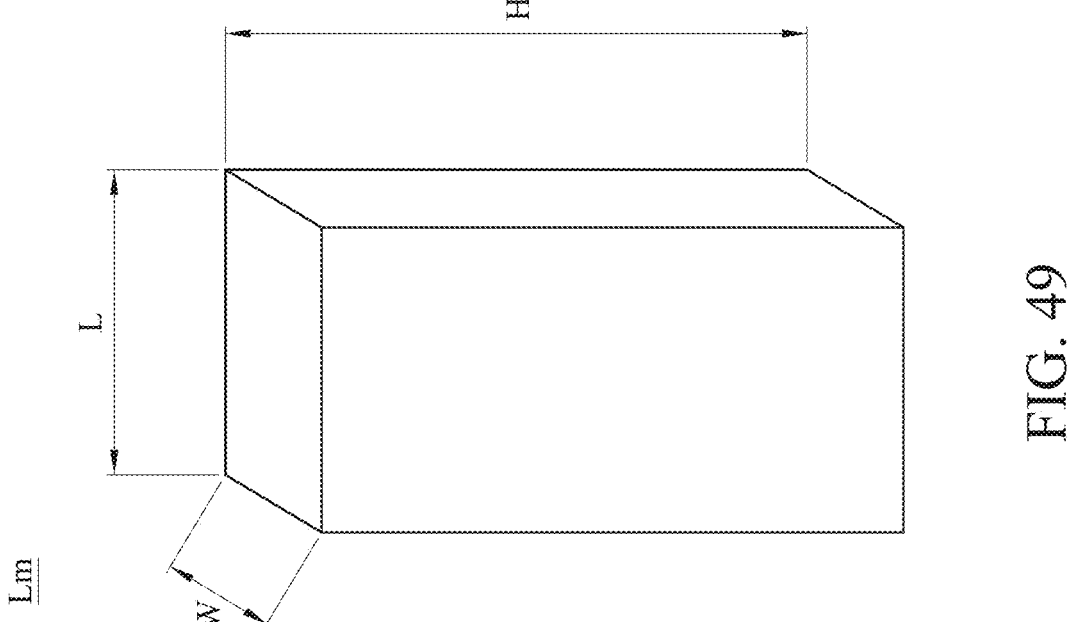
FIG. 49 is a perspective view of single structure of the nanofins in FIG. 48.
Figure 50:
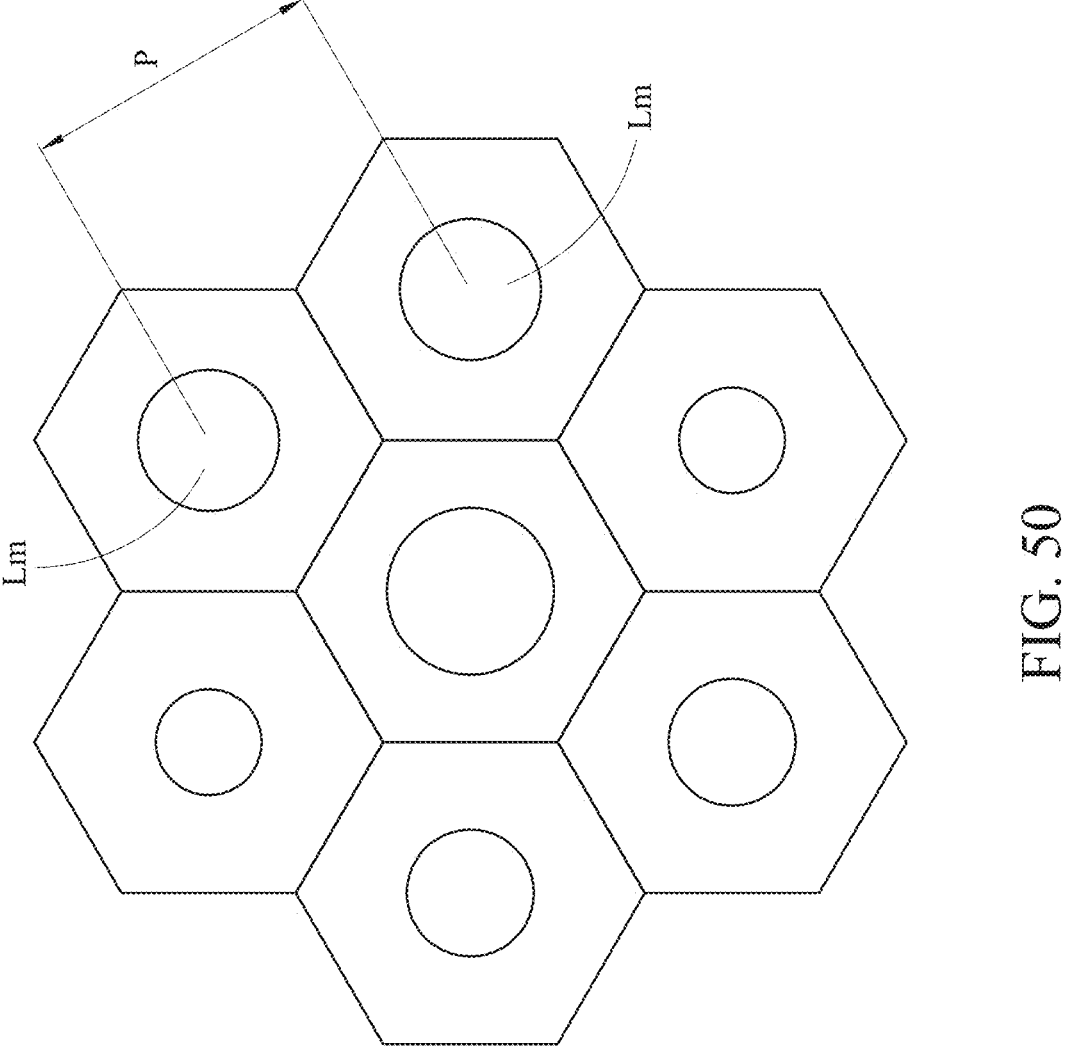
FIG. 50 is a top view of nanopillars according to the present disclosure.
Figure 51:
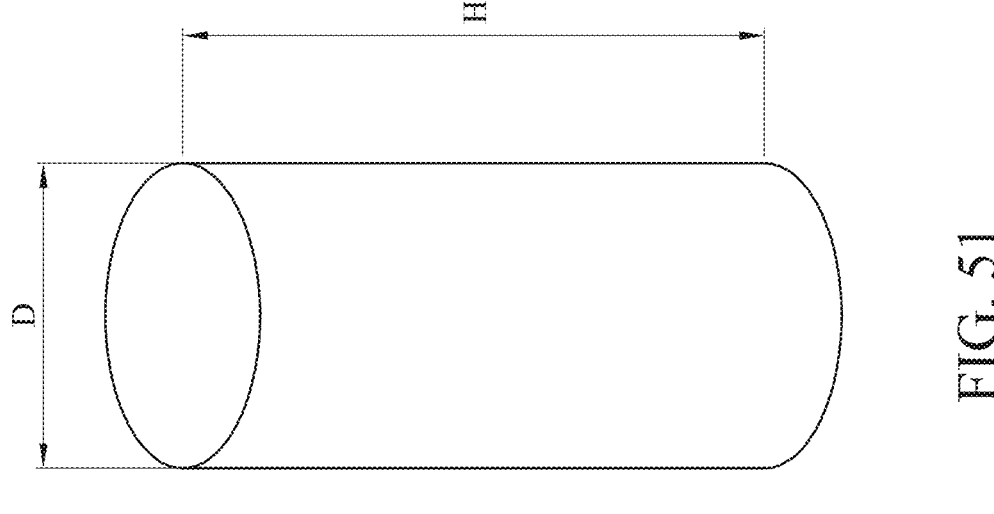
FIG. 51 is a perspective view of single structure of the nanopillars in FIG. 50.

The subwavelength microstructure can be nanofins, and each single structure of the nanofins has different rotation angle at different positions on the lens surface when viewing from cross sections of the nanofins. Moreover, the nanofins can achieve phase control from 0 to 2π by the variation among different rotation angles. Alternatively, the subwavelength microstructure can be nanopillars, and each single structure of nanopillars has different size at different positions on the lens surface when viewing from cross sections of the nanopillars. Moreover, the nanopillars can achieve phase control from 0 to 2π by the variation among different structural sizes. By arranging the geometry and distribution of the subwavelength microstructure on the lens surface, it is favorable for controlling the phase of light. Moreover, the subwavelength microstructure can be a hexagonal periodic array on the surface of the base. Therefore, it is favorable for having good symmetry of the periodic structure array of the subwavelength microstructure, thereby increasing stability of the photographing lens assembly. Moreover, the subwavelength microstructure can be made of dielectric material (e.g., Al$_2$O$_3$, SiO$_2$, TiO$_2$, HfO$_2$, Si$_3$N$_4$, etc.). Therefore, it is favorable for adjusting the material of the subwavelength microstructure and effectively controlling the electrical and magnetic resonance, thereby controlling optical characteristics. Moreover, the subwavelength microstructure can also be made of III-V semiconductors (e.g., BP, GaN, GaAs, etc.), silicon, etc. Please refer to FIG. 48 and FIG. 49, which are respectively a top view of the subwavelength microstructure Lm in the nanofin form and a perspective view of single structure of the subwavelength microstructure Lm in the nanofin form according to the present disclosure. Please refer to FIG. 50 and FIG. 51, which are respectively a top view of the subwavelength microstructure Lm in the nanopillar form and a perspective view of single structure of the subwavelength microstructure Lm in the nanopillar form according to the present disclosure. In FIG. 48 and FIG. 49, θ refers to the rotation angle of the single structure of the nanofins, and L, W and H respectively refer to the length, the width and the height of the single structure of the nanofins. In FIG. 51, D refers to the diameter on the cross section of the single structure of the nanopillars, and H refers to the height of the single structure of the nanopillars.

According to the present disclosure, the term "simple refractive lens element" used herein refer to an optical refractive element without subwavelength microstructure on the object-side surface or the image-side surface thereof. The simple refractive lens element can be made of plastic material, and each of the object-side surface and the image-side surface thereof can be aspheric. Therefore, it is favorable for effectively reducing manufacturing cost and increasing design flexibility, thereby increasing manufacturing capability. Moreover, the lens element closest to the object side in the photographing lens assembly (i.e., the first lens element) can be a simple refractive lens element (i.e., at least one of the abovementioned at least one subsequent lens element can be a metalens). Therefore, it is favorable for having sufficient light refractive capability of the first lens element, thereby designing an optical system of various type (e.g., a wide angle lens, a main lens, or a telephoto lens) by changing the shape of the first lens element. Moreover, the lens element closest to the object side in the photographing lens assembly (e.g., the first lens element) can be a simple refractive lens element and can have negative refractive power. Therefore, it is favorable for adjusting the refractive distribution of the photographing lens assembly, thereby increasing the field of view. Moreover, the image-side surface of the simple refractive lens element closest to the image surface in the photographing lens assembly can be concave in a paraxial region thereof. Therefore, it is favorable for assisting in balancing the back focal length of the photographing lens assembly while correcting off-axis aberration. Moreover, the object-side surface of the second lens element can be convex in a paraxial region thereof. Moreover, the image-side surface of the second lens element can be concave in a paraxial region thereof. Therefore, it is favorable for adjusting the lens shape of the second lens element, thereby correcting aberrations such as astigmatism.

A working wavelength of the photographing lens assembly can fall within a visible spectrum. Moreover, a longitudinal spherical aberration on the image surface at various fields of view within the visible spectrum can range from −0.10 millimeters to 0.10 millimeters. Therefore, it is favorable for reducing chromatic aberration within the visible spectrum. Moreover, the longitudinal spherical aberration on the image surface at various fields of view within the visible spectrum can also range from −0.05 millimeters to 0.06 millimeters. Further, the term "visible spectrum" used herein refers to the segment of the electromagnetic spectrum that the human eye can view, which can be a wavelength band ranging from 400 nanometers (nm) to 700 nanometers.

When a focal length of the photographing lens assembly is f, and a curvature radius of the object-side surface of the first lens element is R1, the following condition can be satisfied: $0.03<f/|R1|<30.00$. Therefore, it is favorable for adjusting the curvature radius of the object-side surface of the first lens element so as to control the angle entering into the photographing lens assembly, thereby adjusting the field of view and the outer diameter at the object side. Moreover, the following condition can also be satisfied: $0.10<f/|R1|<20.00$.

When a maximum image height of the photographing lens assembly (which can be half of a diagonal length of an effective photosensitive area of the image sensor) is ImgH, and a focal length of the first lens element is f1, the following condition can be satisfied: $0.05<|ImgH/f1|<10.00$. Therefore, it is favorable for adjusting the focal length of the first lens element, such that the photographing lens assembly has sufficient refractive power at the object side for correcting aberrations. Moreover, the following condition can also be satisfied: $0.10<|ImgH/f1|<8.00$. Moreover, the following condition can also be satisfied: $0.20<|ImgH/f1|<6.00$.

Figure 46:
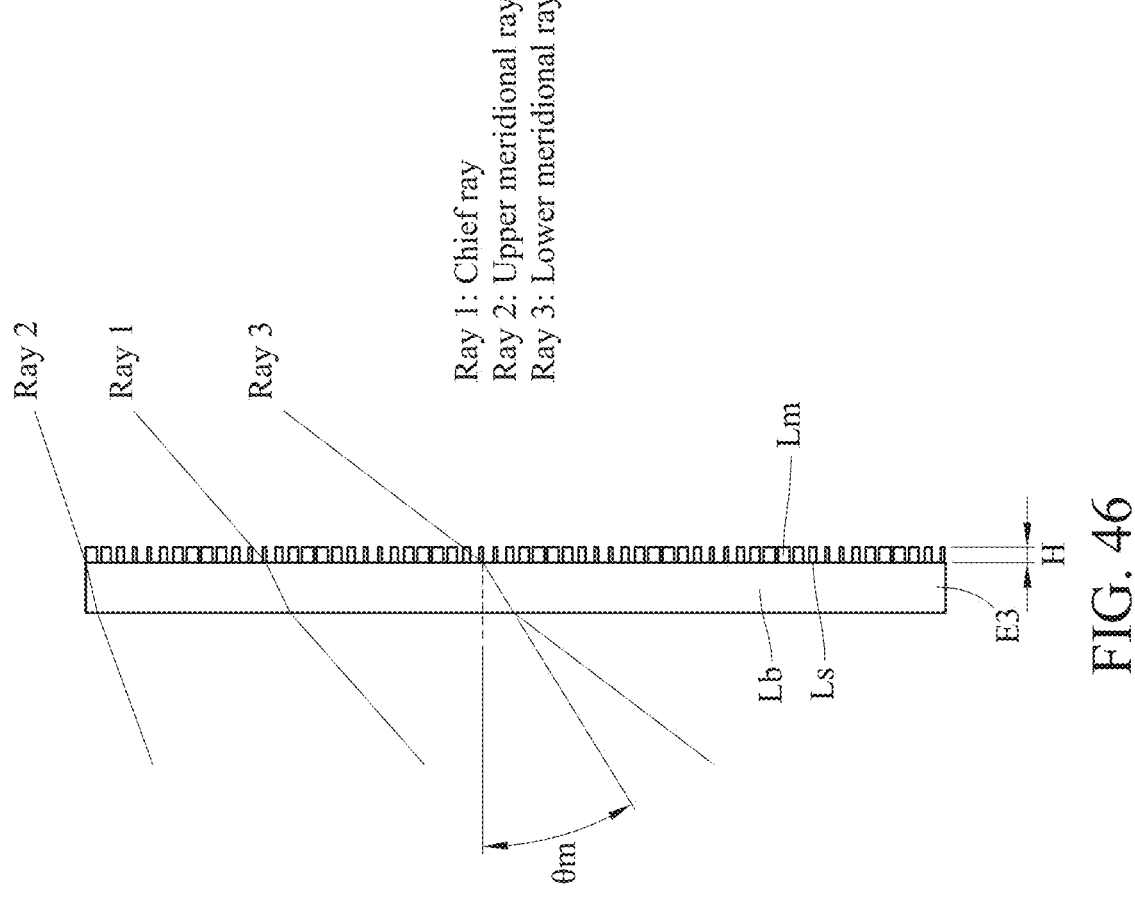
FIG. 46 shows a schematic view of θm at the image-side surface of the third lens element in FIG. 45 served as a metasurface according to the 1st embodiment of the present disclosure.

A maximum angle of incident light onto a metasurface emitting from a meridional ray of maximum field of view is defined as θm. The following condition can be satisfied at a metasurface closest to the object side: $θm<40.0$ [deg.]. Therefore, it is favorable for adjusting the light incident angle on the metasurface at the object side of the photographing lens assembly, thereby preventing excessive loss of light intensity during imaging. The following condition can be satisfied at a metasurface closest to the image surface: $θm<40.0$ [deg.]. Therefore, it is favorable for adjusting the light incident angle on the metasurface at the image side of the photographing lens assembly, thereby remaining aberration correction capability of the subwavelength microstructure so as to increase image quality. Moreover, the following condition can also be satisfied at the metasurface closest to the image surface: $\theta m < 32.0$ [deg.]. The following condition can be satisfied at each metasurface having the subwavelength microstructure: $0.0$ [deg.]$<\theta m<60.0$ [deg.]. Therefore, it is favorable for adjusting the light incident angle on the metasurface, thereby preventing decreasing transmittance of the lens elements due to an overly large incident angle. Moreover, the following condition can also be satisfied at each metasurface having the subwavelength microstructure: $0.0$ [deg.]$<\theta m<50.0$ [deg.]. Please refer to FIG. 46, which shows a schematic view of $\theta m$ at the image-side surface of the third lens element E3 served as the metasurface according to the 1st embodiment of the present disclosure, wherein Ray 1 refers to the chief ray, Ray 2 refers to the upper meridional ray, and Ray 3 refers to the lower meridional ray. In FIG. 46, Ray 2 is angled to the normal line of the metasurface by $13.07°$, and Ray 3 is angled to the normal line of the metasurface by $31.65°$, so that the maximum angle $\theta m$ of incident light onto the image-side surface of the third lens element E3 emitting from the meridional ray of maximum field of view according to the 1st embodiment is $31.65°$.

Figure 45:
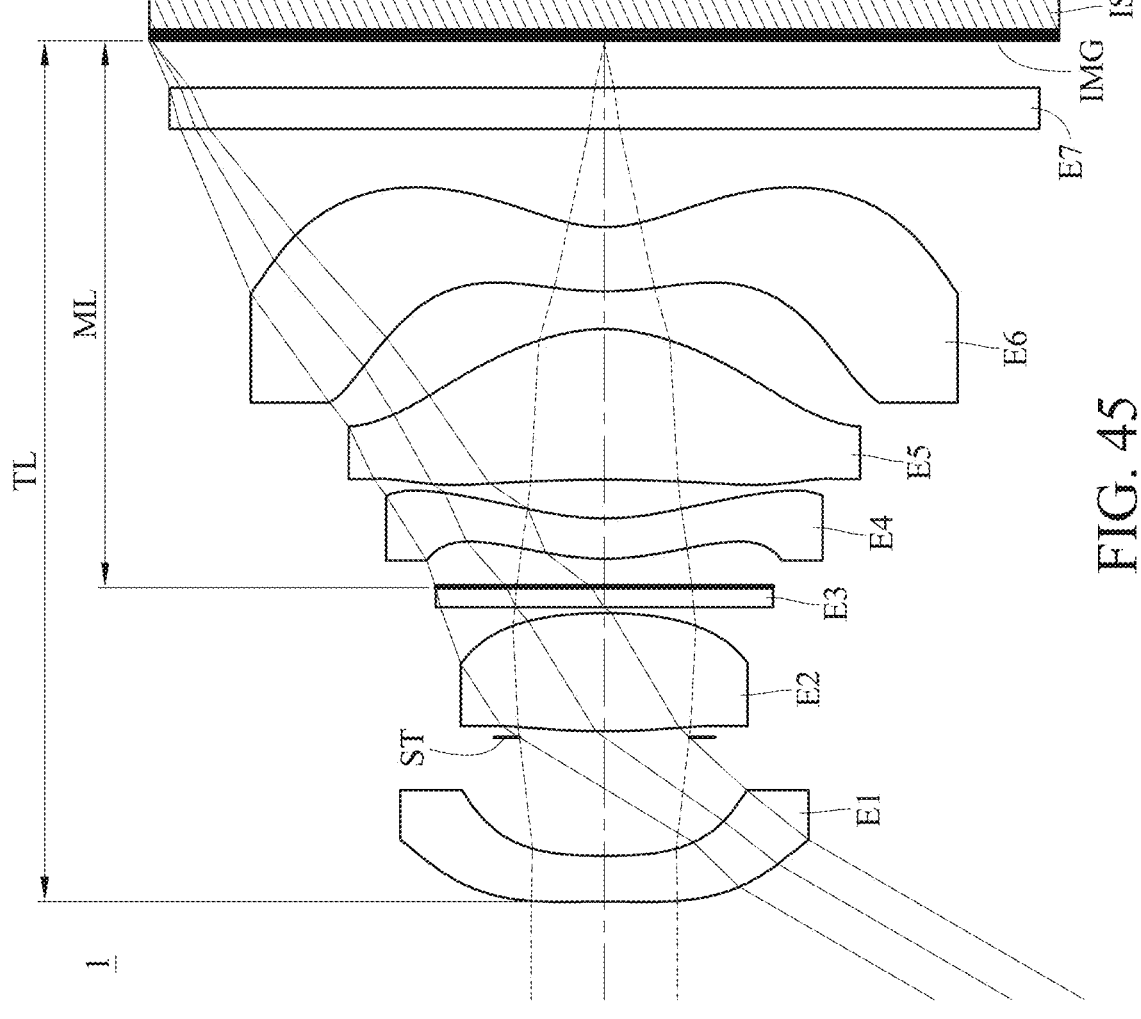
FIG. 45 shows a schematic view of TL and ML according to the 1st embodiment of the present disclosure.

When an axial distance between the metasurface closest to the object side in the photographing lens assembly and the image surface is ML, and an axial distance between the object-side surface of the first lens element and the image surface is TL, the following condition can be satisfied: $0.05 < ML/TL < 0.98$. Therefore, it is favorable for adjusting the position of the metasurface in the photographing lens assembly, thereby correcting aberrations such as chromatic aberration so as to increase image quality. Moreover, the following condition can also be satisfied: $0.20 < ML/TL < 0.90$. Please refer to FIG. 45, which shows a schematic view of ML and TL according to the 1st embodiment of the present disclosure.

When an axial distance between the second lens element and the third lens element is T23, and an axial distance between the object-side surface of the first lens element and the image-side surface of the last lens element that is closest to the image surface is TD, the following condition can be satisfied: $0.005 < T23/TD < 0.80$. Therefore, it is favorable for adjusting the ratio of the lens interval in the photographing lens assembly, thereby preventing interference between lens elements due to an overly small lens interval or preventing increasing eccentricity error due to an overly large lens interval. Moreover, the following condition can also be satisfied: $0.02 < T23/TD < 0.60$.

When a minimum value among Abbe numbers of all simple refractive lens elements and Abbe numbers of all bases of all metalenses of the photographing lens assembly is Vmin, the following condition can be satisfied: $Vmin < 30.0$. Therefore, it is favorable for adjusting Abbe Numbers of lens elements, thereby combining lens elements so as to correct chromatic aberration. Moreover, the following condition can also be satisfied: $6.0 < Vmin < 20.0$.

When a central thickness of a simple refractive lens element closest to the object side in the photographing lens assembly is CTc1, and a curvature radius of the image-side surface of a simple refractive lens element closest to the image surface in the photographing lens assembly is RLci, the following condition can be satisfied: $0.01 < CTc1/|RLci| < 30.00$. Therefore, it is favorable for adjusting the curvature radius of the image-side surface of the simple refractive lens element closest to the image surface, thereby increasing the field curvature correction capability of the said simple refractive lens element. Moreover, the following condition can also be satisfied: $0.05 < CTc1/|RLci| < 20.00$. Moreover, the following condition can also be satisfied: $0.10 < CTc1/|RLci| < 10.00$.

When the focal length of the photographing lens assembly is f, and a focal length of the simple refractive lens element closest to the object side in the photographing lens assembly is fc1, the following condition can be satisfied: $0.015 < f/|fc1| < 20.00$. Therefore, it is favorable for adjusting the focal length of the simple refractive lens element closest to the object side, such that the photographing lens assembly has sufficient refractive power at the object side for correcting aberrations. Moreover, the following condition can also be satisfied: $0.10 < f/|fc1| < 15.00$.

When a minimum value among Abbe numbers of all simple refractive lens elements of the photographing lens assembly is Vcmin, the following condition can be satisfied: $6.0 < Vcmin < 50.0$. Therefore, it is favorable for adjusting Abbe numbers of lens elements, thereby combining lens elements so as to correct chromatic aberration. Moreover, the following condition can also be satisfied: $8.0 < Vcmin < 30.0$. Moreover, the following condition can also be satisfied: $10.0 < Vcmin < 25.0$.

When a height of the subwavelength microstructure perpendicular to a surface of the base is H, and a reference wavelength is $\lambda 0$, the following condition can be satisfied: $0.40 < H/\lambda 0 < 2.20$. Therefore, it is favorable for adjusting the height of the subwavelength microstructure so as to have a proper structural size within the working wavelength band for maintaining image quality. Moreover, the following condition can also be satisfied: $0.60 < H/\lambda 0 < 1.60$. Please refer to FIG. 46, which shows a schematic view of H according to the 1st embodiment of the present disclosure, wherein H refers to the height of the subwavelength microstructure Lm perpendicular to the surface of the base Lb (the basal surface Ls). Please refer to FIG. 49 and FIG. 51, which show schematic views of H of the subwavelength microstructures Lm respectively in the nanofin form and nanopillar form according to the present disclosure.

When the axial distance between the object-side surface of the first lens element and the image surface is TL, and the maximum image height of the photographing lens assembly is ImgH, the following condition can be satisfied: $1.40 < TL/ImgH < 15.00$. Therefore, it is favorable for obtaining a proper balance between reduction in the total track length and enlargement in the image surface. Moreover, the following condition can also be satisfied: $1.65 < TL/ImgH < 10.00$. Moreover, the following condition can also be satisfied: $1.80 < TL/ImgH < 8.00$.

In the case of the subwavelength microstructure being nanopillars, when the height of the subwavelength microstructure perpendicular to the surface of the base is H, and a minimum diameter on the cross sections of the nanopillars is Dmin, the following condition can be satisfied: $4.00 < H/Dmin < 40.00$. Therefore, it is favorable for adjusting the minimum diameter on the cross sections of the nanopillars so as to provide a proper ratio in depth and width of the subwavelength microstructure, while preventing increasing manufacturing difficulty due to an overly small size of the subwavelength microstructure. Moreover, the following condition can also be satisfied: $8.00 < H/Dmin < 25.00$. Moreover, the following condition can also be satisfied: $10.00 < H/Dmin < 20.00$.

In the case of the subwavelength microstructure being nanopillars, when the height of the subwavelength microstructure perpendicular to the surface of the base is H, and a maximum diameter on the cross sections of the nanopillars is Dmax, the following condition can be satisfied: $1.50 < H/$ Dmax<10.00. Therefore, it is favorable for adjusting the maximum diameter on the cross sections of the nanopillars so as to preventing decreasing transmittance of the lens element due to an overly large size of the subwavelength microstructure. Moreover, the following condition can also be satisfied: 2.50<H/Dmax<8.00. Moreover, the following condition can also be satisfied: 3.20<H/Dmax<7.50. Please refer to FIG. 51, which shows a schematic view of H and D of nanopillars according to the present disclosure, wherein D refers to the diameter on the cross section of one nanopillar, the maximum value of D is Dmax, and the minimum value of D is Dmin.

Figure 47:
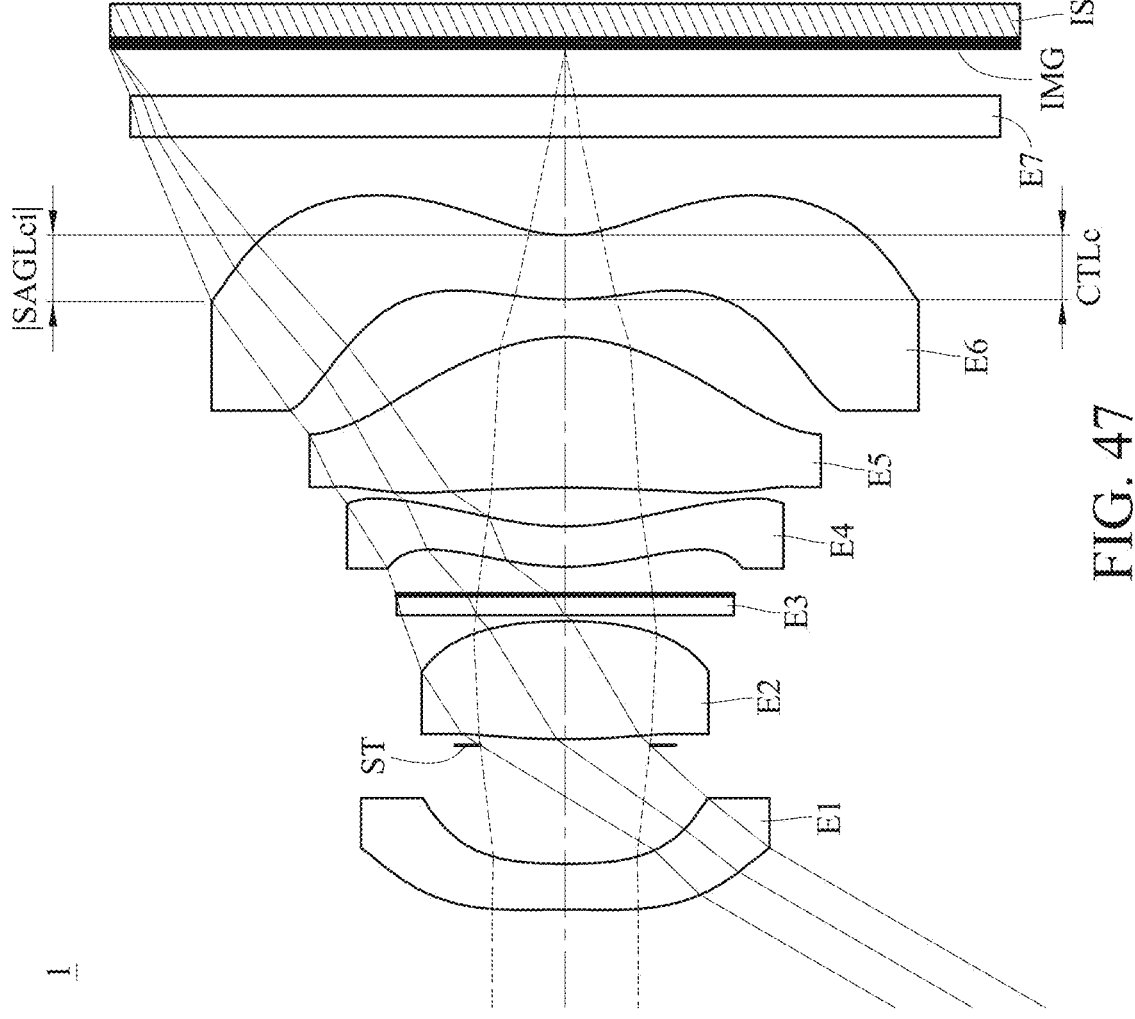
FIG. 47 shows a schematic view of |SAGLci| and CTLc according to the 1st embodiment of the present disclosure.

When a distance parallel to an optical axis between an axial vertex and a maximum effective radius position on the image-side surface of the simple refractive lens element closest to the image surface in the photographing lens assembly is |SAGLci|, and a central thickness of the simple refractive lens element closest to the image surface in the photographing lens assembly is CTLc, the following condition can be satisfied: 0.05<|SAGLci|/CTLc<7.00. Therefore, it is favorable for adjusting the overall shape of the simple refractive lens element closest to the image surface, thereby obtaining a proper balance between correction to off-axis aberration and reduction in molding difficulty. Moreover, the following condition can also be satisfied: 0.07<|SAGLci|/CTLc<4.00. Please refer to FIG. 47, which shows a schematic view of |SAGLci| and CTLc according to the 1st embodiment of the present disclosure.

When half of a maximum field of view of the photographing lens assembly is HFOV, the following condition can be satisfied: 40.0 [deg.]<HFOV<120.0 [deg.]. Therefore, it is favorable for having the wide angle characteristic of the photographing lens assembly and preventing an overly difficult image process caused by an overly large field of view. Moreover, the following condition can also be satisfied: 50.0 [deg.]<HFOV<100.0 [deg.].

When a curvature radius of the object-side surface of the simple refractive lens element closest to the object side in the photographing lens assembly is Rc1o, and a curvature radius of the image-side surface of the simple refractive lens element closest to the object side in the photographing lens assembly is Rc1i, the following condition can also be satisfied: −30.00<(Rc1o−Rc1i)/(Rc1o+Rc1i)<0.30. Therefore, it is favorable for adjusting the lens shape of the simple refractive lens element closest to the object side, such that the said simple refractive lens element has sufficient light refractive capability for controlling the light path.

When a maximum value of an absolute value of a distortion aberration on the image surface at various fields of view is |Dist|_max, the following condition can be satisfied: |Dist|_max<10.0%. Therefore, it is favorable for preventing affecting imaging due to excessive distortion aberration. Moreover, the following condition can also be satisfied: |Dist|_max<6.0%. Moreover, the following condition can also be satisfied: |Dist|_max<3.5%.

When the focal length of the simple refractive lens element closest to the object side in the photographing lens assembly is fc1, and a focal length of a simple refractive lens element being second simple refractive lens element from the object side in the photographing lens assembly is fc2, the following condition can be satisfied: −10.00<fc1/fc2<0.03. Therefore, it is favorable for combining the front two simple refractive lens element at the object side so as to correct aberrations such as spherical aberration.

When a refractive index of the subwavelength microstructure of the metasurface is Nm, and a refractive index of the base of the metasurface is Ns, the following condition can be satisfied at each metasurface having the subwavelength microstructure in the photographing lens assembly: 0.50<Nm−Ns<2.50. Therefore, it is favorable for adjusting the materials of the subwavelength microstructure and the base, thereby reducing energy loss cased during light passing through.

When the refractive index of the subwavelength microstructure of the metasurface is Nm, the following condition can be satisfied at each metasurface having the subwavelength microstructure in the photographing lens assembly: 1.600<Nm<3.500. Therefore, it is favorable for adjusting the material of the subwavelength microstructure and effectively controlling the electrical and magnetic resonance, thereby controlling optical characteristics. Moreover, the following condition can also be satisfied: 2.000<Nm<3.400. Moreover, the following condition can also be satisfied: 2.300<Nm<3.300.

When a maximum value of a maximum effective radius on the metasurface having the subwavelength microstructure in the photographing lens assembly is Ym_max, and the maximum image height of the photographing lens assembly is ImgH, the following condition can be satisfied: 0.10<Ym_max/ImgH<0.75. Therefore, it is favorable for adjusting the maximum effective radius of the metalens, thereby effectively reducing sensitivity while increasing manufacturing yield rate.

When the height of the subwavelength microstructure perpendicular to the surface of the base is H, and a distance between centers of two adjacent periodic structures in the subwavelength microstructure is P, the following condition can be satisfied: 1.25<H/P<10.00. Therefore, it is favorable for adjusting the ratio between the height and the interval of the subwavelength microstructure, thereby obtaining a proper balance between remaining the transmittance of the metalens and reducing manufacturing difficulty. Please refer to FIG. 48 and FIG. 49, which respectively show P and H of the subwavelength microstructure Lm in the nanofin form according to the present disclosure. Please refer to FIG. 50 and FIG. 51, which respectively show P and H of the subwavelength microstructure Lm in the nanopillar form of according to the present disclosure.

When the distance between centers of two adjacent periodic structures in the subwavelength microstructure is P, and the reference wavelength is λ0, the following condition can be satisfied: 0.05<P/λ0<0.80. Therefore, it is favorable for adjusting the interval of adjacent two single structures among the periodic array, thereby achieving optical characteristics in the subwavelength scale required for the metasurface.

When a maximum value among Abbe numbers of all simple refractive lens elements of the photographing lens assembly is Vcmax, and the minimum value among Abbe numbers of all simple refractive lens elements of the photographing lens assembly is Vcmin, the following condition can be satisfied: 1.10<Vcmax/Vcmin<5.20. Therefore, it is favorable for adjusting Abbe numbers of lens elements, thereby combining lens elements so as to correct chromatic aberration. Moreover, the following condition can also be satisfied: 1.50<Vcmax/Vcmin<4.50.

When the maximum value of the maximum effective radius on the metasurface having the subwavelength microstructure in the photographing lens assembly is Ym_max, the following condition can be satisfied: Ym_max<4.00 [mm]. Therefore, it is favorable for adjusting the maximum effective radius of the metasurface, thereby reducing sensitivity while increasing manufacturing yield rate. Moreover, the following condition can also be satisfied: 0.20 [mm] <Ym_max<3.50 [mm].

According to the present disclosure, the aforementioned features and conditions can be utilized in numerous combinations so as to achieve corresponding effects.

According to the present disclosure, the lens elements of the photographing lens assembly (the simple refractive lens element and the base of the metalens) can be made of either glass or plastic material. When the lens elements are made of glass material, the refractive power distribution of the photographing lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, the image surface of the photographing lens assembly, based on the corresponding image sensor, can be flat or curved, especially a curved surface being concave facing towards the object side of the photographing lens assembly.

According to the present disclosure, an image correction unit, such as a field flattener, can be optionally disposed between the lens element closest to the image side of the photographing lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 59:
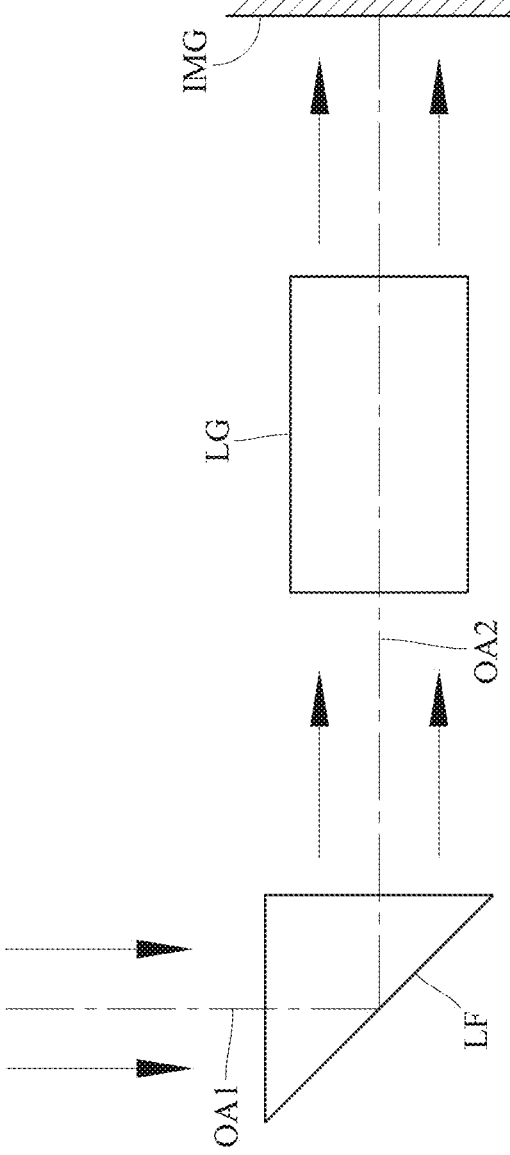
FIG. 59 shows a schematic view of a configuration of a light-folding element in a photographing lens assembly according to one embodiment of the present disclosure.
Figure 60:
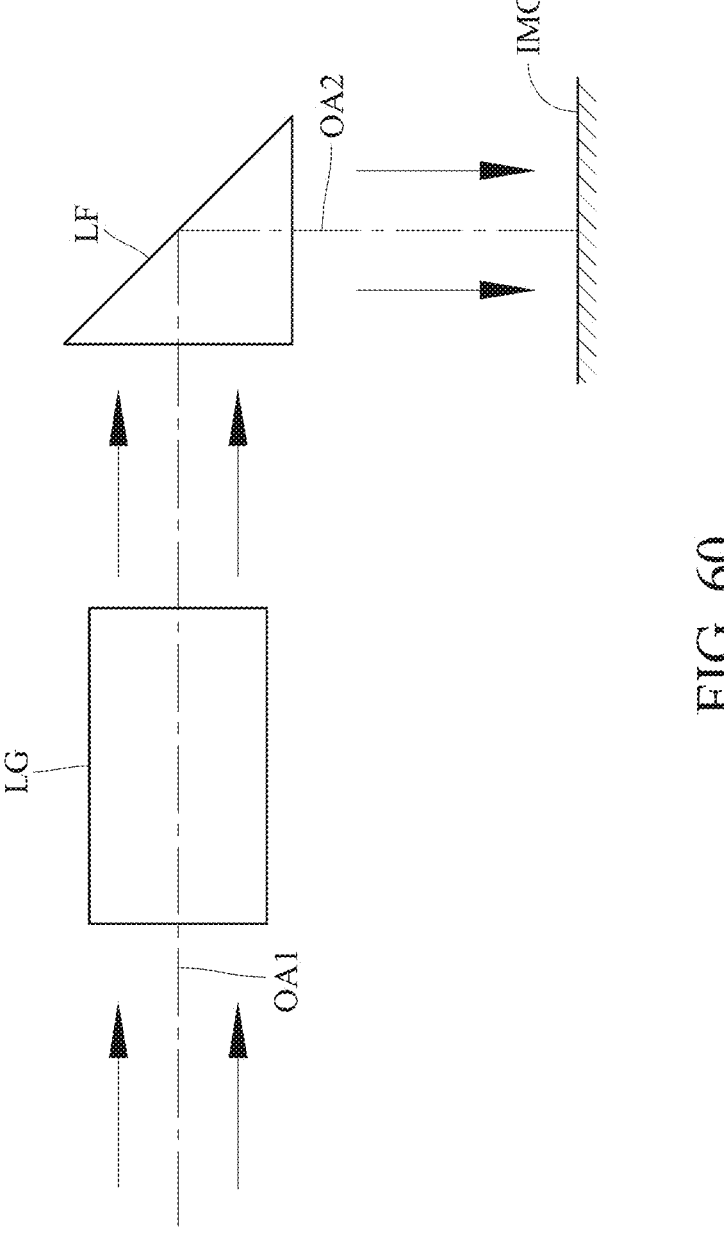
FIG. 60 shows a schematic view of another configuration of a light-folding element in a photographing lens assembly according to one embodiment of the present disclosure.
Figure 61:
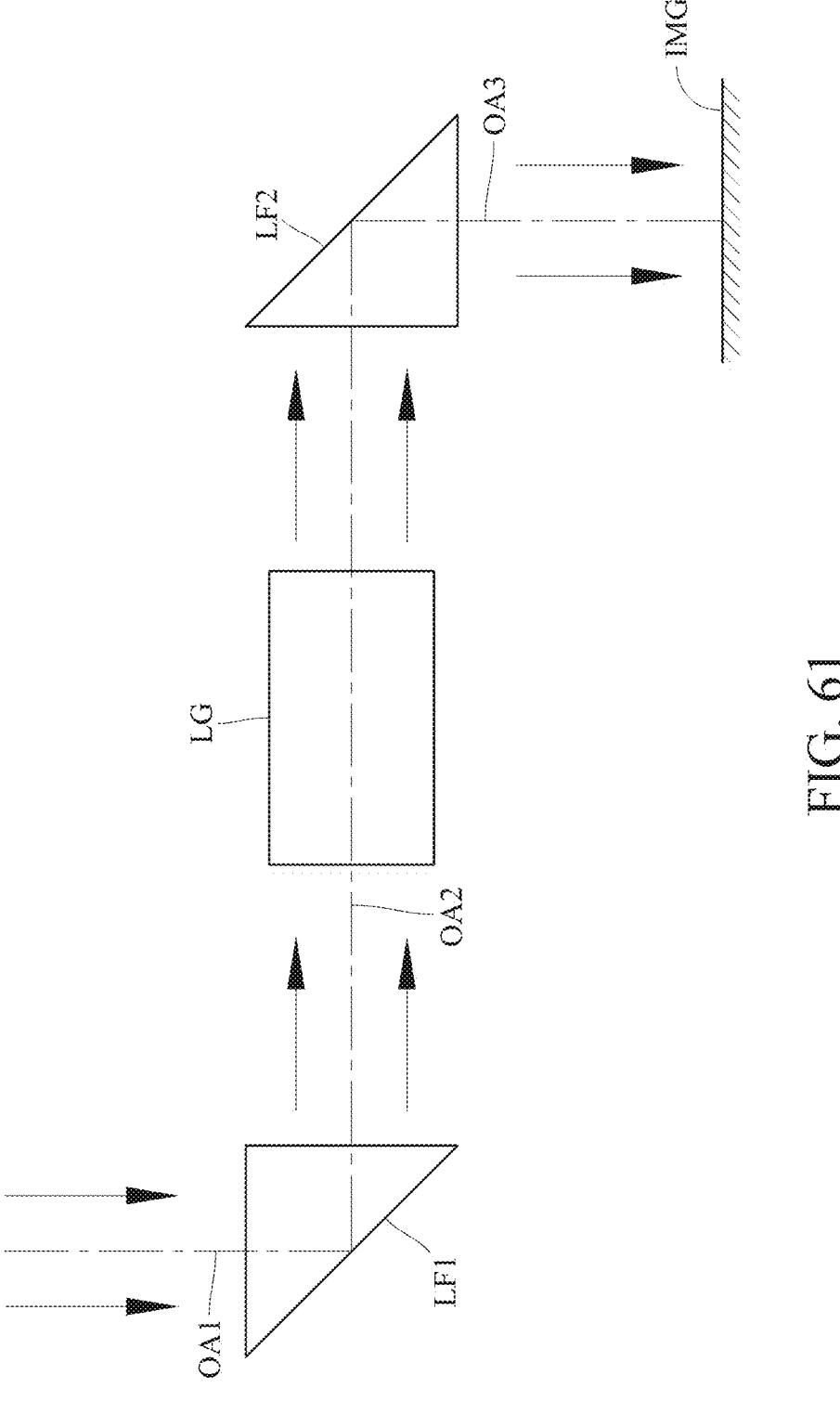
FIG. 61 shows a schematic view of a configuration of two light-folding elements in a photographing lens assembly according to one embodiment of the present disclosure.

According to the present disclosure, at least one light-folding element, such as a prism or a mirror which can have a surface being planar, spherical, aspheric or in free-form, can be optionally disposed between an imaged object and the image surface on the imaging optical path, such that the photographing lens assembly can be more flexible in space arrangement, and therefore the dimensions of an electronic device is not restricted by the total track length of the photographing lens assembly. Specifically, please refer to FIG. 59 and FIG. 60. FIG. 59 shows a schematic view of a configuration of a light-folding element in a photographing lens assembly according to one embodiment of the present disclosure, and FIG. 60 shows a schematic view of another configuration of a light-folding element in a photographing lens assembly according to one embodiment of the present disclosure. In FIG. 59 and FIG. 60, the photographing lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the photographing lens assembly as shown in FIG. 59 or disposed between a lens group LG of the photographing lens assembly and the image surface IMG as shown in FIG. 60. Furthermore, please refer to FIG. 61, which shows a schematic view of a configuration of two light-folding elements in a photographing lens assembly according to one embodiment of the present disclosure. In FIG. 61, the photographing lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the photographing lens assembly, the second light-folding element LF2 is disposed between the lens group LG of the photographing lens assembly and the image surface IMG, and the travelling direction of light on the first optical axis OA1 can be the same direction as the travelling direction of light on the third optical axis OA3 as shown in FIG. 61. The photographing lens assembly can be optionally provided with three or more light-folding elements, and the present disclosure is not limited to the type, amount and position of the light-folding elements of the embodiments disclosed in the aforementioned figures.

According to the present disclosure, the photographing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing lens assembly and thereby provides a wider field of view for the same.

According to the present disclosure, the photographing lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the photographing lens assembly can include one or more optical elements for limiting the form of light passing through the photographing lens assembly. Each optical element can be, but not limited to, a filter, a polarizer, etc., and each optical element can be, but not limited to, a single-piece element, a composite component, a thin film, etc. The optical element can be located at the object side or the image side of the photographing lens assembly or between any two adjacent lens elements so as to allow light in a specific form to pass through, thereby meeting application requirements.

According to the present disclosure, the photographing lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and the image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 2:
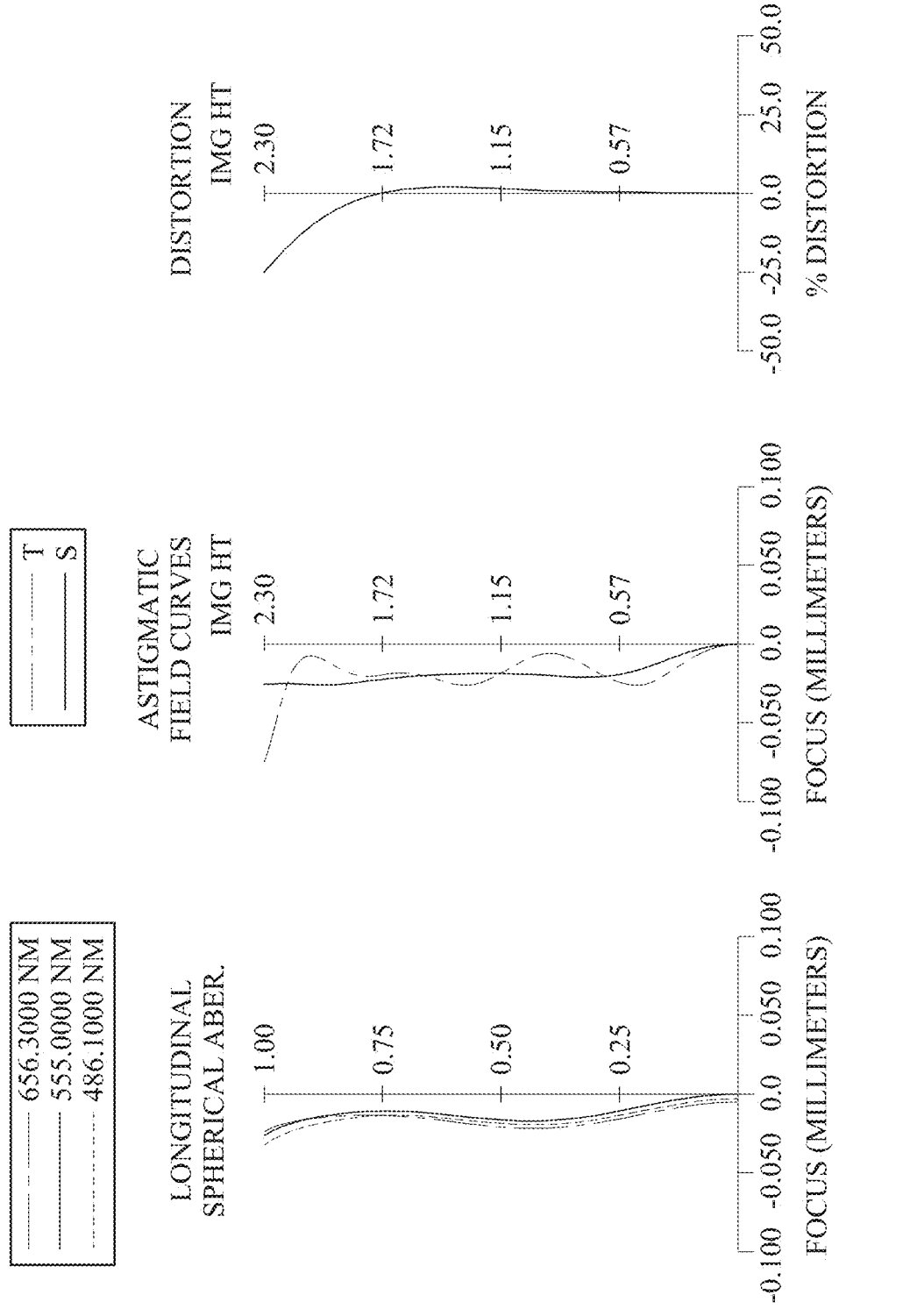
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the photographing lens assembly (its reference numeral is omitted) of the present disclosure and an image sensor IS. The photographing lens assembly includes, in order from an object side to an image side along an optical axis, a first lens element E1, an aperture stop ST, a second lens element E2, a third lens element E3, a fourth lens element E4, a fifth lens element E5, a sixth lens element E6, a filter E9 and an image surface IMG. The photographing lens assembly includes six lens elements (E1, E2, E3, E4, E5 and E6) with no additional lens element disposed between each of the adjacent six lens elements.

The first lens element E1 is a simple refractive lens element with negative refractive power and has an object-side surface being concave in a paraxial region thereof and an image-side surface being concave in a paraxial region thereof. The first lens element E1 is made of plastic material and has the object-side surface and the image-side surface being both aspheric.

The second lens element E2 is a simple refractive lens element with positive refractive power and has an object-side surface being convex in a paraxial region thereof and an image-side surface being convex in a paraxial region thereof. The second lens element E2 is made of plastic material and has the object-side surface and the image-side surface being both aspheric.

The third lens element E3 is a metalens with positive refractive power and has an object-side surface being planar in a paraxial region thereof and an image-side surface being planar in a paraxial region thereof. The third lens element E3 has a base made of glass material and has the image-side surface being a metasurface having a subwavelength microstructure. Specifically, the third lens element E3 includes a base and a subwavelength microstructure formed on a basal surface of the base facing towards the image side, and the metasurface includes the basal surface and the subwavelength microstructure.

The fourth lens element E4 is a simple refractive lens element with positive refractive power and has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 is a simple refractive lens element with positive refractive power and has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 is a simple refractive lens element with negative refractive power and has an object-side surface being convex in a paraxial region thereof and an image-side surface being concave in a paraxial region thereof. The sixth lens element E6 is made of plastic material and has the object-side surface and the image-side surface being both aspheric.

The filter E9 is made of glass material and located between the sixth lens element E6 and the image surface IMG, and will not affect the focal length of the photographing lens assembly. The image sensor IS is disposed on or near the image surface IMG of the photographing lens assembly.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

The phase equation of the metasurface of the aforementioned metalens of the 1st embodiment is expressed as follows:

$$\varphi(r) = d \frac{2\pi}{\lambda_0} \sum_{i=1}^{n} C_i r^{2i},$$

where, $\varphi(r)$ is the phase profiles;

d is the diffraction order;

$\lambda_0$ is the reference wavelength; and r is the radial coordinate.

Figure 52:
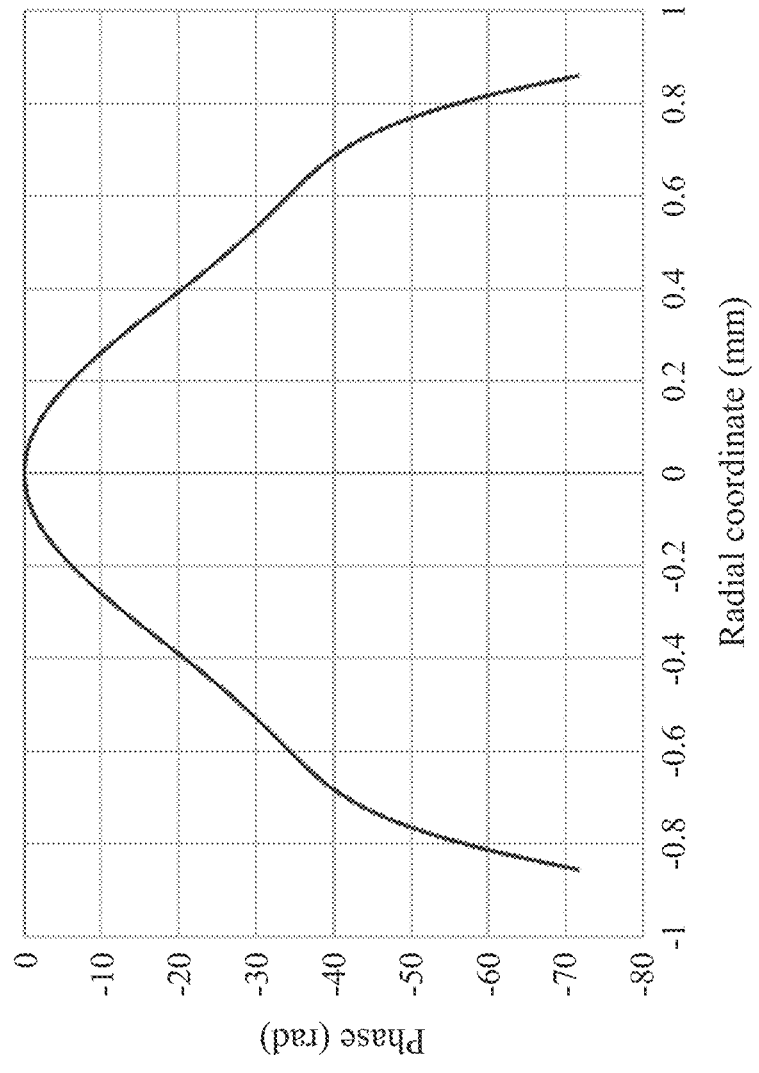
FIG. 52 is a diagram showing the relationship of the radial coordinate of the object-side surface of the third lens element served as the metasurface to the phase according to the 1st embodiment of the present disclosure.
Figure 53:
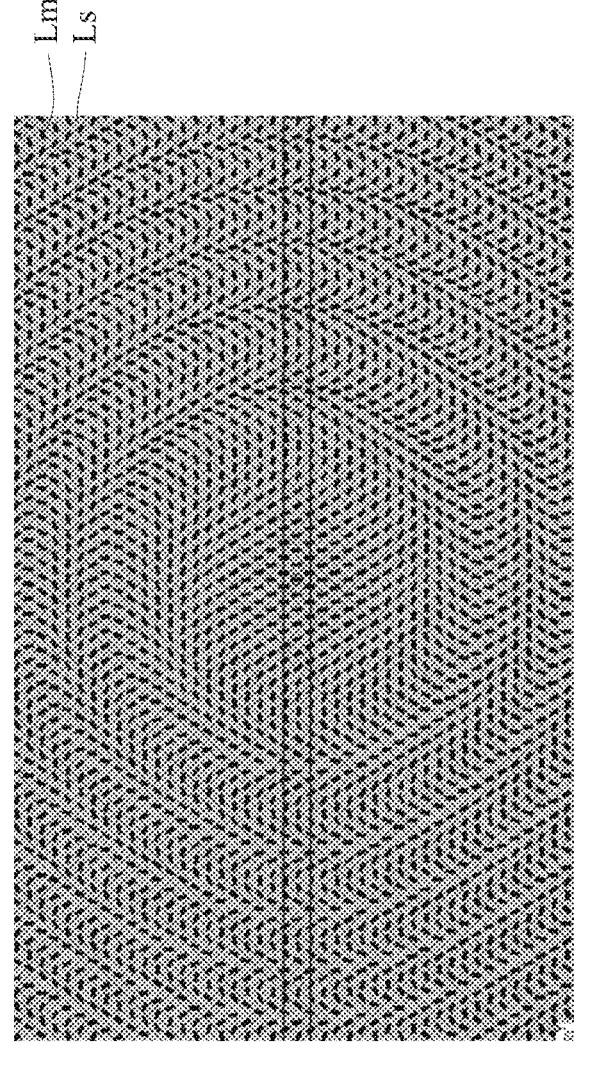
FIG. 53 is a top view of nanofins according to one embodiment of the present disclosure.
Figure 54:
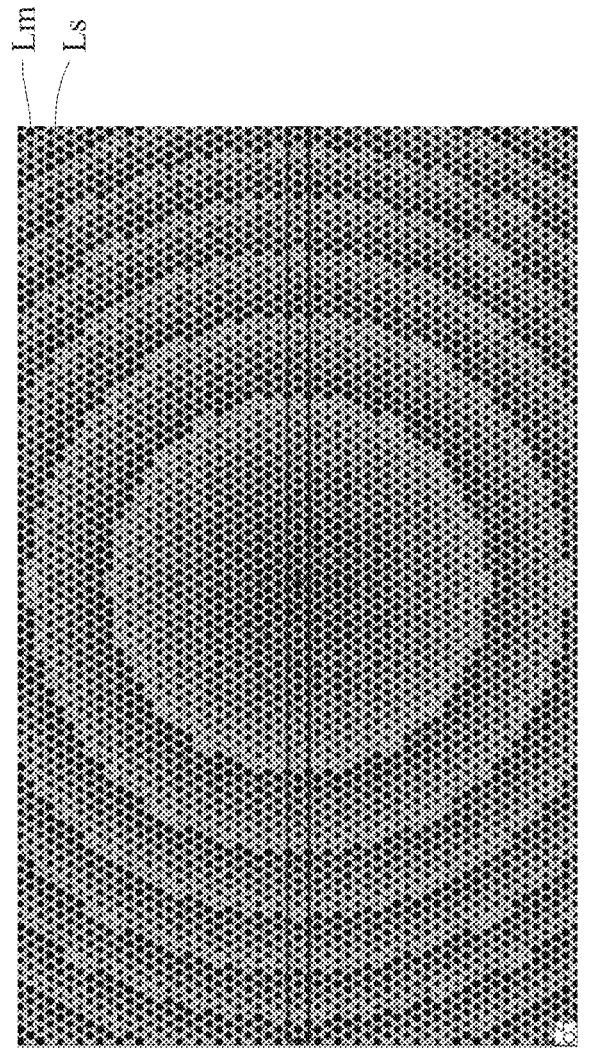
FIG. 54 is a top view of nanopillars according to another embodiment of the present disclosure.

According to the aforementioned phase equation, the image-side surface of the third lens element E3 served as the metasurface having the subwavelength microstructure among the 1st embodiment has a relationship between the phase (unit: rad) and the radial coordinate (unit: millimeters, mm) depicted in FIG. 52. The phase of the subwavelength microstructure can be controlled by the nanofin form of the nanopillar form. Moreover, each single structure of the nanofins has different rotation angle (e.g., the aforementioned θ, as indicated in FIG. 48) at different positions on the lens surface (basal surface Ls) when viewing from cross sections of the nanofins, as shown in the top view of FIG. 53, and the nanofins achieve phase control from 0 to 2π by the variation among different rotation angles; each single structure of the nanopillars has different size (e.g., the aforementioned D, as indicated in FIG. 51) at different positions on the lens surface (basal surface Ls) when viewing from cross sections of the nanopillars, as shown in the top view of FIG. 54, and the nanopillars achieve phase control from 0 to 2π by the variation among different cylinder diameters.

In the photographing lens assembly of the image capturing unit 1 according to the 1st embodiment, when a focal length of the photographing lens assembly is f, an f-number of the photographing lens assembly is Fno, and half of a maximum field of view of the photographing lens assembly is HFOV, these parameters have the following values: f=1.78 millimeters (mm), Fno=2.40, HFOV=59.9 degrees (deg.).

When a maximum image height of the photographing lens assembly is ImgH, and a focal length of the first lens element E1 is f1, the following condition is satisfied: |ImgH/f1|=0.54.

When an axial distance between the object-side surface of the first lens element E1 and the image surface IMG is TL, and the maximum image height of the photographing lens assembly is ImgH, the following condition is satisfied: TL/ImgH=1.91.

When a maximum value of a maximum effective radius on the metasurface having the subwavelength microstructure in the photographing lens assembly is Ym_max, and the maximum image height of the photographing lens assembly is ImgH, the following condition is satisfied: Ym_max/ImgH=0.37. In this embodiment, the maximum effective radius of the image-side surface of the third lens element E3 is the maximum value among all maximum effective radii of the metasurfaces each having the subwavelength microstructure, and therefore Ym_max is the maximum effective radius of the image-side surface of the third lens element E3.

When the maximum value of the maximum effective radius on the metasurface having the subwavelength microstructure in the photographing lens assembly is Ym_max, the following condition is satisfied: Ym_max=0.86 [mm].

When an axial distance between a metasurface closest to the object side in the photographing lens assembly and the image surface IMG is ML, and the axial distance between the object-side surface of the first lens element E1 and image surface IMG is TL, the following condition is satisfied: ML/TL=0.64. In this embodiment, the metasurface closest to the object side is the image-side surface of the third lens element E3, and therefore ML is the axial distance between the image-side surface of the third lens element E3 and the image surface IMG.

When an axial distance between the second lens element E2 and the third lens element E3 is T23, and an axial distance between the object-side surface of the first lens element E1 and the image-side surface of a last lens element that is closest to the image surface IMG is TD, the following condition is satisfied: T23/TD=0.009. In this embodiment, an axial distance between two adjacent lens elements is a distance in a paraxial region between two adjacent lens surfaces of the two adjacent lens elements. In this embodiment, the last lens element closest to the image surface IMG is the sixth lens element E6, and therefore TD is the axial distance between the object-side surface of the first lens element E1 and the image-side surface of the sixth lens element E6.

When the focal length of the photographing lens assembly is f, and a focal length of a simple refractive lens element closest to the object side in the photographing lens assembly is fc1, the following condition is satisfied: f/|fc1|=0.42. In this embodiment, the simple refractive lens element closest to the object side is the first lens element E1, and therefore fc1 is the focal length of the first lens element E1.

When the focal length of the simple refractive lens element closest to the object side in the photographing lens assembly is fc1, and a focal length of a simple refractive lens element being second simple refractive lens element from the object side in the photographing lens assembly is fc2, the following condition is satisfied: fc1/fc2=−1.53. In this embodiment, the second simple refractive lens element from the object side is the second lens element E2, and therefore fc2 is the focal length of the second lens element E2.

When the focal length of the photographing lens assembly is f, and a curvature radius of the object-side surface of the first lens element E1 is R1, the following condition is satisfied: f/|R1|=0.23.

When a central thickness of the simple refractive lens element closest to the object side in the photographing lens assembly is CTc1, and a curvature radius of the image-side surface of a simple refractive lens element closest to the image surface IMG in the photographing lens assembly is RLci, the following condition is satisfied: CTc1/|RLci|=0.33. In this embodiment, the simple refractive lens element closest to the image surface IMG is the sixth lens element E6, and therefore RLci is the curvature radius of the image-side surface of the sixth lens element E6.

When a curvature radius of the object-side surface of the simple refractive lens element closest to the object side in the photographing lens assembly is Rc1o, and a curvature radius of the image-side surface of the simple refractive lens element closest to the object side in the photographing lens assembly is Rc1i, the following condition is satisfied: (Rc1o−Rc1i)/(Rc1o+Rc1i)=2.47.

When a distance parallel to the optical axis between an axial vertex and a maximum effective radius position on the image-side surface of the simple refractive lens element closest to the image surface IMG in the photographing lens assembly is |SAGLci|, and a central thickness of the simple refractive lens element closest to the image surface IMG in the photographing lens assembly is CTLc, the following condition is satisfied: |SAGLci|/CTLc=1.03.

When a minimum value among Abbe numbers of all simple refractive lens elements and Abbe numbers of all bases of all metalenses of the photographing lens assembly is Vmin, the following condition is satisfied: Vmin=19.5. In this embodiment, the Abbe number of the sixth lens element E6 is the minimum value among Abbe numbers of all simple refractive lens element and all bases of all metalenses, and therefore Vmin is the Abbe number of the sixth lens element E6.

When a minimum value among Abbe numbers of all simple refractive lens elements of the photographing lens assembly is Vcmin, the following condition is satisfied: Vcmin=19.5. In this embodiment, the Abbe number of the sixth lens element E6 is the minimum value of Abbe numbers of all simple refractive lens elements, and therefore Vcmin is the Abbe number of the sixth lens element E6.

When a maximum value among Abbe numbers of all simple refractive lens elements of the photographing lens assembly is Vcmax, and the minimum value among Abbe numbers of all simple refractive lens elements of the photographing lens assembly is Vcmin, the following condition is satisfied: Vcmax/Vcmin=2.88. In this embodiment, the Abbe number of the first lens element E1 is the maximum value among Abbe numbers of all simple refractive lens elements, and therefore Vcmax is the Abbe number of the first lens element E1.

When a maximum value of an absolute value of a distortion aberration on the image surface IMG at various fields of view is |Dist|_max, the following condition is satisfied: |Dist|_max=24.99%.

Figure 55:
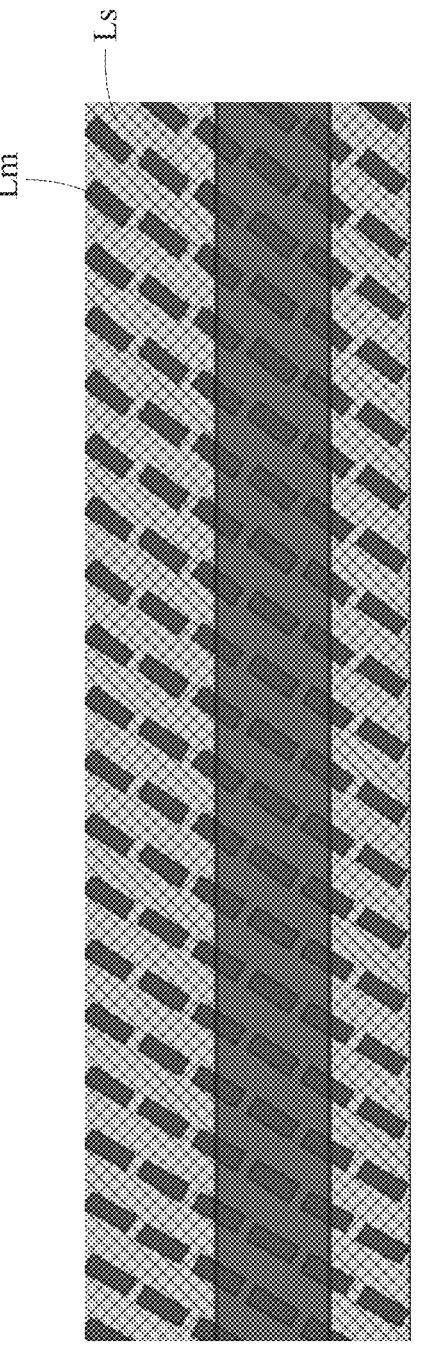
FIG. 55 is a partial and enlarged top view of nanofins according to the 1st embodiment of the present disclosure.
Figure 56:
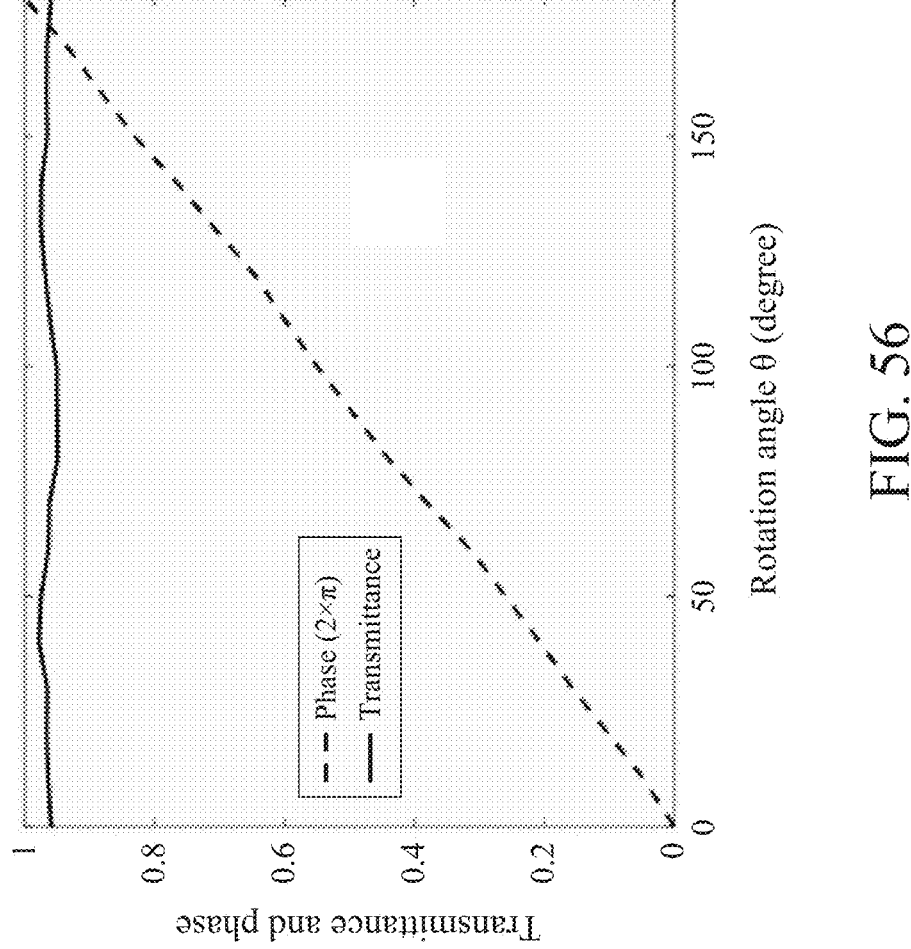
FIG. 56 is a diagram showing the simulation result of the rotation angle of single structure of nanofins to the transmittance and the phase according to the 1st embodiment of the present disclosure.

In the case that the subwavelength microstructure Lm included by the image-side surface of the third lens element E3 served as the metasurface is nanofins, the partial structure thereof viewing from the top side is shown in FIG. 55. Further, when HFOV is 0 degrees, the simulation result of the rotation angle (θ) of single structure of nanofins to the transmittance and the phase is shown in FIG. 56, wherein the phase control from 0 to $2\pi$ is achieved by the variation among different rotation angles (0° to 180°) of the nanofins.

In the case that the subwavelength microstructure Lm included by the image-side surface of the third lens element E3 served as the metasurface is nanofins, the nanofins are made of $TiO_2$ material (refractive index=2.947). When a height of single structure of the nanofins (a height of the subwavelength microstructure perpendicular to the surface of the base) is H, a length of the single structure of nanofins is L, a width of the single structure of nanofins is W, and a distance between centers of two adjacent periodic structures in the nanofins (the subwavelength microstructure) is P, the following conditions are satisfied: H=600 [nm]; L=190 [nm]; W=72 [nm]; and P=320 [nm].

Figure 57:
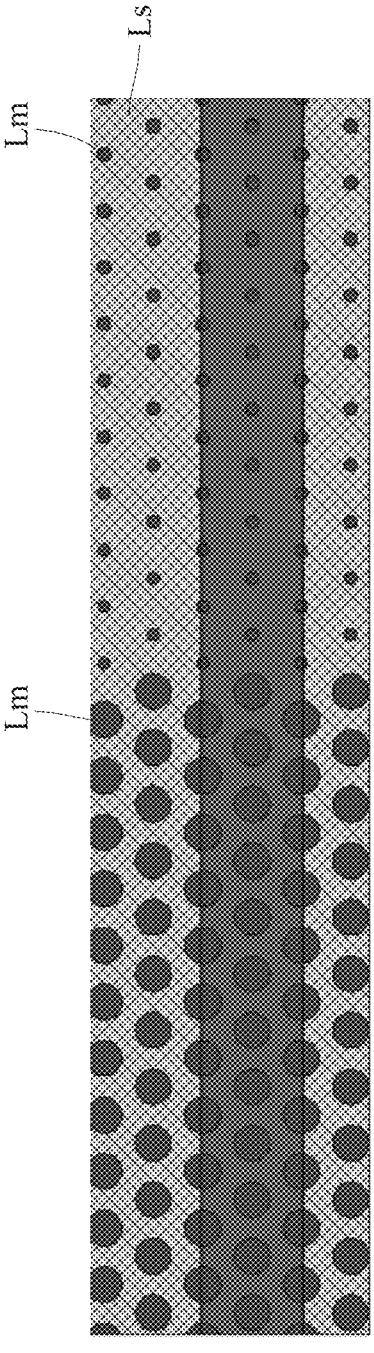
FIG. 57 is a partial and enlarged top view of nanopillars according to the 1st embodiment of the present disclosure.
Figure 58:
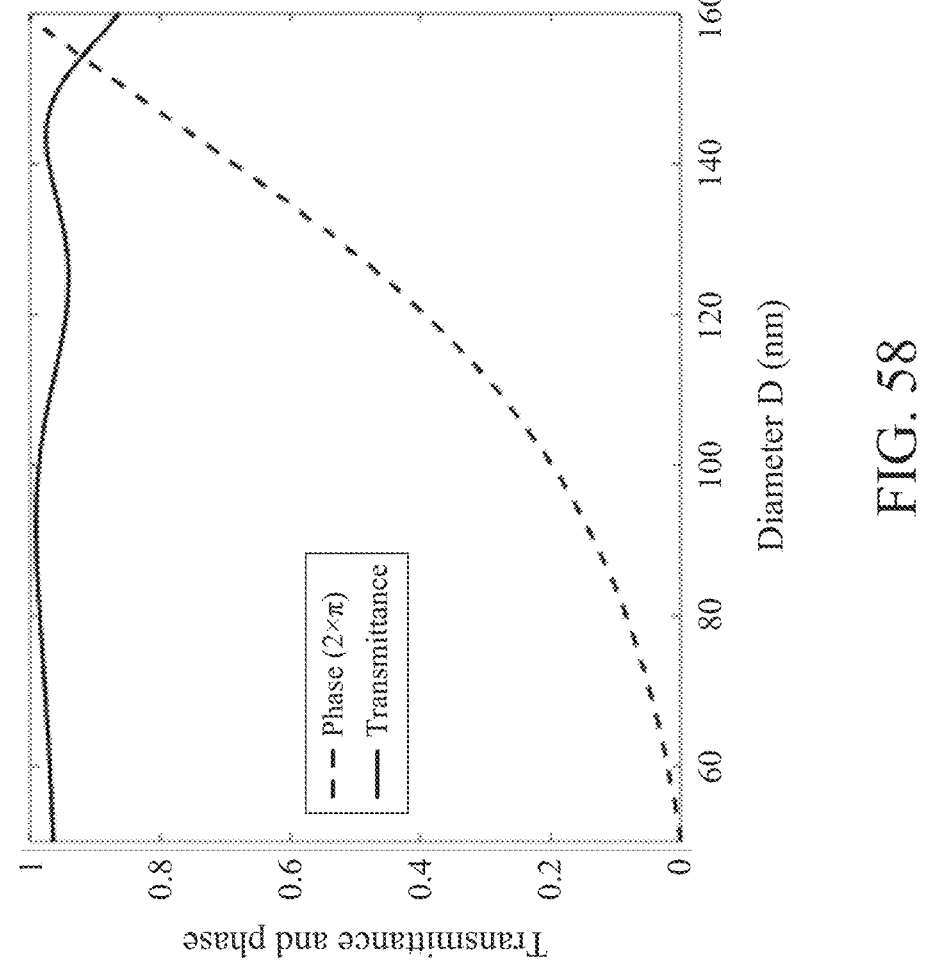
FIG. 58 is a diagram showing the simulation result of the diameter of single structure of nanopillars to the transmittance and the phase according to the 1st embodiment of the present disclosure.

In the case that the subwavelength microstructure Lm included by the image-side surface of the third lens element E3 served as the metasurface is nanopillars, the partial structure thereof viewing from the top side is shown in FIG. 57. Further, when HFOV is 0 degrees, the simulation result of the cylinder diameter (D) of single structure of nanopillars to the transmittance and the phase is shown in FIG. 58, wherein the phase control from 0 to $2\pi$ is achieved by the variation among different cylinder diameters (50 nm to 160 nm) of the nanopillars.

In the case that the subwavelength microstructure Lm included by the image-side surface of the third lens element E3 served as the metasurface is nanopillars, the nanopillars are made of $TiO_2$ material (refractive index=2.947). When a height of single structure of the nanopillars (a height of the subwavelength microstructure perpendicular to the surface of the base) is H, a diameter on the cross section of the single structure of the nanopillars is D, and a distance between centers of two adjacent periodic structures in the nanopillars (the subwavelength microstructure) is P, the following conditions are satisfied: H=600 [nm]; D=50 [nm] to 160 [nm]; and P=250 [nm].

When the height of the subwavelength microstructure perpendicular to the surface of the base is H, and the reference wavelength is $\lambda 0$, the nanofins satisfy the following condition: H/$\lambda 0$=1.08, and the nanopillars satisfy the following condition: H/$\lambda 0$=1.08.

When the distance between centers of two adjacent periodic structures in the subwavelength microstructure is P, and the reference wavelength is $\lambda 0$, the nanofins satisfy the following condition: P/$\lambda 0$=0.58, and the nanopillars satisfy the following condition: P/$\lambda 0$=0.45.

When the height of the subwavelength microstructure perpendicular to the surface of the base is H, and the distance between centers of two adjacent periodic structures in the subwavelength microstructure is P, the nanofins satisfy the following condition: H/P=1.88, and the nanopillars satisfy the following condition: H/P=2.40.

When the height of the subwavelength microstructure perpendicular to the surface of the base is H, and a minimum diameter on the cross sections of the plurality of nanopillars is Dmin, the nanopillars satisfy the following condition: H/Dmin=12.00.

When the height of the subwavelength microstructure perpendicular to a surface of the base is H, and a maximum diameter on the cross sections of the plurality of nanopillars is Dmax, the nanopillars satisfy the following condition: H/Dmax=3.75.

When a refractive index of the subwavelength microstructure of the metasurface is Nm, the nanofins satisfy the following condition: Nm=2.947, and the nanopillars satisfy the following condition: Nm=2.947.

When the refractive index of the subwavelength microstructure of the metasurface is Nm, and a refractive index of the base of the metasurface is Ns, the nanofins satisfy the following condition: Nm−Ns=1.43, and the nanopillars satisfy the following condition: Nm−Ns=1.43.

The detailed optical data of the 1st embodiment are shown in Table 1A, the aspheric surface data are shown in Table 1B and the metasurface phase equation data are shown in Table 1C below.

TABLE 1A

| Surface # | | Curvature Radius | | Thickness | Material | Index | Abbe # | Focal Length |
|---|---|---|---|---|---|---|---|---|
| | | 1st Embodiment f = 1.78 mm, Fno = 2.40, HFOV = 59.9 deg. | | | | | | |
| 0 | Object | Plano | | Infinity | | | | |
| 1 | Lens 1 | −7.9009 | (ASP) | 0.233 | Plastic | 1.547 | 56.1 | −4.26 |
| 2 | | 3.3412 | (ASP) | 0.604 | | | | |
| 3 | Ape. Stop | Plano | | 0.030 | | | | |
| 4 | Lens 2 | 3.6223 | (ASP) | 0.601 | Plastic | 1.546 | 56.0 | 2.78 |
| 5 | | −2.4552 | (ASP) | 0.030 | | | | |
| 6 | Lens 3 | Plano | | 0.100 | Glass | 1.518 | 64.2 | 37.14 |
| 7 | | Plano | | 0.147 | | | | |
| 8 | Lens 4 | 1.2921 | (ASP) | 0.206 | Plastic | 1.666 | 20.4 | 13.94 |
| 9 | | 1.4055 | (ASP) | 0.197 | | | | |
| 10 | Lens 5 | −5.3544 | (ASP) | 0.766 | Plastic | 1.546 | 56.0 | 1.84 |
| 11 | | −0.8880 | (ASP) | 0.192 | | | | |
| 12 | Lens 6 | 1.6246 | (ASP) | 0.327 | Plastic | 1.677 | 19.5 | −2.12 |
| 13 | | 0.6992 | (ASP) | 0.500 | | | | |
| 14 | Filter | Plano | | 0.210 | Glass | 1.518 | 64.2 | — |
| 15 | | Plano | | 0.239 | | | | |
| 16 | Image | Plano | | — | | | | |

Note:

Reference wavelength is 555.0 nm.

The image-side surface of the third lens element E3 (Surface 7) is a metasurface having the subwavelength microstructure.

θm at the image-side surface of the third lens element E3 (Surface 7) is 31.6°.

TABLE 1B

| Surface # | 1 | 2 | 4 | 5 |
|---|---|---|---|---|
| | | Aspheric Coefficients | | |
| k= | 5.279138E+00 | −5.223989E+01 | −1.877615E+00 | 5.008303E+00 |
| A4= | 7.53900261E−01 | 1.07746219E+00 | −6.39989152E−02 | −5.39062593E−01 |
| A6= | −1.05152555E+00 | 9.01710244E−01 | −2.02286550E−01 | 1.68755926E+00 |
| A8= | 1.42913959E+00 | −1.58277726E+01 | 9.77396110E−01 | −7.86141741E+00 |
| A10= | −1.20347347E+00 | 8.09803890E+01 | −1.12333120E+01 | 2.15535616E+01 |
| A12= | 5.87600636E−01 | −2.02854095E+02 | 2.22207772E+01 | −3.34773214E+01 |
| A14= | −2.08101649E−01 | 2.62628836E+02 | — | 1.99598105E+01 |
| A16= | 4.22571924E−02 | −1.41124377E+02 | — | — |

| Surface # | 8 | 9 | 10 | 11 |
|---|---|---|---|---|
| k= | −7.164438E+00 | −6.659765E−01 | 1.109718E+01 | −3.802092E+00 |
| A4= | −1.28419692E−01 | −1.64874608E−01 | 3.28198413E−01 | 2.00070957E−02 |
| A6= | −1.28867854E+00 | −1.77403520E+00 | −1.47868719E+00 | −8.17337723E−01 |
| A8= | 8.67151296E+00 | 9.25514212E+00 | 4.54313422E+00 | 3.04242194E+00 |
| A10= | −3.41702746E+01 | −2.64028389E+01 | −1.01557693E+01 | −6.40034277E+00 |
| A12= | 8.64815768E+01 | 4.75091075E+01 | 1.72628713E+01 | 8.31623666E+00 |
| A14= | −1.46343850E+02 | −5.42050458E+01 | −1.97742712E+01 | −6.58632139E+00 |
| A16= | 1.60884572E+02 | 3.77367255E+01 | 1.37382559E+01 | 3.08661435E+00 |
| A18= | −1.04460097E+02 | −1.45722781E+01 | −5.17533020E+00 | −7.86405587E−01 |
| A20= | 3.00869486E+01 | 2.38598047E+00 | 8.08588724E−01 | 8.39393987E−02 |

| Surface # | 12 | 13 |
|---|---|---|
| k= | −8.106282E−01 | −2.325623E+00 |
| A4= | −4.58523831E−01 | −7.83756113E−01 |
| A6= | −8.57656281E−01 | 1.16329626E+00 |
| A8= | 3.39963748E+00 | −1.26446430E+00 |
| A10= | −6.01084294E+00 | 9.55990328E−01 |
| A12= | 6.13772487E+00 | −4.96483056E−01 |
| A14= | −3.78672778E+00 | 1.72576937E−01 |
| A16= | 1.39137844E+00 | −3.82008901E−02 |
| A18= | −2.78483363E−01 | 4.83439713E−03 |
| A20= | 2.31544472E−02 | −2.63515549E−04 |

TABLE 1C

| coefficients of metasurface phase equation | |
|---|---|
| Surface | 7 |
| diffraction order | 1 |
| C1= | −1.425372E−02 |
| C2= | 1.705275E−02 |
| C3= | 8.005588E−03 |
| C4= | −2.195797E−02 |
| C5= | −1.869082E−02 |
| C6= | −1.095860E−02 |
| C7= | 3.359123E−02 |

In Table 1A, the curvature radius, the thickness and the focal length are shown in millimeters (mm). Surface numbers 0-16 represent the surfaces sequentially arranged from the object side to the image side along the optical axis. In Table 1B, k represents the conic coefficient of the equation of the aspheric surface profiles. A4-A20 represent aspheric coefficients ranging from the 4th order to the 20th order. In Table 1C, the metasurface phase equation data of each metalens of the 1st embodiment are shown, and C1-C7 represent the coefficients of phase equation of each metasurface of each metalens. The tables presented below for each embodiment are the corresponding schematic parameter and aberration curves, and the definitions of the tables are the same as Table 1A, Table 1B and Table 1C of the 1st embodiment. Therefore, an explanation in this regard will not be provided again.

2nd Embodiment

Figure 3:
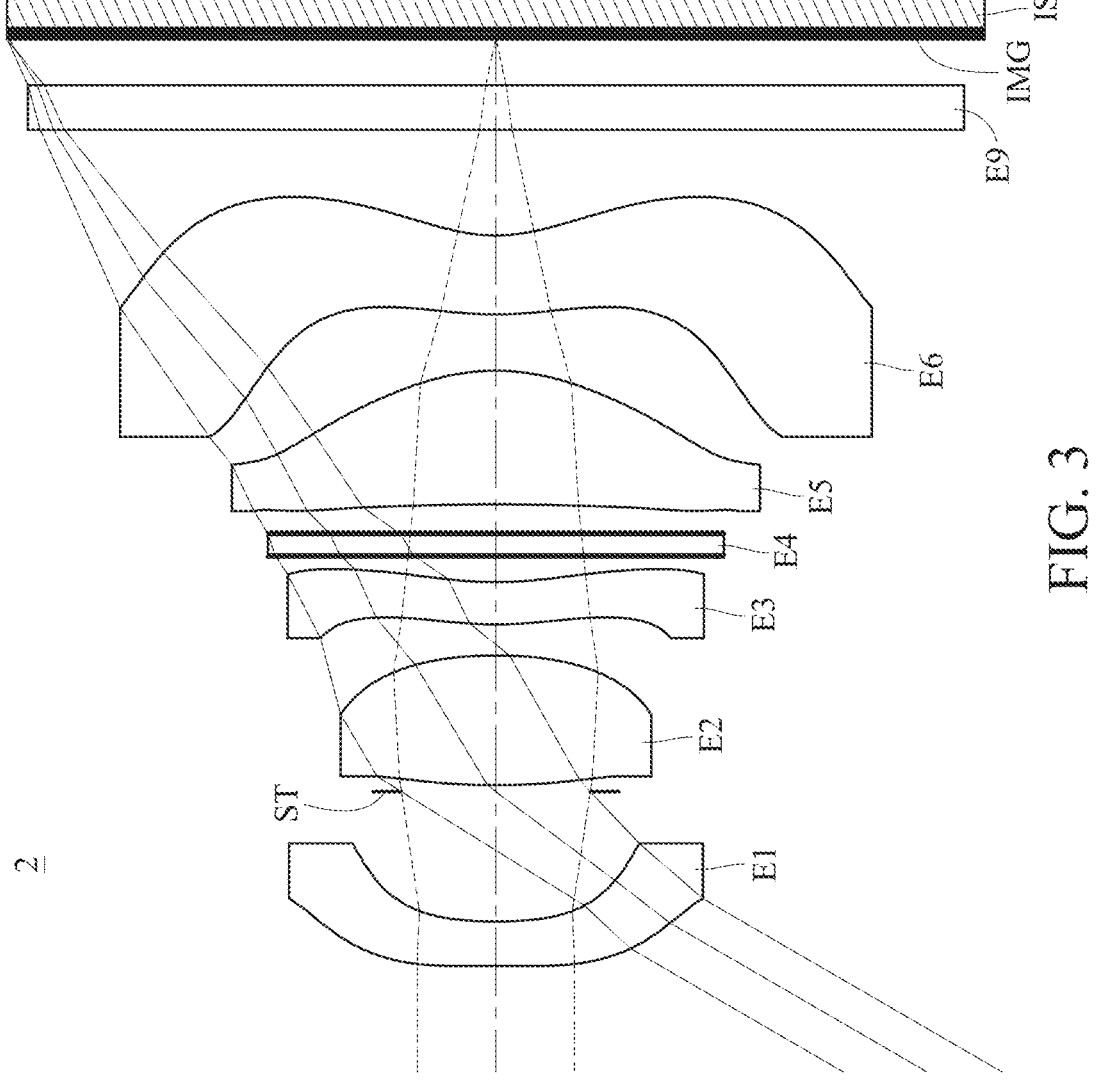
FIG. 3 is a schematic view of an image capturing unit according to the 2nd embodiment of the present disclosure.
Figure 4:
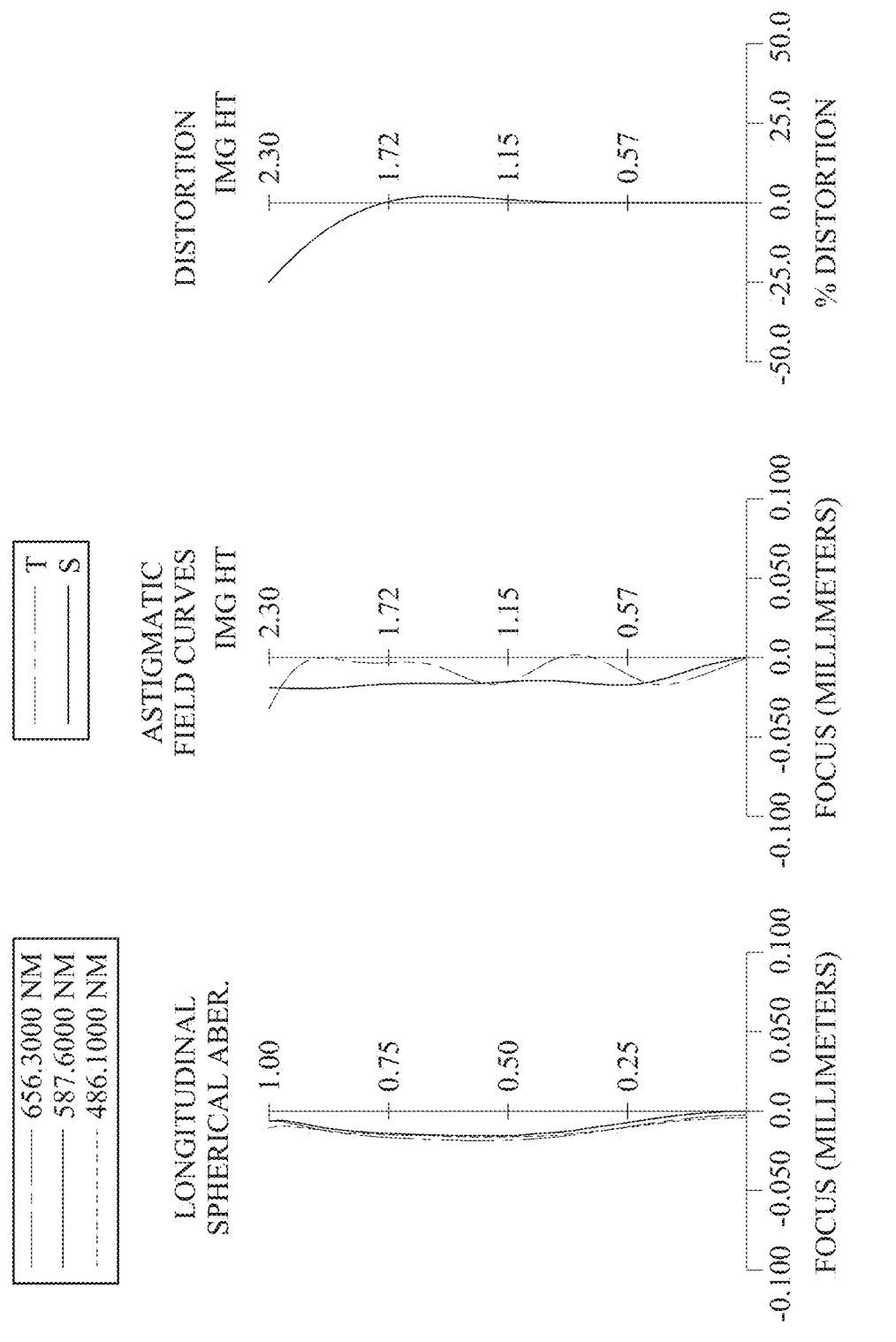
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the photographing lens assembly (its reference numeral is omitted) of the present disclosure and an image sensor IS. The photographing lens assembly includes, in order from an object side to an image side along an optical axis, a first lens element E1, an aperture stop ST, a second lens element E2, a third lens element E3, a fourth lens element E4, a fifth lens element E5, a sixth lens element E6, a filter E9 and an image surface IMG. The photographing lens assembly includes six lens elements (E1, E2, E3, E4, E5 and E6) with no additional lens element disposed between each of the adjacent six lens elements.

The first lens element E1 is a simple refractive lens element with negative refractive power and has an object-side surface being concave in a paraxial region thereof and an image-side surface being concave in a paraxial region thereof. The first lens element E1 is made of plastic material and has the object-side surface and the image-side surface being both aspheric.

The second lens element E2 is a simple refractive lens element with positive refractive power and has an object-side surface being convex in a paraxial region thereof and an image-side surface being convex in a paraxial region thereof. The second lens element E2 is made of plastic material and has the object-side surface and the image-side surface being both aspheric.

The third lens element E3 is a simple refractive lens element with positive refractive power and has an object-side surface being convex in a paraxial region thereof and an image-side surface being concave in a paraxial region thereof. The third lens element E3 is made of plastic material and has the object-side surface and the image-side surface being both aspheric.

The fourth lens element E4 is a metalens with positive refractive power and has an object-side surface being planar in a paraxial region thereof and an image-side surface being planar in a paraxial region thereof. The fourth lens element E4 has a base made of glass material and has the object-side surface and the image-side surface each being a metasurface having a subwavelength microstructure. Specifically, the fourth lens element E4 includes a base and subwavelength microstructures formed on basal surfaces of the base facing towards the object side and the image side, respectively, and the metasurfaces each include one basal surface and one subwavelength microstructure.

The fifth lens element E5 is a simple refractive lens element with positive refractive power and has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 is a simple refractive lens element with negative refractive power and has an object-side surface being convex in a paraxial region thereof and an image-side surface being concave in a paraxial region thereof. The sixth lens element E6 is made of plastic material and has the object-side surface and the image-side surface being both aspheric.

The filter E9 is made of glass material and located between the sixth lens element E6 and the image surface IMG, and will not affect the focal length of the photographing lens assembly. The image sensor IS is disposed on or near the image surface IMG of the photographing lens assembly.

The detailed optical data of the 2nd embodiment are shown in Table 2A and the aspheric surface data are shown in Table 2B and the metasurface phase equation data are shown in Table 2C below.

TABLE 2A

| | | 2nd Embodiment f = 1.78 mm, Fno = 2.40, HFOV = 59.9 deg. | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −13.8961 | (ASP) | 0.211 | Plastic | 1.545 | 56.1 | −3.54 |
| 2 | | 2.2529 | (ASP) | 0.614 | | | | |
| 3 | Ape. Stop | Plano | | 0.030 | | | | |
| 4 | Lens 2 | 3.1071 | (ASP) | 0.613 | Plastic | 1.544 | 56.0 | 2.41 |
| 5 | | −2.1158 | (ASP) | 0.147 | | | | |

TABLE 2A-continued

|  |  | 2nd Embodiment f = 1.78 mm, Fno = 2.40, HFOV = 59.9 deg. |  |  |  |  |  |  |
|---|---|---|---|---|---|---|---|---|
| Surface # |  | Curvature Radius |  | Thickness | Material | Index | Abbe # | Focal Length |
| 6 | Lens 3 | 1.7143 | (ASP) | 0.200 | Plastic | 1.660 | 20.4 | 51.68 |
| 7 |  | 1.7213 | (ASP) | 0.128 |  |  |  |  |
| 8 | Lens 4 | Plano |  | 0.100 | Glass | 1.517 | 64.2 | 45.16 |
| 9 |  | Plano |  | 0.140 |  |  |  |  |
| 10 | Lens 5 | −8.2981 | (ASP) | 0.632 | Plastic | 1.544 | 56.0 | 2.03 |
| 11 |  | −1.0018 | (ASP) | 0.266 |  |  |  |  |
| 12 | Lens 6 | 1.8292 | (ASP) | 0.373 | Plastic | 1.671 | 19.5 | −2.38 |
| 13 |  | 0.7826 | (ASP) | 0.500 |  |  |  |  |
| 14 | Filter | Plano |  | 0.210 | Glass | 1.517 | 64.2 | — |
| 15 |  | Plano |  | 0.217 |  |  |  |  |
| 16 | Image | Plano |  | — |  |  |  |  |

Note:
Reference wavelength is 587.6 nm (d-line).
Each of the object-side surface of the fourth lens element E4 (Surface 8) and the image-side surface of the fourth lens element E4 (Surface 9) is a metasurface having the subwavelength microstructure.
θm at the object-side surface of the fourth lens element E4 (Surface 8) is 55.2°.
θm at the image-side surface of the fourth lens element E4 (Surface 9) is 30.7°.

TABLE 2B

| | | Aspheric Coefficients | | |
|---|---|---|---|---|
| Surface # | 1 | 2 | 4 | 5 |
| k= | 4.689868E+00 | −8.782141E−01 | 6.618037E+00 | 3.524596E+00 |
| A4= | 9.29238681E−01 | 1.14332578E+00 | −4.14789538E−03 | −6.25397834E−01 |
| A6= | −1.45209331E+00 | 1.85568079E+00 | −6.33191363E−01 | 2.33464498E+00 |
| A8= | 2.38071486E+00 | −2.28972200E+01 | 4.35903299E+00 | −9.82037435E+00 |
| A10= | −2.83465959E+00 | 1.22897552E+02 | −2.07309329E+01 | 2.62926787E+01 |
| A12= | 2.60332859E+00 | −3.36497853E+02 | 2.98775172E+01 | −4.10754595E+01 |
| A14= | −1.88390913E+00 | 5.03072110E+02 | — | 2.49046577E+01 |
| A16= | 6.26120412E−01 | −3.32075204E+02 | — | — |

| Surface # | 6 | 7 | 10 | 11 |
|---|---|---|---|---|
| k= | −1.994328E+01 | −1.048037E+00 | 4.236491E+01 | −3.189279E+00 |
| A4= | −5.08743023E−01 | −5.68338984E−01 | 1.90054648E−01 | −3.04041511E−02 |
| A6= | 1.59577632E+00 | 9.52379672E−01 | −9.10453955E−01 | 1.06436143E−01 |
| A8= | −9.37181511E+00 | −2.11140817E+00 | 3.88261772E+00 | −1.20979648E+00 |
| A10= | 3.72596986E+01 | 2.13443422E+00 | −1.09159476E+01 | 5.23037421E+00 |
| A12= | −9.08512199E+01 | 6.25240671E+00 | 1.80319461E+01 | −1.11317180E+01 |
| A14= | 1.31340081E+02 | −2.31823429E+01 | −1.72908920E+01 | 1.28311152E+01 |
| A16= | −1.03062821E+02 | 3.07492746E+01 | 9.45645923E+00 | −8.12789886E+00 |
| A18= | 2.74970133E+01 | −1.92079230E+01 | −2.70068558E+00 | 2.66513855E+00 |
| A20= | 7.07190732E+00 | 4.72234703E+00 | 3.01688319E−01 | −3.54135442E−01 |

| Surface # | 12 | 13 |
|---|---|---|
| k= | −8.854556E−01 | −3.604558E+00 |
| A4= | −5.92707129E−01 | −4.72049323E−01 |
| A6= | 2.58144413E−01 | 5.16622327E−01 |
| A8= | −3.52074113E−01 | −3.93624587E−01 |
| A10= | 1.34864471E+00 | 1.94142161E−01 |
| A12= | −2.56972421E+00 | −6.27996096E−02 |
| A14= | 2.32846951E+00 | 1.24629799E−02 |
| A16= | −1.07842605E+00 | −1.21759112E−03 |
| A18= | 2.49080580E−01 | −1.23289194E−05 |
| A20= | −2.28611074E−02 | 1.11955166E−05 |

TABLE 2C

| | coefficients of metasurface phase equation | |
|---|---|---|
| Surface | 8 | 9 |
| diffraction order | 1 | 1 |
| C1= | −7.260225E−02 | 6.212494E−02 |
| C2= | 3.906815E−02 | −2.635579E−02 |
| C3= | 8.993573E−03 | −1.490540E−02 |

TABLE 2C-continued

| | coefficients of metasurface phase equation | |
|---|---|---|
| Surface | 8 | 9 |
| C4= | 9.174454E−04 | −3.543216E−03 |
| C5= | −1.391475E−03 | 5.701992E−03 |
| C6= | −8.088647E−03 | 4.087403E−03 |

In the 2nd embodiment, the equation of the aspheric surface profiles of the aforementioned lens elements is the same as the equation of the 1st embodiment. Also, the definitions of these parameters shown in Table 2D are the same as those stated in the 1st embodiment with corresponding values for the 2nd embodiment, so an explanation in this regard will not be provided again.

Moreover, these parameters can be calculated from Table 2A, Table 2B and Table 2C as the following values and satisfy the following conditions:

TABLE 2D

| Schematic Parameters | | | |
|---|---|---|---|
| f [mm] | 1.78 | fc1/fc2 | −1.47 |
| Fno | 2.40 | f/|R1| | 0.13 |
| HFOV [deg.] | 59.9 | CTc1/|RLci| | 0.27 |
| |ImgH/f1| | 0.65 | (Rc1o − Rc1i)/(Rc1o + Rc1i) | 1.39 |
| TL/ImgH | 1.91 | SAGLci/CTLc | 0.92 |
| Ym_max/ImgH | 0.47 | Vmin | 19.5 |
| Ym_max [mm] | 1.08 | Vcmin | 19.5 |
| ML/TL | 0.56 | Vcmax/Vcmin | 2.88 |
| T23/TD | 0.04 | |Dist|_max | 24.98% |
| f/|fc1| | 0.50 | — | — |

3rd Embodiment

Figure 5:
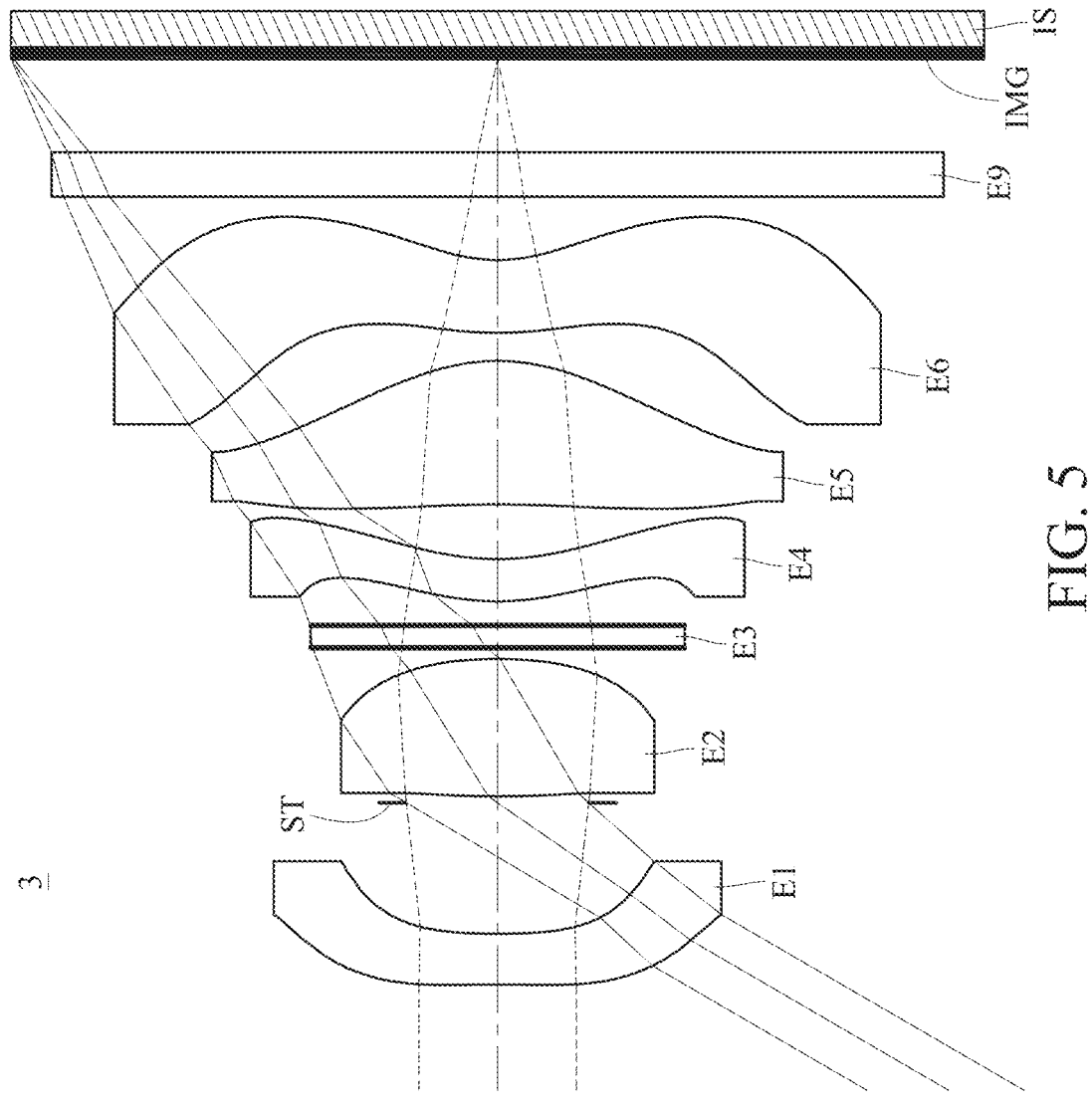
FIG. 5 is a schematic view of an image capturing unit according to the 3rd embodiment of the present disclosure.
Figure 6:
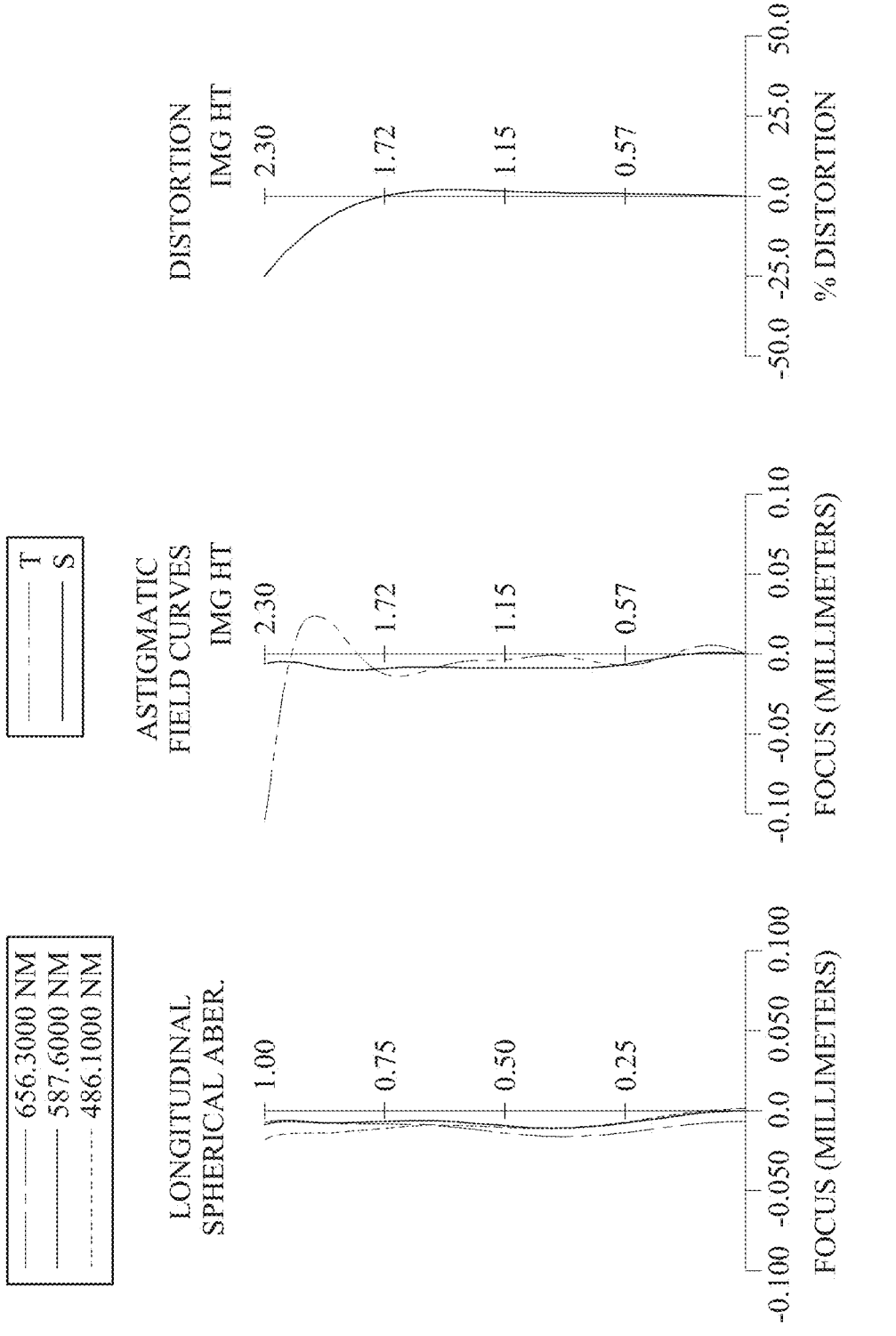
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the photographing lens assembly (its reference numeral is omitted) of the present disclosure and an image sensor IS. The photographing lens assembly includes, in order from an object side to an image side along an optical axis, a first lens element E1, an aperture stop ST, a second lens element E2, a third lens element E3, a fourth lens element E4, a fifth lens element E5, a sixth lens element E6, a filter E9 and an image surface IMG. The photographing lens assembly includes six lens elements (E1, E2, E3, E4, E5 and E6) with no additional lens element disposed between each of the adjacent six lens elements.

The first lens element E1 is a simple refractive lens element with negative refractive power and has an object-side surface being concave in a paraxial region thereof and an image-side surface being concave in a paraxial region thereof. The first lens element E1 is made of plastic material and has the object-side surface and the image-side surface being both aspheric.

The second lens element E2 is a simple refractive lens element with positive refractive power and has an object-side surface being convex in a paraxial region thereof and an image-side surface being convex in a paraxial region thereof. The second lens element E2 is made of plastic material and has the object-side surface and the image-side surface being both aspheric.

The third lens element E3 is a metalens with positive refractive power and has an object-side surface being planar in a paraxial region thereof and an image-side surface being planar in a paraxial region thereof. The third lens element E3 has a base made of glass material and has the object-side surface and the image-side surface each being a metasurface having a subwavelength microstructure. Specifically, the third lens element E3 includes a base and subwavelength microstructures formed on basal surfaces of the base facing towards the object side and the image side, respectively, and the metasurfaces each include one basal surface and one subwavelength microstructure.

The fourth lens element E4 is a simple refractive lens element with positive refractive power and has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 is a simple refractive lens element with positive refractive power and has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 is a simple refractive lens element with negative refractive power and has an object-side surface being convex in a paraxial region thereof and an image-side surface being concave in a paraxial region thereof. The sixth lens element E6 is made of plastic material and has the object-side surface and the image-side surface being both aspheric.

The filter E9 is made of glass material and located between the sixth lens element E6 and the image surface IMG, and will not affect the focal length of the photographing lens assembly. The image sensor IS is disposed on or near the image surface IMG of the photographing lens assembly.

The detailed optical data of the 3rd embodiment are shown in Table 3A and the aspheric surface data are shown in Table 3B and the metasurface phase equation data are shown in Table 3C below.

TABLE 3A

| | | | 3rd Embodiment f = 1.78 mm, Fno = 2.40, HFOV = 59.8 deg. | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −6.7965 | (ASP) | 0.241 | Plastic | 1.545 | 56.1 | −4.58 |
| 2 | | 3.9944 | (ASP) | 0.620 | | | | |
| 3 | Ape. Stop | Plano | | 0.030 | | | | |
| 4 | Lens 2 | 4.4491 | (ASP) | 0.650 | Plastic | 1.544 | 56.0 | 2.71 |
| 5 | | −2.0963 | (ASP) | 0.056 | | | | |
| 6 | Lens 3 | Plano | | 0.100 | Glass | 1.517 | 64.2 | 31.24 |
| 7 | | Plano | | 0.117 | | | | |
| 8 | Lens 4 | 1.2074 | (ASP) | 0.200 | Plastic | 1.660 | 20.4 | 14.05 |
| 9 | | 1.2968 | (ASP) | 0.259 | | | | |

TABLE 3A-continued

3rd Embodiment
f = 1.78 mm, Fno = 2.40, HFOV = 59.8 deg.

| Surface # | | Curvature Radius | | Thickness | Material | Index | Abbe # | Focal Length |
|---|---|---|---|---|---|---|---|---|
| 10 | Lens 5 | −4.8426 | (ASP) | 0.679 | Plastic | 1.544 | 56.0 | 1.94 |
| 11 | | −0.9077 | (ASP) | 0.133 | | | | |
| 12 | Lens 6 | 1.7127 | (ASP) | 0.344 | Plastic | 1.671 | 19.5 | −2.17 |
| 13 | | 0.7230 | (ASP) | 0.300 | | | | |
| 14 | Filter | Plano | | 0.210 | Glass | 1.517 | 64.2 | — |
| 15 | | Plano | | 0.441 | | | | |
| 16 | Image | Plano | | — | | | | |

Note:
Reference wavelength is 587.6 nm (d-line).
Each of the object-side surface of the third lens element E3 (Surface 6) and the image-side surface of the third lens element E3 (Surface 7) is a metasurface having the subwavelength microstructure.
θm at the object-side surface of the third lens element E3 (Surface 6) is 51.4°.
θm at the image-side surface of the third lens element E3 (Surface 7) is 30.9°.

TABLE 3B

Aspheric Coefficients

| Surface # | 1 | 2 | 4 | 5 |
|---|---|---|---|---|
| k= | −7.837113E+00 | −7.023895E+01 | −7.784103E+00 | 3.537520E+00 |
| A4= | 7.17481618E−01 | 1.04566803E+00 | −3.01643434E−02 | −5.58437776E−01 |
| A6= | −9.85718956E−01 | −9.75049015E−02 | −1.28687521E+00 | 1.51643434E+00 |
| A8= | 1.45932568E+00 | −5.33771542E+00 | 1.10080729E+01 | −6.33621149E+00 |
| A10= | −1.58077459E+00 | 2.89899224E+01 | −5.47843611E+01 | 1.72670197E+01 |
| A12= | 1.29827252E+00 | −6.72547491E+01 | 8.99078749E+01 | −2.76595358E+01 |
| A14= | −7.28034164E−01 | 8.52703850E+01 | — | 1.69877240E+01 |
| A16= | 1.75057122E−01 | −4.89975044E+01 | — | — |

| Surface # | 8 | 9 | 10 | 11 |
|---|---|---|---|---|
| k= | −5.821382E+00 | −4.730052E−01 | 1.913266E+00 | −4.505725E+00 |
| A4= | −1.06715639E−01 | −1.65280629E−01 | 2.17923003E−01 | −5.66682217E−02 |
| A6= | −2.96476836E−01 | −6.36053484E−01 | −5.65968343E−01 | −6.99777480E−01 |
| A8= | 8.84838312E−02 | 2.22609201E+00 | 2.63914898E+00 | 3.78759594E+00 |
| A10= | 1.94963130E+00 | −5.66271186E+00 | −8.11161720E+00 | −8.21780483E+00 |
| A12= | −6.82959501E+00 | 1.08862779E+01 | 1.40023406E+01 | 9.84812096E+00 |
| A14= | 1.15107757E+01 | −1.35620241E+01 | −1.39123856E+01 | −6.99338675E+00 |
| A16= | −1.01048050E+01 | 9.96207681E+00 | 7.94529461E+00 | 2.92773619E+00 |
| A18= | 3.12117785E+00 | −3.90536647E+00 | −2.42674204E+00 | −6.67472800E−01 |
| A20= | 3.20076844E−01 | 6.28647244E−01 | 3.07073750E−01 | 6.38937000E−02 |

| Surface # | 12 | 13 |
|---|---|---|
| k= | −2.797151E−01 | −1.792618E+00 |
| A4= | −4.63716221E−01 | −9.31417156E−01 |
| A6= | −8.55327105E−01 | 1.36704843E+00 |
| A8= | 3.64028505E+00 | −1.39617567E+00 |
| A10= | −6.17687337E+00 | 9.78146921E−01 |
| A12= | 5.76492251E+00 | −4.73527412E−01 |
| A14= | −3.15331861E+00 | 1.56042817E−01 |
| A16= | 1.00890233E+00 | −3.34631940E−02 |
| A18= | −1.75007516E−01 | 4.20594501E−03 |
| A20= | 1.27118618E−02 | −2.34071459E−04 |

TABLE 3C coefficients of metasurface phase equation

| Surface | 6 | 7 |
|---|---|---|
| diffraction order | 1 | 1 |
| C1= | −2.015004E−02 | 4.158340E−03 |
| C2= | 3.440258E−02 | 3.592417E−03 |
| C3= | −1.089453E−02 | −3.237933E−02 |
| C4= | −3.880234E−02 | 1.360487E−02 |
| C5= | −6.531269E−03 | 5.396110E−02 |
| C6= | −4.240218E−02 | 2.559748E−02 |

In the 3rd embodiment, the equation of the aspheric surface profiles of the aforementioned lens elements is the same as the equation of the 1st embodiment. Also, the definitions of these parameters shown in Table 3D are the same as those stated in the 1st embodiment with corresponding values for the 3rd embodiment, so an explanation in this regard will not be provided again.

Moreover, these parameters can be calculated from Table 3A, Table 3B and Table 3C as the following values and satisfy the following conditions:

TABLE 3D

| Schematic Parameters | | | |
|---|---|---|---|
| f [mm] | 1.78 | fc1/fc2 | −1.69 |
| Fno | 2.40 | f/|R1| | 0.26 |
| HFOV [deg.] | 59.8 | CTc1/|RLci| | 0.33 |
| |ImgH/f1| | 0.50 | (Rc1o − Rc1i)/(Rc1o + Rc1i) | 3.85 |
| TL/ImgH | 1.91 | |SAGLci|/CTLc | 0.73 |
| Ym__max/ImgH | 0.39 | Vmin | 19.5 |
| Ym__max [mm] | 0.88 | Vcmin | 19.5 |
| ML/TL | 0.64 | Vcmax/Vcmin | 2.88 |
| T23/TD | 0.02 | |Dist|__max | 24.91% |
| f/|fc1| | 0.39 | — | — |

4th Embodiment

Figure 7:
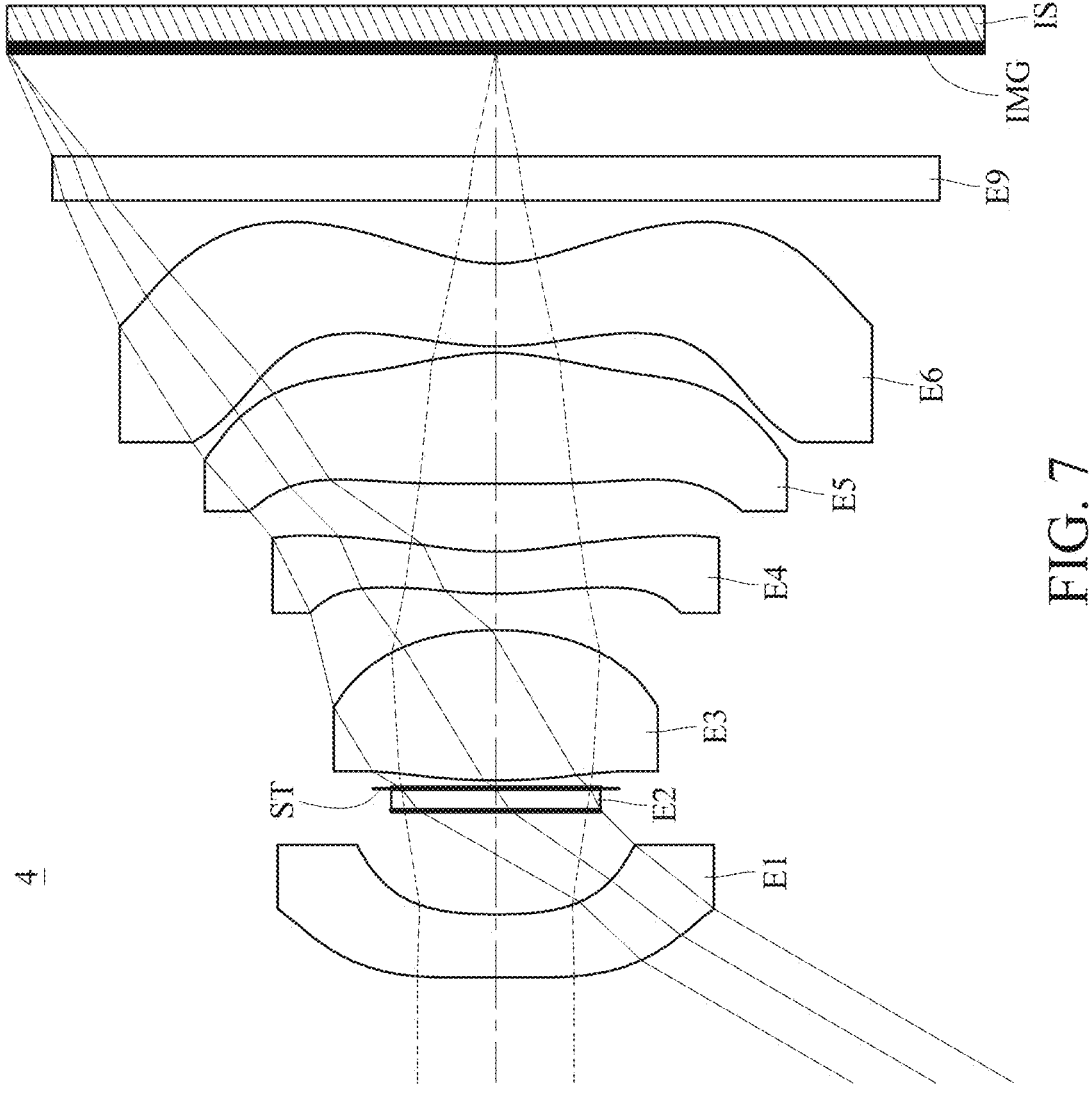
FIG. 7 is a schematic view of an image capturing unit according to the 4th embodiment of the present disclosure.
Figure 8:
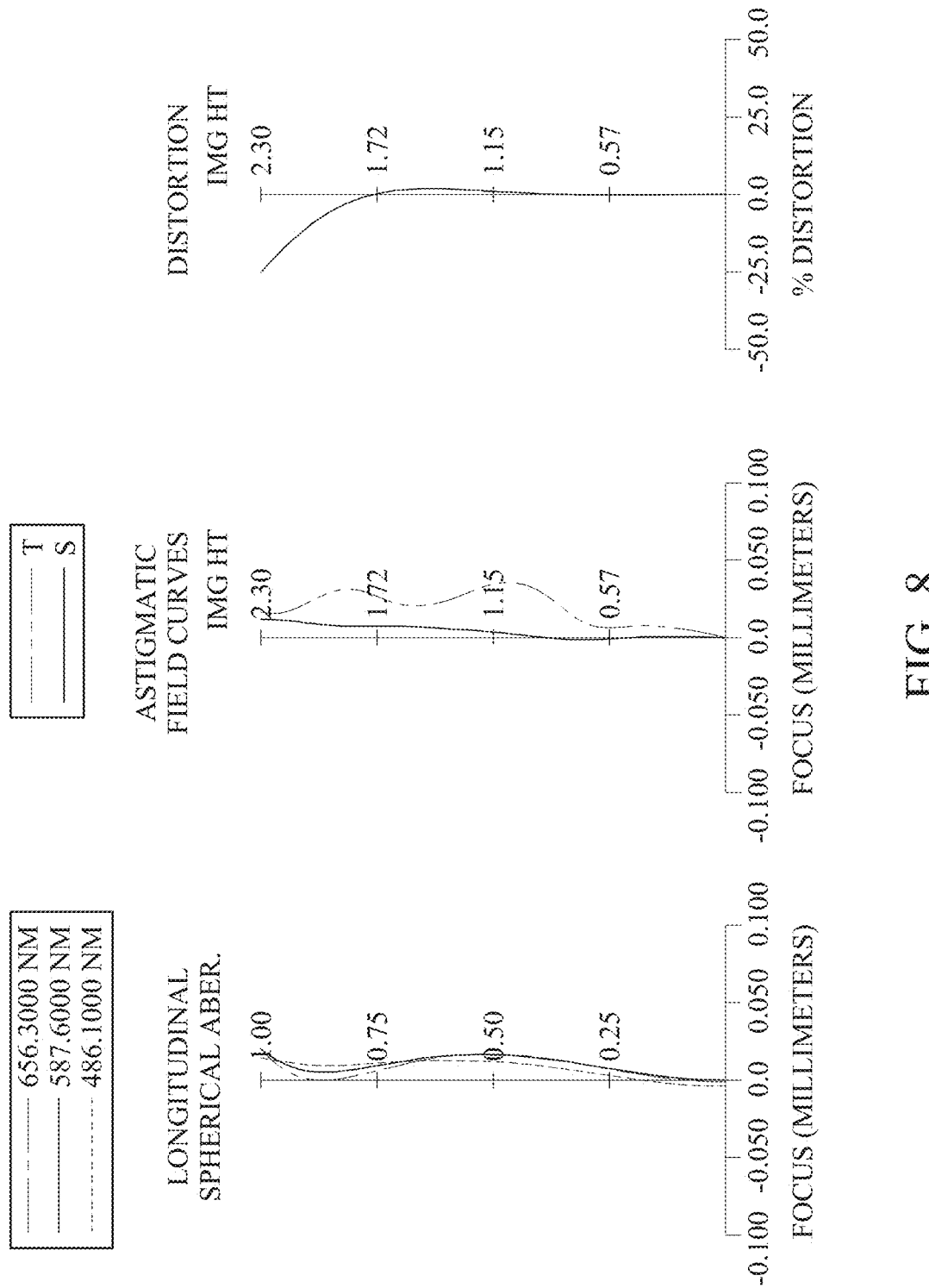
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the photographing lens assembly (its reference numeral is omitted) of the present disclosure and an image sensor IS. The photographing lens assembly includes, in order from an object side to an image side along an optical axis, a first lens element E1, a second lens element E2, an aperture stop ST, a third lens element E3, a fourth lens element E4, a fifth lens element E5, a sixth lens element E6, a filter E9 and an image surface IMG. The photographing lens assembly includes six lens elements (E1, E2, E3, E4, E5 and E6) with no additional lens element disposed between each of the adjacent six lens elements.

The first lens element E1 is a simple refractive lens element with negative refractive power and has an object-side surface being concave in a paraxial region thereof and an image-side surface being concave in a paraxial region thereof. The first lens element E1 is made of plastic material and has the object-side surface and the image-side surface being both aspheric.

The second lens element E2 is a metalens with positive refractive power and has an object-side surface being planar in a paraxial region thereof and an image-side surface being planar in a paraxial region thereof. The second lens element E2 has a base made of glass material and has the object-side surface and the image-side surface each being a metasurface having a subwavelength microstructure. Specifically, the second lens element E2 includes a base and subwavelength microstructures formed on basal surfaces of the base facing towards the object side and the image side, respectively, and the metasurfaces each include one basal surface and one subwavelength microstructure.

The third lens element E3 is a simple refractive lens element with positive refractive power and has an object-side surface being convex in a paraxial region thereof and an image-side surface being convex in a paraxial region thereof. The third lens element E3 is made of plastic material and has the object-side surface and the image-side surface being both aspheric.

The fourth lens element E4 is a simple refractive lens element with negative refractive power and has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 is a simple refractive lens element with positive refractive power and has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 is a simple refractive lens element with negative refractive power and has an object-side surface being convex in a paraxial region thereof and an image-side surface being concave in a paraxial region thereof. The sixth lens element E6 is made of plastic material and has the object-side surface and the image-side surface being both aspheric.

The filter E9 is made of glass material and located between the sixth lens element E6 and the image surface IMG, and will not affect the focal length of the photographing lens assembly. The image sensor IS is disposed on or near the image surface IMG of the photographing lens assembly.

The detailed optical data of the 4th embodiment are shown in Table 4A and the aspheric surface data are shown in Table 4B and the metasurface phase equation data are shown in Table 4C below.

TABLE 4A

4th Embodiment
f = 1.78 mm, Fno = 2.40, HFOV = 59.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −9.4203 | (ASP) | 0.298 | Plastic | 1.545 | 56.1 | −3.60 |
| 2 | | 2.5079 | (ASP) | 0.495 | | | | |
| 3 | Lens 2 | Plano | | 0.100 | Glass | 1.517 | 64.2 | 90.87 |
| 4 | | Plano | | 0.001 | | | | |
| 5 | Ape. Stop | Plano | | 0.040 | | | | |
| 6 | Lens 3 | 2.9657 | (ASP) | 0.712 | Plastic | 1.544 | 56.0 | 1.94 |
| 7 | | −1.5005 | (ASP) | 0.173 | | | | |
| 8 | Lens 4 | 1.7852 | (ASP) | 0.200 | Plastic | 1.660 | 20.4 | −26.15 |
| 9 | | 1.5458 | (ASP) | 0.322 | | | | |
| 10 | Lens 5 | −23.1803 | (ASP) | 0.620 | Plastic | 1.544 | 56.0 | 2.22 |
| 11 | | −1.1600 | (ASP) | 0.031 | | | | |

TABLE 4A-continued

4th Embodiment
f = 1.78 mm, Fno = 2.40, HFOV = 59.9 deg.

| Surface # | | Curvature Radius | | Thickness | Material | Index | Abbe # | Focal Length |
|---|---|---|---|---|---|---|---|---|
| 12 | Lens 6 | 1.5053 | (ASP) | 0.392 | Plastic | 1.671 | 19.5 | −2.41 |
| 13 | | 0.6983 | (ASP) | 0.300 | | | | |
| 14 | Filter | Plano | | 0.210 | Glass | 1.517 | 64.2 | — |
| 15 | | Plano | | 0.485 | | | | |
| 16 | Image | Plano | | — | | | | |

Note:

Reference wavelength is 587.6 nm (d-line).

Each of the object-side surface of the second lens element E2 (Surface 3) and the image-side surface of the second lens element E2 (Surface 4) is a metasurface having the subwavelength microstructure.

θm at the object-side surface of the second lens element E2 (Surface 3) is 60.4°.

θm at the image-side surface of the second lens element E2 (Surface 4) is 37.0°.

TABLE 4B

Aspheric Coefficients

| Surface # | 1 | 2 | 6 | 7 |
|---|---|---|---|---|
| k= | −7.834030E+01 | −3.050182E−02 | −4.751276E+00 | 7.908983E−02 |
| A4= | 7.59693067E−01 | 1.17490819E+00 | 9.31844342E−02 | −5.78214130E−01 |
| A6= | −1.26573408E+00 | −5.27612974E−02 | −7.94496211E−01 | 1.82335821E+00 |
| A8= | 2.48963698E+00 | −6.73016579E+00 | 4.63377886E−02 | −6.78652804E+00 |
| A10= | −3.75988269E+00 | 5.18588411E+01 | 1.72410169E+00 | 1.53952135E+01 |
| A12= | 3.91798792E+00 | −1.62023068E+02 | −2.13191884E−01 | −2.16732890E+01 |
| A14= | −2.41758355E+00 | 2.85894820E+02 | — | 1.24495607E+01 |
| A16= | 6.20399040E−01 | −2.22981401E+02 | — | — |

| Surface # | 8 | 9 | 10 | 11 |
|---|---|---|---|---|
| k= | −1.678535E+01 | −9.818590E−01 | −5.761901E+01 | −6.384329E+00 |
| A4= | −6.44866300E−01 | −6.48577863E−01 | 3.98514647E−01 | 3.69522415E−01 |
| A6= | 1.76457521E+00 | 7.68959787E−01 | −8.76209052E−01 | −4.50534245E−01 |
| A8= | −8.30740934E+00 | −6.94888434E−01 | 6.50836267E−01 | 6.31634936E−01 |
| A10= | 3.82372540E+01 | 1.34815510E+00 | 1.03888245E+00 | −1.19385664E+00 |
| A12= | −1.19092122E+02 | −2.70904533E+00 | −4.51291201E+00 | 1.30248543E+00 |
| A14= | 2.29908305E+02 | 2.63848870E+00 | 7.10772384E+00 | −7.80788867E−01 |
| A16= | −2.67310682E+02 | −8.84920389E−01 | −5.89655772E+00 | 2.57465890E−01 |
| A18= | 1.69437637E+02 | −2.34169678E−01 | 2.52724415E+00 | −4.35802825E−02 |
| A20= | −4.42894497E+01 | 1.63281650E−01 | −4.39777629E−01 | 3.01147667E−03 |

| Surface # | 12 | 13 |
|---|---|---|
| k= | −4.060919E−01 | −5.287217E+00 |
| A4= | −6.27211368E−01 | −2.75100115E−01 |
| A6= | 8.03488566E−01 | 2.32385248E−01 |
| A8= | −1.81309515E+00 | −1.52878570E−01 |
| A10= | 3.37930218E+00 | 5.89078853E−02 |
| A12= | −4.26553609E+00 | −1.54197369E−02 |
| A14= | 3.22818311E+00 | 4.93769122E−03 |
| A16= | −1.38649673E+00 | −2.10384926E−03 |
| A18= | 3.12098369E−01 | 5.47953148E−04 |
| A20= | −2.86523175E−02 | −5.42506692E−05 |

TABLE 4C coefficients of metasurface phase equation

| Surface | 3 | 4 |
|---|---|---|
| diffraction order | 1 | 1 |
| C1= | 6.902012E−02 | −7.385051E−02 |
| C2= | −1.177115E−01 | 1.654699E−01 |
| C3= | 2.448657E−01 | −6.527476E−01 |
| C4= | 1.702557E+00 | −1.287550E+00 |
| C5= | −5.718050E+00 | 8.073417E+00 |

In the 4th embodiment, the equation of the aspheric surface profiles of the aforementioned lens elements is the same as the equation of the 1st embodiment. Also, the definitions of these parameters shown in Table 4D are the same as those stated in the 1st embodiment with corresponding values for the 4th embodiment, so an explanation in this regard will not be provided again.

Moreover, these parameters can be calculated from Table 4A, Table 4B and Table 4C as the following values and satisfy the following conditions:

TABLE 4D

Schematic Parameters

| | | | |
|---|---|---|---|
| f [mm] | 1.78 | fc1/fc2 | −1.86 |
| Fno | 2.40 | f/|R1| | 0.19 |
| HFOV [deg.] | 59.9 | CTc1/|RLci| | 0.43 |

TABLE 4D-continued

| Schematic Parameters | | | |
|---|---|---|---|
| |ImgH/f1| | 0.64 | (Rc1o − Rc1i)/(Rc1o + Rc1i) | 1.73 |
| TL/ImgH | 1.91 | |SAGLci|/CTLc | 0.75 |
| Ym_max/ImgH | 0.22 | Vmin | 19.5 |
| Ym_max [mm] | 0.50 | Vcmin | 19.5 |
| ML/TL | 0.82 | Vcmax/Vcmin | 2.88 |
| T23/TD | 0.012 | |Dist|_max | 25.20% |
| f/|fc1| | 0.49 | — | — |

5th Embodiment

Figure 9:
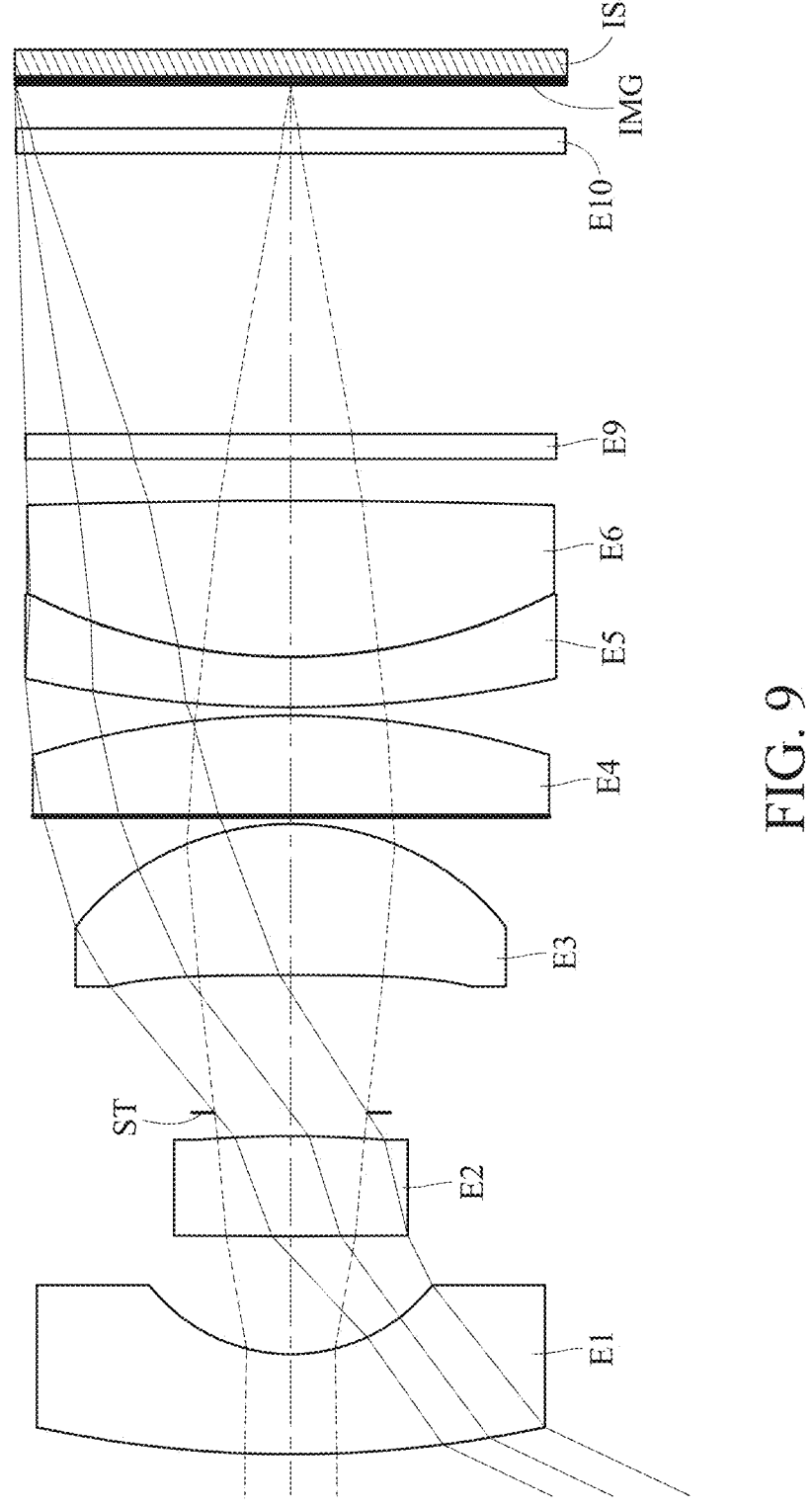
FIG. 9 is a schematic view of an image capturing unit according to the 5th embodiment of the present disclosure.
Figure 10:
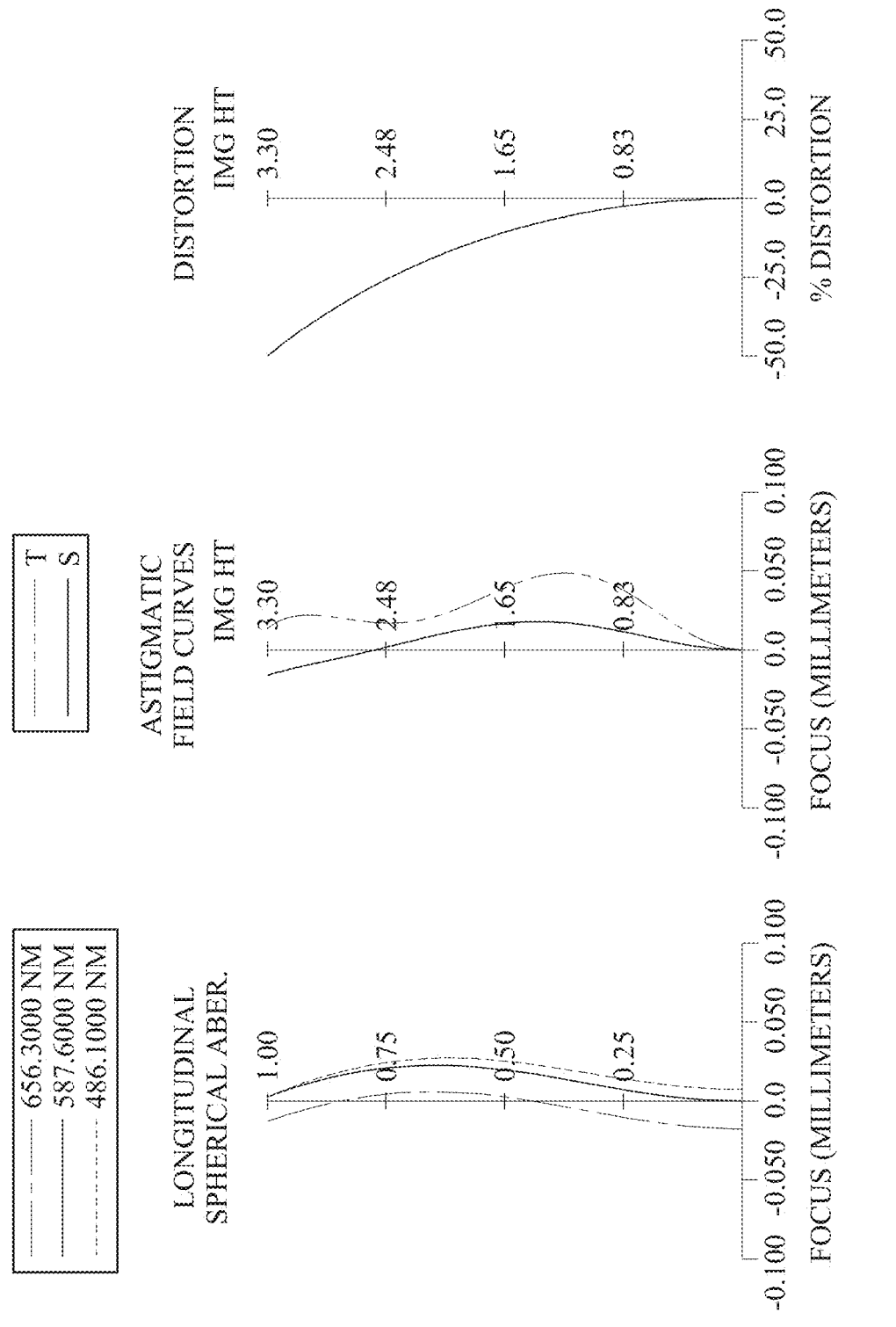
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the photographing lens assembly (its reference numeral is omitted) of the present disclosure and an image sensor IS. The photographing lens assembly includes, in order from an object side to an image side along an optical axis, a first lens element E1, a second lens element E2, an aperture stop ST, a third lens element E3, a fourth lens element E4, a fifth lens element E5, a sixth lens element E6, a filter E9, a cover glass E10 and an image surface IMG. The photographing lens assembly includes six lens elements (E1, E2, E3, E4, E5 and E6) with no additional lens element disposed between each of the adjacent six lens elements.

The first lens element E1 is a simple refractive lens element with negative refractive power and has an object-side surface being convex in a paraxial region thereof and an image-side surface being concave in a paraxial region thereof. The first lens element E1 is made of glass material and has the object-side surface and the image-side surface being both spherical.

The second lens element E2 is a simple refractive lens element with positive refractive power and has an object-side surface being convex in a paraxial region thereof and an image-side surface being convex in a paraxial region thereof. The second lens element E2 is made of glass material and has the object-side surface and the image-side surface being both spherical.

The third lens element E3 is a simple refractive lens element with positive refractive power and has an object-side surface being concave in a paraxial region thereof and an image-side surface being convex in a paraxial region thereof. The third lens element E3 is made of plastic material and has the object-side surface and the image-side surface being both aspheric.

The fourth lens element E4 is a metalens with positive refractive power and has an object-side surface being planar in a paraxial region thereof and an image-side surface being convex in a paraxial region thereof. The fourth lens element E4 has a base made of glass material and has the object-side surface being a metasurface having a subwavelength microstructure and an image-side surface being spherical. Specifically, the fourth lens element E4 includes a base and a subwavelength microstructure formed on a basal surface of the base facing towards the object side, and the metasurface includes the basal surface and the subwavelength microstructure.

The fifth lens element E5 is a simple refractive lens element with negative refractive power and has an object-side surface being convex in a paraxial region thereof and an image-side surface being concave in a paraxial region thereof. The fifth lens element E5 is made of glass material and has the object-side surface and the image-side surface being both spherical.

The sixth lens element E6 is a simple refractive lens element with positive refractive power and has an object-side surface being convex in a paraxial region thereof and an image-side surface being convex in a paraxial region thereof. The sixth lens element E6 is made of glass material and has the object-side surface and the image-side surface being both spherical. The object-side surface of the sixth lens element E6 is cemented to the image-side surface of the fifth lens element E5.

The filter E9 is made of glass material and located between the sixth lens element E6 and the image surface IMG, and will not affect the focal length of the photographing lens assembly. The cover glass is made of glass material and located between the filter E9 and the image surface IMG, and will not affect the focal length of the photographing lens assembly. The image sensor IS is disposed on or near the image surface IMG of the photographing lens assembly.

The detailed optical data of the 5th embodiment are shown in Table 5A and the aspheric surface data are shown in Table 5B and the metasurface phase equation data are shown in Table 5C below.

TABLE 5A

| | | | | | | | |
|---|---|---|---|---|---|---|---|
| 5th Embodiment | | | | | | | |
| f = 3.11 mm, Fno = 2.82, HFOV = 64.8 deg. | | | | | | | |
| Surface # | | Curvature Radius | | Thickness | Material | Index | Abbe # | Focal Length |
| 0 | Object | Plano | | Infinity | | | | |
| 1 | Lens 1 | 14.4559 | (SPH) | 1.200 | Glass | 1.804 | 46.5 | −3.28 |
| 2 | | 2.1500 | (SPH) | 1.415 | | | | |
| 3 | Lens 2 | 138.2540 | (SPH) | 1.200 | Glass | 1.946 | 18.0 | 14.16 |
| 4 | | −14.7741 | (SPH) | 0.282 | | | | |
| 5 | Ape. Stop | Plano | | 1.649 | | | | |
| 6 | Lens 3 | −74.4058 | (ASP) | 1.812 | Plastic | 1.544 | 55.9 | 6.29 |
| 7 | | −3.3000 | (ASP) | 0.100 | | | | |
| 8 | Lens 4 | Plano | | 1.200 | Glass | 1.517 | 64.2 | 20.02 |
| 9 | | −10.3451 | (SPH) | 0.100 | | | | |
| 10 | Lens 5 | 14.9038 | (SPH) | 0.600 | Glass | 1.946 | 18.0 | −14.11 |
| 11 | | 6.9035 | (SPH) | 0.005 | Cemented | 1.550 | 43.9 | |
| 12 | Lens 6 | 6.9035 | (SPH) | 1.870 | Glass | 1.620 | 60.4 | 10.48 |
| 13 | | −100.0000 | (SPH) | 0.500 | | | | |

TABLE 5A-continued

| Surface # | | Curvature Radius | Thickness | Material | Index | Abbe # | Focal Length |
|---|---|---|---|---|---|---|---|
| | | 5th Embodiment | | | | | |
| | | f = 3.11 mm, Fno = 2.82, HFOV = 64.8 deg. | | | | | |
| 14 | Filter | Plano | 0.300 | Glass | 1.517 | 64.2 | — |
| 15 | | Plano | 3.363 | | | | |
| 16 | Cover Glass | Plano | 0.300 | Glass | 1.517 | 64.2 | — |
| 17 | | Plano | 0.522 | | | | |
| 18 | Image | Plano | — | | | | |

Note:
Reference wavelength is 587.6 nm (d-line).
The object-side surface of the fourth lens element E4 (Surface 8) is a metasurface having the subwavelength microstructure.
$\theta m$ at the object-side surface of the fourth lens element E4 (Surface 8) is 24.2°.

TABLE 5B

Aspheric Coefficients

| Surface # | 6 | 7 |
|---|---|---|
| k= | −9.900000E+01 | −4.846383E+00 |
| A4= | −4.39761593E−03 | −1.55178406E−02 |
| A6= | 2.07919926E−04 | 1.64888547E−03 |
| A8= | −7.95320971E−05 | −2.38862028E−04 |
| A10= | −1.94362364E−06 | 1.63145253E−05 |
| A12= | 9.48766133E−07 | −8.37220985E−07 |

TABLE 5C coefficients of metasurface phase equation

| Surface | 8 |
|---|---|
| diffraction order | 1 |
| C1= | −4.107245E−03 |
| C2= | 3.003776E−05 |
| C3= | −5.141692E−05 |
| C4= | 1.577587E−05 |
| C5= | −1.988472E−06 |
| C6= | 1.184005E−07 |
| C7= | −5.017396E−09 |
| C8= | 1.698493E−10 |

In the 5th embodiment, the equation of the aspheric surface profiles of the aforementioned lens elements is the same as the equation of the 1st embodiment. Also, the definitions of these parameters shown in Table 5D are the same as those stated in the 1st embodiment with corresponding values for the 5th embodiment, so an explanation in this regard will not be provided again.

Moreover, these parameters can be calculated from Table 5A, Table 5B and Table 5C as the following values and satisfy the following conditions:

TABLE 5D

Schematic Parameters

| | | | |
|---|---|---|---|
| f [mm] | 3.11 | fc1/fc2 | −0.23 |
| Fno | 2.82 | f/|R1| | 0.22 |
| HFOV [deg.] | 64.8 | CTc1/|RLci| | 0.012 |
| |ImgH/f1| | 1.01 | (Rc1o − Rc1i)/(Rc1o + Rc1i) | 0.74 |
| TL/ImgH | 4.97 | |SAGLci|/CTLc | 0.03 |
| Ym_max/ImgH | 0.90 | Vmin | 18.0 |
| Ym_max [mm] | 2.97 | Vcmin | 18.0 |
| ML/TL | 0.53 | Vcmax/Vcmin | 3.36 |
| T23/TD | 0.17 | |Dist|_max | 49.97% |
| f/|fc1| | 0.95 | — | — |

6th Embodiment

Figure 11:
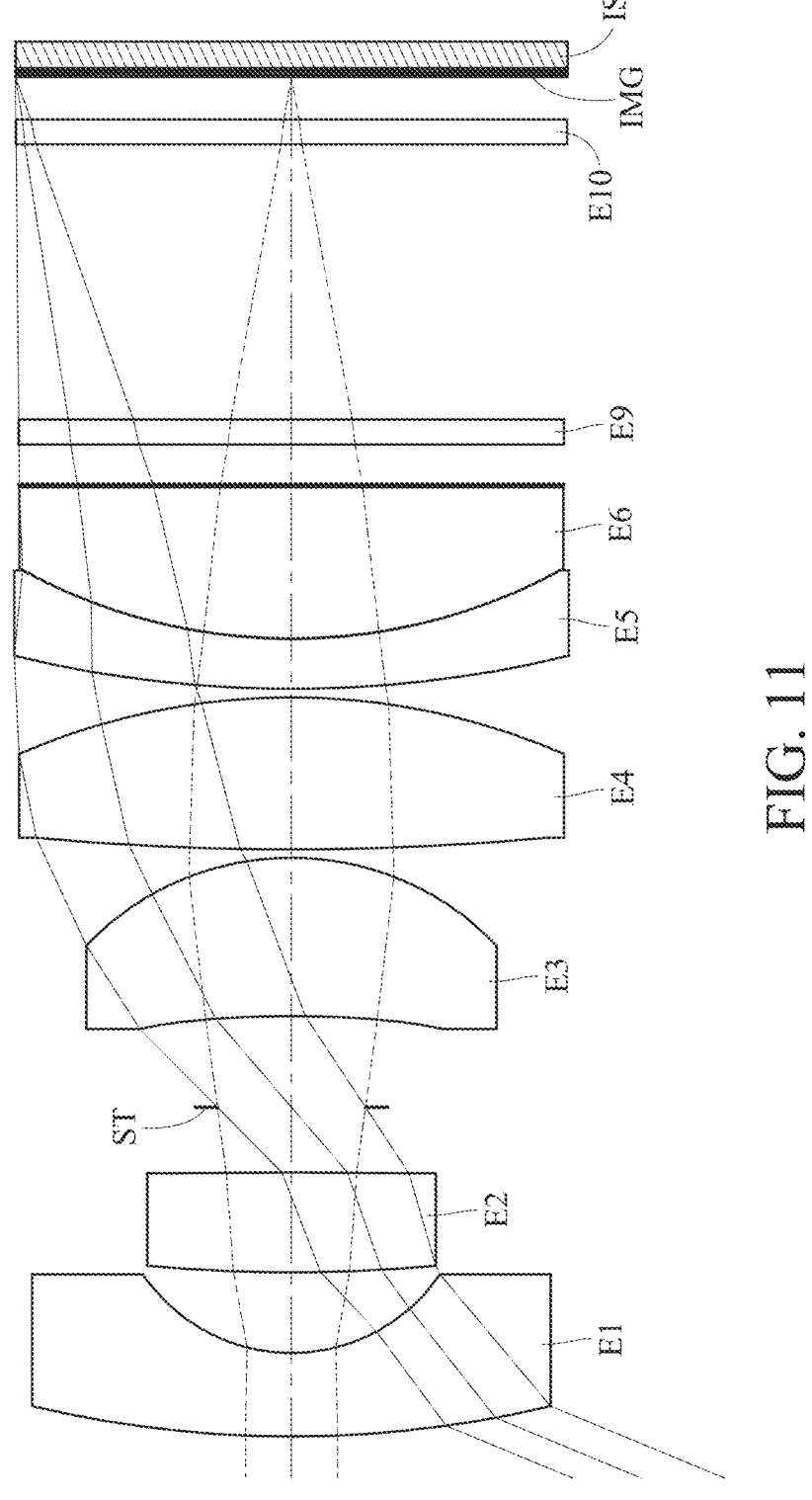
FIG. 11 is a schematic view of an image capturing unit according to the 6th embodiment of the present disclosure.
Figure 12:
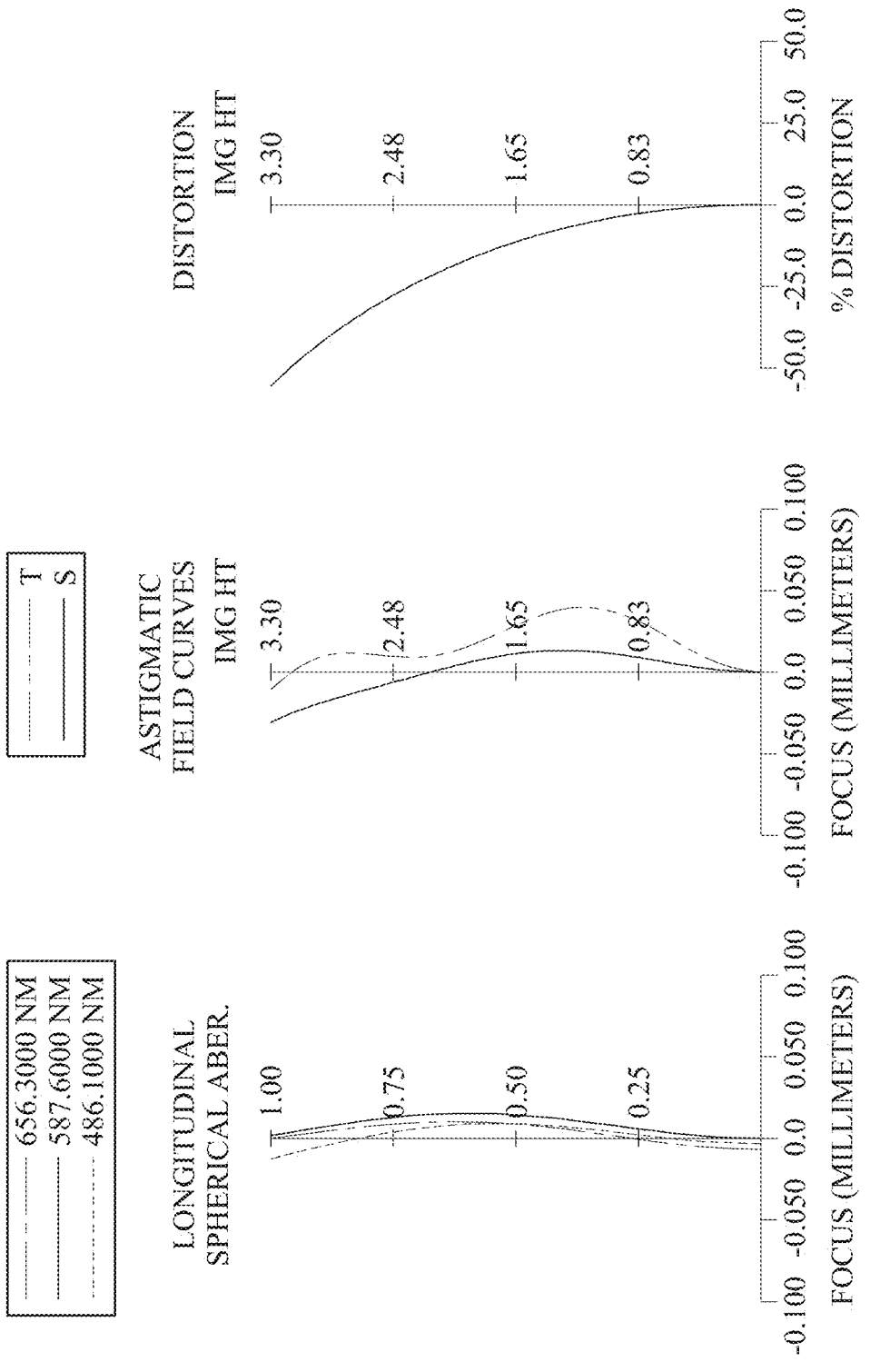
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the photographing lens assembly (its reference numeral is omitted) of the present disclosure and an image sensor IS. The photographing lens assembly includes, in order from an object side to an image side along an optical axis, a first lens element E1, a second lens element E2, an aperture stop ST, a third lens element E3, a fourth lens element E4, a fifth lens element E5, a sixth lens element E6, a filter E9, a cover glass E10 and an image surface IMG. The photographing lens assembly includes six lens elements (E1, E2, E3, E4, E5 and E6) with no additional lens element disposed between each of the adjacent six lens elements.

The first lens element E1 is a simple refractive lens element with negative refractive power and has an object-side surface being convex in a paraxial region thereof and an image-side surface being concave in a paraxial region thereof. The first lens element E1 is made of glass material and has the object-side surface and the image-side surface being both spherical.

The second lens element E2 is a simple refractive lens element with positive refractive power and has an object-side surface being convex in a paraxial region thereof and an image-side surface being convex in a paraxial region thereof. The second lens element E2 is made of glass material and has the object-side surface and the image-side surface being both spherical.

The third lens element E3 is a simple refractive lens element with positive refractive power and has an object-side surface being concave in a paraxial region thereof and an image-side surface being convex in a paraxial region thereof. The third lens element E3 is made of plastic material and has the object-side surface and the image-side surface being both aspheric.

The fourth lens element E4 is a simple refractive lens element with positive refractive power and has an object-side surface being convex in a paraxial region thereof and an image-side surface being convex in a paraxial region thereof. The fourth lens element E4 is made of glass material and has the object-side surface and the image-side surface being both spherical.

The fifth lens element E5 is a simple refractive lens element with negative refractive power and has an object-side surface being convex in a paraxial region thereof and an image-side surface being concave in a paraxial region thereof. The fifth lens element E5 is made of glass material and has the object-side surface and the image-side surface being both spherical.

The sixth lens element E6 is a metalens with positive refractive power and has an object-side surface being convex in a paraxial region thereof and an image-side surface being planar in a paraxial region thereof. The sixth lens element E6 has a base made of glass material and has the object-side surface being spherical and the image-side surface being a metasurface having a subwavelength microstructure. Specifically, the sixth lens element E6 includes a base and a subwavelength microstructure formed on a basal surface of the base facing towards the image side, and the metasurface includes the basal surface and the subwavelength microstructure. The object side of the sixth lens element E6 is cemented to the image-side surface of the fifth lens element E5.

The filter E9 is made of glass material and located between the sixth lens element E6 and the image surface IMG, and will not affect the focal length of the photographing lens assembly. The cover glass E10 is made of glass material and located between the filter E9 and the image surface IMG, and will not affect the focal length of the photographing lens assembly. The image sensor IS is disposed on or near the image surface IMG of the photographing lens assembly.

The detailed optical data of the 6th embodiment are shown in Table 6A and the aspheric surface data are shown in Table 6B and the metasurface phase equation data are shown in Table 6C below.

TABLE 6B-continued

| | Aspheric Coefficients | |
| --- | --- | --- |
| Surface # | 6 | 7 |
| A10= | 9.76009741E−05 | 2.40698954E−05 |
| A12= | −9.76860891E−06 | −7.65913963E−07 |

TABLE 6C

| coefficients of metasurface phase equation | |
| --- | --- |
| Surface | 13 |
| diffraction order | 1 |
| C1= | −5.651147E−03 |
| C2= | 3.034206E−04 |
| C3= | −6.868449E−05 |
| C4= | 1.197291E−05 |
| C5= | −1.254567E−06 |
| C6= | 5.842664E−08 |
| C7= | −4.634340E−10 |
| C8= | −3.087155E−11 |

In the 6th embodiment, the equation of the aspheric surface profiles of the aforementioned lens elements is the same as the equation of the 1st embodiment. Also, the definitions of these parameters shown in Table 6D are the same as those stated in the 1st embodiment with corresponding values for the 6th embodiment, so an explanation in this regard will not be provided again.

TABLE 6A

6th Embodiment
f = 3.08 mm, Fno = 2.79, HFOV = 67.5 deg.

| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Lens 1 | 13.3981 | (SPH) | 1.000 | Glass | 1.804 | 46.5 | −3.32 |
| 2 | | 2.1500 | (SPH) | 0.966 | | | | |
| 3 | Lens 2 | 18.9409 | (SPH) | 1.200 | Glass | 1.946 | 18.0 | 16.70 |
| 4 | | −92.3198 | (SPH) | 0.779 | | | | |
| 5 | Ape. Stop | Plano | | 1.091 | | | | |
| 6 | Lens 3 | −15.7179 | (ASP) | 1.899 | Plastic | 1.544 | 55.9 | 7.57 |
| 7 | | −3.4000 | (ASP) | 0.100 | | | | |
| 8 | Lens 4 | 33.4308 | (SPH) | 1.823 | Glass | 1.729 | 54.5 | 9.18 |
| 9 | | −8.1816 | (SPH) | 0.100 | | | | |
| 10 | Lens 5 | 14.0003 | (SPH) | 0.600 | Glass | 1.946 | 18.0 | −14.28 |
| 11 | | 6.7306 | (SPH) | 0.005 | Cemented | 1.550 | 43.9 | |
| 12 | Lens 6 | 6.7306 | (SPH) | 1.826 | Glass | 1.517 | 64.2 | 13.02 |
| 13 | | Plano | | 0.500 | | | | |
| 14 | Filter | Plano | | 0.300 | Glass | 1.517 | 64.2 | — |
| 15 | | Plano | | 3.296 | | | | |
| 16 | Cover Glass | Plano | | 0.300 | Glass | 1.517 | 64.2 | — |
| 17 | | Plano | | 0.508 | | | | |
| 18 | Image | Plano | | — | | | | |

Note:
Reference wavelength is 587.6 nm (d-line).
The image-side surface of the sixth lens element E6 (Surface 13) is a metasurface having the subwavelength microstructure.
θm at the image-side surface of the sixth lens element E6 (Surface 13) is 13.3°.

TABLE 6B

| | Aspheric Coefficients | |
| --- | --- | --- |
| Surface # | 6 | 7 |
| k= | −1.836106E+01 | −5.598149E+00 |
| A4= | −5.42351260E−03 | −1.71902768E−02 |
| A6= | 5.07501155E−04 | 2.07108321E−03 |
| A8= | −3.24611450E−04 | −3.10242962E−04 |

Moreover, these parameters can be calculated from Table 6A, Table 6B and Table 6C as the following values and satisfy the following conditions:

TABLE 6D

| Schematic Parameters | | | |
| --- | --- | --- | --- |
| f [mm] | 3.08 | fc1/fc2 | −0.20 |
| Fno | 2.79 | f/|R1| | 0.23 |

TABLE 6D-continued

| Schematic Parameters | | | |
|---|---|---|---|
| HFOV [deg.] | 67.5 | CTc1/|RLci| | 0.15 |
| |ImgH/f1| | 1.00 | (Rc1o − Rc1i)/(Rc1o + Rc1i) | 0.72 |
| TL/ImgH | 4.93 | |SAGLci|/CTLc | 1.37 |
| Ym__max/ImgH | 0.99 | Vmin | 18.0 |
| Ym__max [mm] | 3.26 | Vcmin | 18.0 |
| ML/TL | 0.30 | Vcmax/Vcmin | 3.11 |
| T23/TD | 0.16 | |Dist|__max | 55.47% |
| f/|fc1| | 0.93 | — | — |

7th Embodiment

Figure 13:
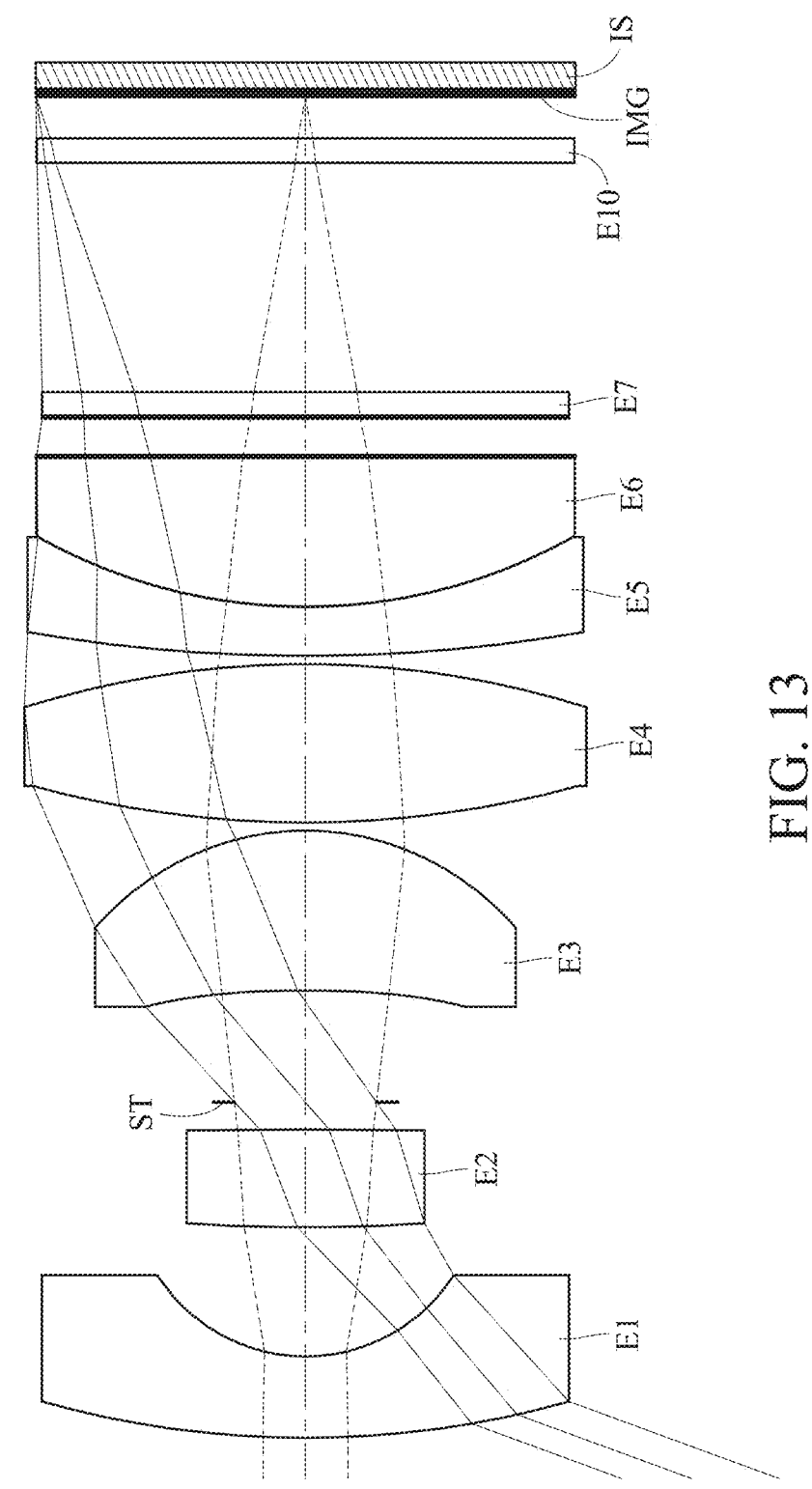
FIG. 13 is a schematic view of an image capturing unit according to the 7th embodiment of the present disclosure.
Figure 14:
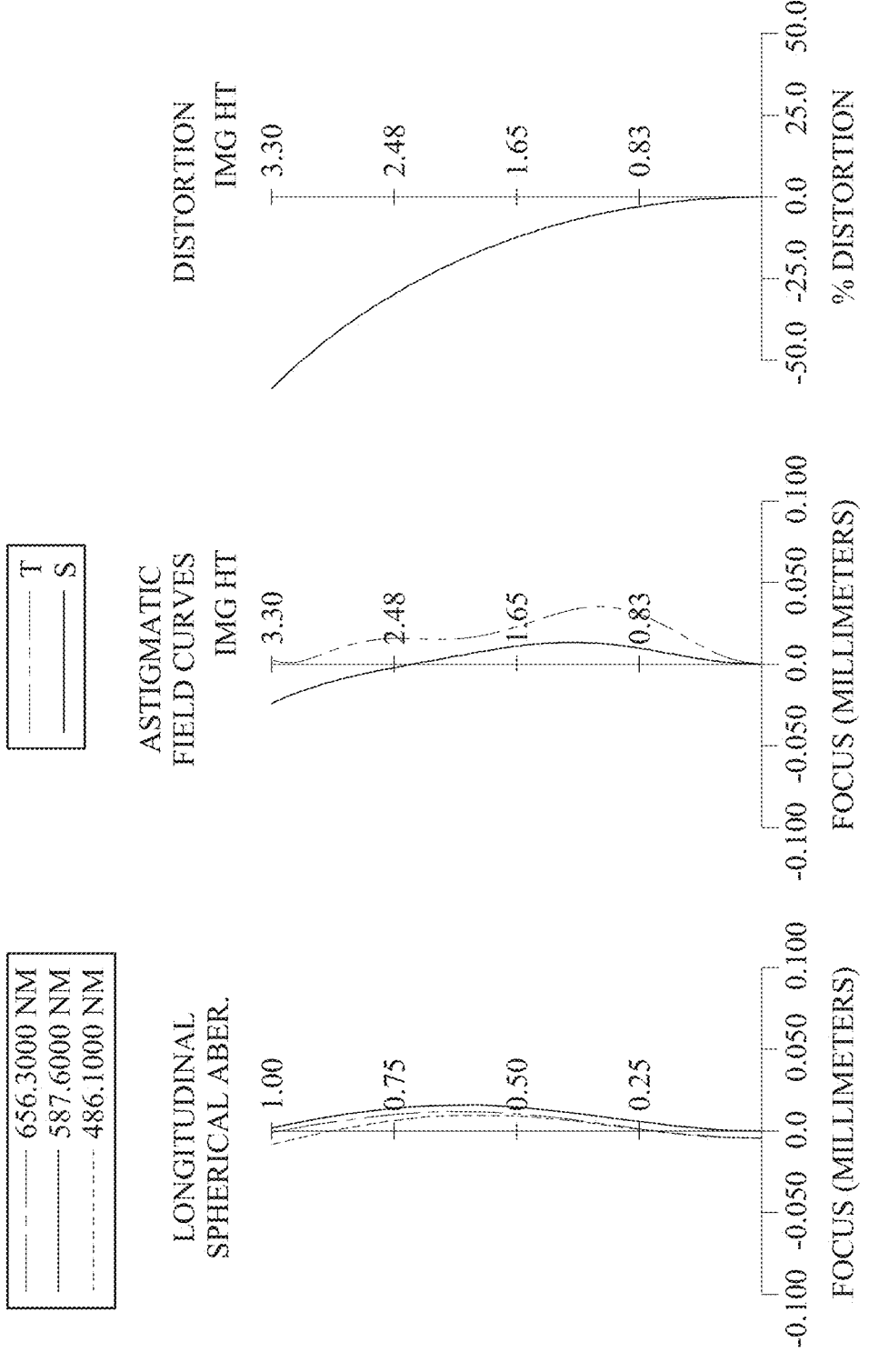
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the photographing lens assembly (its reference numeral is omitted) of the present disclosure and an image sensor IS. The photographing lens assembly includes, in order from an object side to an image side along an optical axis, a first lens element E1, a second lens element E2, an aperture stop ST, a third lens element E3, a fourth lens element E4, a fifth lens element E5, a sixth lens element E6, a seventh lens element E7, a cover glass E10 and an image surface IMG. The photographing lens assembly includes seven lens elements (E1, E2, E3, E4, E5, E6 and E7) with no additional lens element disposed between each of the adjacent seven lens elements.

The first lens element E1 is a simple refractive lens element with negative refractive power and has an object-side surface being convex in a paraxial region thereof and an image-side surface being concave in a paraxial region thereof. The first lens element E1 is made of glass material and has the object-side surface and the image-side surface being both spherical.

The second lens element E2 is a simple refractive lens element with positive refractive power and has an object-side surface being convex in a paraxial region thereof and an image-side surface being convex in a paraxial region thereof. The second lens element E2 is made of glass material and has the object-side surface and the image-side surface being both spherical.

The third lens element E3 is a simple refractive lens element with positive refractive power and has an object-side surface being concave in a paraxial region thereof and an image-side surface being convex in a paraxial region thereof. The third lens element E3 is made of plastic material and has the object-side surface and the image-side surface being both aspheric.

The fourth lens element E4 is a simple refractive lens element with positive refractive power and has an object-side surface being convex in a paraxial region thereof and an image-side surface being convex in a paraxial region thereof. The fourth lens element E4 is made of glass material and has the object-side surface and the image-side surface being both spherical.

The fifth lens element E5 is a simple refractive lens element with negative refractive power and has an object-side surface being convex in a paraxial region thereof and an image-side surface being concave in a paraxial region thereof. The fifth lens element E5 is made of glass material and has the object-side surface and the image-side surface being both spherical.

The sixth lens element E6 is a metalens with positive refractive power and has an object-side surface being convex in a paraxial region thereof and an image-side surface being planar in a paraxial region thereof. The sixth lens element E6 has a base made of glass material and has the object-side surface being spherical and the image-side surface being a metasurface having a subwavelength microstructure. Specifically, the sixth lens element E6 includes a base and a subwavelength microstructure formed on a basal surface of the base facing towards the image side, and the metasurface includes the basal surface and the subwavelength microstructure. The object side of the sixth lens element E6 is cemented to the image-side surface of the fifth lens element E5.

The seventh lens element E7 is a metalens with negative refractive power and has an object-side surface being planar in a paraxial region thereof and an image-side surface being planar in a paraxial region thereof. The seventh lens element E7 has a base made of glass material and has the object-side surface being a metasurface having a subwavelength microstructure. Specifically, the seventh lens element E7 includes a base and a subwavelength microstructure formed on a basal surface of the base facing towards the object side, and the metasurface includes the basal surface and the subwavelength microstructure. The seventh lens element E7 has a filter function and therefore can be served as a filter.

The cover glass E10 is made of glass material and located between the seventh lens element E7 and the image surface IMG, and will not affect the focal length of the photographing lens assembly. The image sensor IS is disposed on or near the image surface IMG of the photographing lens assembly.

The detailed optical data of the 7th embodiment are shown in Table 7A and the aspheric surface data are shown in Table 7B and the metasurface phase equation data are shown in Table 7C below.

TABLE 7A

| 7th Embodiment f = 2.94 mm, Fno = 2.81, HFOV = 69.8 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 11.9078 (SPH) | 1.000 | Glass | 1.804 | 46.5 | −3.42 |
| 2 | | 2.1500 (SPH) | 1.585 | | | | |
| 3 | Lens 2 | 22.0687 (SPH) | 1.200 | Glass | 1.946 | 18.0 | 17.03 |
| 4 | | −58.0330 (SPH) | 0.336 | | | | |
| 5 | Ape. Stop | Plano | 1.370 | | | | |
| 6 | Lens 3 | −13.6792 (ASP) | 1.960 | Plastic | 1.544 | 55.9 | 7.50 |
| 7 | | −3.3000 (ASP) | 0.100 | | | | |

TABLE 7A-continued

7th Embodiment
f = 2.94 mm, Fno = 2.81, HFOV = 69.8 deg.

| Surface # | | Curvature Radius | | Thickness | Material | Index | Abbe # | Focal Length |
|---|---|---|---|---|---|---|---|---|
| 8 | Lens 4 | 12.6754 | (SPH) | 1.944 | Glass | 1.729 | 54.5 | 8.55 |
| 9 | | −11.4856 | (SPH) | 0.100 | | | | |
| 10 | Lens 5 | 19.9788 | (SPH) | 0.600 | Glass | 1.946 | 18.0 | −10.91 |
| 11 | | 6.7054 | (SPH) | 0.005 | Cemented | 1.550 | 43.9 | |
| 12 | Lens 6 | 6.7054 | (SPH) | 1.834 | Glass | 1.517 | 64.2 | 12.97 |
| 13 | | Plano | | 0.500 | | | | |
| 14 | Lens 7 | Plano | | 0.300 | Glass | 1.517 | 64.2 | −38.90 |
| 15 | | Plano | | 2.812 | | | | |
| 16 | Cover Glass | Plano | | 0.300 | Glass | 1.517 | 64.2 | — |
| 17 | | Plano | | 0.506 | | | | |
| 18 | Image | Plano | | — | | | | |

Note:
Reference wavelength is 587.6 nm (d-line).
Each of the image-side surface of the sixth lens element E6 (Surface 13) and the object-side surface of the seventh lens element E7 (Surface 14) is a metasurface having the subwavelength microstructure.
θm at the image-side surface of the sixth lens element E6 (Surface 13) is 12.4°.
θm at the object-side surface of the seventh lens element E7 (Surface 14) is 14.7°.

TABLE 7B

Aspheric Coefficients

| Surface # | 6 | 7 |
|---|---|---|
| k= | 4.085543E−01 | −5.213768E+00 |
| A4= | −4.53836480E−03 | −1.68341518E−02 |
| A6= | 4.66571128E−04 | 2.04330273E−03 |
| A8= | −2.67697391E−04 | −2.98012502E−04 |
| A10= | 7.21982805E−05 | 2.28263806E−05 |
| A12= | −6.62411657E−06 | −6.86426562E−07 |

TABLE 7C coefficients of metasurface phase equation

| Surface | 13 | 14 |
|---|---|---|
| diffraction order | 1 | 1 |
| C1= | −1.562030E−02 | 1.285349E−02 |
| C2= | −4.541916E−04 | 5.039607E−04 |
| C3= | −3.863838E−05 | 1.530861E−05 |
| C4= | 8.514806E−06 | −2.461067E−07 |
| C5= | −8.196625E−07 | −3.129376E−07 |
| C6= | 5.717231E−08 | 2.559001E−08 |
| C7= | −3.431879E−09 | −7.442990E−11 |
| C8= | 9.014661E−11 | — |

In the 7th embodiment, the equation of the aspheric surface profiles of the aforementioned lens elements is the same as the equation of the 1st embodiment. Also, the definitions of these parameters shown in Table 7D are the same as those stated in the 1st embodiment with corresponding values for the 7th embodiment, so an explanation in this regard will not be provided again.

Moreover, these parameters can be calculated from Table 7A, Table 7B and the Table 7C as the following values and satisfy the following conditions:

TABLE 7D

Schematic Parameters

| f [mm] | 2.94 | fc1/fc2 | −0.20 |
|---|---|---|---|
| Fno | 2.81 | f/|R1| | 0.25 |
| HFOV [deg.] | 69.8 | CTc1/|RLci| | 0.15 |
| |ImgH/f1| | 0.97 | (Rc1o − Rc1i)/(Rc1o + Rc1i) | 0.69 |

TABLE 7D-continued

Schematic Parameters

| TL/ImgH | 4.98 | |SAGLci|/CTLc | 1.43 |
|---|---|---|---|
| Ym_max/ImgH | 1.00 | Vmin | 18.0 |
| Ym_max [mm] | 3.30 | Vcmin | 18.0 |
| ML/TL | 0.27 | Vcmax/Vcmin | 3.11 |
| T23/TD | 0.13 | |Dist|_max | 58.64% |
| f/|fc1| | 0.86 | — | — |

8th Embodiment

Figure 15:
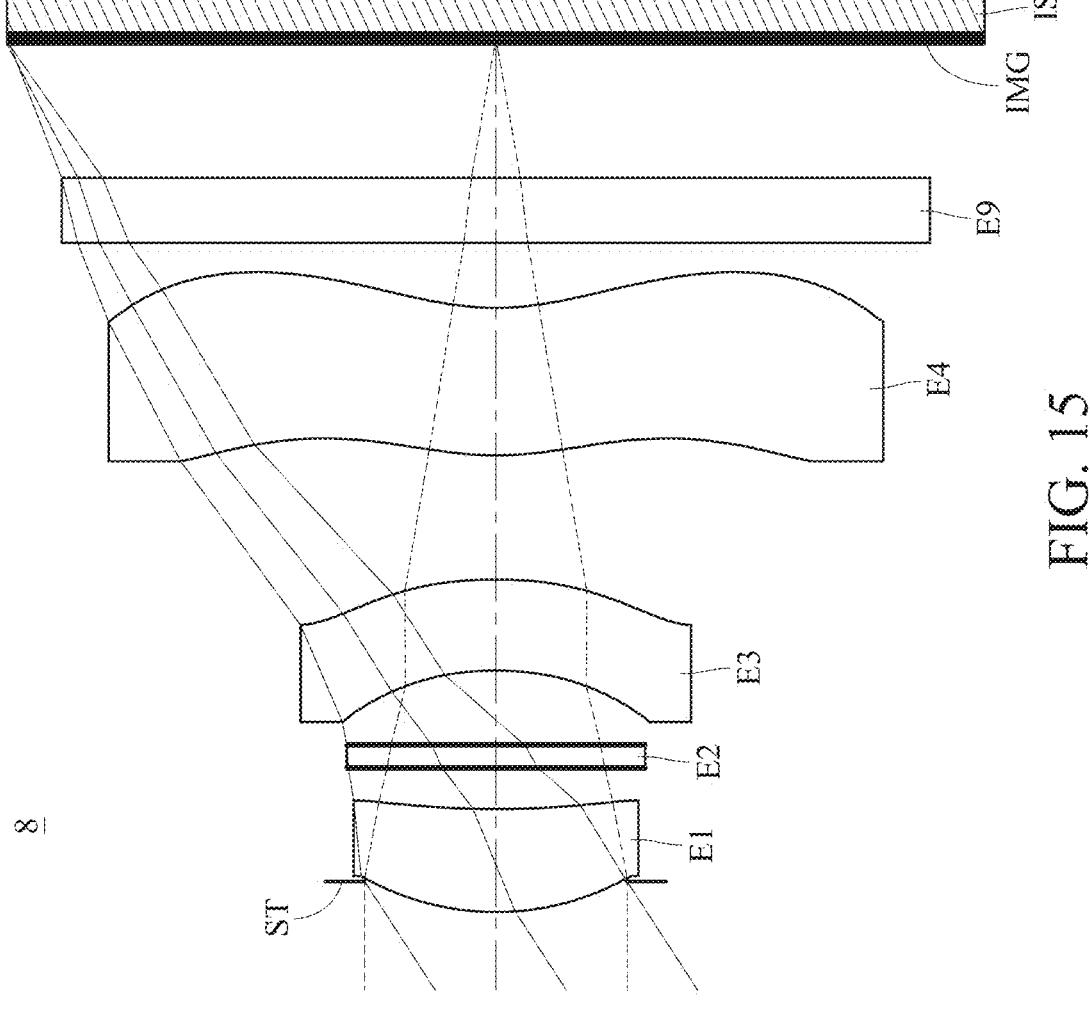
FIG. 15 is a schematic view of an image capturing unit according to the 8th embodiment of the present disclosure.
Figure 16:
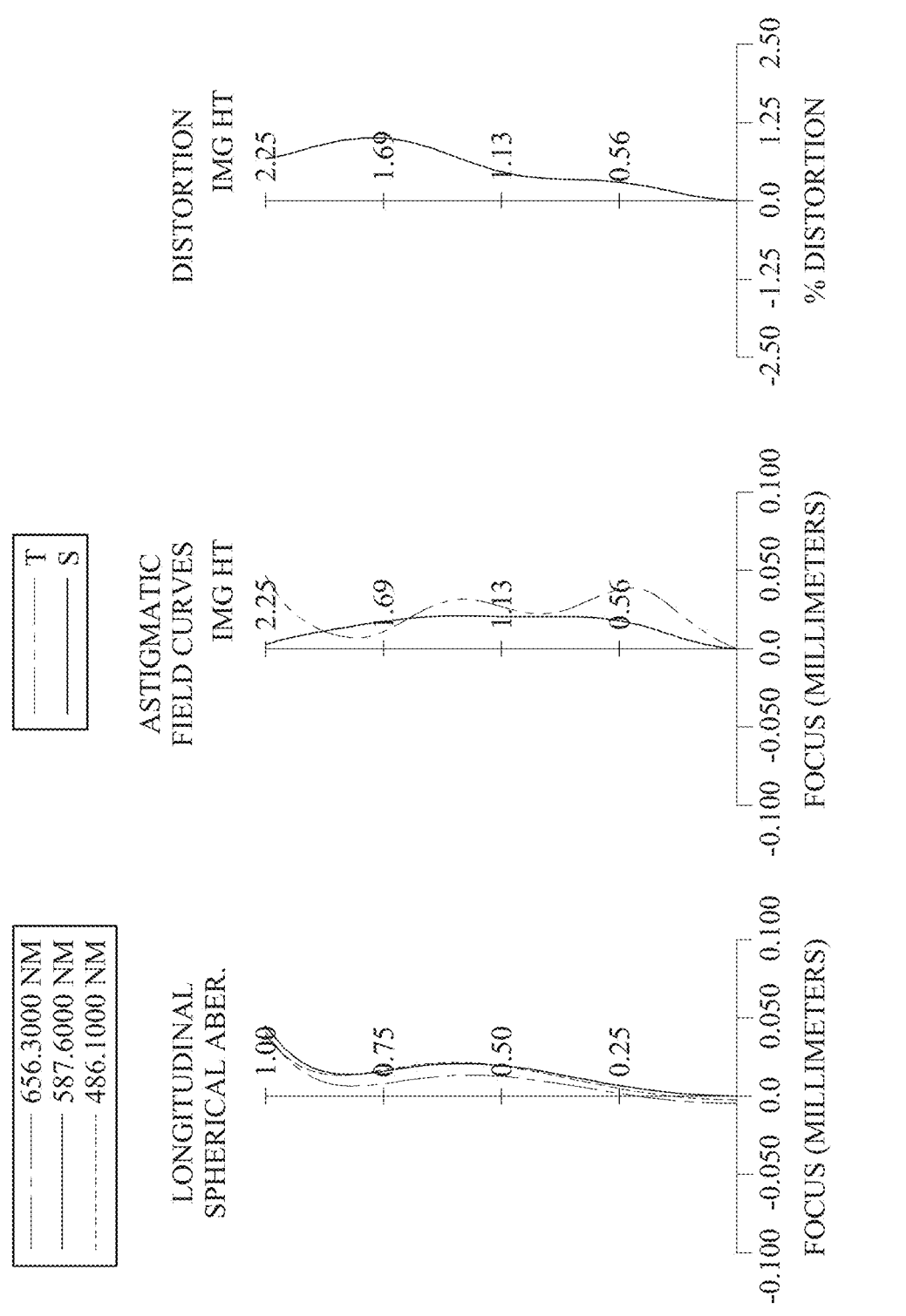
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a third lens element E3, a fourth lens element E4, a filter E9 and an image surface IMG. The photographing lens assembly includes four lens elements (E1, E2, E3 and E4) with no additional lens element disposed between each of the adjacent four lens elements.

The first lens element E1 is a simple refractive lens element with positive refractive power and has an object-side surface being convex in a paraxial region thereof and an image-side surface being concave in a paraxial region thereof. The first lens element E1 is made of plastic material and has the object-side surface and the image-side surface being both aspheric.

The second lens element E2 is a metalens with positive refractive power and has an object-side surface being planar in a paraxial region thereof and an image-side surface being planar in a paraxial region thereof. The second lens element E2 has a base made of glass material and has the object-side surface and the image-side surface each being a metasurface having a subwavelength microstructure. Specifically, the second lens element E2 includes a base and subwavelength microstructures formed on basal surfaces of the base facing towards the object side and the image side, respectively, and the metasurfaces each include one basal surface and one subwavelength microstructure.

The third lens element E3 is a simple refractive lens element with negative refractive power and has an object-side surface being concave in a paraxial region thereof and an image-side surface being convex in a paraxial region thereof. The third lens element E3 is made of plastic material and has the object-side surface and the image-side surface being both aspheric.

The fourth lens element E4 is a simple refractive lens element with positive refractive power and has an object-side surface being convex in a paraxial region thereof and an image-side surface being concave in a paraxial region thereof. The fourth lens element E4 is made of plastic material and has the object-side surface and the image-side surface being both aspheric.

The filter E9 is made of glass material and located between the fourth lens element E4 and the image surface IMG, and will not affect the focal length of the photographing lens assembly. The image sensor IS is disposed on or near the image surface IMG of the photographing lens assembly.

The detailed optical data of the 8th embodiment are shown in Table 8A and the aspheric surface data are shown in Table 8B and the metasurface phase equation data are shown in Table 8C below.

TABLE 8A

8th Embodiment
f = 3.43 mm, Fno = 2.84, HFOV = 33.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.140 | | | | |
| 2 | Lens 1 | 1.2419 (ASP) | 0.475 | Plastic | 1.544 | 55.9 | 3.08 |
| 3 | | 4.1680 (ASP) | 0.193 | | | | |
| 4 | Lens 2 | Plano | 0.100 | Glass | 1.517 | 64.2 | 57.67 |
| 5 | | Plano | 0.345 | | | | |
| 6 | Lens 3 | −1.4133 (ASP) | 0.420 | Plastic | 1.632 | 23.4 | −9.69 |
| 7 | | −2.0490 (ASP) | 0.572 | | | | |
| 8 | Lens 4 | 1.4568 (ASP) | 0.680 | Plastic | 1.530 | 55.8 | 726.58 |
| 9 | | 1.2258 (ASP) | 0.300 | | | | |
| 10 | Filter | Plano | 0.300 | Glass | 1.517 | 64.2 | — |
| 11 | | Plano | 0.615 | | | | |
| 12 | Image | Plano | — | | | | |

Note:
Reference wavelength is 587.6 nm (d-line).
Each of the object-side surface of the second lens element E2 (Surface 4) and the image-side surface of the second lens element E2 (Surface 5) is a metasurface having the subwavelength microstructure.
θm at the object-side surface of the second lens element E2 (Surface 4) is 48.3°.
θm at the image-side surface of the second lens element E2 (Surface 5) is 29.7°.

TABLE 8B

Aspheric Coefficients

| Surface # | 2 | 3 | 6 | 7 |
|---|---|---|---|---|
| k= | 2.545510E−01 | 1.155753E+01 | −3.756503E−01 | −1.876612E+00 |
| A4= | −5.89447685E−04 | −3.25019017E−02 | −4.90052352E−01 | −4.84862376E−01 |
| A6= | −1.49009578E−01 | −1.13156551E−01 | 1.62623555E+00 | 1.15408738E+00 |
| A8= | 5.24878443E−01 | 3.66368291E−01 | −4.80560093E+00 | −1.74159718E+00 |
| A10= | −7.84303891E−01 | −9.58467235E−01 | 9.34225261E+00 | 1.89108328E+00 |
| A12= | — | — | −8.09209865E+00 | −7.99430405E−01 |

| Surface # | 8 | 9 |
|---|---|---|
| k= | −1.007981E+01 | −6.496717E+00 |
| A4= | −2.63431077E−01 | −1.59714303E−01 |
| A6= | 1.83678987E−01 | 1.00903393E−01 |
| A8= | −8.15971234E−02 | −5.11419379E−02 |
| A10= | 2.04034434E−02 | 1.61046423E−02 |
| A12= | −1.56971265E−03 | −2.95526439E−03 |
| A14= | −1.32493292E−04 | 2.38492603E−04 |

TABLE 8C

| coefficients of metasurface phase equation | | |
|---|---|---|
| Surface | 4 | 5 |
| diffraction order | 1 | 1 |
| C1= | −1.646336E−02 | 7.809953E−03 |
| C2= | 3.257632E−02 | −4.594205E−02 |
| C3= | −4.163497E−01 | 4.348592E−01 |
| C4= | 1.093583E+00 | −7.263690E−01 |
| C5= | −7.867928E−01 | −4.623709E−01 |
| C6= | −2.670090E−01 | 1.502194E+00 |

In the 8th embodiment, the equation of the aspheric surface profiles of the aforementioned lens elements is the same as the equation of the 1st embodiment. Also, the definitions of these parameters shown in Table 8D are the same as those stated in the 1st embodiment with corresponding values for the 8th embodiment, so an explanation in this regard will not be provided again.

Moreover, these parameters can be calculated from Table 8A, Table 8B and Table 8C as the following values and satisfy the following conditions:

TABLE 8D

| Schematic Parameters | | | |
|---|---|---|---|
| f [mm] | 3.43 | fc1/fc2 | −0.32 |
| Fno | 2.84 | f/|R1| | 2.76 |
| HFOV [deg.] | 33.0 | CTc1/|RLci| | 0.39 |
| |ImgH/f1| | 0.73 | (Rc1o − Rc1i)/(Rc1o + Rc1i) | −0.54 |
| TL/ImgH | 1.78 | |SAGLci|/CTLc | 0.10 |
| Ym_max/ImgH | 0.31 | Vmin | 23.4 |
| Ym_max [mm] | 0.69 | Vcmin | 23.4 |
| ML/TL | 0.83 | Vcmax/Vcmin | 2.39 |
| T23/TD | 0.12 | |Dist|_max | 1.01% |
| f/|fc1| | 1.11 | — | — |

9th Embodiment

Figure 17:
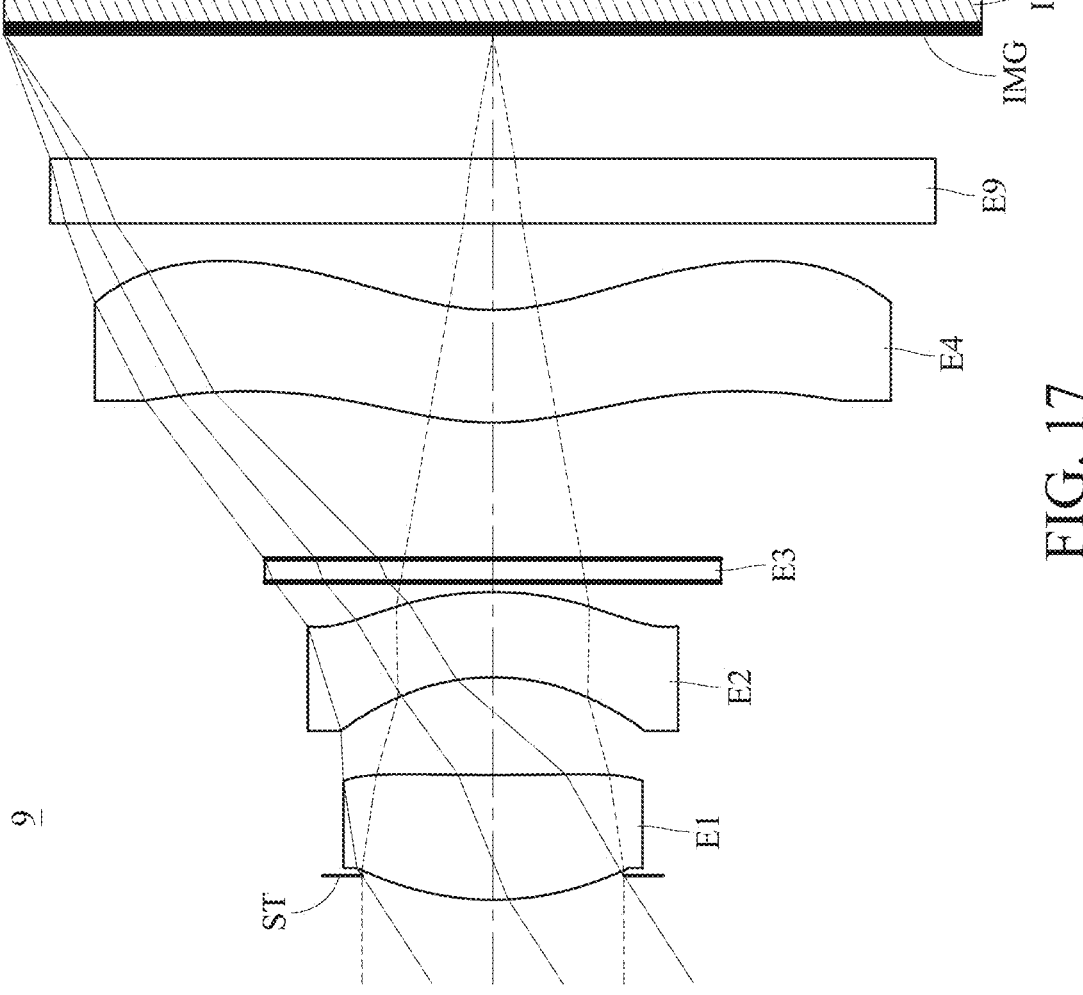
FIG. 17 is a schematic view of an image capturing unit according to the 9th embodiment of the present disclosure.
Figure 18:
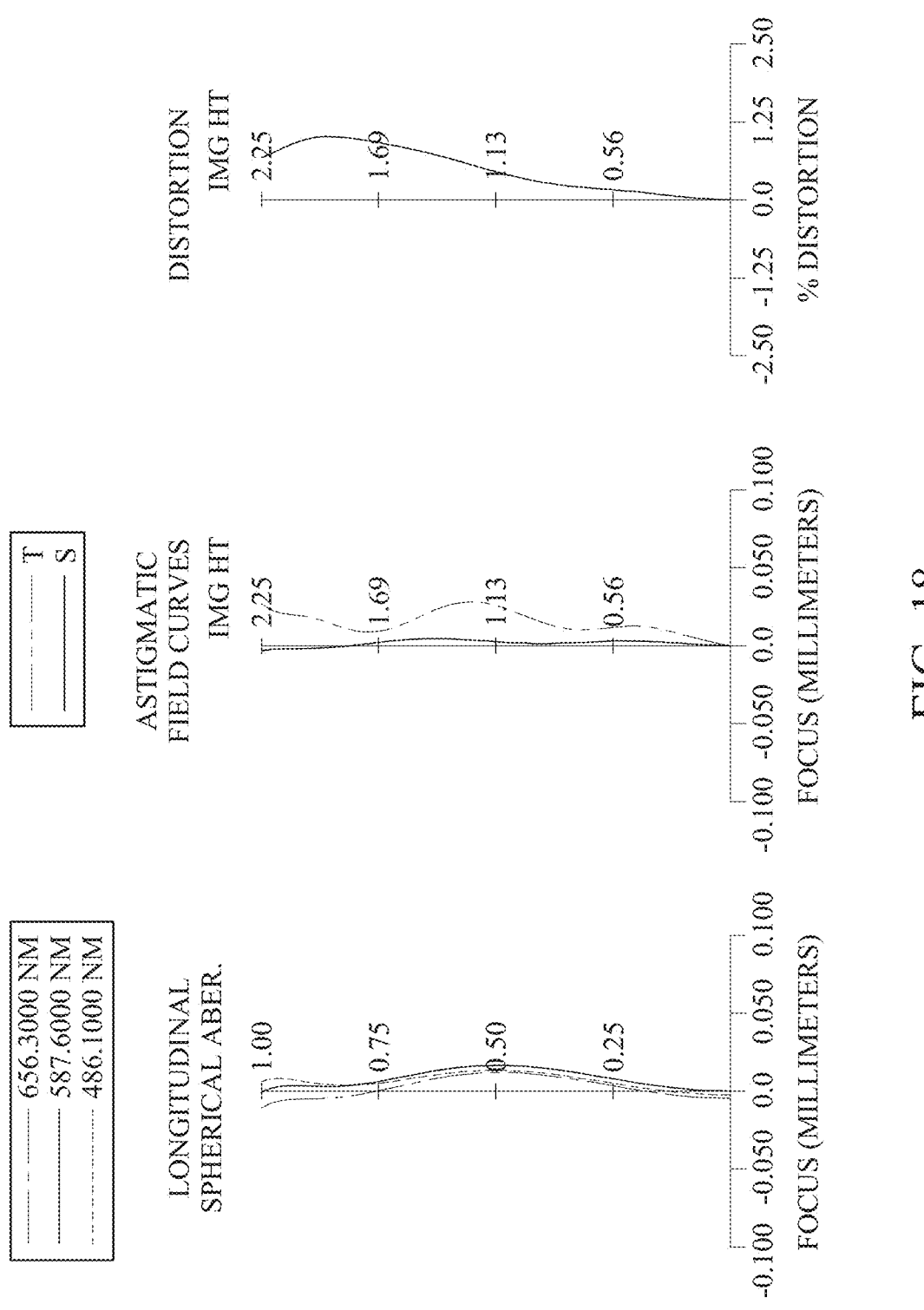
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a third lens element E3, a fourth lens element E4, a filter E9 and an image surface IMG. The photographing lens assembly includes four lens elements (E1, E2, E3 and E4) with no additional lens element disposed between each of the adjacent four lens elements.

The first lens element E1 is a simple refractive lens element with positive refractive power and has an object-side surface being convex in a paraxial region thereof and an image-side surface being concave in a paraxial region thereof. The first lens element E1 is made of plastic material and has the object-side surface and the image-side surface being both aspheric.

The second lens element E2 is a simple refractive lens element with negative refractive power and has an object-side surface being concave in a paraxial region thereof and an image-side surface being convex in a paraxial region thereof. The second lens element E2 is made of plastic material and has the object-side surface and the image-side surface being both aspheric.

The third lens element E3 is a metalens with positive refractive power and has an object-side surface being planar in a paraxial region thereof and an image-side surface being planar in a paraxial region thereof. The third lens element E3 has a base made of glass material and has the object-side surface and the image-side surface each being a metasurface having a subwavelength microstructure. Specifically, the third lens element E3 includes a base and subwavelength microstructures formed on basal surfaces of the base facing towards the object side and the image side, respectively, and the metasurfaces each include one basal surface and one subwavelength microstructure.

The fourth lens element E4 is a simple refractive lens element with negative refractive power and has an object-side surface being convex in a paraxial region thereof and an image-side surface being concave in a paraxial region thereof. The fourth lens element E4 is made of plastic material and has the object-side surface and the image-side surface being both aspheric.

The filter E9 is made of glass material and located between the fourth lens element E4 and the image surface IMG, and will not affect the focal length of the photographing lens assembly. The image sensor IS is disposed on or near the image surface IMG of the photographing lens assembly.

The detailed optical data of the 9th embodiment are shown in Table 9A and the aspheric surface data are shown in Table 9B and the metasurface phase equation data are shown in Table 9C below.

TABLE 9A

| 9th Embodiment f = 3.43 mm, Fno = 2.84, HFOV = 33.0 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | −0.111 | | | | |
| 2 | Lens 1 | 1.3577 (ASP) | 0.577 | Plastic | 1.544 | 55.9 | 2.80 |
| 3 | | 10.6988 (ASP) | 0.452 | | | | |
| 4 | Lens 2 | −1.1382 (ASP) | 0.394 | Plastic | 1.632 | 23.4 | −9.21 |
| 5 | | −1.6047 (ASP) | 0.050 | | | | |
| 6 | Lens 3 | Plano | 0.100 | Glass | 1.517 | 64.2 | 51.45 |
| 7 | | Plano | 0.634 | | | | |
| 8 | Lens 4 | 1.3840 (ASP) | 0.521 | Plastic | 1.530 | 55.8 | −33.10 |
| 9 | | 1.1155 (ASP) | 0.400 | | | | |

TABLE 9A-continued

| | | | | | | | Focal |
|---|---|---|---|---|---|---|---|

9th Embodiment
f = 3.43 mm, Fno = 2.84, HFOV = 33.0 deg.

| Surface # | | Curvature Radius | Thickness | Material | Index | Abbe # | Focal Length |
|---|---|---|---|---|---|---|---|
| 10 | Filter | Plano | 0.300 | Glass | 1.517 | 64.2 | — |
| 11 | | Plano | 0.573 | | | | |
| 12 | Image | Plano | — | | | | |

Note:
Reference wavelength is 587.6 nm (d-line).
Each of the object-side surface of the third lens element E3 (Surface 6) and the image-side surface of the third lens element E3 (Surface 7) is a metasurface having the subwavelength microstructure.
θm at the object-side surface of the third lens element E3 (Surface 6) is 43.6°.
θm at the image-side surface of the third lens element E3 (Surface 7) is 22.9°.

TABLE 9B

Aspheric Coefficients

| Surface # | 2 | 3 | 4 | 5 |
|---|---|---|---|---|
| k= | 3.073303E−01 | 9.711326E+01 | −4.430344E−01 | −7.519012E+00 |
| A4= | −3.19644713E−02 | −1.18394215E−01 | −3.91813868E−01 | −5.05927249E−01 |
| A6= | −7.30134219E−02 | −1.79001485E−01 | 1.51968616E+00 | 1.39228179E+00 |
| A8= | 1.10994113E−01 | 2.36623246E−01 | −3.80546213E+00 | −2.07296248E+00 |
| A10= | −3.90742920E−01 | −7.40454290E−01 | 7.31907478E+00 | 2.42830011E+00 |
| A12= | — | — | −6.49686343E+00 | −1.15695776E+00 |

| Surface # | 8 | 9 |
|---|---|---|
| k= | −8.397209E+00 | −5.346234E+00 |
| A4= | −1.16382084E−01 | −1.16418605E−01 |
| A6= | 2.23499104E−02 | 5.28898981E−02 |
| A8= | 2.27788942E−02 | −2.25126373E−02 |
| A10= | −1.71283506E−02 | 7.09723065E−03 |
| A12= | 4.48286862E−03 | −1.46586943E−03 |
| A14= | −4.12525446E−04 | 1.29542009E−04 |

TABLE 9C coefficients of metasurface phase equation

| Surface | 6 | 7 |
|---|---|---|
| diffraction order | 1 | 1 |
| C1= | −5.861723E−02 | 4.928032E−02 |
| C2= | −1.305568E−01 | 1.665909E−01 |
| C3= | 5.912173E−02 | −1.740695E−01 |
| C4= | 2.064679E−01 | 7.333578E−03 |
| C5= | −2.567164E−01 | 6.589847E−02 |
| C6= | 9.558091E−02 | −2.971058E−02 |

In the 9th embodiment, the equation of the aspheric surface profiles of the aforementioned lens elements is the same as the equation of the 1st embodiment. Also, the definitions of these parameters shown in Table 9D are the same as those stated in the 1st embodiment with corresponding values for the 9th embodiment, so an explanation in this regard will not be provided again.

Moreover, these parameters can be calculated from Table 9A, Table 9B and Table 9C as the following values and satisfy the following conditions:

TABLE 9D

Schematic Parameters

| | | | |
|---|---|---|---|
| f [mm] | 3.43 | fc1/fc2 | −0.30 |
| Fno | 2.84 | f/|R1| | 2.53 |

TABLE 9D-continued

Schematic Parameters

| | | | |
|---|---|---|---|
| HFOV [deg.] | 33.0 | CTc1/|RLci| | 0.52 |
| |ImgH/f1| | 0.80 | (Rc1o − Rc1i)/(Rc1o + Rc1i) | −0.77 |
| TL/ImgH | 1.78 | |SAGLci|/CTLc | 0.06 |
| Ym_max/ImgH | 0.47 | Vmin | 23.4 |
| Ym_max [mm] | 1.05 | Vcmin | 23.4 |
| ML/TL | 0.63 | Vcmax/Vcmin | 2.39 |
| T23/TD | 0.02 | |Dist|_max | 1.01% |
| f/|fc1| | 1.23 | — | — |

10th Embodiment

Figure 19:
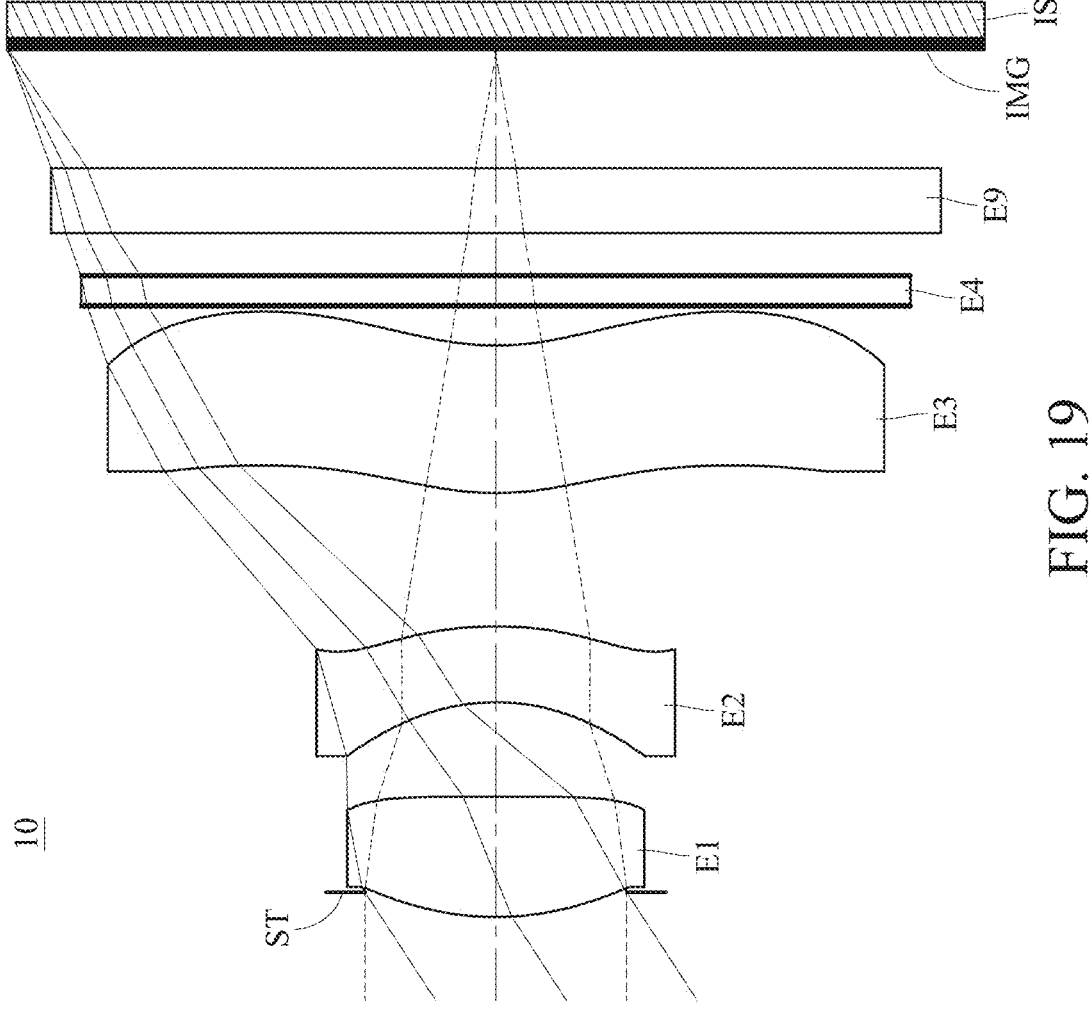
FIG. 19 is a schematic view of an image capturing unit according to the 10th embodiment of the present disclosure.
Figure 20:
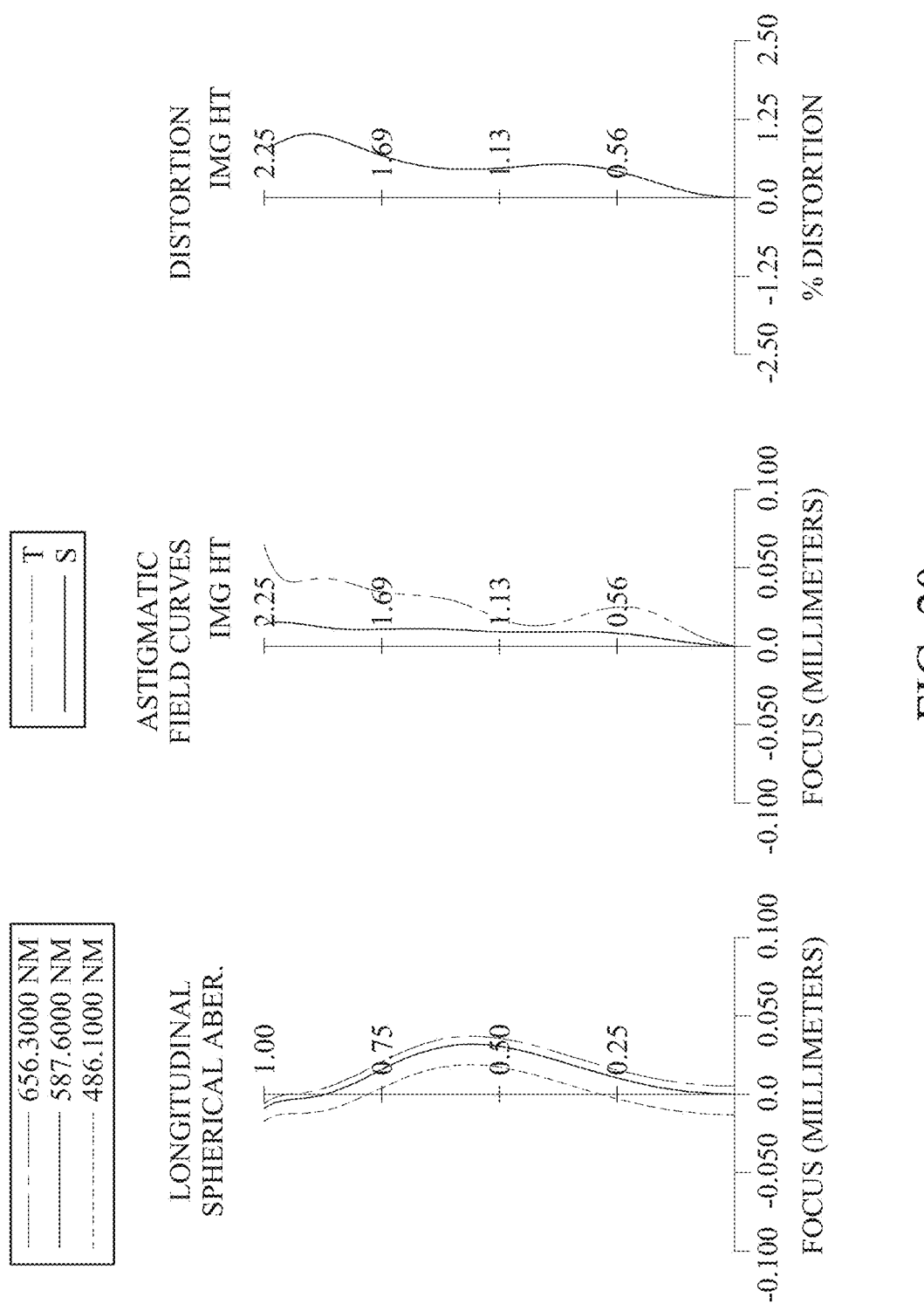
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a third lens element E3, a fourth lens element E4, a filter E9 and an image surface IMG. The photographing lens assembly includes four lens elements (E1, E2, E3 and E4) with no additional lens element disposed between each of the adjacent four lens elements.

The first lens element E1 is a simple refractive lens element with positive refractive power and has an object-side surface being convex in a paraxial region thereof and an image-side surface being concave in a paraxial region thereof. The first lens element E1 is made of plastic material and has the object-side surface and the image-side surface being both aspheric.

The second lens element E2 is a simple refractive lens element with negative refractive power and has an object-side surface being concave in a paraxial region thereof and an image-side surface being convex in a paraxial region thereof. The second lens element E2 is made of plastic material and has the object-side surface and the image-side surface being both aspheric.

The third lens element E3 is a simple refractive lens element with positive refractive power and has an object-side surface being convex in a paraxial region thereof and an image-side surface being concave in a paraxial region thereof. The third lens element E3 is made of plastic material and has the object-side surface and the image-side surface being both aspheric.

The fourth lens element E4 is a metalens with positive refractive power and has an object-side surface being planar in a paraxial region thereof and an image-side surface being planar in a paraxial region thereof. The fourth lens element E4 has a base made of glass material and has the object-side surface and the image-side surface each being a metasurface having a subwavelength microstructure. Specifically, the fourth lens element E4 includes a base and subwavelength microstructures formed on basal surfaces of the base facing towards the object side and the image side, respectively, and the metasurfaces each include one basal surface and one subwavelength microstructure.

The filter E9 is made of glass material and located between the fourth lens element E4 and the image surface IMG, and will not affect the focal length of the photographing lens assembly. The image sensor IS is disposed on or near the image surface IMG of the photographing lens assembly.

The detailed optical data of the 10th embodiment are shown in Table 10A and the aspheric surface data are shown in Table 10B and the metasurface phase equation data are shown in Table 10C below.

TABLE 10A

| | | | | | | | Focal |
|---|---|---|---|---|---|---|---|
| Surface # | | Curvature Radius | Thickness | Material | Index | Abbe # | Length |
| 0 | Object | Plano | Infinity | | | | |
| 1 | Ape. Stop | Plano | −0.115 | | | | |
| 2 | Lens 1 | 1.3270 (ASP) | 0.554 | Plastic | 1.544 | 55.9 | 2.51 |
| 3 | | 38.8079 (ASP) | 0.436 | | | | |
| 4 | Lens 2 | −1.0367 (ASP) | 0.350 | Plastic | 1.632 | 23.4 | −4.64 |
| 5 | | −1.8124 (ASP) | 0.615 | | | | |
| 6 | Lens 3 | 1.3475 (ASP) | 0.680 | Plastic | 1.530 | 55.8 | 23.72 |
| 7 | | 1.2453 (ASP) | 0.186 | | | | |
| 8 | Lens 4 | Plano | 0.132 | Glass | 1.517 | 64.2 | 85.19 |
| 9 | | Plano | 0.200 | | | | |
| 10 | Filter | Plano | 0.300 | Glass | 1.517 | 64.2 | — |
| 11 | | Plano | 0.545 | | | | |
| 12 | Image | Plano | — | | | | |

10th Embodiment
f = 3.42 mm, Fno = 2.84, HFOV = 33.1 deg.

Note:

Reference wavelength is 587.6 nm (d-line).

Each of the object-side surface of the fourth lens element E4 (Surface 8) and the image-side surface of the fourth lens element E4 (Surface 9) is a metasurface having the subwavelength microstructure.

$\theta m$ at the object-side surface of the fourth lens element E4 (Surface 8) is 33.0°.

$\theta m$ at the image-side surface of the fourth lens element E4 (Surface 9) is 12.0°.

TABLE 10B

Aspheric Coefficients

| Surface # | 2 | 3 | 4 | 5 |
|---|---|---|---|---|
| k= | 5.297870E−01 | 9.900000E+01 | −1.165103E+00 | 2.655041E+00 |
| A4= | −5.99059321E−02 | −1.62971372E−01 | −4.57030689E−01 | −2.47710585E−01 |
| A6= | −1.71397527E−01 | −1.98700429E−01 | 1.64693171E+00 | 1.23228280E+00 |
| A8= | 3.92099879E−02 | −1.82076109E−02 | −3.04672500E+00 | −1.02880745E+00 |
| A10= | −1.08915832E+00 | −4.62241734E−01 | 3.38996022E+00 | 8.56949034E−01 |
| A12= | — | — | −2.26003616E+00 | −3.21856785E−01 |

| Surface # | 6 | 7 |
|---|---|---|
| k= | −7.163393E+00 | −5.432464E+00 |
| A4= | −1.93974298E−01 | −1.93479589E−01 |
| A6= | 9.54459374E−02 | 1.22751928E−01 |
| A8= | −5.04522865E−03 | −6.20531058E−02 |
| A10= | −1.40195028E−02 | 2.14372181E−02 |
| A12= | 5.23357621E−03 | −4.39945844E−03 |
| A14= | −5.77082232E−04 | 3.76015549E−04 |

TABLE 10C

| | coefficients of metasurface phase equation | |
|---|---|---|
| Surface | 8 | 9 |
| diffraction order | 1 | 1 |
| C1= | −4.502188E−02 | 3.946209E−02 |
| C2= | −8.626229E−02 | 1.129316E−01 |
| C3= | 2.918915E−02 | −4.614539E−02 |
| C4= | −9.749992E−04 | 5.986270E−03 |
| C5= | −6.643432E−04 | −5.067882E−05 |
| C6= | 7.242178E−05 | −3.247986E−05 |

In the 10th embodiment, the equation of the aspheric surface profiles of the aforementioned lens elements is the same as the equation of the 1st embodiment. Also, the definitions of these parameters shown in Table 10D are the same as those stated in the 1st embodiment with corresponding values for the 10th embodiment, so an explanation in this regard will not be provided again.

Moreover, these parameters can be calculated from Table 10A, Table 10B and Table 10C as the following values and satisfy the following conditions:

TABLE 10D

| | Schematic Parameters | | |
|---|---|---|---|
| f [mm] | 3.42 | fc1/fc2 | −0.54 |
| Fno | 2.84 | f/|R1| | 2.58 |
| HFOV [deg.] | 33.1 | CTc1/|RLci| | 0.44 |
| |ImgH/f1| | 0.90 | (Rc1o − Rc1i)/(Rc1o + Rc1i) | −0.93 |
| TL/ImgH | 1.78 | |SAGLci|/CTLc | 0.13 |
| Ym_max/ImgH | 0.85 | Vmin | 23.4 |
| Ym_max [mm] | 1.91 | Vomin | 23.4 |
| ML/TL | 0.29 | Vcmax/Vcmin | 2.39 |
| T23/TD | 0.21 | |Dist|_max | 1.02% |
| f/|fc1| | 1.36 | — | — |

11th Embodiment

Figure 21:
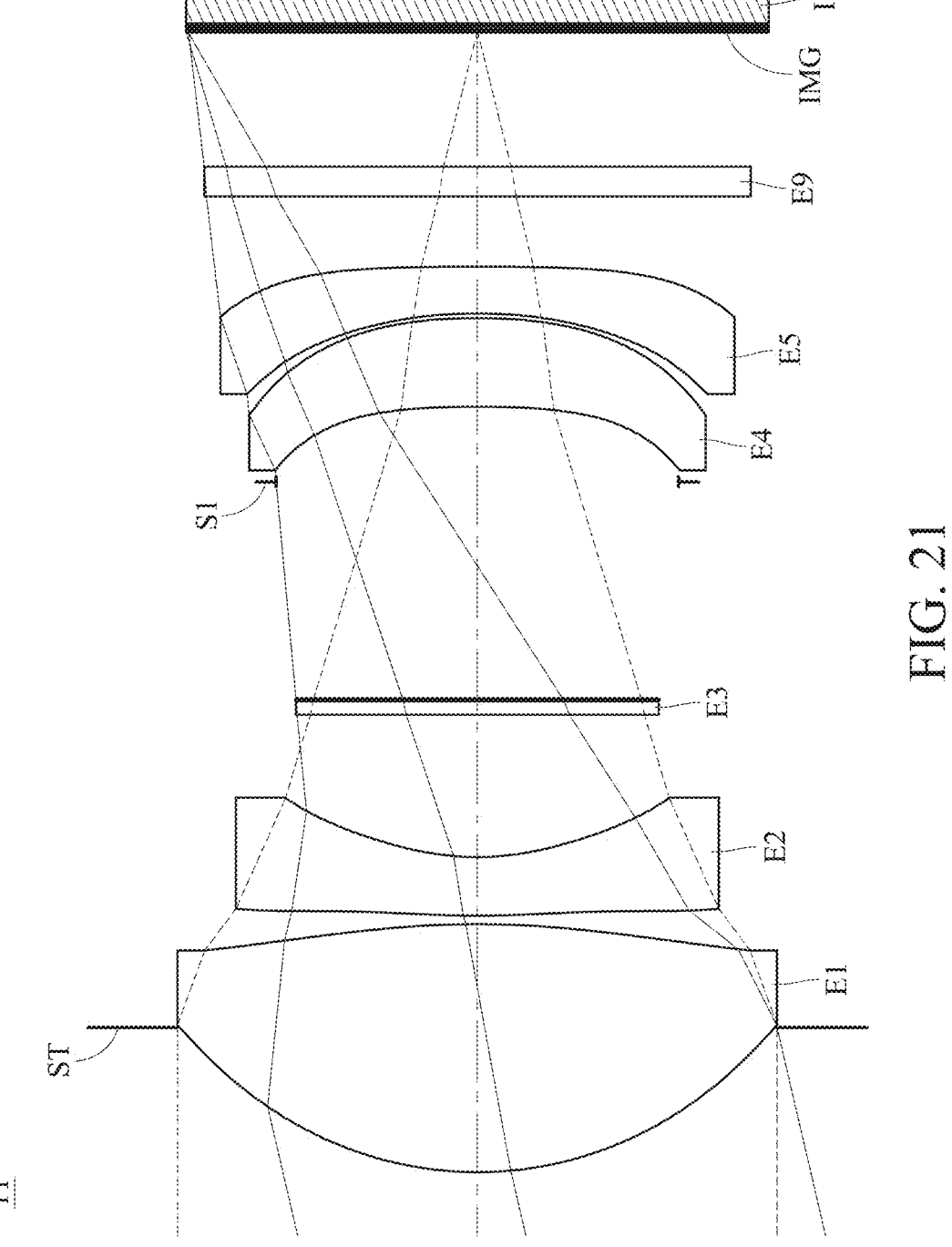
FIG. 21 is a schematic view of an image capturing unit according to the 11th embodiment of the present disclosure.
Figure 22:
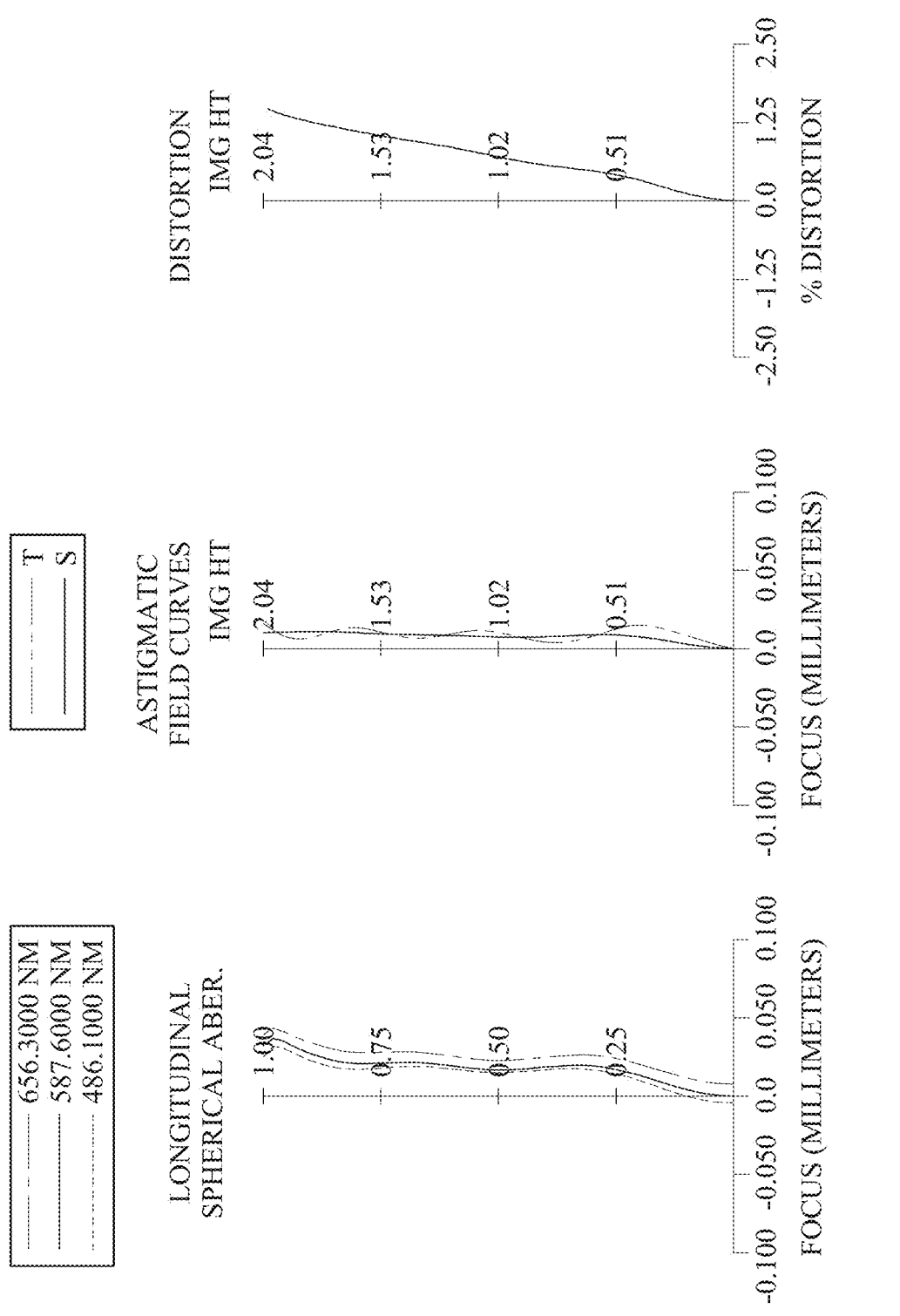
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit 11 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a third lens element E3, a stop S1, a fourth lens element E4, a fifth lens element E5, a filter E9 and an image surface IMG. The photographing lens assembly includes five lens elements (E1, E2, E3, E4 and E5) with no additional lens element disposed between each of the adjacent five lens elements.

The first lens element E1 is a simple refractive lens element with positive refractive power and has an object-side surface being convex in a paraxial region thereof and an image-side surface being convex in a paraxial region thereof. The first lens element E1 is made of plastic material and has the object-side surface and the image-side surface being both aspheric.

The second lens element E2 is a simple refractive lens element with negative refractive power and has an object-side surface being convex in a paraxial region thereof and an image-side surface being concave in a paraxial region thereof. The second lens element E2 is made of plastic material and has the object-side surface and the image-side surface being both aspheric.

The third lens element E3 is a metalens with positive refractive power and has an object-side surface being planar in a paraxial region thereof and an image-side surface being planar in a paraxial region thereof. The third lens element E3 has a base made of glass material and has the image-side surface being a metasurface having a subwavelength microstructure. Specifically, the third lens element E3 includes a base and a subwavelength microstructure formed on a basal surface of the base facing towards the image side, and the metasurface includes the basal surface and the subwavelength microstructure.

The fourth lens element E4 is a simple refractive lens element with positive refractive power and has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 is a simple refractive lens element with negative refractive power and has an object-side surface being concave in a paraxial region thereof and an image-side surface being convex in a paraxial region thereof. The fifth lens element E5 is made of plastic material and has the object-side surface and the image-side surface being both aspheric.

The filter E9 is made of glass material and located between the fifth lens element E5 and the image surface IMG, and will not affect the focal length of the photographing lens assembly. The image sensor IS is disposed on or near the image surface IMG of the photographing lens assembly.

The detailed optical data of the 11th embodiment are shown in Table 11A and the aspheric surface data are shown in Table 11B and the metasurface phase equation data are shown in Table 11C below.

TABLE 11A

| | 11th Embodiment f = 8.61 mm, Fno = 2.05, HFOV = 13.1 deg. | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −1.016 | | | | |
| 2 | Lens 1 | 2.5572 | (ASP) | 1.740 | Plastic | 1.545 | 56.1 | 3.58 |
| 3 | | −6.2670 | (ASP) | 0.060 | | | | |
| 4 | Lens 2 | 6.6955 | (ASP) | 0.411 | Plastic | 1.614 | 25.6 | −4.30 |
| 5 | | 1.8500 | (ASP) | 1.000 | | | | |

TABLE 11A-continued

| | | | | | | | Focal |
| Surface # | | Curvature Radius | Thickness | Material | Index | Abbe # | Length |
| --- | --- | --- | --- | --- | --- | --- | --- |
| | | 11th Embodiment | | | | | |
| | | f = 8.61 mm, Fno = 2.05, HFOV = 13.1 deg. | | | | | |
| 6 | Lens 3 | Plano | 0.100 | Glass | 1.517 | 64.2 | 7147.15 |
| 7 | | Plano | 1.534 | | | | |
| 8 | Stop | Plano | 0.527 | | | | |
| 9 | Lens 4 | −8.1587 (ASP) | 0.622 | Plastic | 1.686 | 18.4 | 17.21 |
| 10 | | −4.9749 (ASP) | 0.032 | | | | |
| 11 | Lens 5 | −4.2307 (ASP) | 0.330 | Plastic | 1.544 | 56.0 | −9.67 |
| 12 | | −22.1953 (ASP) | 0.492 | | | | |
| 13 | Filter | Plano | 0.210 | Glass | 1.517 | 64.2 | — |
| 14 | | Plano | 0.940 | | | | |
| 15 | Image | Plano | — | | | | |

Note:
Reference wavelength is 587.6 nm (d-line).
An effective radius of the stop S1 (Surface 8) is 1.410 mm.
The image-side surface of the third lens element E3 (Surface 7) is a metasurface having the subwavelength microstructure.
θm at the object-side surface of the third lens element E3 (Surface 7) is 20.8°.

TABLE 11B

Aspheric Coefficients

| Surface # | 2 | 3 | 4 | 5 |
| --- | --- | --- | --- | --- |
| k= | −4.827283E+00 | −1.444012E+01 | 5.480658E+00 | −7.062648E+00 |
| A4= | 3.52510240E−02 | 3.55385205E−03 | −7.24137494E−02 | 4.06007344E−02 |
| A6= | −6.78949694E−03 | −1.32612828E−05 | 3.21869933E−02 | −5.07536103E−02 |
| A8= | 1.64367185E−03 | 4.78684635E−04 | −7.19120725E−02 | 6.23952212E−02 |
| A10= | −2.40218423E−04 | −3.37133992E−04 | 2.54164144E−04 | −3.91043729E−02 |
| A12= | 1.66899294E−05 | 8.42440575E−05 | 2.59090775E−04 | 1.34119123E−02 |
| A14= | −2.96813217E−07 | −7.34014649E−06 | −4.08803611E−05 | −1.84289978E−03 |

| Surface # | 9 | 10 | 11 | 12 |
| --- | --- | --- | --- | --- |
| k= | −1.316745E+01 | 2.346047E+00 | 4.798610E+00 | 2.561551E+01 |
| A4= | −9.22991357E−02 | −2.71744213E−01 | −2.76512584E−01 | −8.64642741E−03 |
| A6= | 1.52611941E−01 | 7.35950641E−01 | 9.03636164E−01 | −3.22885328E−03 |
| A8= | −4.52698538E−01 | −1.29935180E+00 | −1.60635514E+00 | −3.82288349E−03 |
| A10= | 7.74339054E−01 | 1.38944957E+00 | 1.72965158E+00 | −6.68384215E−04 |
| A12= | −8.31780968E−01 | −9.42161701E−01 | −1.19222448E+00 | 3.71802041E−03 |
| A14= | 5.60231917E−01 | 4.07855773E−01 | 5.32559369E−01 | −2.60561066E−03 |
| A16= | −2.27570879E−01 | −1.08856976E−01 | −1.49706384E−01 | 8.58241028E−04 |
| A18= | 5.02161382E−02 | 1.61281967E−02 | 2.40494707E−02 | −1.42704370E−04 |
| A20= | −4.53662144E−03 | −9.90719176E−04 | −1.67392674E−03 | 9.75576397E−06 |

TABLE 11C coefficients of metasurface phase equation

| Surface | 7 |
| --- | --- |
| diffraction order | 1 |
| C1= | −6.995793E−05 |
| C2= | −9.617386E−04 |
| C3= | 1.560573E−04 |
| C4= | 1.321483E−03 |
| C5= | −1.829376E−03 |
| C6= | 1.153006E−03 |
| C7= | −5.355816E−04 |
| C8= | 2.007424E−04 |
| C9= | −5.130121E−05 |
| C10= | 6.439034E−06 |

In the 11th embodiment, the equation of the aspheric surface profiles of the aforementioned lens elements is the same as the equation of the 1st embodiment. Also, the definitions of these parameters shown in Table 11D are the same as those stated in the 1st embodiment with corresponding values for the 11th embodiment, so an explanation in this regard will not be provided again.

Moreover, these parameters can be calculated from Table 11A, Table 11B and Table 11C as the following values and satisfy the following conditions:

TABLE 11D

Schematic Parameters

| | | | |
| --- | --- | --- | --- |
| f [mm] | 8.61 | fc1/fc2 | −0.83 |
| Fno | 2.05 | f/|R1| | 3.37 |
| HFOV [deg.] | 13.1 | CTc1/|RLci| | 0.08 |
| |ImgH/f1| | 0.57 | (Rc1o − Rc1i)/(Rc1o + Rc1i) | −2.38 |
| TL/ImgH | 3.92 | |SAGLci|/CTLc | 1.07 |
| Ym_max/ImgH | 0.62 | Vmin | 18.4 |
| Ym_max [mm] | 1.27 | Vcmin | 18.4 |
| ML/TL | 0.59 | Vcmax/Vcmin | 3.05 |
| T23/TD | 0.16 | |Dist|_max | 1.50% |
| f/|fc1| | 2.41 | — | — |

12th Embodiment

Figure 23:
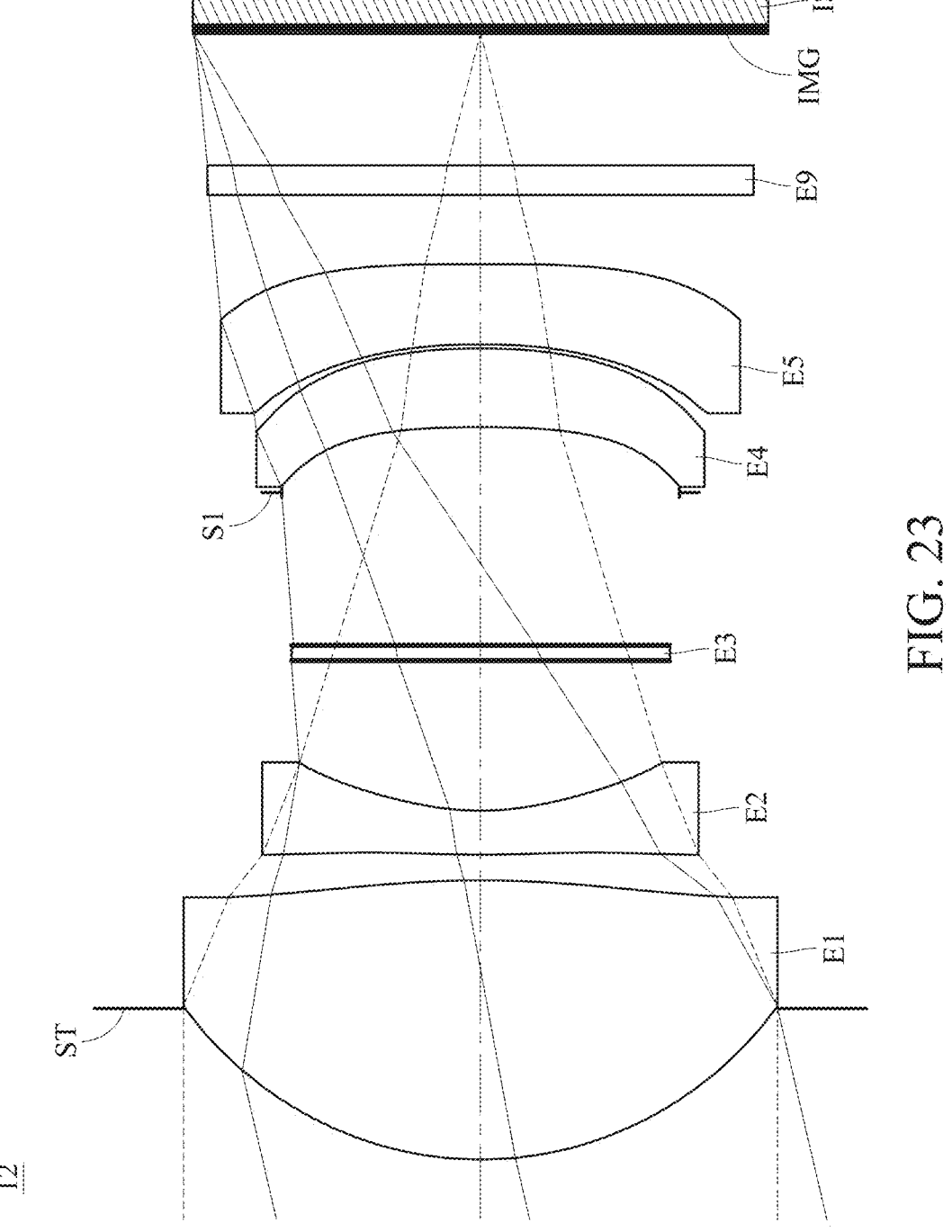
FIG. 23 is a schematic view of an image capturing unit according to the 12th embodiment of the present disclosure.
Figure 24:
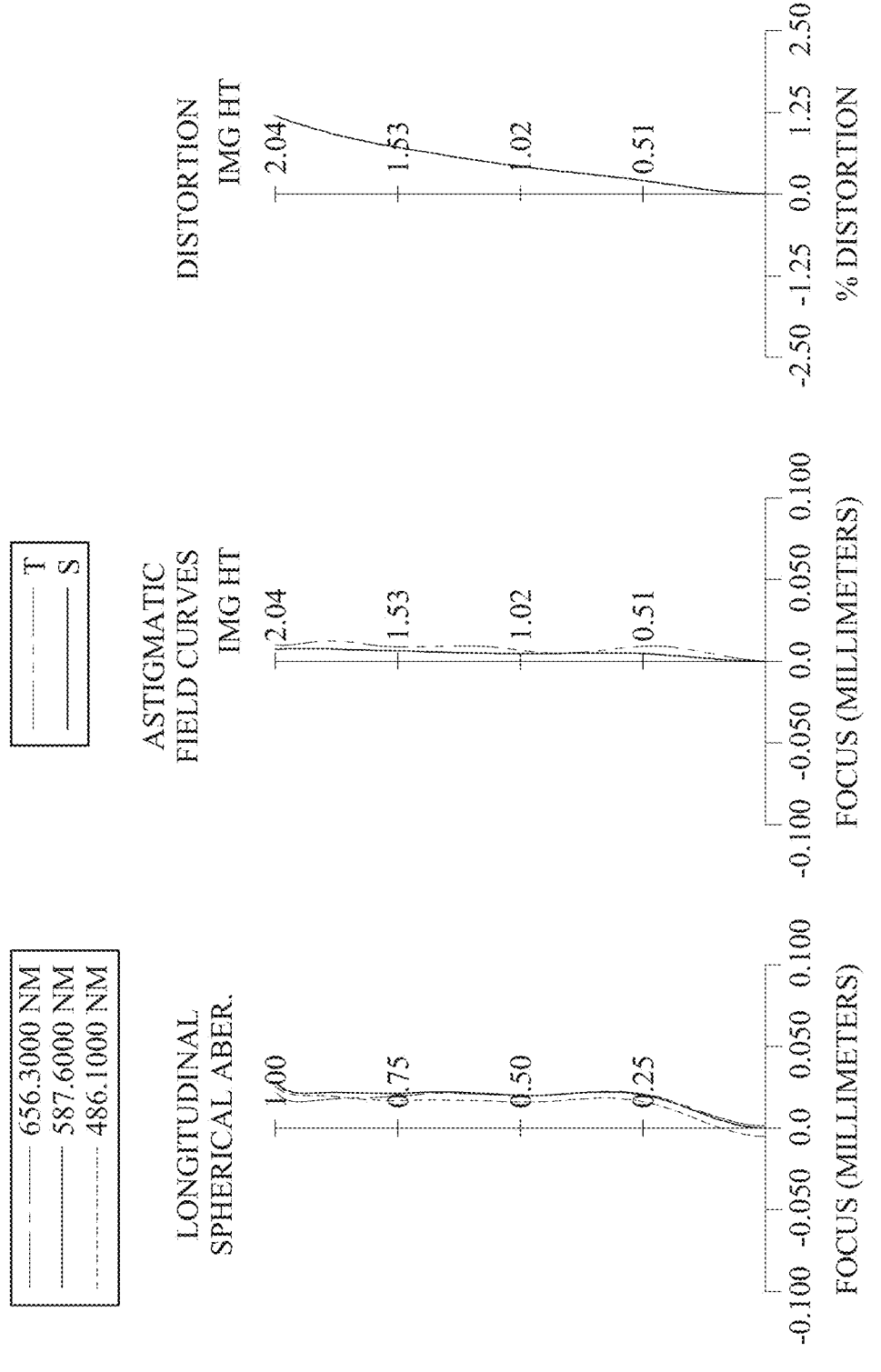
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit 12 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a third lens element E3, a stop S1, a fourth lens element E4, a fifth lens element E5, a filter E9 and an image surface IMG. The photographing lens assembly includes five lens elements (E1, E2, E3, E4 and E5) with no additional lens element disposed between each of the adjacent five lens elements.

The first lens element E1 is a simple refractive lens element with positive refractive power and has an object-side surface being convex in a paraxial region thereof and an image-side surface being convex in a paraxial region thereof. The first lens element E1 is made of plastic material and has the object-side surface and the image-side surface being both aspheric.

The second lens element E2 is a simple refractive lens element with negative refractive power and has an object-side surface being convex in a paraxial region thereof and an image-side surface being concave in a paraxial region thereof. The second lens element E2 is made of plastic material and has the object-side surface and the image-side surface being both aspheric.

The third lens element E3 is a metalens with negative refractive power and has an object-side surface being planar in a paraxial region thereof and an image-side surface being planar in a paraxial region thereof. The third lens element E3 has a base made of glass material and has the object-side surface and the image-side surface each being a metasurface having a subwavelength microstructure. Specifically, the third lens element E3 includes a base and subwavelength microstructures formed on basal surfaces of the base facing towards the object side and the image side, respectively, and the metasurfaces each include one basal surface and one subwavelength microstructure.

The fourth lens element E4 is a simple refractive lens element with positive refractive power and has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 is a simple refractive lens element with negative refractive power and has an object-side surface being concave in a paraxial region thereof and an image-side surface being convex in a paraxial region thereof. The fifth lens element E5 is made of plastic material and has the object-side surface and the image-side surface being both aspheric.

The filter E9 is made of glass material and located between the fifth lens element E5 and the image surface IMG, and will not affect the focal length of the photographing lens assembly. The image sensor IS is disposed on or near the image surface IMG of the photographing lens assembly.

The detailed optical data of the 12th embodiment are shown in Table 12A and the aspheric surface data are shown in Table 12B and the metasurface phase equation data are shown in Table 12C below.

TABLE 12A

| | | | | | | | |
|---|---|---|---|---|---|---|---|
| 12th Embodiment f = 8.64 mm, Fno = 2.05, HFOV = 13.1 deg. | | | | | | | |
| Surface # | | Curvature Radius | Thickness | Material | Index | Abbe # | Focal Length |
| 0 | Object | Plano | Infinity | | | | |
| 1 | Ape. Stop | Plano | −1.074 | | | | |
| 2 | Lens 1 | 2.5365 (ASP) | 1.982 | Plastic | 1.545 | 56.1 | 3.73 |
| 3 | | −7.4508 (ASP) | 0.182 | | | | |
| 4 | Lens 2 | 7.7304 (ASP) | 0.313 | Plastic | 1.614 | 25.6 | −4.36 |
| 5 | | 1.9574 (ASP) | 1.070 | | | | |
| 6 | Lens 3 | Plano | 0.100 | Glass | 1.517 | 64.2 | −265.18 |
| 7 | | Plano | 1.088 | | | | |
| 8 | Stop | Plano | 0.466 | | | | |
| 9 | Lens 4 | −7.7179 (ASP) | 0.558 | Plastic | 1.686 | 18.4 | 20.05 |
| 10 | | −5.0896 (ASP) | 0.029 | | | | |
| 11 | Lens 5 | −5.4036 (ASP) | 0.569 | Plastic | 1.544 | 56.0 | −11.06 |
| 12 | | −55.0839 (ASP) | 0.492 | | | | |
| 13 | Filter | Plano | 0.210 | Glass | 1.517 | 64.2 | — |
| 14 | | Plano | 0.934 | | | | |
| 15 | Image | Plano | — | | | | |

Note:

Reference wavelength is 587.6 nm (d-line).

An effective radius of the stop S1 (Surface 8) is 1.410 mm.

Each of the object-side surface of the third lens element E3 (Surface 6) and the image-side surface of the third lens element E3 (Surface 7) is a metasurface having the subwavelength microstructure.

θm at the object-side surface of the third lens element E3 (Surface 6) is 33.1°.

θm at the image-side surface of the third lens element E3 (Surface 7) is 24.8°.

TABLE 12B

| Aspheric Coefficients | | | | |
|---|---|---|---|---|
| Surface # | 2 | 3 | 4 | 5 |
| k= | −4.571607E+00 | −1.845429E+01 | 5.480658E+00 | −6.474913E+00 |
| A4= | 3.39653681E−02 | 7.25195018E−04 | −1.05521135E−01 | −1.88150000E−02 |
| A6= | −6.19221093E−03 | 6.90627133E−03 | 8.21520701E−02 | 3.07096865E−02 |
| A8= | 1.55558148E−03 | −3.77745226E−03 | −4.12732867E−02 | −3.43550553E−03 |
| A10= | −2.14528631E−04 | 1.00133120E−03 | 1.27198123E−02 | −6.74062362E−03 |
| A12= | 1.38491676E−05 | −1.27580327E−04 | −2.13320931E−03 | 4.10517055E−03 |
| A14= | 3.23982577E−07 | 5.97308578E−06 | 1.46312273E−04 | −6.19568271E−04 |
| Surface # | 9 | 10 | 11 | 12 |
| k= | −8.281599E+00 | −1.297406E+01 | 8.838421E+00 | 9.899919E+01 |
| A4= | −6.27554935E−02 | −1.98398982E−01 | −2.20480217E−01 | −4.53396228E−02 |
| A6= | 7.74768024E−02 | 5.64597814E−01 | 7.07532291E−01 | 2.47517412E−02 |
| A8= | −2.53326317E−01 | −1.15872239E+00 | −1.39976068E+00 | −2.57663565E−02 |
| A10= | 4.28691120E−01 | 1.43859549E+00 | 1.70799165E+00 | 2.00248680E−02 |
| A12= | −4.54500888E−01 | −1.12970087E+00 | −1.32176270E+00 | −1.04153732E−02 |
| A14= | 2.99236880E−01 | 5.62759798E−01 | 6.50325966E−01 | 3.37121328E−03 |
| A16= | −1.17292023E−01 | −1.71678548E−01 | −1.96621636E−01 | −6.35085125E−04 |
| A18= | 2.44581218E−02 | 2.90549459E−02 | 3.31587013E−02 | 5.97353210E−05 |
| A20= | −2.00006336E−03 | −2.06972546E−03 | −2.37328502E−03 | −1.80360874E−06 |

TABLE 12C

| coefficients of metasurface phase equation | | |
|---|---|---|
| Surface | 6 | 7 |
| diffraction order | 1 | 1 |
| C1= | −1.005186E−01 | 1.037796E−01 |
| C2= | −9.077455E−03 | 1.032536E−02 |
| C3= | 1.951568E−03 | −2.316531E−03 |
| C4= | −9.742320E−04 | 1.938805E−03 |
| C5= | 3.410428E−04 | −2.267386E−03 |
| C6= | — | 1.374276E−03 |
| C7= | — | −3.634441E−04 |
| C8= | — | 2.777344E−05 |
| C9= | — | −5.130121E−05 |
| C10= | — | 2.174130E−05 |

In the 12th embodiment, the equation of the aspheric surface profiles of the aforementioned lens elements is the same as the equation of the 1st embodiment. Also, the definitions of these parameters shown in Table 12D are the same as those stated in the 1st embodiment with corresponding values for the 12th embodiment, so an explanation in this regard will not be provided again.

Moreover, these parameters can be calculated from Table 12A, Table 12B and Table 12C as the following values and satisfy the following conditions:

TABLE 12D

| Schematic Parameters | | | |
|---|---|---|---|
| f [mm] | 8.64 | fc1/fc2 | −0.86 |
| Fno | 2.05 | f/|R1| | 3.41 |
| HFOV [deg.] | 13.1 | CTc1/|RLci| | 0.04 |
| |ImgH/f1| | 0.55 | (Rc1o − Rc1i)/(Rc1o + Rc1i) | −2.03 |
| TL/ImgH | 3.92 | |SAGLci|/CTLc | 0.69 |
| Ym_max/ImgH | 0.66 | Vmin | 18.4 |
| Ym_max [mm] | 1.34 | Vcmin | 18.4 |
| ML/TL | 0.56 | Vcmax/Vcmin | 3.05 |
| T23/TD | 0.17 | |Dist|_max | 1.20% |
| f/|fc1| | 2.31 | — | — |

13th Embodiment

Figure 25:
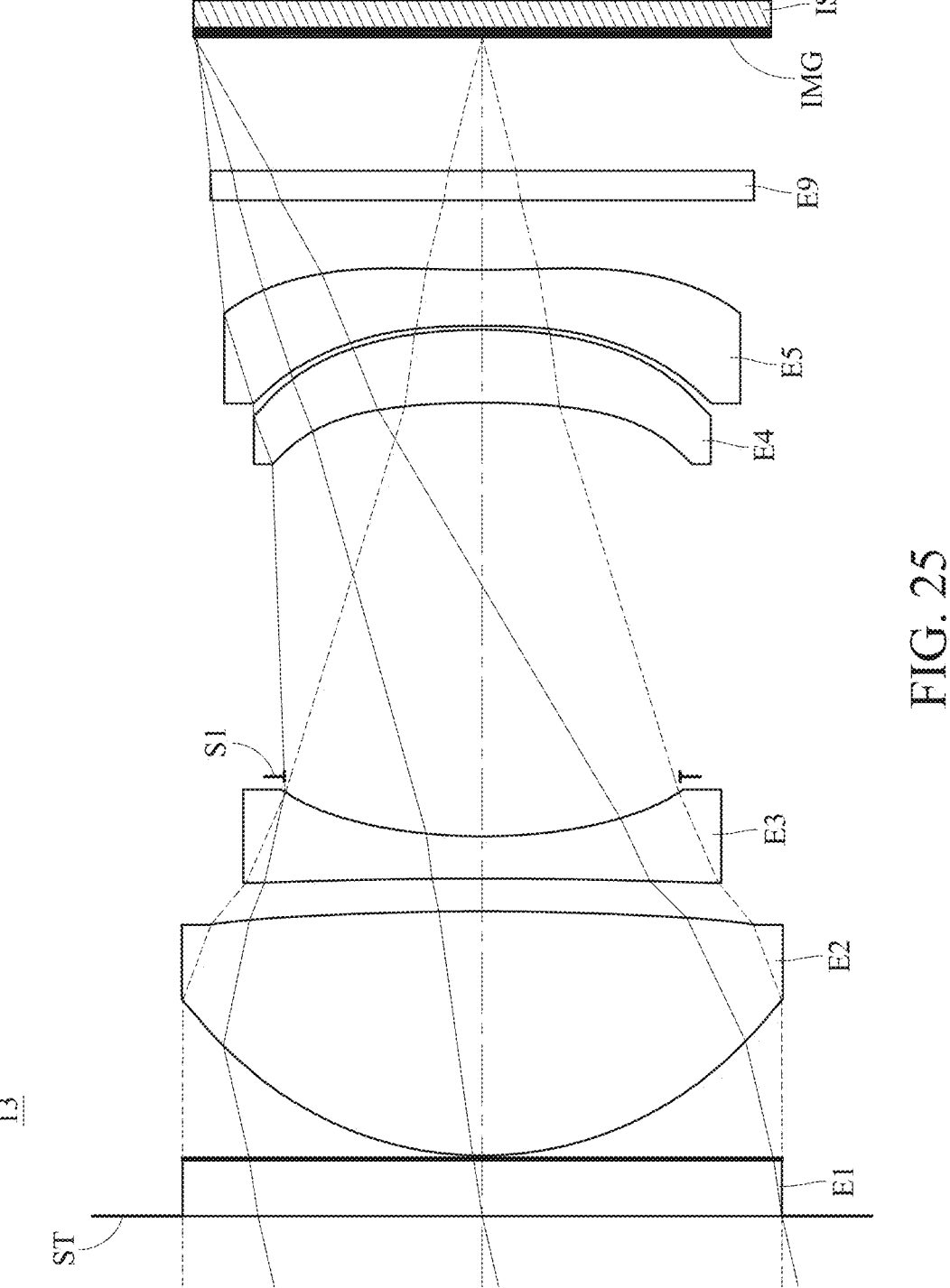
FIG. 25 is a schematic view of an image capturing unit according to the 13th embodiment of the present disclosure.

FIG. 25 is a schematic view of an image capturing unit according to the 13th embodiment of the present disclosure.

Figure 26:
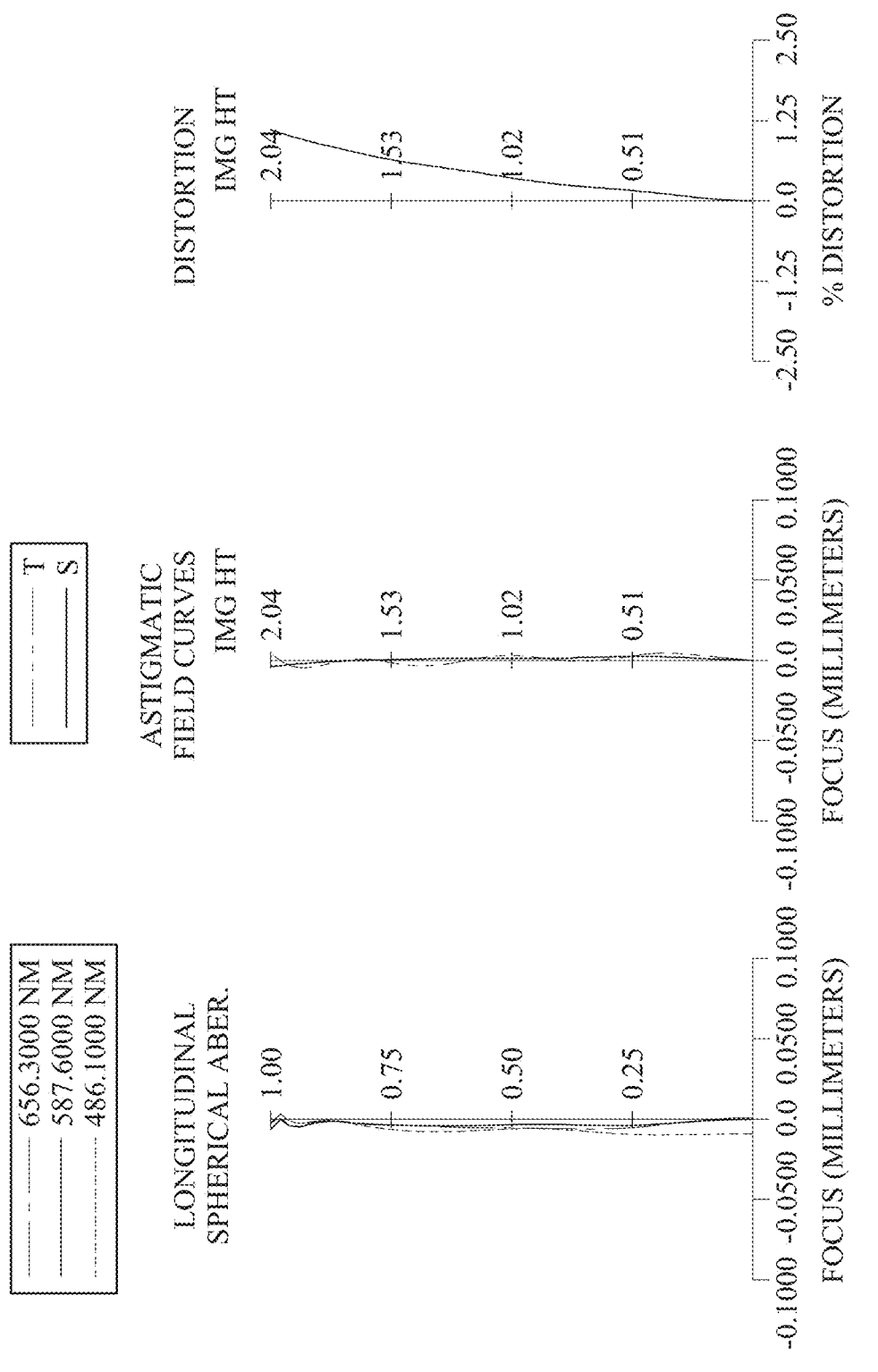
FIG. 26 shows spherical aberration curves, astigmatic field curves and a distortion curve of the image capturing unit according to the 13th embodiment.

FIG. 26 shows, in order from left to right, spherical aberration curves, astigmatic field curves and a distortion curve of the image capturing unit according to the 13th embodiment. In FIG. 25, the image capturing unit 13 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a third lens element E3, a stop S1, a fourth lens element E4, a fifth lens element E5, a filter E9 and an image surface IMG. The photographing lens assembly includes five lens elements (E1, E2, E3, E4 and E5) with no additional lens element disposed between each of the adjacent five lens elements.

The first lens element E1 is a metalens with positive refractive power and has an object-side surface being planar in a paraxial region thereof and an image-side surface being planar in a paraxial region thereof. The first lens element E1 has a base made of glass material and has the image-side surface being a metasurface having a subwavelength microstructure. Specifically, the first lens element E1 includes a base and a subwavelength microstructure formed on a basal surface of the base facing towards the image side, and the metasurface includes the basal surface and the subwavelength microstructure.

The second lens element E2 is a simple refractive lens element with positive refractive power and has an object-side surface being convex in a paraxial region thereof and an image-side surface being convex in a paraxial region thereof. The second lens element E2 is made of plastic material and has the object-side surface and the image-side surface being both aspheric.

The third lens element E3 is a simple refractive lens element with negative refractive power and has an object-side surface being concave in a paraxial region thereof and an image-side surface being concave in a paraxial region thereof. The third lens element E3 is made of plastic material and has the object-side surface and the image-side surface being both aspheric.

The fourth lens element E4 is a simple refractive lens element with positive refractive power and has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 is a simple refractive lens element with negative refractive power and has an object-side surface being concave in a paraxial region thereof and an image-side surface being concave in a paraxial region thereof. The fifth lens element E5 is made of plastic material and has the object-side surface and the image-side surface being both aspheric.

The filter E9 is made of glass material and located between the fifth lens element E5 and the image surface IMG, and will not affect the focal length of the photographing lens assembly. The image sensor IS is disposed on or near the image surface IMG of the photographing lens assembly.

The detailed optical data of the 13th embodiment are shown in Table 13A and the aspheric surface data are shown in Table 13B and the metasurface phase equation data are shown in Table 13C below.

TABLE 13A

13th Embodiment
f = 8.69 mm, Fno = 2.05, HFOV = 13.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.000 | | | | |
| 2 | Lens 1 | Plano | | 0.400 | Glass | 1.517 | 64.2 | 449.72 |
| 3 | | Plano | | 0.029 | | | | |
| 4 | Lens 2 | 2.5014 | (ASP) | 1.730 | Plastic | 1.544 | 56.0 | 4.21 |
| 5 | | −20.2731 | (ASP) | 0.232 | | | | |
| 6 | Lens 3 | −37.9555 | (ASP) | 0.300 | Plastic | 1.614 | 25.6 | −6.08 |
| 7 | | 4.1496 | (ASP) | 0.424 | | | | |
| 8 | Stop | Plano | | 2.648 | | | | |
| 9 | Lens 4 | −6.4944 | (ASP) | 0.517 | Plastic | 1.686 | 18.4 | 12.19 |
| 10 | | −3.7744 | (ASP) | 0.028 | | | | |
| 11 | Lens 5 | −6.6461 | (ASP) | 0.396 | Plastic | 1.544 | 56.0 | −6.63 |
| 12 | | 8.0408 | (ASP) | 0.492 | | | | |
| 13 | Filter | Plano | | 0.210 | Glass | 1.517 | 64.2 | — |
| 14 | | Plano | | 0.948 | | | | |
| 15 | Image | Plano | | — | | | | |

Note:
Reference wavelength is 587.6 nm (d-line).
An effective radius of the stop S1 (Surface 8) is 1.400 mm.
The image-side surface of the first lens element E1 (Surface 3) is a metasurface having the subwavelength microstructure.
θm at the image-side surface of the first lens element E1 (Surface 3) is 8.6°.

TABLE 13B

Aspheric Coefficients

| Surface # | 4 | 5 | 6 | 7 |
|---|---|---|---|---|
| k= | −4.027571E+00 | 1.954126E+01 | 9.900000E+01 | −1.885168E+01 |
| A4= | 3.11099626E−02 | 6.46820031E−03 | 6.81839873E−03 | 4.47586448E−02 |
| A6= | −5.08229713E−03 | −7.98832297E−03 | −1.53849294E−02 | −1.97324799E−02 |
| A8= | 1.65327505E−03 | 6.22077258E−03 | 1.50372439E−02 | 1.40043979E−02 |
| A10= | −4.03623310E−04 | −2.48592353E−03 | −6.93726913E−03 | −3.43750899E−03 |
| A12= | 7.20673943E−05 | 4.60600796E−04 | 1.44786644E−03 | −3.04192104E−04 |
| A14= | −6.42319837E−06 | −3.22656664E−05 | −8.43682257E−05 | 2.42374233E−04 |
| A16= | — | — | −5.41079306E−06 | 1.95297400E−05 |

| Surface # | 9 | 10 | 11 | 12 |
|---|---|---|---|---|
| k= | 1.304068E+01 | 2.687555E+00 | 1.285798E+01 | −1.108526E+01 |
| A4= | −2.71036875E−02 | −2.39717963E−02 | −1.08658406E−01 | −1.04136243E−01 |
| A6= | 5.23193163E−02 | 7.04502587E−02 | 1.13871103E−01 | 5.01651294E−02 |
| A8= | −2.24964091E−01 | −2.89053369E−01 | −2.72806587E−01 | −9.22980174E−03 |
| A10= | 4.20187091E−01 | 5.38038576E−01 | 5.10681079E−01 | −1.40777932E−02 |
| A12= | −4.57837982E−01 | −5.48479994E−01 | −5.43253419E−01 | 1.46936698E−02 |
| A14= | 3.00373662E−01 | 3.24393856E−01 | 3.33092667E−01 | −6.96901699E−03 |
| A16= | −1.16481907E−01 | −1.10892136E−01 | −1.17308313E−01 | 1.86248719E−03 |
| A18= | 2.44374631E−02 | 2.02459578E−02 | 2.20012054E−02 | −2.71934908E−04 |
| A20= | −2.11525385E−03 | −1.51811696E−03 | −1.69611410E−03 | 1.69851615E−05 |

TABLE 13C

| coefficients of metasurface phase equation | |
| --- | --- |
| Surface | 3 |
| diffraction order | 1 |
| C1= | -1.111815E-03 |
| C2= | -3.021892E-04 |
| C3= | 2.164864E-04 |
| C4= | -5.527347E-05 |
| C5= | 5.047603E-06 |

In the 13th embodiment, the equation of the aspheric surface profiles of the aforementioned lens elements is the same as the equation of the 1st embodiment. Also, the definitions of these parameters shown in Table 13D are the same as those stated in the 1st embodiment with corresponding values for the 13th embodiment, so an explanation in this regard will not be provided again.

Moreover, these parameters can be calculated from Table 13A, Table 13B and Table 13C as the following values and satisfy the following conditions:

TABLE 13D

| Schematic Parameters | | | |
| --- | --- | --- | --- |
| f [mm] | 8.69 | fc1/fc2 | -0.69 |
| Fno | 2.05 | f/|R1| | 0.00 |
| HFOV [deg.] | 13.1 | CTc1/|RLci| | 0.22 |
| |ImgH/f1| | 0.005 | (Rc1o − Rc1i)/(Rc1o + Rc1i) | -1.28 |
| TL/ImgH | 4.10 | |SAGLci|/CTLc | 0.78 |
| Ym_max/ImgH | 1.04 | Vmin | 18.4 |
| Ym_max [mm] | 2.12 | Vcmin | 18.4 |
| ML/TL | 0.95 | Vcmax/Vcmin | 3.04 |
| T23/TD | 0.03 | |Dist|_max | 1.11% |
| f/|fc1| | 2.07 | — | — |

14th Embodiment

Figure 27:
FIG. 27 is a schematic view of an image capturing unit according to the 14th embodiment of the present disclosure.
Figure 28:
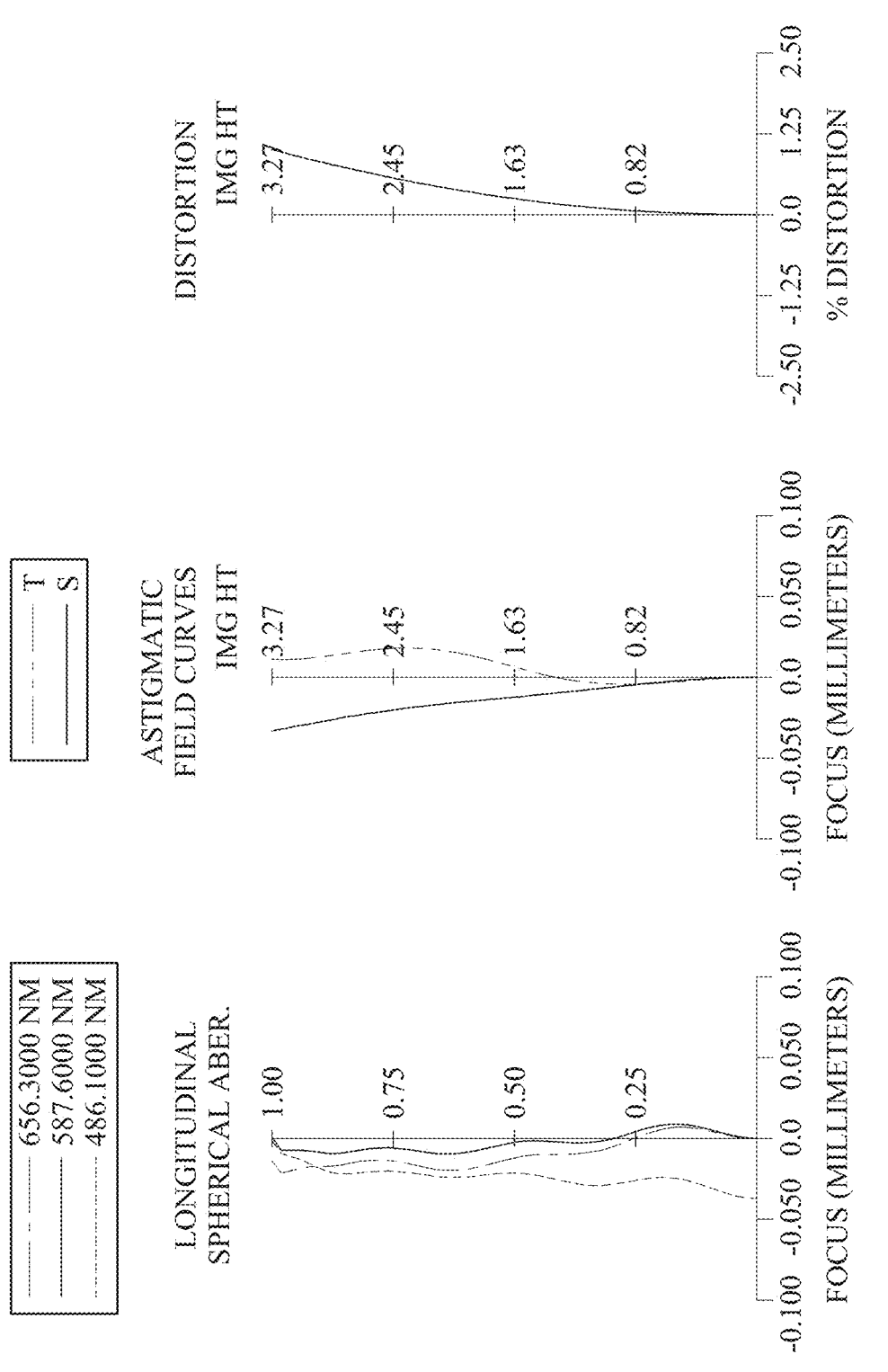
FIG. 28 shows spherical aberration curves, astigmatic field curves and a distortion curve of the image capturing unit according to the 14th embodiment.

FIG. 27 is a schematic view of an image capturing unit according to the 14th embodiment of the present disclosure. FIG. 28 shows, in order from left to right, spherical aberration curves, astigmatic field curves and a distortion curve of the image capturing unit according to the 14th embodiment. In FIG. 27, the image capturing unit 14 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a third lens element E3, a stop S1, a fourth lens element E4, a fifth lens element E5, a filter E9 and an image surface IMG. The photographing lens assembly includes five lens elements (E1, E2, E3, E4 and E5) with no additional lens element disposed between each of the adjacent five lens elements.

The first lens element E1 is a simple refractive lens element with positive refractive power and has an object-side surface being convex in a paraxial region thereof and an image-side surface being convex in a paraxial region thereof. The first lens element E1 is made of plastic material and has the object-side surface and the image-side surface being both aspheric.

The second lens element E2 is a simple refractive lens element with negative refractive power and has an object-side surface being concave in a paraxial region thereof and an image-side surface being concave in a paraxial region thereof. The second lens element E2 is made of plastic material and has the object-side surface and the image-side surface being both aspheric.

The third lens element E3 is a simple refractive lens element with positive refractive power and has an object-side surface being convex in a paraxial region thereof and an image-side surface being concave in a paraxial region thereof. The third lens element E3 is made of plastic material and has the object-side surface and the image-side surface being both aspheric.

The fourth lens element E4 is a metalens with positive refractive power and has an object-side surface being planar in a paraxial region thereof and an image-side surface being planar in a paraxial region thereof. The fourth lens element E4 has a base made of glass material and has the object-side surface and the image-side surface each being a metasurface having a subwavelength microstructure. Specifically, the fourth lens element E4 includes a base and subwavelength microstructures formed on basal surfaces of the base facing towards the object side and the image side, respectively, and the metasurfaces each include one basal surface and one subwavelength microstructure.

The fifth lens element E5 is a simple refractive lens element with positive refractive power and has an object-side surface being concave in a paraxial region thereof and an image-side surface being convex in a paraxial region thereof. The fifth lens element E5 is made of plastic material and has the object-side surface and the image-side surface being both aspheric.

The filter E9 is made of glass material and located between the fifth lens element E5 and the image surface IMG, and will not affect the focal length of the photographing lens assembly. The image sensor IS is disposed on or near the image surface IMG of the photographing lens assembly.

The detailed optical data of the 14th embodiment are shown in Table 14A and the aspheric surface data are shown in Table 14B and the metasurface phase equation data are shown in Table 14C below.

TABLE 14A

| 14th Embodiment f = 18.57 mm, Fno = 4.50, HFOV = 9.9 deg. | | | | | | |
| --- | --- | --- | --- | --- | --- | --- |
| Surface # | | Curvature Radius | Thickness | Material | Index | Abbe # | Focal Length |
| 0 | Object | Plano | Infinity | | | | |
| 1 | Ape. Stop | Plano | -0.503 | | | | |
| 2 | Lens 1 | 3.6054 (ASP) | 1.700 | Plastic | 1.545 | 56.1 | 6.04 |
| 3 | | -31.2155 (ASP) | 0.502 | | | | |

TABLE 14A-continued

| | | | | | | | | Focal |
|---|---|---|---|---|---|---|---|---|

14th Embodiment
f = 18.57 mm, Fno = 4.50, HFOV = 9.9 deg.

| Surface # | | Curvature Radius | | Thickness | Material | Index | Abbe # | Focal Length |
|---|---|---|---|---|---|---|---|---|
| 4 | Lens 2 | −3.7571 | (ASP) | 0.892 | Plastic | 1.566 | 37.4 | −5.07 |
| 5 | | 13.2265 | (ASP) | 0.221 | | | | |
| 6 | Lens 3 | 3.7754 | (ASP) | 0.400 | Plastic | 1.534 | 56.0 | 50.59 |
| 7 | | 4.2265 | (ASP) | 0.493 | | | | |
| 8 | Stop | Plano | | 0.137 | | | | |
| 9 | Lens 4 | Plano | | 0.100 | Glass | 1.517 | 64.2 | 7158.78 |
| 10 | | Plano | | 0.233 | | | | |
| 11 | Lens 5 | −13.5837 | (ASP) | 0.750 | Plastic | 1.587 | 28.3 | 35.80 |
| 12 | | −8.4202 | (ASP) | 2.000 | | | | |
| 13 | Filter | Plano | | 0.210 | Glass | 1.517 | 64.2 | — |
| 14 | | Plano | | 9.697 | | | | |
| 15 | Image | Plano | | — | | | | |

Note:
Reference wavelength is 587.6 nm (d-line).
An effective radius of the stop S1 (Surface 8) is 1.479 mm.
Each of the object-side surface of the fourth lens element E4 (Surface 9) and the image-side surface of the fourth lens element E4 (Surface 10) is a metasurface having the subwavelength microstructure.
θm at the object-side surface of the fourth lens element E4 (Surface 9) is 16.8°.
θm at the image-side surface of the fourth lens element E4 (Surface 10) is 15.6°.

TABLE 14B

Aspheric Coefficients

| Surface # | 2 | 3 | 4 | 5 |
|---|---|---|---|---|
| k= | 3.161260E−01 | −9.900000E+01 | −9.312765E+00 | 5.543740E+01 |
| A4= | −1.24221902E−03 | −1.67114823E−02 | −4.37982783E−02 | 1.40109768E−02 |
| A6= | 1.78130243E−04 | 1.08276543E−02 | 5.17042036E−02 | −4.04683454E−02 |
| A8= | −4.23242303E−05 | −3.92266108E−03 | −2.94435664E−02 | 6.48433945E−02 |
| A10= | −1.60886997E−05 | 6.90032573E−04 | 9.96181592E−03 | −4.17451610E−02 |
| A12= | 5.10457973E−06 | −4.93308571E−05 | −2.10258697E−03 | 1.24270675E−02 |
| A14= | −6.21213069E−07 | — | 2.68073850E−04 | −1.42788470E−03 |
| A16= | — | — | −1.63690556E−05 | — |

| Surface # | 6 | 7 | 11 | 12 |
|---|---|---|---|---|
| k= | 0.000000E+00 | 0.000000E+00 | 0.000000E+00 | −5.641007E+01 |
| A4= | 1.11779234E−01 | 1.21970542E−01 | 1.52525391E−02 | −1.04587656E−02 |
| A6= | −1.70500358E−01 | −1.25821193E−01 | −1.51866442E−02 | 1.71014506E−03 |
| A8= | 1.29140332E−01 | 4.18563754E−02 | 3.62241207E−03 | −5.04570205E−03 |
| A10= | −4.09148150E−02 | 4.17842354E−02 | 3.20626137E−03 | 5.78265279E−03 |
| A12= | −2.71627888E−03 | −4.83093920E−02 | −2.14410990E−03 | −3.32366134E−03 |
| A14= | 4.98474989E−03 | 1.94658255E−02 | 1.37131948E−04 | 1.02987903E−03 |
| A16= | −1.00619218E−03 | −3.32596091E−03 | 1.84572647E−04 | −1.63011952E−04 |
| A18= | 4.19655293E−05 | 1.69156805E−04 | −3.72689027E−05 | 1.01957185E−05 |

TABLE 14C coefficients of metasurface phase equation

| Surface | 9 | 10 |
|---|---|---|
| diffraction order | 1 | 1 |
| C1= | −7.828950E−02 | 7.903554E−02 |
| C2= | 3.064168E−03 | −4.230051E−03 |
| C3= | 1.051952E−03 | −4.996741E−04 |
| C4= | −1.981146E−05 | −1.266684E−04 |
| C5= | −5.193241E−05 | 1.001598E−05 |
| C6= | −5.159132E−06 | 2.066325E−05 |
| C7= | 2.643692E−06 | 2.152887E−07 |
| C8= | −1.092215E−06 | — |

In the 14th embodiment, the equation of the aspheric surface profiles of the aforementioned lens elements is the same as the equation of the 1st embodiment. Also, the definitions of these parameters shown in Table 14D are the same as those stated in the 1st embodiment with correspond-ing values for the 14th embodiment, so an explanation in this regard will not be provided again.

Moreover, these parameters can be calculated from Table 14A, Table 14B and Table 14C as the following values and satisfy the following conditions:

TABLE 14D

Schematic Parameters

| f [mm] | 18.57 | fc1/fc2 | −1.19 |
|---|---|---|---|
| Fno | 4.50 | f/|R1| | 5.15 |
| HFOV [deg.] | 9.9 | CTc1/|RLci| | 0.20 |
| |ImgH/f1| | 0.54 | (Rc1o − Rc1i)/(Rc1o + Rc1i) | −1.26 |
| TL/ImgH | 5.30 | |SAGLci|/CTLc | 0.27 |
| Ym_max/ImgH | 0.47 | Vcmin | 28.3 |
| Ym_max [mm] | 1.52 | Vcmin | 28.3 |
| ML/TL | 0.75 | Vcmax/Vcmin | 1.98 |
| T23/TD | 0.04 | |Dist|_max | 1.00% |
| f/|fc1| | 3.08 | — | — |

15th Embodiment

Figure 29:
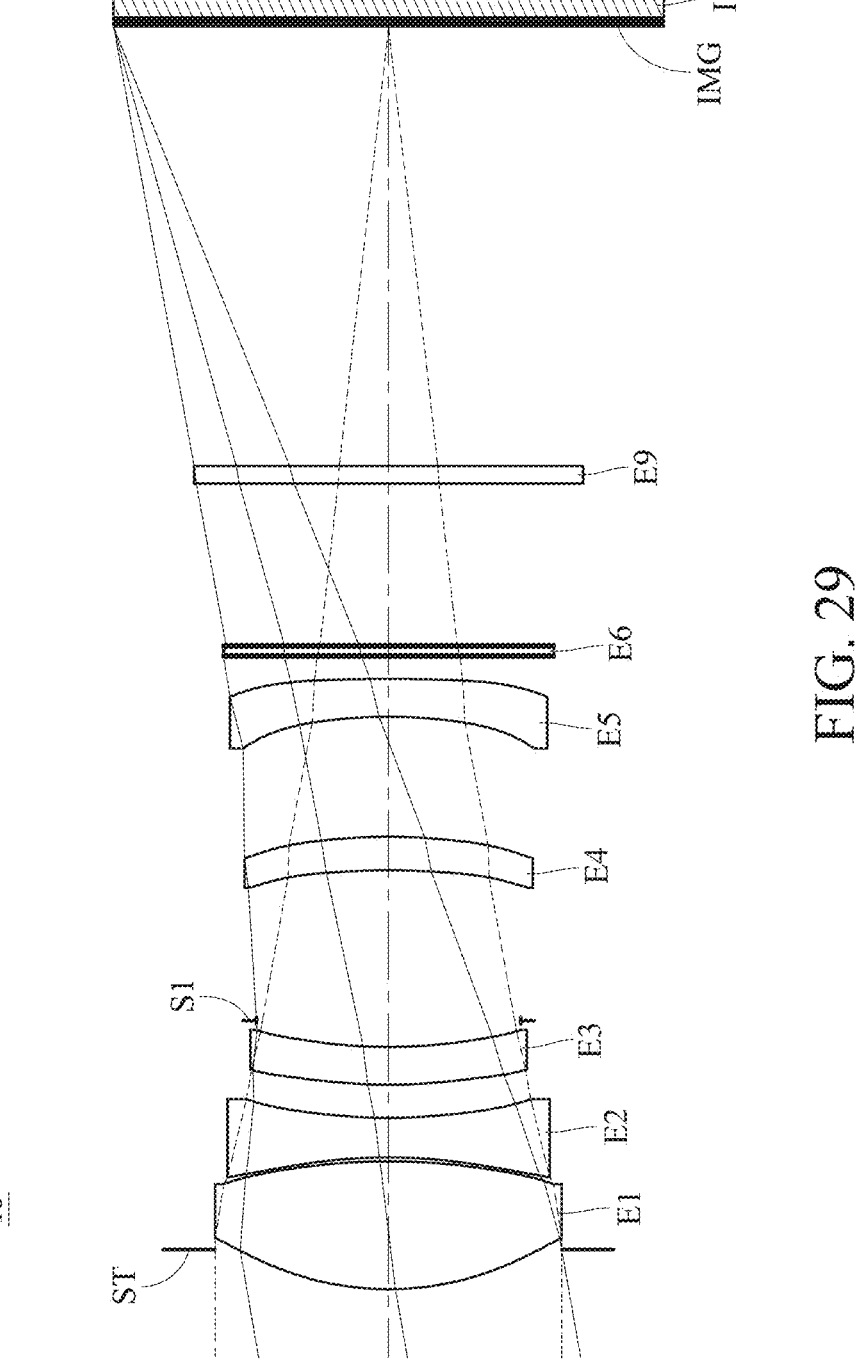
FIG. 29 is a schematic view of an image capturing unit according to the 15th embodiment of the present disclosure.
Figure 30:
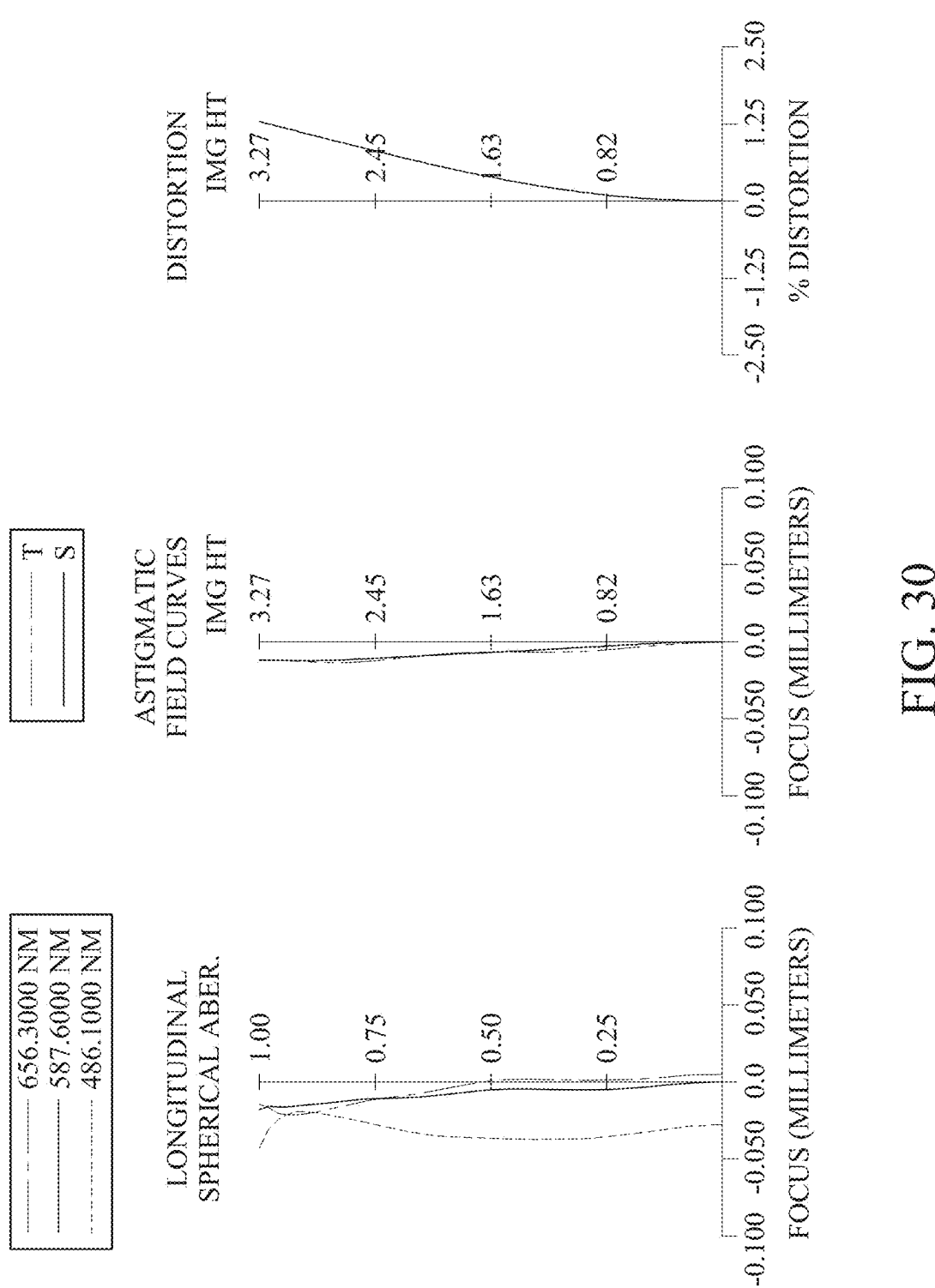
FIG. 30 shows spherical aberration curves, astigmatic field curves and a distortion curve of the image capturing unit according to the 15th embodiment.

FIG. 29 is a schematic view of an image capturing unit according to the 15th embodiment of the present disclosure. FIG. 30 shows, in order from left to right, spherical aberration curves, astigmatic field curves and a distortion curve of the image capturing unit according to the 15th embodiment. In FIG. 29, the image capturing unit 15 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a third lens element E3, a stop S1, a fourth lens element E4, a fifth lens element E5, a sixth lens element E6, a filter E9 and an image surface IMG. The photographing lens assembly includes six lens elements (E1, E2, E3, E4, E5 and E6) with no additional lens element disposed between each of the adjacent six lens elements.

The first lens element E1 is a simple refractive lens element with positive refractive power and has an object-side surface being convex in a paraxial region thereof and an image-side surface being convex in a paraxial region thereof. The first lens element E1 is made of plastic material and has the object-side surface and the image-side surface being both aspheric.

The second lens element E2 is a simple refractive lens element with negative refractive power and has an object-side surface being concave in a paraxial region thereof and an image-side surface being concave in a paraxial region thereof. The second lens element E2 is made of plastic material and has the object-side surface and the image-side surface being both aspheric.

The third lens element E3 is a simple refractive lens element with positive refractive power and has an object-side surface being convex in a paraxial region thereof and an image-side surface being concave in a paraxial region thereof. The third lens element E3 is made of plastic material and has the object-side surface and the image-side surface being both aspheric.

The fourth lens element E4 is a simple refractive lens element with positive refractive power and has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 is a simple refractive lens element with negative refractive power and has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 is a metalens with negative refractive power and has an object-side surface being planar in a paraxial region thereof and an image-side surface being planar in a paraxial region thereof. The sixth lens element E6 has a base made of glass material and has the object-side surface and the image-side surface each being a metasurface having a subwavelength microstructure. Specifically, the sixth lens element E6 includes a base and subwavelength microstructures formed on basal surfaces of the base facing towards the object side and the image side, respectively, and the metasurfaces each include one basal surface and one subwavelength microstructure.

The filter E9 is made of glass material and located between the sixth lens element E6 and the image surface IMG, and will not affect the focal length of the photographing lens assembly. The image sensor IS is disposed on or near the image surface IMG of the photographing lens assembly.

The detailed optical data of the 15th embodiment are shown in Table 15A and the aspheric surface data are shown in Table 15B and the metasurface phase equation data are shown in Table 15C below.

TABLE 15A

15th Embodiment
f = 18.52 mm, Fno = 4.50, HFOV = 9.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.470 | | | | |
| 2 | Lens 1 | 3.5517 (ASP) | 1.521 | Plastic | 1.545 | 56.1 | 4.57 |
| 3 | | −7.0645 (ASP) | 0.046 | | | | |
| 4 | Lens 2 | −6.7488 (ASP) | 0.470 | Plastic | 1.566 | 37.4 | −5.25 |
| 5 | | 5.4396 (ASP) | 0.394 | | | | |
| 6 | Lens 3 | 5.6170 (ASP) | 0.450 | Plastic | 1.534 | 56.0 | 114.73 |
| 7 | | 6.0111 (ASP) | 0.315 | | | | |
| 8 | Stop | Plano | 1.785 | | | | |
| 9 | Lens 4 | −8.3390 (ASP) | 0.400 | Plastic | 1.686 | 18.4 | 32.29 |
| 10 | | −6.1768 (ASP) | 1.427 | | | | |
| 11 | Lens 5 | −5.6608 (ASP) | 0.450 | Plastic | 1.587 | 28.3 | −13.46 |
| 12 | | −20.5485 (ASP) | 0.282 | | | | |
| 13 | Lens 6 | Plano | 0.100 | Glass | 1.517 | 64.2 | −97.16 |
| 14 | | Plano | 1.940 | | | | |
| 15 | Filter | Plano | 0.210 | Glass | 1.517 | 64.2 | — |
| 16 | | Plano | 5.230 | | | | |
| 17 | Image | Plano | — | | | | |

Note:
Reference wavelength is 587.6 nm (d-line).
An effective radius of the stop S1 (Surface 8) is 1.570 mm.
Each of the object-side surface of the sixth lens element E6 (Surface 13) and the image-side surface of the sixth lens element E6 (Surface 14) is a metasurface having the subwavelength microstructure.
θm at the object-side surface of the sixth lens element E6 (Surface 13) is 21.1°.
θm at the image-side surface of the sixth lens element E6 (Surface 14) is 19.1°.

TABLE 15B

| Aspheric Coefficients | | | | |
|---|---|---|---|---|
| Surface # | 2 | 3 | 4 | 5 |
| k= | 6.953706E−02 | −1.570305E+01 | −5.398761E+00 | −1.184742E+00 |
| A4= | 2.42305036E−04 | −2.82097038E−06 | −1.71963412E−02 | −3.94486077E−02 |
| A6= | −2.60438631E−04 | −5.69818042E−04 | 1.68270034E−02 | 2.59426960E−02 |
| A8= | 2.76241056E−05 | −1.54695441E−04 | −6.72510670E−03 | −5.00038949E−03 |
| A10= | −6.97158362E−05 | 3.80734001E−05 | 1.33209309E−03 | −1.86691241E−03 |
| A12= | 2.13308947E−05 | −4.92221803E−06 | −8.48615329E−05 | 1.06992012E−03 |
| A14= | −3.06851635E−06 | — | −9.94528550E−06 | −1.37920911E−04 |
| A16= | — | — | 1.38329975E−06 | — |

| Surface # | 6 | 7 | 9 | 10 |
|---|---|---|---|---|
| k= | 0.000000E+00 | 0.000000E+00 | 0.000000E+00 | 0.000000E+00 |
| A4= | −2.05656221E−02 | 7.90603184E−04 | 1.80335184E−02 | 2.36663052E−02 |
| A6= | −1.14725674E−04 | −7.58627280E−03 | −1.40718959E−02 | −1.35325640E−02 |
| A8= | 9.87389755E−03 | 8.45274619E−03 | 1.62747674E−03 | 8.76747135E−04 |
| A10= | −9.49731599E−03 | −8.72483084E−03 | −1.58825507E−03 | −1.57420567E−03 |
| A12= | 3.98519290E−03 | 5.53830551E−03 | 1.24464706E−03 | 1.76400613E−03 |
| A14= | −6.89759748E−04 | −1.91208141E−03 | −2.78126626E−04 | −6.64115642E−04 |
| A16= | 3.54711833E−05 | 3.72131579E−04 | 2.03845288E−05 | 1.18388272E−04 |
| A18= | 8.80482766E−07 | −3.13313118E−05 | — | −8.28228011E−06 |

| Surface # | 11 | 12 |
|---|---|---|
| k= | 0.000000E+00 | 8.978112E+01 |
| A4= | 1.34007838E−02 | 5.90951230E−03 |
| A6= | −1.54230079E−02 | −9.17621848E−03 |
| A8= | 5.70855193E−03 | 3.05552973E−03 |
| A10= | −3.35828421E−03 | −1.18740923E−03 |
| A12= | 1.57239126E−03 | 4.69718765E−04 |
| A14= | −4.19766152E−04 | −1.17880091E−04 |
| A16= | 5.55983080E−05 | 1.52642619E−05 |
| A18= | −2.61690735E−06 | −7.28746784E−07 |

TABLE 15C

| coefficients of metasurface phase equation | | |
|---|---|---|
| Surface | 13 | 14 |
| diffraction order | 13 | 14 |
| C1= | −1.661011E−01 | 1.750816E−01 |
| C2= | −1.033506E−04 | 5.035985E−04 |
| C3= | −1.090835E−04 | 6.415488E−07 |
| C4= | −3.240308E−06 | 8.886857E−06 |
| C5= | 4.964378E−06 | −8.797563E−08 |
| C6= | — | −1.170418E−06 |

In the 15th embodiment, the equation of the aspheric surface profiles of the aforementioned lens elements is the same as the equation of the 1st embodiment. Also, the definitions of these parameters shown in Table 15D are the same as those stated in the 1st embodiment with corresponding values for the 15th embodiment, so an explanation in this regard will not be provided again.

Moreover, these parameters can be calculated from Table 15A, Table 15B and Table 15C as the following values and satisfy the following conditions:

TABLE 15D

| Schematic Parameters | | | |
|---|---|---|---|
| f [mm] | 18.52 | fc1/fc2 | −0.87 |
| Fno | 4.50 | f/|R1| | 5.21 |
| HFOV [deg.] | 9.9 | CTc1/|RLci| | 0.07 |
| |ImgH/f1| | 0.72 | (Rc1o − Rc1i)/(Rc1o + Rc1i) | −3.02 |
| TL/ImgH | 4.59 | |SAGLci|/CTLc | 0.48 |
| Ym_max/ImgH | 0.60 | Vmin | 18.4 |
| Ym_max [mm] | 1.96 | Vcmin | 18.4 |
| ML/TL | 0.50 | Vcmax/Vcmin | 3.05 |

TABLE 15D-continued

| Schematic Parameters | | | |
|---|---|---|---|
| T23/TD | 0.05 | |Dist|_max | 1.29% |
| f/|fc1| | 4.05 | — | — |

16th Embodiment

Figure 31:
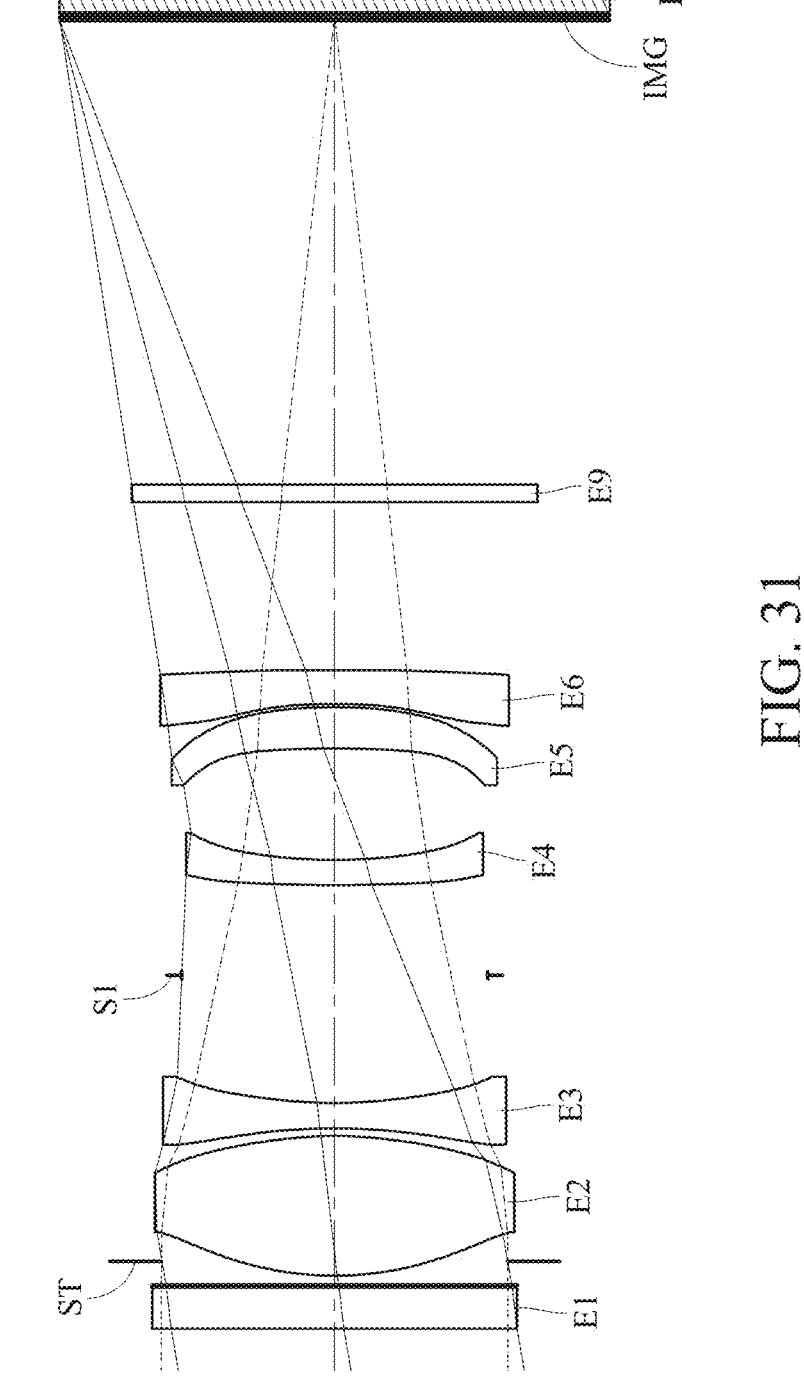
FIG. 31 is a schematic view of an image capturing unit according to the 16th embodiment of the present disclosure.
Figure 32:
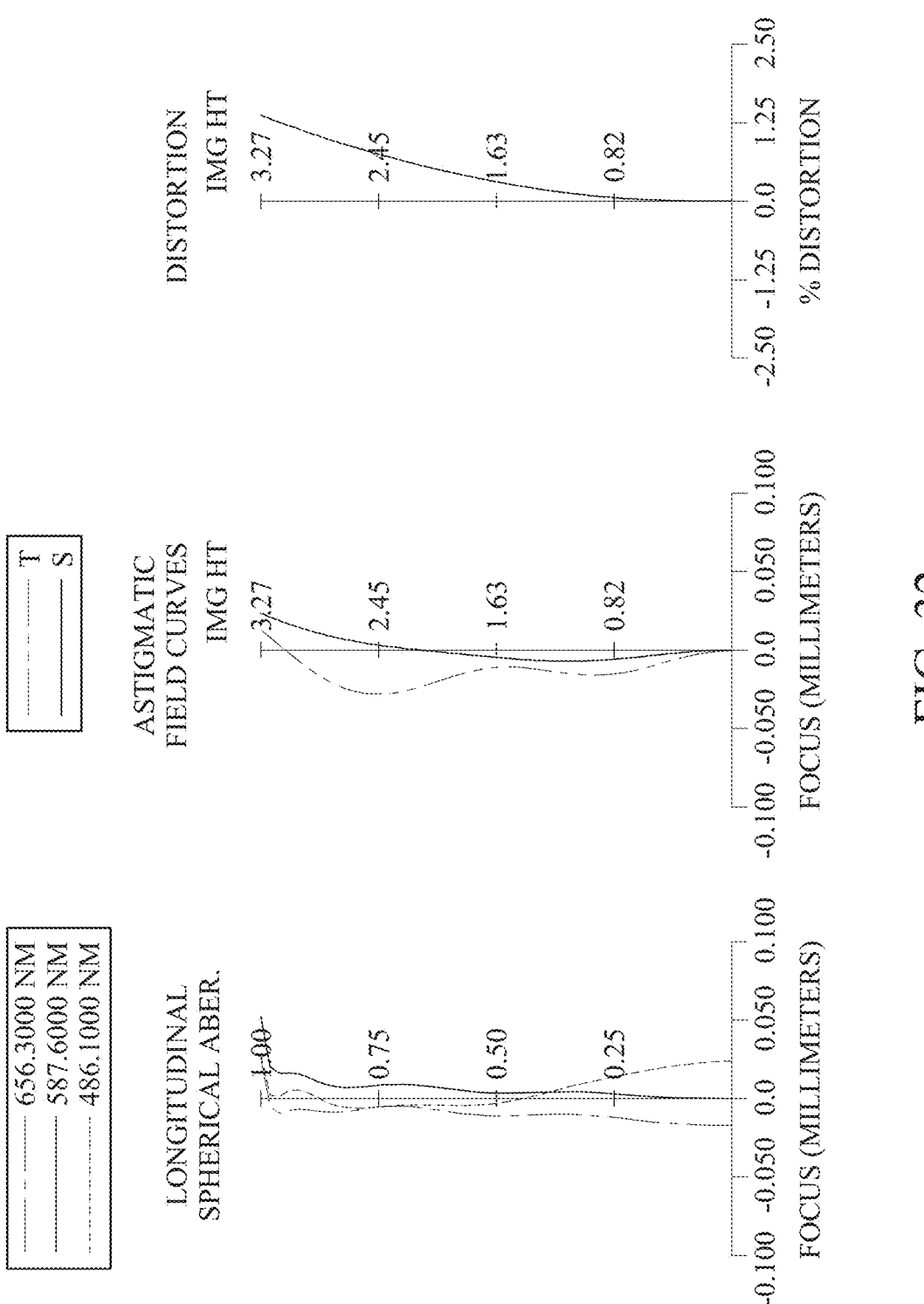
FIG. 32 shows spherical aberration curves, astigmatic field curves and a distortion curve of the image capturing unit according to the 16th embodiment.

FIG. 31 is a schematic view of an image capturing unit according to the 16th embodiment of the present disclosure. FIG. 32 shows, in order from left to right, spherical aberration curves, astigmatic field curves and a distortion curve of the image capturing unit according to the 16th embodiment. In FIG. 31, the image capturing unit 16 includes the photographing lens assembly (its reference numeral is omitted) of the present disclosure and an image sensor IS. The photographing lens assembly includes, in order from an object side to an image side along an optical axis, a first lens element E1, an aperture stop ST, a second lens element E2, a third lens element E3, a stop S1, a fourth lens element E4, a fifth lens element E5, a sixth lens element E6, a filter E9 and an image surface IMG. The photographing lens assembly includes six lens elements (E1, E2, E3, E4, E5 and E6) with no additional lens element disposed between each of the adjacent six lens elements.

The first lens element E1 is a metalens with positive refractive power and has an object-side surface being planar in a paraxial region thereof and an image-side surface being planar in a paraxial region thereof. The first lens element E1 has a base made of glass material and has the image-side surface being a metasurface having a subwavelength microstructure. Specifically, the first lens element E1 includes a base and a subwavelength microstructure formed on a basal surface of the base facing towards the image side, and the metasurface includes the basal surface and the subwavelength microstructure.

The second lens element E2 is a simple refractive lens element with positive refractive power and has an object-side surface being convex in a paraxial region thereof and an image-side surface being convex in a paraxial region thereof. The second lens element E2 is made of plastic material and has the object-side surface and the image-side surface being both aspheric.

The third lens element E3 is a simple refractive lens element with negative refractive power and has an object-side surface being concave in a paraxial region thereof and an image-side surface being concave in a paraxial region thereof. The third lens element E3 is made of plastic material and has the object-side surface and the image-side surface being both aspheric.

The fourth lens element E4 is a simple refractive lens element with negative refractive power and has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 is a simple refractive lens element with positive refractive power and has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 is a simple refractive lens element with negative refractive power and has an object-side surface being concave in a paraxial region thereof and an image-side surface being concave in a paraxial region thereof. The sixth lens element E6 is made of plastic material and has the object-side surface and the image-side surface being both aspheric.

The filter E9 is made of glass material and located between the sixth lens element E6 and the image surface IMG, and will not affect the focal length of the photographing lens assembly. The image sensor IS is disposed on or near the image surface IMG of the photographing lens assembly.

The detailed optical data of the 16th embodiment are shown in Table 16A and the aspheric surface data are shown in Table 16B and the metasurface phase equation data are shown in Table 16C below.

TABLE 16A

16th Embodiment
f = 18.52 mm, Fno = 4.50, HFOV = 9.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | Plano | 0.500 | Glass | 1.517 | 64.2 | 722.47 |
| 2 | | Plano | 0.300 | | | | |
| 3 | Ape. Stop | Plano | −0.170 | | | | |
| 4 | Lens 2 | 3.8662 (ASP) | 1.662 | Plastic | 1.545 | 56.1 | 4.07 |
| 5 | | −4.4037 (ASP) | 0.090 | | | | |
| 6 | Lens 3 | −6.9418 (ASP) | 0.301 | Plastic | 1.566 | 37.4 | −5.12 |
| 7 | | 5.0506 (ASP) | 1.520 | | | | |
| 8 | Stop | Plano | 1.070 | | | | |
| 9 | Lens 4 | 11.9223 (ASP) | 0.300 | Plastic | 1.534 | 56.0 | −19.43 |
| 10 | | 5.5008 (ASP) | 1.325 | | | | |
| 11 | Lens 5 | −15.6901 (ASP) | 0.493 | Plastic | 1.686 | 18.4 | 18.20 |
| 12 | | −7.0412 (ASP) | 0.038 | | | | |
| 13 | Lens 6 | −9.1367 (ASP) | 0.400 | Plastic | 1.587 | 28.3 | −12.79 |
| 14 | | 42.8202 (ASP) | 2.000 | | | | |
| 15 | Filter | Plano | 0.210 | Glass | 1.517 | 64.2 | — |
| 16 | | Plano | 5.513 | | | | |
| 17 | Image | Plano | — | | | | |

Note:
Reference wavelength is 587.6 nm (d-line).
An effective radius of the stop S1 (Surface 8) is 1.815 mm.
The image-side surface of the first lens element E1 (Surface 2) is a metasurface having the subwavelength microstructure.
θm at the image-side surface of the first lens element E1 (Surface 2) is 6.5°.

TABLE 16B

Aspheric Coefficients

| Surface # | 4 | 5 | 6 | 7 |
|---|---|---|---|---|
| k= | −1.886668E−01 | −1.488244E+01 | −1.283625E+01 | −2.488686E+00 |
| A4= | −2.37902060E−04 | 1.35229324E−02 | −3.30711175E−04 | −3.17245617E−02 |
| A6= | 5.23388284E−05 | −1.13841589E−02 | 2.53134285E−03 | 2.27230619E−02 |
| A8= | −2.90780299E−04 | 3.24064840E−03 | −4.32327760E−03 | −1.13598473E−02 |
| A10= | 9.82161851E−05 | −4.92752457E−04 | 2.60039266E−03 | 4.22703769E−03 |
| A12= | −2.61421635E−05 | 2.92517176E−05 | −6.94299384E−04 | −8.63670924E−04 |

TABLE 16B-continued

| Aspheric Coefficients | | | |
|---|---|---|---|
| A14= | 1.47849348E−06 | — | 8.87278107E−05 | 7.30554795E−05 |
| A16= | — | — | −4.23705529E−06 | — |

| Surface # | 9 | 10 | 11 | 12 |
|---|---|---|---|---|
| k= | 0.000000E+00 | 0.000000E+00 | 0.000000E+00 | 0.000000E+00 |
| A4= | −3.12943859E−02 | −2.80330218E−02 | −9.41436076E−03 | −6.46871556E−02 |
| A6= | 1.91725827E−02 | 2.16384112E−02 | 3.89235924E−03 | 9.16986926E−02 |
| A8= | −5.58523293E−03 | −6.84912241E−03 | −1.22497584E−02 | −8.95635813E−02 |
| A10= | 2.39977529E−03 | 2.35482116E−03 | 6.32950105E−03 | 5.03580987E−02 |
| A12= | −8.58871727E−04 | 4.27422232E−05 | −1.97862384E−03 | −1.74972937E−02 |
| A14= | 6.86362786E−05 | −5.27655801E−04 | 3.21916127E−04 | 3.72026628E−03 |
| A16= | 2.95781120E−05 | 1.80725009E−04 | −1.65928680E−05 | −4.46353971E−04 |
| A18= | −4.85214535E−06 | −1.80984742E−05 | — | 2.32627931E−05 |

| Surface # | 13 | 14 |
|---|---|---|
| k= | 0.000000E+00 | 5.620890E+01 |
| A4= | −1.00230111E−01 | −3.26232547E−02 |
| A6= | 1.18175548E−01 | 1.71494505E−02 |
| A8= | −9.04884740E−02 | −4.25727535E−03 |
| A10= | 4.66114015E−02 | 2.84845678E−04 |
| A12= | −1.49847076E−02 | 1.08079126E−04 |
| A14= | 2.89500170E−03 | −2.03937022E−05 |
| A16= | −3.10593203E−04 | −7.62666752E−07 |
| A18= | 1.42444544E−05 | 2.50571836E−07 |

TABLE 16C

| coefficients of metasurface phase equation | |
|---|---|
| Surface | 2 |
| diffraction order | 1 |
| C1= | −6.920735E−04 |
| C2= | −1.421856E−04 |
| C3= | 8.260347E−06 |
| C4= | 8.311395E−06 |
| C5= | −1.719424E−07 |
| C6= | −4.296541E−07 |
| C7= | −6.250982E−08 |
| C8= | 2.028683E−08 |
| C9= | 5.980870E−10 |
| C10= | −1.935951E−10 |

In the 16th embodiment, the equation of the aspheric surface profiles of the aforementioned lens elements is the same as the equation of the 1st embodiment. Also, the definitions of these parameters shown in Table 16D are the same as those stated in the 1st embodiment with corresponding values for the 16th embodiment, so an explanation in this regard will not be provided again.

Moreover, these parameters can be calculated from Table 16A, Table 16B and Table 16C as the following values and satisfy the following conditions:

TABLE 16D

| Schematic Parameters | | | |
|---|---|---|---|
| f [mm] | 18.52 | fc1/fc2 | −0.79 |
| Fno | 4.50 | f/|R1| | 0.00 |
| HFOV [deg.] | 9.9 | CTc1/|RLci| | 0.04 |
| |ImgH/f1| | 0.005 | (Rc1o − Rc1i)/(Rc1o + Rc1i) | −15.39 |
| TL/ImgH | 4.76 | |SAGLci|/CTLc | 0.15 |
| Ym_max/ImgH | 0.65 | Vmin | 18.4 |
| Ym_max [mm] | 2.11 | Vcmin | 18.4 |
| ML/TL | 0.97 | Vcmax/Vcmin | 3.05 |
| T23/TD | 0.011 | |Dist|_max | 1.37% |
| f/|fc1| | 4.56 | — | — |

17th Embodiment

Figure 33:
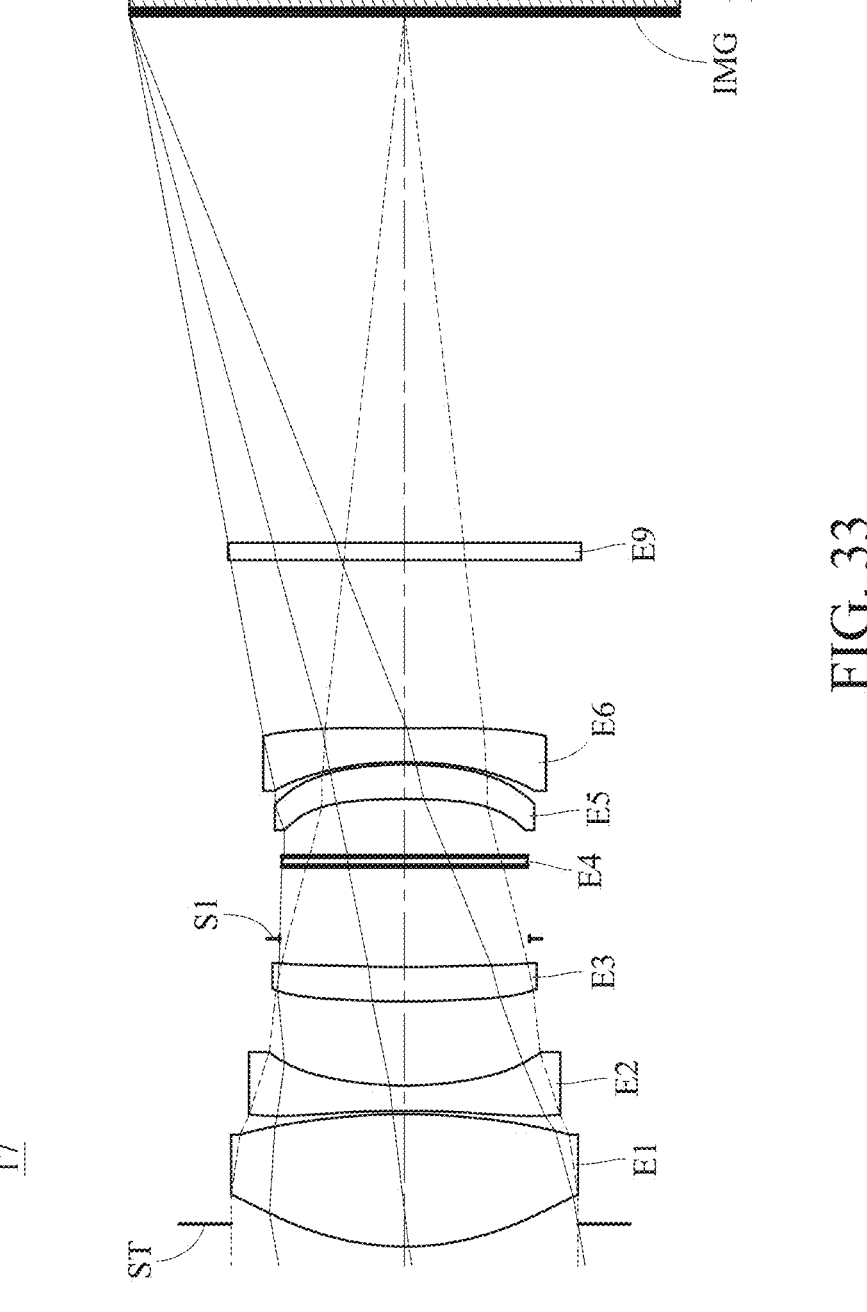
FIG. 33 is a schematic view of an image capturing unit according to the 17th embodiment of the present disclosure.
Figure 34:
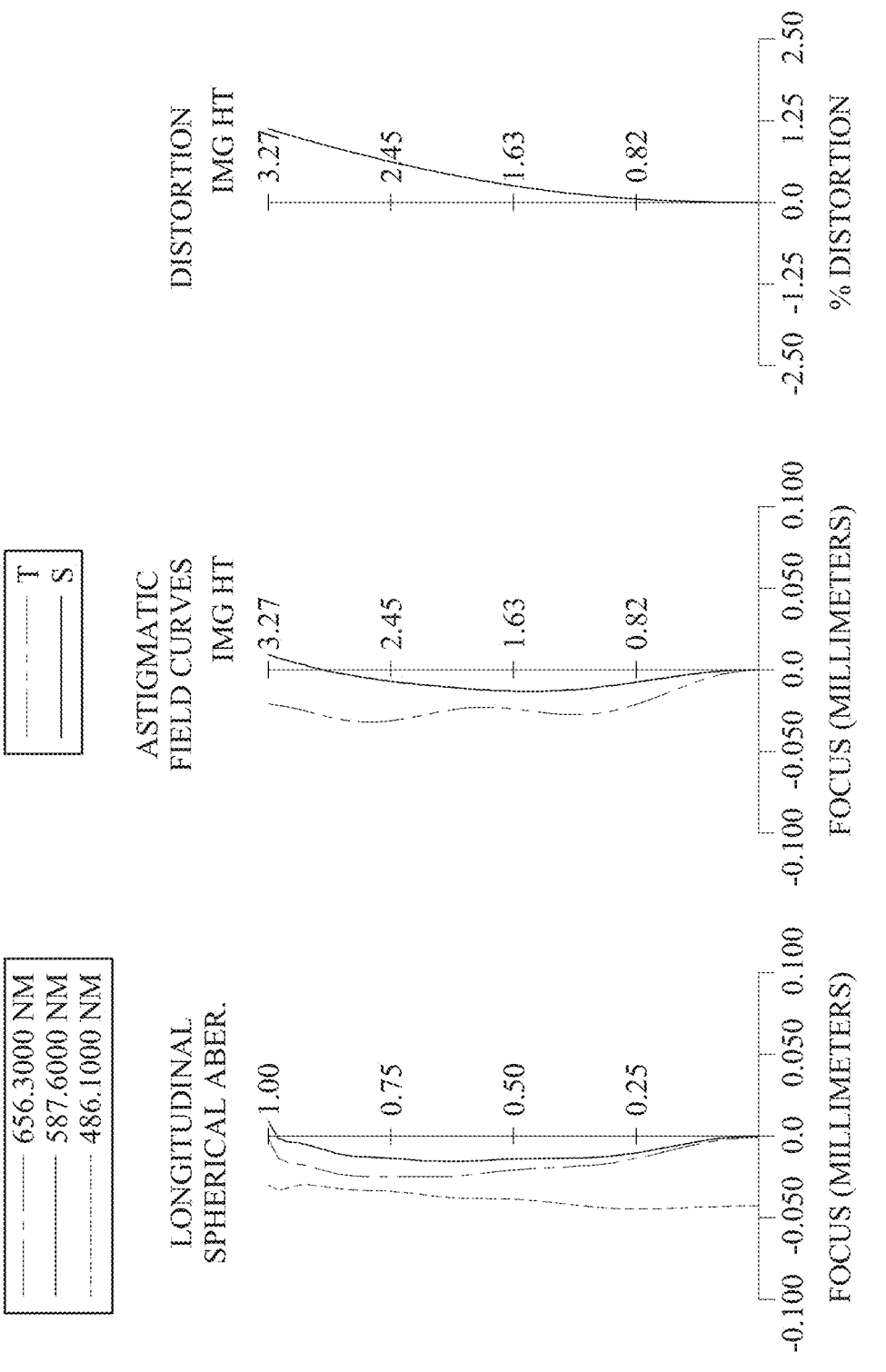
FIG. 34 shows spherical aberration curves, astigmatic field curves and a distortion curve of the image capturing unit according to the 17th embodiment.

FIG. 33 is a schematic view of an image capturing unit according to the 17th embodiment of the present disclosure. FIG. 34 shows, in order from left to right, spherical aberration curves, astigmatic field curves and a distortion curve of the image capturing unit according to the 17th embodiment. In FIG. 33, the image capturing unit 17 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a third lens element E3, a stop S1, a fourth lens element E4, a fifth lens element E5, a sixth lens element E6, a filter E9 and an image surface IMG. The photographing lens assembly includes six lens elements (E1, E2, E3, E4, E5 and E6) with no additional lens element disposed between each of the adjacent six lens elements.

The first lens element E1 is a simple refractive lens element with positive refractive power and has an object-side surface being convex in a paraxial region thereof and an image-side surface being convex in a paraxial region thereof. The first lens element E1 is made of plastic material and has the object-side surface and the image-side surface being both aspheric.

The second lens element E2 is a simple refractive lens element with negative refractive power and has an object-side surface being concave in a paraxial region thereof and an image-side surface being concave in a paraxial region thereof. The second lens element E2 is made of plastic material and has the object-side surface and the image-side surface being both aspheric.

The third lens element E3 is a simple refractive lens element with positive refractive power and has an object-side surface being convex in a paraxial region thereof and an image-side surface being concave in a paraxial region thereof. The third lens element E3 is made of plastic material and has the object-side surface and the image-side surface being both aspheric.

The fourth lens element E4 is a metalens with negative refractive power and has an object-side surface being planar in a paraxial region thereof and an image-side surface being planar in a paraxial region thereof. The fourth lens element E4 has a base made of glass material and has the object-side surface and the image-side surface each being a metasurface having a subwavelength microstructure. Specifically, the fourth lens element E4 includes a base and subwavelength microstructures formed on basal surfaces of the base facing towards the object side and the image side, respectively, and the metasurfaces each include one basal surface and one subwavelength microstructure.

The fifth lens element E5 is a simple refractive lens element with positive refractive power and has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 is a simple refractive lens element with negative refractive power and has an object-side surface being concave in a paraxial region thereof and an image-side surface being concave in a paraxial region thereof. The sixth lens element E6 is made of plastic material and has the object-side surface and the image-side surface being both aspheric.

The filter E9 is made of glass material and located between the sixth lens element E6 and the image surface IMG, and will not affect the focal length of the photographing lens assembly. The image sensor IS is disposed on or near the image surface IMG of the photographing lens assembly.

The detailed optical data of the 17th embodiment are shown in Table 17A and the aspheric surface data are shown in Table 17B and the metasurface phase equation data are shown in Table 17C below.

TABLE 17A

17th Embodiment
f = 18.53 mm, Fno = 4.50, HFOV = 9.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.270 | | | | |
| 2 | Lens 1 | 3.3289 | (ASP) | 1.573 | Plastic | 1.545 | 56.1 | 4.51 |
| 3 | | −7.8468 | (ASP) | 0.040 | | | | |
| 4 | Lens 2 | −18.5816 | (ASP) | 0.300 | Plastic | 1.566 | 37.4 | −5.62 |
| 5 | | 3.8637 | (ASP) | 1.000 | | | | |
| 6 | Lens 3 | 8.9433 | (ASP) | 0.408 | Plastic | 1.534 | 56.0 | 80.81 |
| 7 | | 11.1005 | (ASP) | 0.339 | | | | |
| 8 | Stop | Plano | | 0.871 | | | | |
| 9 | Lens 4 | Plano | | 0.100 | Glass | 1.517 | 64.2 | −125.38 |
| 10 | | Plano | | 0.690 | | | | |
| 11 | Lens 5 | −8.3229 | (ASP) | 0.410 | Plastic | 1.686 | 18.4 | 11.70 |
| 12 | | −4.1684 | (ASP) | 0.028 | | | | |
| 13 | Lens 6 | −4.6213 | (ASP) | 0.400 | Plastic | 1.587 | 28.3 | −6.44 |
| 14 | | 21.4384 | (ASP) | 2.000 | | | | |
| 15 | Filter | Plano | | 0.210 | Glass | 1.517 | 64.2 | — |
| 16 | | Plano | | 6.259 | | | | |
| 17 | Image | Plano | | — | | | | |

Note:
Reference wavelength is 587.6 nm (d-line).
An effective radius of the stop S1 (Surface 8) is 1.483 mm.
Each of the object-side surface of the fourth lens element E4 (Surface 9) and the image-side surface of the fourth lens element E4 (Surface 10) is a metasurface having the subwavelength microstructure.
θm at the object-side surface of the fourth lens element E4 (Surface 9) is 22.2°.
θm at the image-side surface of the fourth lens element E4 (Surface 10) is 20.4°.

TABLE 17B

Aspheric Coefficients

| Surface # | 2 | 3 | 4 | 5 |
|---|---|---|---|---|
| k= | −1.909394E−01 | −1.575451E+01 | −2.190461E+01 | 1.414509E+00 |
| A4= | 1.34784163E−04 | −4.27652685E−03 | −3.95997339E−02 | −5.13288963E−02 |
| A6= | −1.25349331E−04 | 3.54000750E−03 | 4.12783494E−02 | 4.69862536E−02 |
| A8= | −2.63708207E−04 | −1.69156956E−03 | −1.91832402E−02 | −1.98648671E−02 |
| A10= | 5.20088308E−05 | 3.09918097E−04 | 5.88658773E−03 | 6.64962918E−03 |
| A12= | −1.52066343E−05 | −2.16999917E−05 | −1.24212592E−03 | −1.54103784E−03 |
| A14= | 1.21564404E−06 | — | 1.64698855E−04 | 1.60333652E−04 |
| A16= | — | — | −9.96034669E−06 | — |

| Surface # | 6 | 7 | 11 | 12 |
|---|---|---|---|---|
| k= | 0.000000E+00 | 0.000000E+00 | 0.000000E+00 | 0.000000E+00 |
| A4= | −3.45881235E−02 | −3.56101843E−02 | −2.18245558E−02 | 4.85365918E−02 |
| A6= | 1.50776417E−02 | 1.28968982E−02 | −3.05324155E−02 | −1.85932041E−01 |
| A8= | 6.44092958E−03 | 2.83826879E−03 | 2.37749571E−02 | 2.53887684E−01 |

TABLE 17B-continued

| | | Aspheric Coefficients | | |
|---|---|---|---|
| A10= | −5.30095137E−03 | −2.47392757E−03 | −2.06660651E−02 | −2.08621480E−01 |
| A12= | 1.04512763E−03 | −5.05763371E−04 | 1.06069397E−02 | 1.02349838E−01 |
| A14= | 2.59139512E−04 | 9.36302823E−04 | −3.56817612E−03 | −2.93391148E−02 |
| A16= | −1.58494000E−04 | −3.43988467E−04 | 6.13295590E−04 | 4.41445036E−03 |
| A18= | 2.31213605E−05 | 4.56665434E−05 | — | −2.52168719E−04 |

| Surface # | 13 | 14 |
|---|---|---|
| k= | 0.000000E+00 | −9.900000E+01 |
| A4= | 3.10137870E−02 | −4.00613754E−02 |
| A6= | −1.78306017E−01 | 1.69655238E−02 |
| A8= | 2.84550417E−01 | −3.14434076E−03 |
| A10= | −2.44086836E−01 | −2.21116900E−03 |
| A12= | 1.24018027E−01 | 1.97326084E−03 |
| A14= | −3.70827399E−02 | −7.09013542E−04 |
| A16= | 5.92496815E−03 | 1.20334834E−04 |
| A18= | −3.82860092E−04 | −7.70375558E−06 |

TABLE 17C

| | coefficients of metasurface phase equation | |
|---|---|---|
| Surface | 9 | 10 |
| diffraction order | 1 | 1 |
| C1= | −1.381295E−01 | 1.447538E−01 |
| C2= | −7.951618E−04 | 2.301342E−03 |
| C3= | 7.162696E−05 | −4.048345E−04 |
| C4= | 2.179551E−04 | −2.675960E−04 |
| C5= | 1.214069E−04 | −5.116163E−05 |
| C6= | 4.458905E−06 | −3.071124E−05 |
| C7= | −9.119602E−06 | −6.721625E−06 |
| C8= | −3.332094E−06 | 3.126137E−06 |
| C9= | −8.362537E−07 | 3.463554E−06 |
| C10= | — | 9.822661E−07 |

In the 17th embodiment, the equation of the aspheric surface profiles of the aforementioned lens elements is the same as the equation of the 1st embodiment. Also, the definitions of these parameters shown in Table 17D are the same as those stated in the 1st embodiment with corresponding values for the 17th embodiment, so an explanation in this regard will not be provided again.

Moreover, these parameters can be calculated from Table 17A, Table 17B and Table 17C as the following values and satisfy the following conditions:

TABLE 17D

| | Schematic Parameters | | |
|---|---|---|---|
| f [mm] | 18.53 | fc1/fc2 | −0.80 |
| Fno | 4.50 | f/|R1| | 5.57 |
| HFOV [deg.] | 9.9 | CTc1/|RLci| | 0.07 |
| |ImgH/f1| | 0.72 | (Rc1o − Rc1i)/(Rc1o + Rc1i) | −2.47 |
| TL/ImgH | 4.47 | |SAGLci|/CTLc | 0.23 |
| Ym_max/ImgH | 0.45 | Vmin | 18.4 |
| Ym_max [mm] | 1.46 | Vcmin | 18.4 |
| ML/TL | 0.69 | Vcmax/Vcmin | 3.05 |
| T23/TD | 0.16 | |Dist|_max | 1.13% |
| f/|fc1| | 4.11 | — | — |

18th Embodiment

Figure 35:
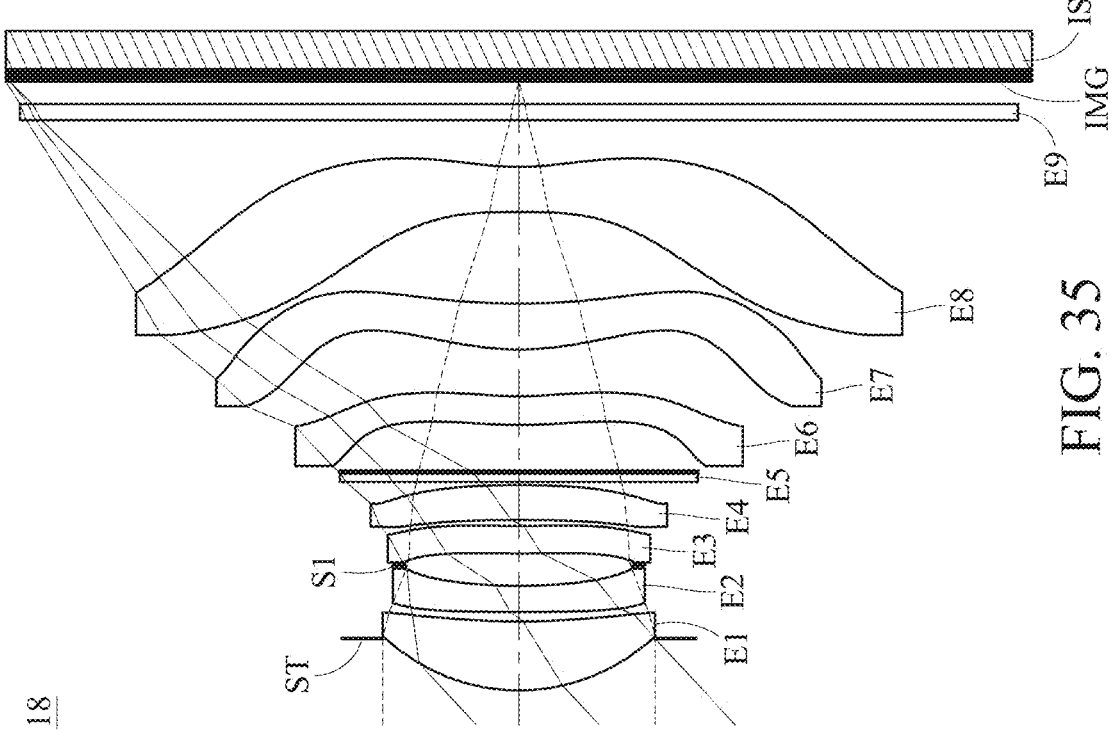
FIG. 35 is a schematic view of an image capturing unit according to the 18th embodiment of the present disclosure.
Figure 36:
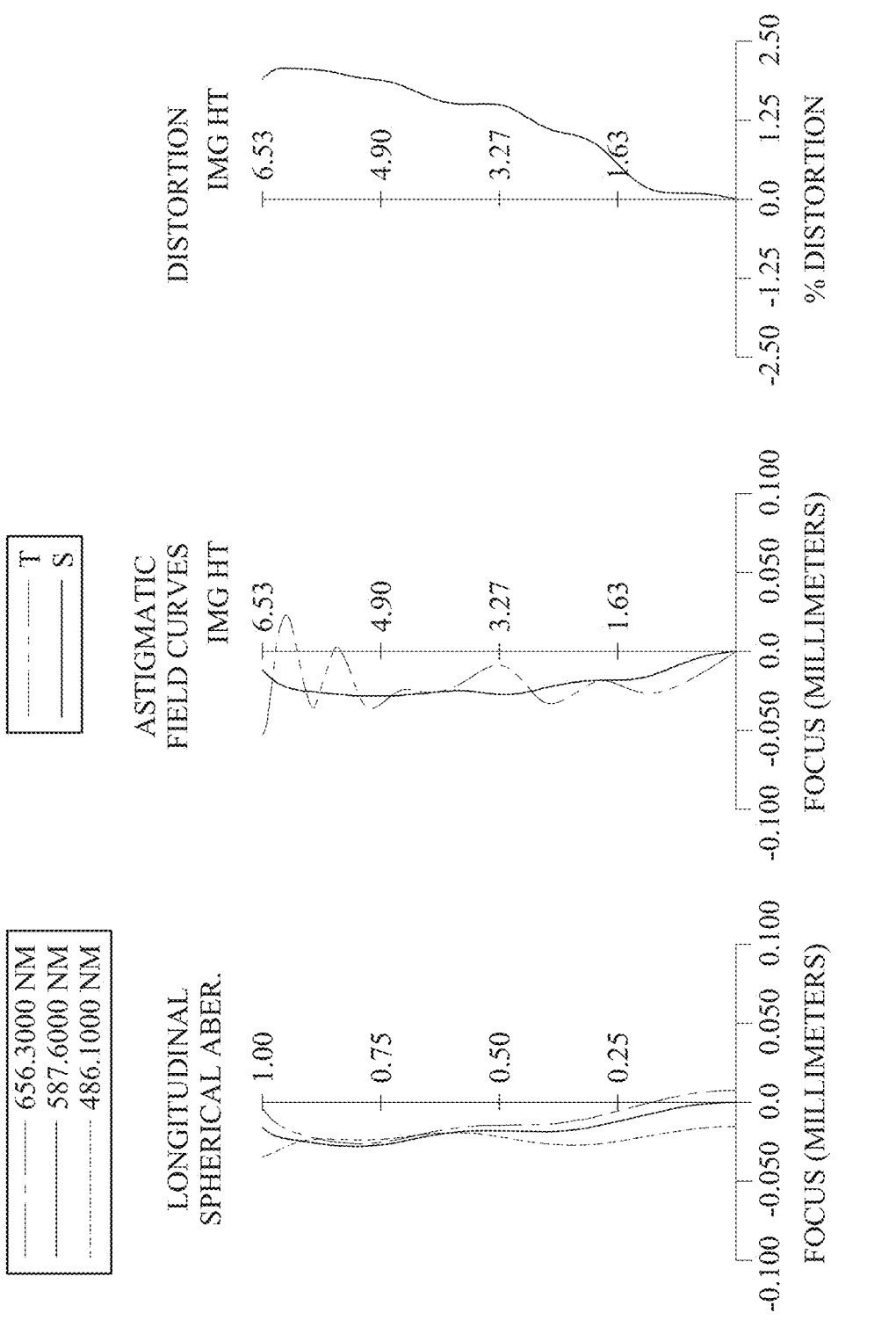
FIG. 36 shows spherical aberration curves, astigmatic field curves and a distortion curve of the image capturing unit according to the 18th embodiment.

FIG. 35 is a schematic view of an image capturing unit according to the 18th embodiment of the present disclosure. FIG. 36 shows, in order from left to right, spherical aberration curves, astigmatic field curves and a distortion curve of the image capturing unit according to the 18th embodiment. In FIG. 35, the image capturing unit 18 includes the photographing lens assembly (its reference numeral is omitted) of the present disclosure and an image sensor IS. The photographing lens assembly includes, in order from an object side to an image side along an optical axis, an aperture stop ST, a first lens element E1, a second lens element E2, a stop S1, a third lens element E3, a fourth lens element E4, a fifth lens element E5, a sixth lens element E6, a seventh lens element E7, an eighth lens element E8, a filter E9 and an image surface IMG. The photographing lens assembly includes eight lens elements (E1, E2, E3, E4, E5, E6, E7 and E8) with no additional lens element disposed between each of the adjacent eight lens elements.

The first lens element E1 is a simple refractive lens element with positive refractive power and has an object-side surface being convex in a paraxial region thereof and an image-side surface being concave in a paraxial region thereof. The first lens element E1 is made of plastic material and has the object-side surface and the image-side surface being both aspheric.

The second lens element E2 is a simple refractive lens element with negative refractive power and has an object-side surface being convex in a paraxial region thereof and an image-side surface being concave in a paraxial region thereof. The second lens element E2 is made of plastic material and has the object-side surface and the image-side surface being both aspheric.

The third lens element E3 is a simple refractive lens element with negative refractive power and has an object-side surface being convex in a paraxial region thereof and an image-side surface being concave in a paraxial region thereof. The third lens element E3 is made of plastic material and has the object-side surface and the image-side surface being both aspheric.

The fourth lens element E4 is a simple refractive lens element with positive refractive power and has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 is a metalens with positive refractive power and has an object-side surface being planar in a paraxial region thereof and an image-side surface being planar in a paraxial region thereof. The fifth lens element E5 has a base made of glass material and has the image-side surface being a metasurface having a subwavelength microstructure. Specifically, the fifth lens element E5 includes a base and a subwavelength microstructure formed on a basal surface of the base facing towards the image side, and the metasurface includes the basal surface and the subwavelength microstructure.

The sixth lens element E6 is a simple refractive lens element with negative refractive power and has an object-side surface being convex in a paraxial region thereof and an image-side surface being concave in a paraxial region thereof. The sixth lens element E6 is made of plastic material and has the object-side surface and the image-side surface being both aspheric.

The seventh lens element E7 is a simple refractive lens element with positive refractive power and has an object-side surface being convex in a paraxial region thereof and an image-side surface being concave in a paraxial region thereof. The seventh lens element E7 is made of plastic material and has the object-side surface and the image-side surface being both aspheric.

The eighth lens element E8 is a simple refractive lens element with negative refractive power and has an object-side surface being concave in a paraxial region thereof and an image-side surface being concave in a paraxial region thereof. The eighth lens element E8 is made of plastic material and has the object-side surface and the image-side surface being both aspheric.

The filter E9 is made of glass material and located between the eighth lens element E8 and the image surface IMG, and will not affect the focal length of the photographing lens assembly. The image sensor IS is disposed on or near the image surface IMG of the photographing lens assembly.

The detailed optical data of the 18th embodiment are shown in Table 18A and the aspheric surface data are shown in Table 18B and the metasurface phase equation data are shown in Table 18C below.

TABLE 18A

18th Embodiment
f = 6.95 mm, Fno = 1.99, HFOV = 42.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.667 | | | | |
| 2 | Lens 1 | 2.5346 | (ASP) | 0.886 | Plastic | 1.545 | 56.1 | 6.22 |
| 3 | | 8.8174 | (ASP) | 0.120 | | | | |
| 4 | Lens 2 | 22.7243 | (ASP) | 0.339 | Plastic | 1.669 | 19.5 | −16.46 |
| 5 | | 7.3730 | (ASP) | 0.264 | | | | |
| 6 | Stop | Plano | | 0.151 | | | | |
| 7 | Lens 3 | 23.8936 | (ASP) | 0.355 | Plastic | 1.669 | 19.5 | −333.94 |
| 8 | | 21.4566 | (ASP) | 0.075 | | | | |
| 9 | Lens 4 | −34.4663 | (ASP) | 0.450 | Plastic | 1.544 | 55.6 | 36.67 |
| 10 | | −12.6922 | (ASP) | 0.038 | | | | |
| 11 | Lens 5 | Plano | | 0.120 | Glass | 1.517 | 64.2 | 412.49 |
| 12 | | Plano | | 0.615 | | | | |
| 13 | Lens 6 | 6.0728 | (ASP) | 0.370 | Plastic | 1.587 | 28.3 | −58.59 |
| 14 | | 5.0454 | (ASP) | 0.600 | | | | |
| 15 | Lens 7 | 3.5826 | (ASP) | 0.591 | Plastic | 1.544 | 56.0 | 10.46 |
| 16 | | 9.1158 | (ASP) | 1.177 | | | | |
| 17 | Lens 8 | −19.7459 | (ASP) | 0.580 | Plastic | 1.534 | 56.0 | −5.30 |
| 18 | | 3.3362 | (ASP) | 0.600 | | | | |
| 19 | Filter | Plano | | 0.210 | Glass | 1.517 | 64.2 | — |
| 20 | | Plano | | 0.285 | | | | |
| 21 | Image | Plano | | — | | | | |

Note:
Reference wavelength is 587.6 nm (d-line).
An effective radius of the stop S1 (Surface 6) is 1.470 mm.
The image-side surface of the fifth lens element E5 (Surface 12) is a metasurface having the subwavelength microstructure.
θm at the image-side surface of the fifth lens element E5 (Surface 12) is 35.3°.

TABLE 18B

Aspheric Coefficients

| Surface # | 2 | 3 | 4 | 5 |
|---|---|---|---|---|
| k= | 2.613640E−02 | −2.240178E+01 | −8.882342E−01 | 5.442015E+00 |
| A4= | −1.54763864E−05 | −8.81624883E−03 | −1.13015206E−02 | −1.17874347E−03 |
| A6= | 1.39788677E−03 | 2.72519631E−03 | 1.25775643E−02 | 1.13421803E−02 |
| A8= | −1.97089460E−03 | 2.10568330E−03 | −2.41588031E−03 | −3.00148611E−03 |
| A10= | 1.68983791E−03 | −2.36664076E−03 | −5.45347673E−04 | 3.64437758E−04 |
| A12= | −8.31945428E−04 | 1.02545116E−03 | 5.42684231E−04 | 6.77957909E−05 |
| A14= | 2.12308958E−04 | −2.12773082E−04 | −1.22724624E−04 | 1.49681988E−05 |
| A16= | −2.39910744E−05 | 1.50212468E−05 | 1.11343734E−05 | — |

| Surface # | 7 | 8 | 9 | 10 |
|---|---|---|---|---|
| k= | 3.201056E+01 | 7.128111E+01 | −9.900000E+01 | −6.743968E+00 |
| A4= | −2.86484440E−02 | −3.75299400E−02 | −2.46552068E−02 | −1.91393187E−02 |
| A6= | −8.97125571E−04 | 2.17005901E−02 | 1.97166304E−02 | 2.97340984E−03 |

TABLE 18B-continued

| | Aspheric Coefficients | | | |
|---|---|---|---|---|
| A8= | −3.83066109E−04 | −3.28819132E−02 | −1.32642024E−02 | 1.59529539E−02 |
| A10= | 2.20791249E−04 | 2.69176250E−02 | −5.88928943E−03 | −3.44303513E−02 |
| A12= | −2.87091398E−04 | −1.11011829E−02 | 1.78172551E−02 | 3.59596964E−02 |
| A14= | 1.45011029E−04 | 2.02336195E−03 | −1.28777310E−02 | −2.27934202E−02 |
| A16= | −2.65360683E−05 | −2.60878984E−05 | 4.44533506E−03 | 9.11352690E−03 |
| A18= | — | −2.48819288E−05 | −7.49451418E−04 | −2.24918757E−03 |
| A20= | — | — | 4.92339051E−05 | 3.13162439E−04 |
| A22= | — | — | — | −1.87509666E−05 |

| Surface # | 13 | 14 | 15 | 16 |
|---|---|---|---|---|
| k= | −1.041416E+01 | −5.483060E−02 | −8.381882E−01 | 2.226338E+00 |
| A4= | −4.97022159E−02 | −7.91773568E−02 | −2.83840868E−02 | −2.80894615E−03 |
| A6= | 1.07151777E−02 | 3.59388798E−02 | 8.22140299E−03 | 1.82257466E−03 |
| A8= | 1.64290699E−02 | −1.35285950E−02 | −3.61129647E−03 | −6.91171588E−04 |
| A10= | −2.51732670E−02 | 2.30078994E−03 | 8.80770429E−04 | −6.19794465E−04 |
| A12= | 1.71105278E−02 | 6.26308934E−04 | −1.45469070E−04 | 4.78492392E−04 |
| A14= | −6.92442823E−03 | −4.89687163E−04 | 2.94461584E−05 | −1.54821488E−04 |
| A16= | 1.74648516E−03 | 1.35187816E−04 | −8.21733794E−06 | 2.97901611E−05 |
| A18= | −2.69380000E−04 | −2.05513533E−05 | 1.68331392E−06 | −3.72635998E−06 |
| A20= | 2.32446927E−05 | 1.80622911E−06 | −2.11652612E−07 | 3.09621931E−07 |
| A22= | −8.57665369E−07 | −8.60858086E−08 | 1.62614038E−08 | −1.67230288E−08 |
| A24= | — | 1.72495109E−09 | −7.50251017E−10 | 5.40429685E−10 |
| A26= | — | — | 1.91601404E−11 | −7.89093574E−12 |
| A28= | — | — | −2.08658097E−13 | −3.80553628E−14 |
| A30= | — | — | — | 1.96712781E−15 |

| Surface # | 17 | 18 |
|---|---|---|
| k= | −2.177631E+01 | −1.025701E+00 |
| A4= | −8.68265574E−02 | −9.15918775E−02 |
| A6= | 3.98551782E−02 | 3.83874682E−02 |
| A8= | −1.51682038E−02 | −1.20343911E−02 |
| A10= | 4.27223717E−03 | 2.49286875E−03 |
| A12= | −8.34747705E−04 | −3.27978173E−04 |
| A14= | 1.14159136E−04 | 2.50822058E−05 |
| A16= | −1.11448056E−05 | −6.35817207E−07 |
| A18= | 7.87086503E−07 | −7.74941763E−08 |
| A20= | −4.03458149E−08 | 9.98383138E−09 |
| A22= | 1.48797427E−09 | −5.78834912E−10 |
| A24= | −3.85072279E−11 | 2.00777811E−11 |
| A26= | 6.64100443E−13 | −4.26833984E−13 |
| A28= | −6.85760647E−15 | 5.15175109E−15 |
| A30= | 3.20856914E−17 | −2.71337587E−17 |

TABLE 18C

| coefficients of metasurface phase equation | |
|---|---|
| Surface | 12 |
| diffraction order | 1 |
| C1= | −1.212155E−03 |
| C2= | 1.097121E−04 |
| C3= | 3.920027E−05 |
| C4= | 5.599325E−06 |
| C5= | −1.846716E−07 |
| C6= | −1.723347E−07 |
| C7= | −2.771567E−08 |
| C8= | −4.186579E−09 |

TABLE 18D

| Schematic Parameters | | | |
|---|---|---|---|
| f [mm] | 6.95 | fc1/fc2 | −0.38 |
| Fno | 1.99 | f/|R1| | 2.74 |
| HFOV [deg.] | 42.7 | CTc1/|RLci| | 0.27 |
| |ImgH/f1| | 1.05 | (Rc1o − Rc1i)/(Rc1o + Rc1i) | −0.55 |
| TL/ImgH | 1.20 | |SAGLci|/CTLc | 2.78 |
| Ym_max/ImgH | 0.35 | Vmin | 19.5 |
| Ym_max [mm] | 2.30 | Vcmin | 19.5 |
| ML/TL | 0.64 | Vcmax/Vcmin | 2.88 |
| T23/TD | 0.06 | |Dist|_max | 2.08% |
| f/|fc1| | 1.12 | — | — |

In the 18th embodiment, the equation of the aspheric surface profiles of the aforementioned lens elements is the same as the equation of the 1st embodiment. Also, the definitions of these parameters shown in Table 18D are the same as those stated in the 1st embodiment with corresponding values for the 18th embodiment, so an explanation in this regard will not be provided again.

Moreover, these parameters can be calculated from Table 18A, Table 18B and Table 18C as the following values and satisfy the following conditions:

19th Embodiment

Figure 37:
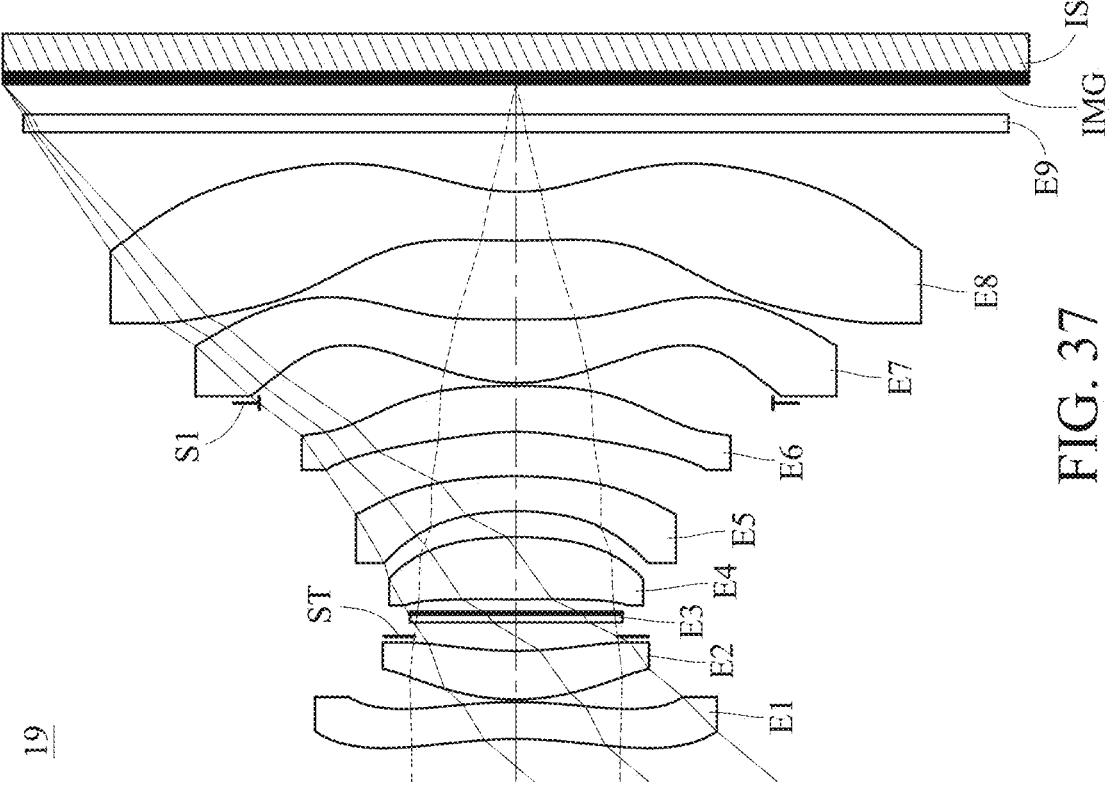
FIG. 37 is a schematic view of an image capturing unit according to the 19th embodiment of the present disclosure.
Figure 38:
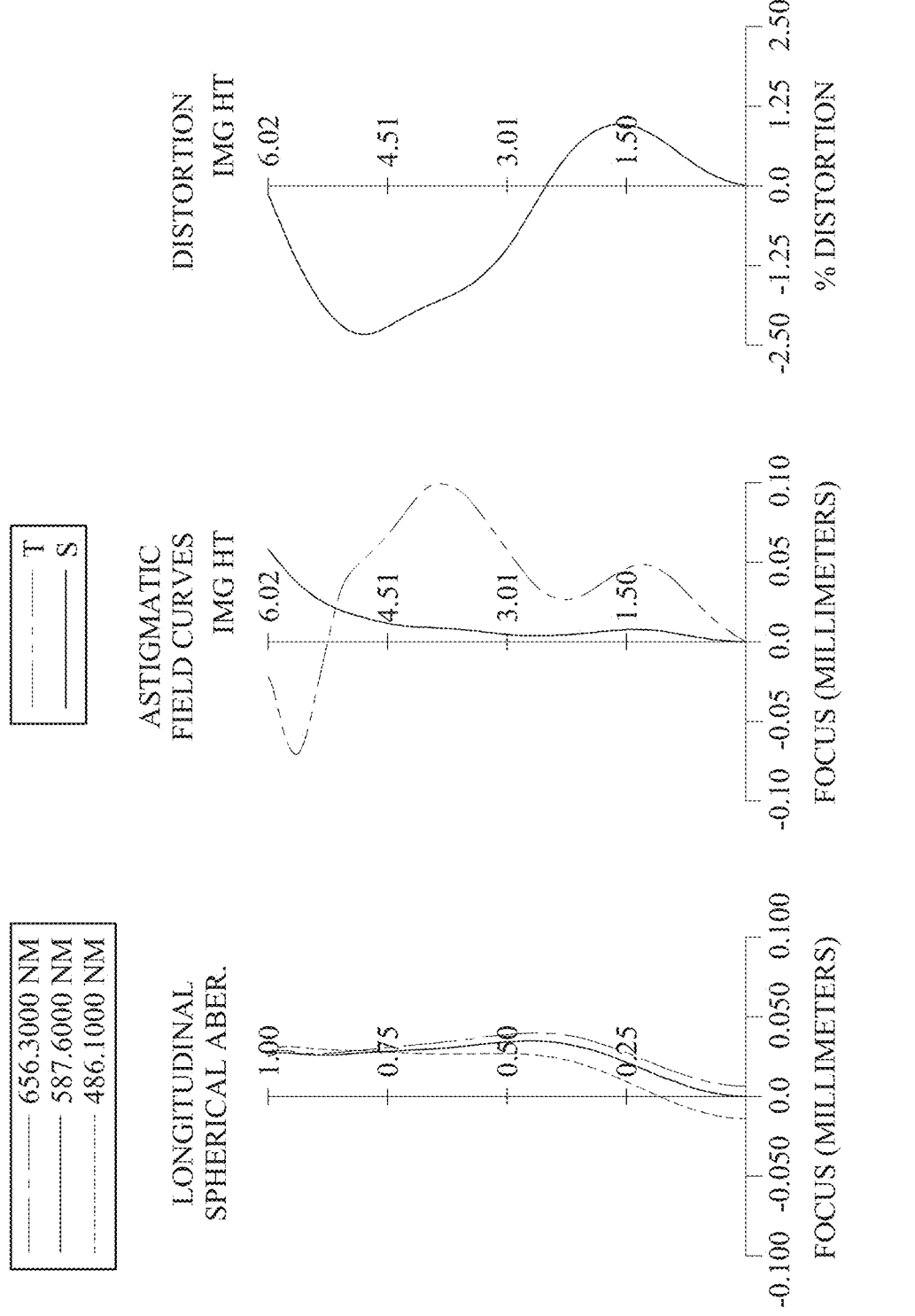
FIG. 38 shows spherical aberration curves, astigmatic field curves and a distortion curve of the image capturing unit according to the 19th embodiment.

FIG. 37 is a schematic view of an image capturing unit according to the 19th embodiment of the present disclosure. FIG. 38 shows, in order from left to right, spherical aberration curves, astigmatic field curves and a distortion curve of the image capturing unit according to the 19th embodiment. In FIG. 37, the image capturing unit 19 includes the photographing lens assembly (its reference numeral is omitted) of the present disclosure and an image sensor IS. The photographing lens assembly includes, in order from an object side to an image side along an optical axis, a first lens element E1, a second lens element E2, an aperture stop ST, a third lens element E3, a fourth lens element E4, a fifth lens element E5, a sixth lens element E6, a stop S1, a seventh lens element E7, an eighth lens element E8, a filter E9 and an image surface IMG. The photographing lens assembly includes eight lens elements (E1, E2, E3, E4, E5, E6, E7 and E8) with no additional lens element disposed between each of the adjacent eight lens elements.

The first lens element E1 is a simple refractive lens element with positive refractive power and has an object-side surface being concave in a paraxial region thereof and an image-side surface being convex in a paraxial region thereof. The first lens element E1 is made of plastic material and has the object-side surface and the image-side surface being both aspheric.

The second lens element E2 is a simple refractive lens element with positive refractive power and has an object-side surface being convex in a paraxial region thereof and an image-side surface being concave in a paraxial region thereof. The second lens element E2 is made of plastic material and has the object-side surface and the image-side surface being both aspheric.

The third lens element E3 is a metalens with positive refractive power and has an object-side surface being planar in a paraxial region thereof and an image-side surface being planar in a paraxial region thereof. The fifth lens element E5 has a base made of glass material and has the image-side surface being a metasurface having a subwavelength micro-structure. Specifically, the third lens element E3 includes a base and a subwavelength microstructure formed on a basal surface of the base facing towards the image side, and the metasurface includes the basal surface and the subwave-length microstructure.

The fourth lens element E4 is a simple refractive lens element with positive refractive power and has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 is a simple refractive lens element with negative refractive power and has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 is a simple refractive lens element with negative refractive power and has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 is a simple refractive lens element with positive refractive power and has an object-side surface being convex in a paraxial region thereof and an image-side surface being convex in a paraxial region thereof. The seventh lens element E7 is made of plastic material and has the object-side surface and the image-side surface being both aspheric.

The eighth lens element E8 is a simple refractive lens element with negative refractive power and has an object-side surface being convex in a paraxial region thereof and an image-side surface being concave in a paraxial region thereof. The eighth lens element E8 is made of plastic material and has the object-side surface and the image-side surface being both aspheric.

The filter E9 is made of glass material and located between the eighth lens element E8 and the image surface IMG, and will not affect the focal length of the photograph-ing lens assembly. The image sensor IS is disposed on or near the image surface IMG of the photographing lens assembly.

The detailed optical data of the 19th embodiment are shown in Table 19A and the aspheric surface data are shown in Table 19B and the metasurface phase equation data are shown in Table 19C below.

TABLE 19A

|  |  |  |  |  |  |  |  |
|---|---|---|---|---|---|---|---|
| 19th Embodiment |  |  |  |  |  |  |  |
| f = 5.04 mm, Fno = 2.06, HFOV = 50.0 deg. |  |  |  |  |  |  |  |
| Surface # |  | Curvature Radius | Thickness | Material | Index | Abbe # | Focal Length |
| 0 | Object | Plano | Infinity |  |  |  |  |
| 1 | Lens 1 | −5.0918 (ASP) | 0.435 | Plastic | 1.545 | 56.1 | 261.83 |
| 2 |  | −5.0645 (ASP) | 0.030 |  |  |  |  |
| 3 | Lens 2 | 2.6753 (ASP) | 0.571 | Plastic | 1.545 | 56.1 | 10.64 |
| 4 |  | 4.5929 (ASP) | 0.170 |  |  |  |  |
| 5 | Ape. Stop | Plano | 0.164 |  |  |  |  |
| 6 | Lens 3 | Plano | 0.100 | Glass | 1.517 | 64.2 | 565.40 |
| 7 |  | Plano | 0.171 |  |  |  |  |
| 8 | Lens 4 | 79.5092 (ASP) | 0.731 | Plastic | 1.545 | 56.1 | 7.76 |
| 9 |  | −4.4504 (ASP) | 0.304 |  |  |  |  |
| 10 | Lens 5 | −3.4110 (ASP) | 0.412 | Plastic | 1.669 | 19.5 | −18.20 |
| 11 |  | −4.9677 (ASP) | 0.520 |  |  |  |  |
| 12 | Lens 6 | −2.8532 (ASP) | 0.538 | Plastic | 1.566 | 37.4 | −6.36 |
| 13 |  | −14.7023 (ASP) | −0.200 |  |  |  |  |
| 14 | Stop | Plano | 0.235 |  |  |  |  |
| 15 | Lens 7 | 1.9590 (ASP) | 0.746 | Plastic | 1.545 | 56.1 | 3.50 |
| 16 |  | −60.4385 (ASP) | 0.927 |  |  |  |  |
| 17 | Lens 8 | 12.0469 (ASP) | 0.572 | Plastic | 1.534 | 55.9 | −4.76 |
| 18 |  | 2.0622 (ASP) | 0.700 |  |  |  |  |

TABLE 19A-continued

| | | | | | | | Focal |
|---|---|---|---|---|---|---|---|
| Surface # | | Curvature Radius | Thickness | Material | Index | Abbe # | Length |
| 19 | Filter | Plano | 0.210 | Glass | 1.517 | 64.2 | — |
| 20 | | Plano | 0.354 | | | | |
| 21 | Image | Plano | — | | | | |

19th Embodiment
f = 5.04 mm, Fno = 2.06, HFOV = 50.0 deg.

Note:
Reference wavelength is 587.6 nm (d-line).
An effective radius of the stop S1 (Surface 14) is 3.012 mm.
The image-side surface of the third lens element E3 (Surface 7) is a metasurface having the subwavelength microstructure.
θm at the image-side surface of the third lens element E3 (Surface 7) is 36.4°.

TABLE 19B

Aspheric Coefficients

| Surface # | 1 | 2 | 3 | 4 |
|---|---|---|---|---|
| k= | −3.910924E+01 | −2.433581E+01 | −3.981071E+00 | −4.888419E−01 |
| A4= | −3.42619833E−04 | 1.56834452E−02 | 7.00845865E−03 | −3.48585794E−02 |
| A6= | 6.91789295E−03 | −1.83166267E−03 | 1.96414334E−03 | 9.24899999E−03 |
| A8= | −2.54853470E−03 | 3.53888412E−03 | −2.89088598E−03 | −2.82579271E−03 |
| A10= | 6.30874286E−04 | −2.39752024E−03 | 6.66771050E−04 | −3.45692971E−03 |
| A12= | −9.53154390E−05 | 8.88688792E−04 | −4.88872485E−04 | 2.28500700E−03 |
| A14= | 8.06047062E−06 | −1.69575125E−04 | 1.14381320E−04 | −3.76376589E−04 |
| A16= | −2.61266995E−07 | 1.36813814E−05 | — | — |

| Surface # | 8 | 9 | 10 | 11 |
|---|---|---|---|---|
| k= | −7.129127E+01 | 1.174371E+00 | 4.698812E−01 | 8.458589E−01 |
| A4= | −2.05627744E−02 | −2.69484139E−02 | −2.58807964E−02 | 2.83280786E−02 |
| A6= | 1.29976233E−02 | −2.48742608E−02 | −3.00697732E−02 | −5.13889455E−02 |
| A8= | −2.88913295E−02 | 2.62916331E−02 | 8.85921658E−03 | 3.63648657E−02 |
| A10= | 2.41277425E−02 | −1.66684774E−02 | 1.83692437E−02 | −1.45040144E−02 |
| A12= | −1.09907267E−02 | 5.30805626E−03 | −1.80257343E−02 | 3.19860609E−03 |
| A14= | 1.96388743E−03 | −7.45916011E−04 | 6.34779118E−03 | −3.62706742E−04 |
| A16= | — | — | −8.06663185E−04 | 1.79613224E−05 |

| Surface # | 12 | 13 | 15 | 16 |
|---|---|---|---|---|
| k= | −2.641271E+01 | −3.553389E+01 | −8.996506E+00 | 7.930067E+01 |
| A4= | 1.20281063E−02 | −7.67527759E−02 | 2.16118630E−02 | 9.12165487E−02 |
| A6= | 1.35786424E−03 | 3.22887502E−02 | −9.14444563E−03 | −4.03510077E−02 |
| A8= | −1.32837563E−02 | −9.88665111E−03 | 3.81069160E−04 | 9.78754960E−03 |
| A10= | 1.01600851E−02 | 1.19701841E−03 | 2.14510089E−04 | −1.63305833E−03 |
| A12= | −4.00596025E−03 | 4.39501481E−04 | −4.76940913E−05 | 1.88825067E−04 |
| A14= | 9.61315618E−04 | −1.98883133E−04 | 3.52114387E−06 | −1.45364431E−05 |
| A16= | −1.44788791E−04 | 3.33173439E−05 | 7.32385241E−08 | 7.01471254E−07 |
| A18= | 1.28937685E−05 | −2.70952850E−06 | −2.19848593E−08 | −1.90548797E−08 |
| A20= | −5.28340722E−07 | 8.93964574E−08 | 7.77394287E−10 | 2.21300252E−10 |

| Surface # | 17 | 18 |
|---|---|---|
| k= | 3.533699E+00 | −9.602570E−01 |
| A4= | −1.50491877E+01 | −7.81630800E−02 |
| A6= | 6.32003312E+00 | 1.71822070E−02 |
| A8= | 1.72613818E+02 | −3.05970164E−03 |
| A10= | −6.21568293E+02 | 3.87487646E−04 |
| A12= | 1.08050373E+03 | −3.26189128E−05 |
| A14= | −1.10954742E+03 | 1.76357816E−06 |
| A16= | 6.89599920E+02 | −5.86997189E−08 |
| A18= | −2.41331160E+02 | 1.09437517E−09 |
| A20= | 3.66314533E+01 | −8.74642310E−12 |

TABLE 19C

| coefficients of metasurface phase equation | |
| --- | --- |
| Surface | 7 |
| diffraction order | 1 |
| C1= | −8.843283E−04 |
| C2= | 4.698135E−04 |
| C3= | −1.745676E−04 |
| C4= | −7.200304E−05 |
| C5= | 7.659174E−06 |
| C6= | 2.079709E−05 |

In the 19th embodiment, the equation of the aspheric surface profiles of the aforementioned lens elements is the same as the equation of the 1st embodiment. Also, the definitions of these parameters shown in Table 19D are the same as those stated in the 1st embodiment with corresponding values for the 19th embodiment, so an explanation in this regard will not be provided again.

Moreover, these parameters can be calculated from Table 19A, Table 19B and Table 19C as the following values and satisfy the following conditions:

TABLE 19D

| Schematic Parameters | | | |
| --- | --- | --- | --- |
| f [mm] | 5.04 | fc1/fc2 | 24.61 |
| Fno | 2.06 | f/|R1| | 0.99 |
| HFOV [deg.] | 50.0 | CTc1/|RLci| | 0.21 |
| |ImgH/f1| | 0.02 | (Rc1o − Rc1i)/(Rc1o + Rc1i) | 0.003 |
| TL/ImgH | 1.28 | |SAGLci|/CTLc | 1.22 |
| Ym_max/ImgH | 0.21 | Vmin | 19.5 |
| Ym_max [mm] | 1.25 | Vcmin | 19.5 |
| ML/TL | 0.81 | Vcmax/Vcmin | 2.88 |
| T23/TD | 0.05 | |Dist|_max | 2.33% |
| f/|fc1| | 0.02 | — | — |

20th Embodiment

Figure 39:
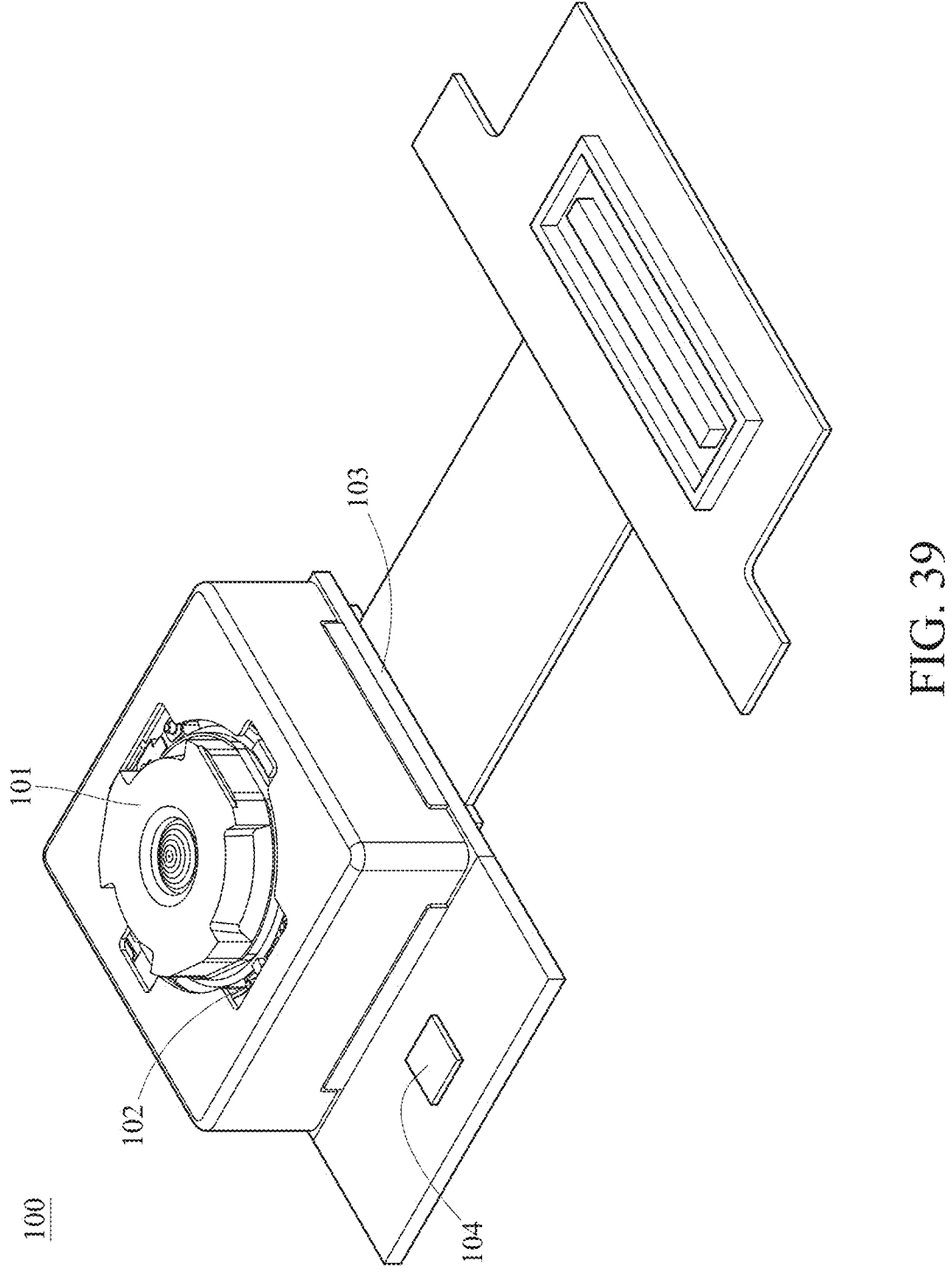
FIG. 39 is a perspective view of an image capturing unit according to the 20th embodiment of the present disclosure.

FIG. 39 is a perspective view of an image capturing unit according to the 20th embodiment of the present disclosure. In this embodiment, an image capturing unit 100 is a camera module including a lens unit 101, a driving device 102, an image sensor 103 and an image stabilizer 104. The lens unit 101 includes the photographing lens assembly disclosed in the 1st embodiment, a barrel and a holder member (their reference numerals are omitted) for holding the photographing lens assembly. However, the lens unit 101 may alternatively be provided with the photographing lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the photographing lens assembly to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

21th Embodiment

Figure 40:
FIG. 40 is one perspective view of an electronic device according to the 21th embodiment of the present disclosure.
Figure 41:
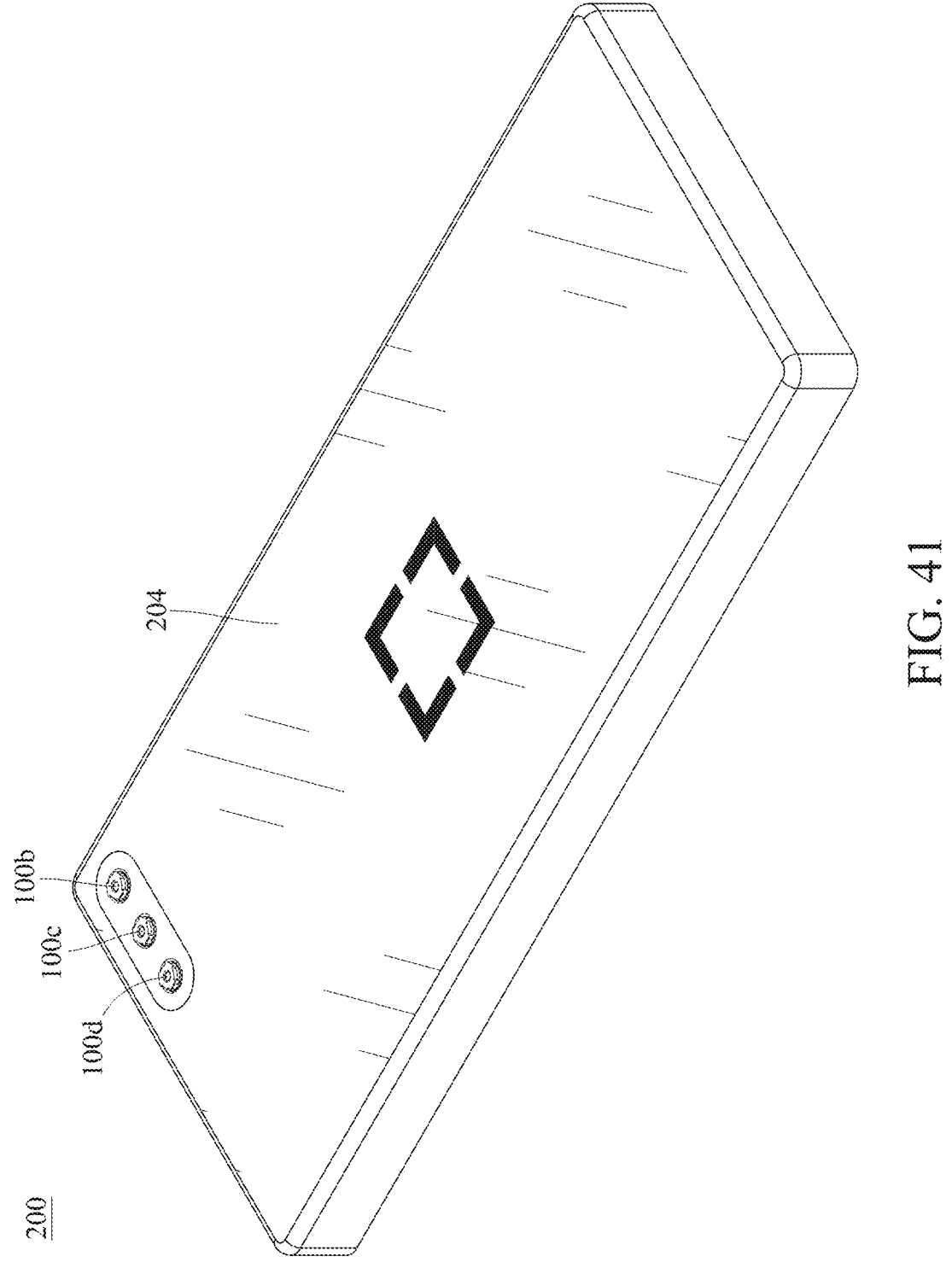
FIG. 41 is another perspective view of the electronic device in FIG. 40.
Figure 42:
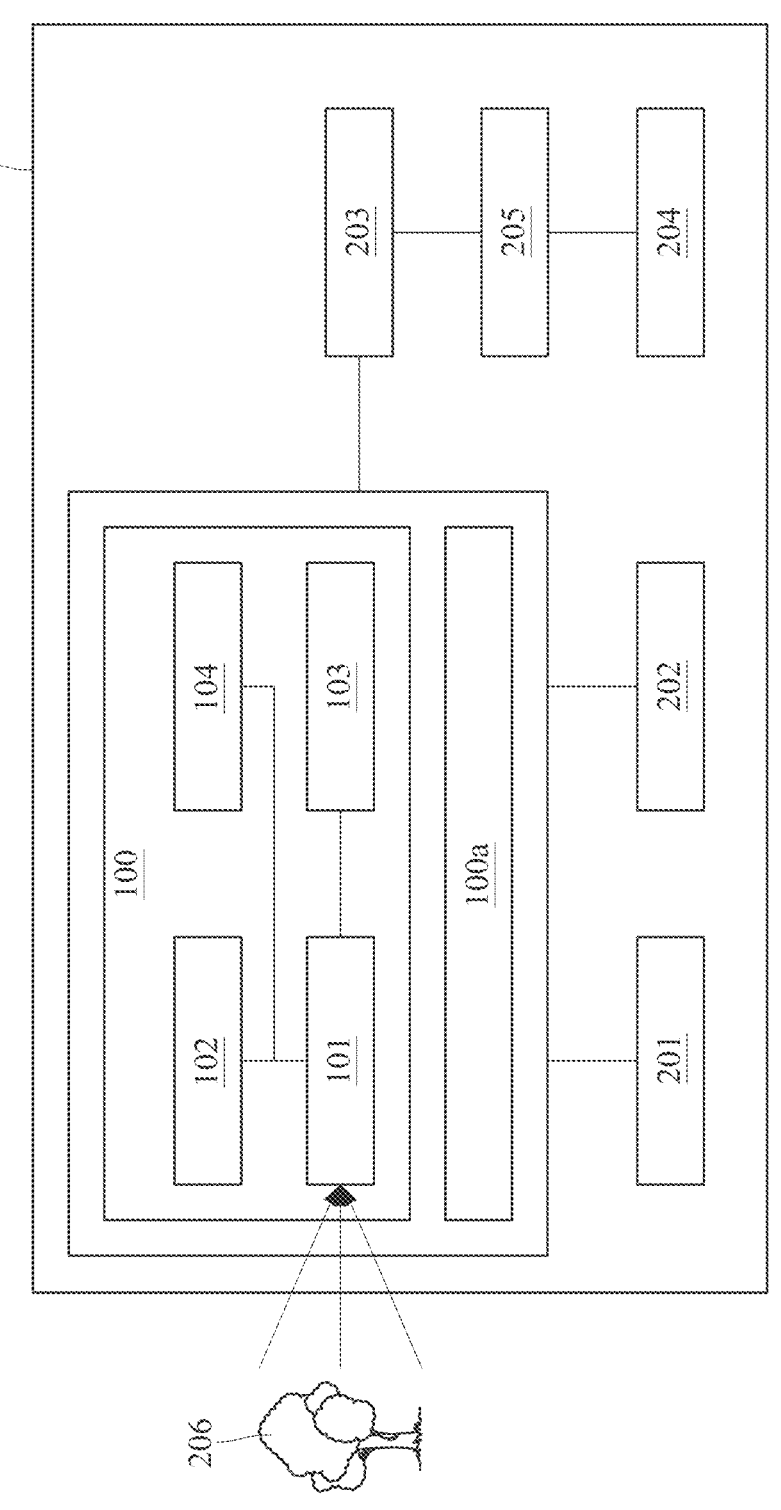
FIG. 42 is a block diagram of the electronic device in FIG. 40.

FIG. 40 is one perspective view of an electronic device according to the 21th embodiment of the present disclosure. FIG. 41 is another perspective view of the electronic device in FIG. 40. FIG. 42 is a block diagram of the electronic device in FIG. 40.

In this embodiment, an electronic device 200 is a smartphone including the image capturing unit 100 disclosed in the 20th embodiment, an image capturing unit 100a, an image capturing unit 100b, an image capturing unit 100c, an image capturing unit 100d, a flash module 201, a focus assist module 202, an image signal processor 203, a display module 204 and an image software processor 205. The image capturing unit 100 and the image capturing unit 100a are disposed on the same side of the electronic device 200. The focus assist module 202 can be a laser rangefinder or a ToF (time of flight) module, but the present disclosure is not limited thereto. The image capturing unit 100b, the image capturing unit 100c, the image capturing unit 100d and the display module 204 are disposed on the opposite side of the electronic device 200, and the display module 204 can be a user interface, such that the image capturing units 100b, 100c, 100d can be front-facing cameras of the electronic device 200 for taking selfies, but the present disclosure is not limited thereto. Furthermore, each of the image capturing units 100a, 100b, 100c and 100d can include the photographing lens assembly of the present disclosure and can have a configuration similar to that of the image capturing unit 100. In detail, each of the image capturing units 100a, 100b, 100c and 100d can include a lens unit, a driving device, an image sensor and an image stabilizer, and each of the lens unit can include a photographing lens assembly such as the photographing lens assembly of the present disclosure, a barrel and a holder member for holding the photographing lens assembly.

The image capturing unit 100 is a wide-angle image capturing unit, the image capturing unit 100a is an ultra-wide-angle image capturing unit, the image capturing unit 100b is a wide-angle image capturing unit, the image capturing unit 100c is an ultra-wide-angle image capturing unit, and the image capturing unit 100d is a ToF image capturing unit. In this embodiment, the image capturing units 100 and 100a have different fields of view, such that the electronic device 200 can have various magnification ratios so as to meet the requirement of optical zoom functionality. In addition, the image capturing unit 100d can determine depth information of the imaged object. In this embodiment, the electronic device 200 includes multiple image capturing units 100, 100a, 100b, 100c and 100d, but the present disclosure is not limited to the number and arrangement of image capturing units.

When a user captures images of an object 206, the light rays converge in the image capturing unit 100 or the image capturing unit 100*a* to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100*b*, 100*c* or 100*d* to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

22th Embodiment

Figure 43:
FIG. 43 is one perspective view of an electronic device according to the 22th embodiment of the present disclosure.

FIG. 43 is one perspective view of an electronic device according to the 22th embodiment of the present disclosure.

In this embodiment, an electronic device 300 is a smartphone including the image capturing unit 100 disclosed in the 20th embodiment, an image capturing unit 100*e*, an image capturing unit 100*f*, a flash module 301, a focus assist module, an image signal processor, a display module and an image software processor (not shown). The image capturing unit 100, the image capturing unit 100*e* and the image capturing unit 100*f* are disposed on the same side of the electronic device 300, while the display module is disposed on the opposite side of the electronic device 300. Furthermore, each of the image capturing units 100*e* and 100*f* can include the photographing lens assembly of the present disclosure and can have a configuration similar to that of the image capturing unit 100, and the details in this regard will not be provided again.

The image capturing unit 100 is a wide-angle image capturing unit, the image capturing unit 100*e* is a telephoto image capturing unit, and the image capturing unit 100*f* is an ultra-wide-angle image capturing unit. In this embodiment, the image capturing units 100, 100*e* and 100*f* have different fields of view, such that the electronic device 300 can have various magnification ratios so as to meet the requirement of optical zoom functionality. Moreover, the image capturing unit 100*e* can be a telephoto image capturing unit having a light-folding element configuration, such that the total track length of the image capturing unit 100*e* is not limited by the thickness of the electronic device 300. Moreover, the light-folding element configuration of the image capturing unit 100*e* can be similar to, for example, one of the structures shown in FIG. 59 to FIG. 61, which can be referred to foregoing descriptions corresponding to FIG. 59 to FIG. 61, and the details in this regard will not be provided again. In this embodiment, the electronic device 300 includes multiple image capturing units 100, 100*e* and 100*f*, but the present disclosure is not limited to the number and arrangement of image capturing units. When a user captures images of an object, light rays converge in the image capturing unit 100, 100*e* or 100*f* to generate images, and the flash module 301 is activated for light supplement. Further, the subsequent processes are performed in a manner similar to the abovementioned embodiment, so the details in this regard will not be provided again.

23th Embodiment

Figure 44:
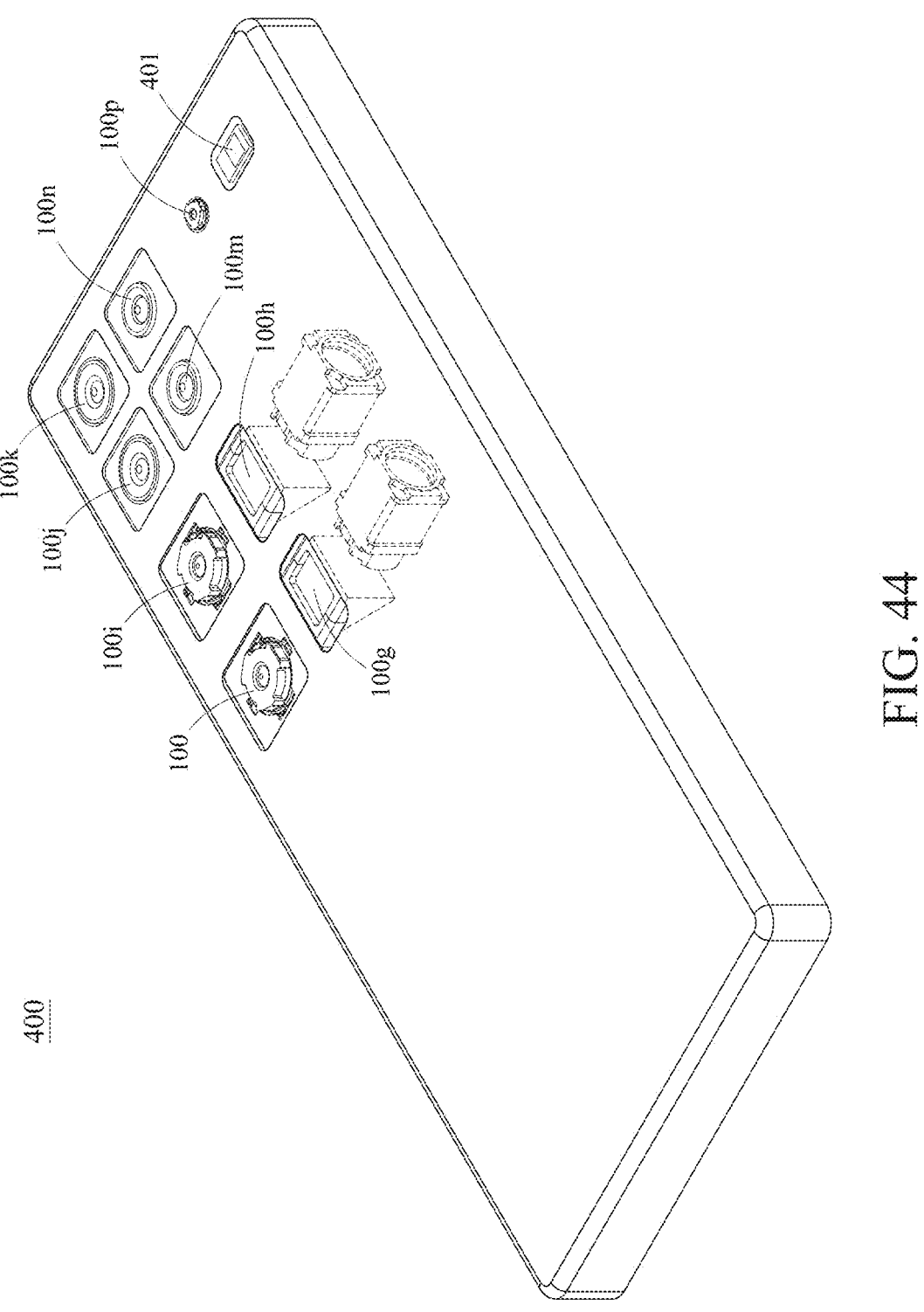
FIG. 44 is one perspective view of an electronic device according to the 23th embodiment of the present disclosure.

FIG. 44 is one perspective view of an electronic device according to the 23th embodiment of the present disclosure.

In this embodiment, an electronic device 400 is a smartphone including the image capturing unit 100 disclosed in the 20th embodiment, an image capturing unit 100*g*, an image capturing unit 100*h*, an image capturing unit 100*i*, an image capturing unit 100*j*, an image capturing unit 100*k*, an image capturing unit 100*m*, an image capturing unit 100*n*, an image capturing unit 100*p*, a flash module 401, a focus assist module, an image signal processor, a display module and an image software processor (not shown). The image capturing units 100, 100*g*, 100*h*, 100*i*, 100*j*, 100*k*, 100*m*, 100*n* and 100*p* are disposed on the same side of the electronic device 400, while the display module is disposed on the opposite side of the electronic device 400. Furthermore, each of the image capturing units 100*g*, 100*h*, 100*i*, 100*j*, 100*k*, 100*m*, 100*n* and 100*p* can include the photographing lens assembly of the present disclosure and can have a configuration similar to that of the image capturing unit 100, and the details in this regard will not be provided again.

The image capturing unit 100 is a wide-angle image capturing unit, the image capturing unit 100*g* is a telephoto image capturing unit, the image capturing unit 100*h* is a telephoto image capturing unit, the image capturing unit 100*i* is a wide-angle image capturing unit, the image capturing unit 100*j* is an ultra-wide-angle image capturing unit, the image capturing unit 100*k* is an ultra-wide-angle image capturing unit, the image capturing unit 100*m* is a telephoto image capturing unit, the image capturing unit 100*n* is a telephoto image capturing unit, and the image capturing unit 100*p* is a ToF image capturing unit. In this embodiment, the image capturing units 100, 100*g*, 100*h*, 100*i*, 100*j*, 100*k*, 100*m* and 100*n* have different fields of view, such that the electronic device 400 can have various magnification ratios so as to meet the requirement of optical zoom functionality. Moreover, each of the image capturing units 100*g* and 100*h* can be a telephoto image capturing unit having a light-folding element configuration. Moreover, the light-folding element configuration of each of the image capturing unit 100*g* and 100*h* can be similar to, for example, one of the structures shown in FIG. 59 to FIG. 61, which can be referred to foregoing descriptions corresponding to FIG. 59 to FIG. 61, and the details in this regard will not be provided again. In addition, the image capturing unit 100*p* can determine depth information of the imaged object. In this embodiment, the electronic device 400 includes multiple image capturing units 100, 100*g*, 100*h*, 100*i*, 100*j*, 100*k*, 100*m*, 100*n* and 100*p*, but the present disclosure is not limited to the number and arrangement of image capturing units. When a user captures images of an object, the light rays converge in the image capturing unit 100, 100*g*, 100*h*, 100*i*, 100*j*, 100*k*, 100*m*, 100*n* or 100*p* to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the photographing lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-19C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising a plurality of lens elements, the plurality of lens elements at least comprising a first lens element closest to an object side and at least one subsequent lens element, and each of the plurality of lens elements having an object-side surface facing toward the object side and an image-side surface facing toward an image side;

wherein the first lens element is a simple refractive lens element, at least one lens element of the at least one subsequent lens element is a metalens, at least one lens surface of the object-side surface and the image-side surface of the metalens is a metasurface, and the metasurface comprises a base and a subwavelength microstructure formed on the base;

wherein a minimum value among Abbe numbers of all simple refractive lens elements and Abbe numbers of all bases of all metalenses of the photographing lens assembly is Vmin, a central thickness of the simple refractive lens element closest to the object side in the photographing lens assembly is CTc1, a curvature radius of the image-side surface of a simple refractive lens element closest to an image surface in the photographing lens assembly is RLci, and the following conditions are satisfied:

$$6.0 < V\text{min} < 20.0; \text{ and}$$

$$0.01 < CTc1/|RLci| < 30.00;$$

wherein a maximum angle of incident light onto a metasurface emitting from a meridional ray of maximum field of view is θm, and the following condition is satisfied at each metasurface having the subwavelength microstructure:

$$0.0 \text{ [deg.]} < \theta m < 60.0 \text{ [deg.]}.$$

2. The photographing lens assembly of claim 1, wherein a minimum value among Abbe numbers of all simple refractive lens elements of the photographing lens assembly is Vcmin, and the following condition is satisfied:

$$6.0 < Vc\text{min} < 50.0.$$

3. The photographing lens assembly of claim 1, wherein a height of the subwavelength microstructure perpendicular to a surface of the base is H, a reference wavelength is λ0, and the following condition is satisfied:

$$0.40 < H/\lambda 0 < 2.20.$$

4. The photographing lens assembly of claim 1, wherein a surface of the base is planar, at least one lens element among the plurality of lens elements is a simple refractive lens element, and the simple refractive lens element is made of plastic material and has the object-side surface and the image-side surface being both aspheric;

wherein the maximum angle of incident light onto the metasurface emitting from the meridional ray of maximum field of view is θm, and the following condition is satisfied at a metasurface closest to the image surface:

$$\theta m < 32.0 \text{ [deg.]}.$$

5. The photographing lens assembly of claim 1, wherein an axial distance between the object-side surface of the first lens element and the image surface is TL, a maximum image height of the photographing lens assembly is ImgH, and the following condition is satisfied:

$$1.40 < TL/\text{Img}H < 15.00.$$

6. The photographing lens assembly of claim 1, wherein the subwavelength microstructure comprises a plurality of nanofins, and the plurality of nanofins have different rotation angles at different positions on a lens surface when viewing from cross sections of the plurality of nanofins.

7. The photographing lens assembly of claim 1, wherein the subwavelength microstructure comprises a plurality of nanopillars, and the plurality of nanopillars have different sizes at different positions on a lens surface when viewing from cross sections of the plurality of nanopillars.

8. The photographing lens assembly of claim 7, wherein a height of the subwavelength microstructure perpendicular to a surface of the base is H, a minimum diameter on the cross sections of the plurality of nanopillars is Dmin, and the following condition is satisfied:

$$4.00 < H/D\text{min} < 40.00.$$

9. The photographing lens assembly of claim 7, wherein a height of the subwavelength microstructure perpendicular to a surface of the base is H, a maximum diameter on the cross sections of the plurality of nanopillars is Dmax, and the following condition is satisfied:

$$1.50 < H/D\text{max} < 10.00.$$

10. An image capturing unit, comprising:
the photographing lens assembly of claim 1; and
an image sensor disposed on the image surface of the photographing lens assembly.

11. An electronic device, comprising:
the image capturing unit of claim 10.

12. The photographing lens assembly of claim 1, wherein a distance parallel to an optical axis between an axial vertex and a maximum effective radius position on the image-side surface of a simple refractive lens element closest to the image surface in the photographing lens assembly is |SAGLci|, a central thickness of the simple refractive lens element closest to the image surface in the photographing lens assembly is CTLc, and the following condition is satisfied:

$$0.05 < |SAGLci|/CTLc < 7.00.$$

13. The photographing lens assembly of claim 1, wherein a focal length of the photographing lens assembly is f, a focal length of a simple refractive lens element closest to the object side in the photographing lens assembly is fc1, and the following condition is satisfied:

$$0.015 < f/|fc1| < 20.00.$$

14. The photographing lens assembly of claim 13, wherein a lens element closest to the object side in the photographing lens assembly is the simple refractive lens element and has negative refractive power.

15. The photographing lens assembly of claim 14, wherein half of a maximum field of view of the photographing lens assembly is HFOV, and the following condition is satisfied:

40.0 [deg.]<HFOV<120.0 [deg.].

16. The photographing lens assembly of claim 13, wherein a curvature radius of the object-side surface of the simple refractive lens element closest to the object side in the photographing lens assembly is Rc1o, a curvature radius of the image-side surface of the simple refractive lens element closest to the object side in the photographing lens assembly is Rc1i, and the following condition is satisfied:

−30.00<(Rc1o−Rc1i)/(Rc1o+Rc1i)<0.30.

17. The photographing lens assembly of claim 16, wherein a maximum value of an absolute value of a distortion aberration on the image surface at various fields of view is |Dist|_max, and the following condition is satisfied:
|Dist|_max<10.0%.

18. The photographing lens assembly of claim 16, wherein each of the object-side and the image-side of the metalens is the metasurface having the subwavelength microstructure.

19. The photographing lens assembly of claim 1, wherein the photographing lens assembly at least comprises two simple refractive lens elements;

wherein a focal length of a simple refractive lens element closest to the object side in the photographing lens assembly is fc1, a focal length of a simple refractive lens element being second simple refractive lens element from the object side in the photographing lens assembly is fc2, and the following condition is satisfied:

−10.00<fc1/fc2<0.03.

20. The photographing lens assembly of claim 1, wherein a working wavelength of the photographing lens assembly falls within a visible spectrum.

21. The photographing lens assembly of claim 1, wherein the image-side surface of a simple refractive lens element closest to the image surface in the photographing lens assembly is concave in a paraxial region thereof.

22. The photographing lens assembly of claim 1, wherein a refractive index of the subwavelength microstructure of the metasurface is Nm, a refractive index of the base of the metasurface is Ns, and the following condition is satisfied at each metasurface in the photographing lens assembly:

0.50<Nm−Ns<2.50.

23. The photographing lens assembly of claim 1, wherein the subwavelength microstructure is a hexagonal periodic array on the surface of the base.

24. The photographing lens assembly of claim 1, wherein a refractive index of the subwavelength microstructure of the metasurface is Nm, and the following condition is satisfied at each metasurface in the photographing lens assembly:

1.600<Nm<3.500.

25. The photographing lens assembly of claim 1, wherein a longitudinal spherical aberration on the image surface at various fields of view within a visible spectrum ranges from −0.10 millimeters to 0.10 millimeters.

26. The photographing lens assembly of claim 1, wherein a maximum value of a maximum effective radius on the metasurface having the subwavelength microstructure in the photographing lens assembly is Ym_max, a maximum image height of the photographing lens assembly is ImgH, and the following condition is satisfied:

0.10<Ym_max/ImgH<0.75.

27. The photographing lens assembly of claim 1, wherein a height of the subwavelength microstructure perpendicular to a surface of the base is H, a distance between centers of two adjacent periodic structures in the subwavelength microstructure is P, and the following condition is satisfied:

1.25<H/P<10.00.

28. The photographing lens assembly of claim 1, wherein the maximum angle of incident light onto the metasurface emitting from the meridional ray of maximum field of view is θm, and the following condition is satisfied at each metasurface having the subwavelength microstructure:

0.0 [deg.]<θm<50.0 [deg.].

29. The photographing lens assembly of claim 1, wherein the plurality of lens element at least comprise the first lens element closest to the object side and a second lens element that is adjacent to the first lens element at an image side of the first lens element, there is no additional lens element disposed between the first lens element and the second lens element, and the image-side surface of the second lens element is concave in a paraxial region thereof.

30. The photographing lens assembly of claim 1, wherein the plurality of lens element at least comprise the first lens element closest to the object side and a second lens element that is adjacent to the first lens element at an image side of the first lens element, the object-side surface of the second lens element is convex in a paraxial region thereof.

31. The photographing lens assembly of claim 1, wherein a distance between centers of two adjacent periodic structures in the subwavelength microstructure is P, a reference wavelength is λ0, and the following condition is satisfied:

0.05<P/λ0<0.80.

32. The photographing lens assembly of claim 1, wherein the photographing lens assembly at least comprises two simple refractive lens elements;

wherein a maximum value among Abbe numbers of all simple refractive lens elements of the photographing lens assembly is Vcmax, a minimum value among Abbe numbers of all simple refractive lens elements of the photographing lens assembly is Vcmin, and the following condition is satisfied:

1.10<Vcmax/Vcmin<5.20.

33. The photographing lens assembly of claim 1, wherein a maximum value of a maximum effective radius on the metasurface having the subwavelength microstructure in the photographing lens assembly is Ym_max, and the following condition is satisfied:

Ym_max<4.00 [mm].

34. The photographing lens assembly of claim 1, wherein the maximum angle of incident light onto the metasurface emitting from the meridional ray of maximum field of view is θm, and the following condition is satisfied at a metasurface closest to the image surface:

0.0 [deg.]<θm<40.0 [deg.].

35. The photographing lens assembly of claim 1, wherein the subwavelength microstructure of the metasurface of the photographing lens assembly is made of dielectric material.

36. The photographing lens assembly of claim 1; wherein a focal length of the photographing lens assembly is f, a curvature radius of the object-side surface of the first lens element is R1, and the following condition is satisfied:

$$0.03 < f/|R1| < 30.00.$$

37. The photographing lens assembly of claim 1; wherein a maximum image height of the photographing lens assembly is ImgH, a focal length of the first lens element is f1, and the following condition is satisfied:

$$0.05 < |ImgH/f1| < 10.00.$$

\* \* \* \* \*